US012340191B1

(12) United States Patent
Serban et al.

(10) Patent No.: US 12,340,191 B1
(45) Date of Patent: Jun. 24, 2025

(54) SYSTEMS AND METHODS FOR REVIEWING CODE

(71) Applicant: Korbit Technologies Inc., Montréal (CA)

(72) Inventors: Iulian Serban, Montreal (CA); Ariella Smofsky, Montreal (CA); Robert Belfer, Montreal (CA); Mathieu Germain, Montreal (CA); Antoine Frau, Corsica (FR); Kavita Ganeshan, Calgary (CA); Ekaterina Kochmar, Abu Dhabi (AE); Soner Yildirim, Istanbul (AR); Arjun Sudhakar, Toronto (CA)

(73) Assignee: Korbit Technologies Inc., Montreal (CA)

( * ) Notice: Subject to any disclaimer, the term of this patent is extended or adjusted under 35 U.S.C. 154(b) by 0 days.

(21) Appl. No.: 18/942,096

(22) Filed: Nov. 8, 2024

(51) Int. Cl.
*G06F 8/40* (2018.01)
*G06F 8/41* (2018.01)
*G06F 11/362* (2025.01)

(52) U.S. Cl.
CPC .............. *G06F 8/433* (2013.01); *G06F 8/427* (2013.01); *G06F 11/3624* (2013.01)

(58) Field of Classification Search
CPC ... G06F 8/427; G06F 8/433; G06F 11/362471
See application file for complete search history.

(56) References Cited

U.S. PATENT DOCUMENTS

| | | | |
|---|---|---|---|
| 10,740,216 B1* | 8/2020 | Parent | G06N 20/00 |
| 2013/0041712 A1* | 2/2013 | Smoot | G06Q 40/08 |
| | | | 705/7.28 |
| 2020/0082095 A1* | 3/2020 | Mcallister | G06F 11/323 |
| 2023/0229849 A1* | 7/2023 | Ramamonjison | G06N 5/01 |
| | | | 715/234 |

(Continued)

OTHER PUBLICATIONS

Goel, Amar. How Does Bito's "AI That Understands Your Code" Work? Available at: www.linkedin.com/posts/amargoel_how-does-bitos-ai-that-understands-your-activity-7191451305532444672-u6HR. [retrieved Nov. 22, 2024] May 1, 2024. 7 pages.

(Continued)

*Primary Examiner* — Hanh Thi-Minh Bui
(74) *Attorney, Agent, or Firm* — WILSON SONSINI GOODRICH & ROSATI

(57) ABSTRACT

Provided herein is a method for reviewing code. The method can comprise parsing the code to generate a structural representation of the code, wherein the structural representation comprises a graph representative of the code. The method can comprise processing the code and the structural representation to generate a context for the code based at least in part on the graph. The method can comprise processing the context and a set of prompts to generate a set of contextualized prompts, wherein at least two prompts in the set of prompts are specific for different categories of issues. The method can comprise prompting a first set of language models with the set of contextualized prompts to generate a set of issue reports. The method can comprise prompting a (Continued)

second set of language models to generate a set of validated issue reports comprising a set of non-hallucinated issue report.

29 Claims, 45 Drawing Sheets

(56) References Cited

U.S. PATENT DOCUMENTS

2024/0403710 A1* 12/2024 Licato .................... G06N 3/045
2024/0428091 A1* 12/2024 Sharpe ................... G06N 5/025

OTHER PUBLICATIONS

Qodo Merge Pro. Available at: https://pr-agent-docs.codium.ai/#how-it-works. [retrieved Nov. 22, 2024]. 6 pages.
SonarQube, 10.7 Documentation. Sonarsource, docs.sonarsource.com/sonarqube/latest/?_gl=1*hhpooz*_gcl_aw*R0NMLjE3MjQxNjExNTluQ2p3S0NBandfWkMyQmhBUUVpd0FYU2dDbGpQN3FHNV9waGpxYzVuWk12YzJCdF9xVDM0OV9xMmZnRGpGWmNBVGU4QVpmRIhiRUdybEdCb0NCNkVRQXZEX0J3RQ..*_gcl_au*MTk1ODUwNzg1OC4xNzI0MTYxMTUx*_up*MQ..*_ga*OTYwODEyNjg1LjE3MjQxNjExNTI.*_ga_9JZ0GZ5TC6*MTcyNDE2MTE1Mi4xLjAuMTcyNDE2MTQ1Ni42MC4wLjA.&gclid=CjwKCAjw_ZC2BhAQEiwAXSgCljP7qG5_phjqc5nZMvc2Bt_qT349_q2fgDjFZcATe8AZfFXbEGrIGBoCB6EQAvD_BwE. Accessed Nov. 22, 2024. 4 pages.
Unell, Madison. Code Climate. Available at: https://codeclimate.com/velocity/what-is-velocity. [retrieved Nov. 22, 2024] Mar. 8, 2024. 9 pages.

\* cited by examiner

FIG. 24A chat_oracle/api/code_analysis_api_proxy.py

| 35 |    | return False |
|----|----|--------------|
| 36 |    | return True |
| 37 |    | |
| 38 |    | |
| 39 | 20 | @ns.route('/check', methods=['POST']) |
| 40 | 21 | class Proxy(Resource): |
| 41 | 22 | @login_required |
| 42 | 23 | def post(self): |
| 43 | 24 | data = request.get_json() |
| 44 | 25 | repo_names = [repo["full_name"] for repo in data["repositories"]] | development-Korbit-ai-mentor     on Jun 20, 2023

It seems like the function 'is_user_in_repo_orgs' is replacing the previous 'is_allowed' function. Make sure that this new function covers all the cases that the old function did. For instance, the old function checks if the repo name is in the user organizations, does the new function do this as well?

FIG. 24B chat_oracle/api/code_analysis_api_proxy.py

| ... | ... | @@ -3,46 +3,27 @@ |
|-----|-----|-------------------|
| 3   | 3   | from flask_restx import Namespace, Resource |
| 4   | 4   | from korbit_logger.logger import get_logger |
| 5   | 5   | |
| 6   |     | - from chat_oracle.api.auth import login_required |
|     | 6   | + from chat_oracle.api.auth import is_user_in_repo_orgs, login_required | development-Korbit-ai-mentor     on Jun 20, 2023

It seems like you have moved authentication functions to a separate module. This is a good practice for modularity, but this change could potentially introduce issues if the moved functions are not thoroughly tested in their new context. Make sure that the functions 'is_user_in_repo_orgs' and 'login_required' are still working as expected after the move.

| raw_issue_subcategory | keyword_mute | low_confidence | not_actionable | not_in_diff | one_issue_per... | praise | semantic_ded... | wrong_catego... | Row totals |
|---|---|---|---|---|---|---|---|---|---|
| Readability and Maintainability | 149 | 915 | | | 559 | 122 | 59 | | 1,804 |
| Asynchronous Processing | | 66 | | | 85 | 89 | 67 | 13 | 321 |
| Database Operations | | 132 | 2 | | 146 | 32 | 28 | 1 | 362 |
| Design Patterns | | 95 | | | 282 | 346 | 35 | 5 | 758 |
| Error Handling | | 149 | | | 444 | 119 | 25 | 39 | 778 |
| Logging | | 54 | | | 261 | 209 | 25 | | 606 |
| Objects and Data Structures | | 118 | | | 315 | 316 | 1 | 60 | 810 |
| Performance | | 264 | 1 | 2 | 299 | 84 | 20 | 13 | 709 |
| Security | | 130 | 3 | 5 | 256 | 140 | 25 | 40 | 620 |
| Third-party Libraries | | 110 | 3 | 2 | 39 | 100 | 29 | 11 | 294 |
| Naming | | | | | 1 | 3 | 4 | | 8 |
| Systems and Environment | | | | | 1 | 5 | | | 6 |
| Documentation | | | | | | 4 | 1 | | 5 |
| Tests | | | | | | 2 | | | 2 |
| Grand totals | 149 | 2,033 | 9 | 15 | 2,688 | 1,571 | 195 | 368 | 7,083 |

*FIG. 28*

SYSTEMS AND METHODS FOR REVIEWING CODE

BACKGROUND

In software development, ensuring code quality and that software meets all requirements is a critical yet challenging task. The presence of bugs, errors, and inefficiencies in software can lead to unexpected behavior, application crashes, performance degradation, and poor user experience.

SUMMARY

In some aspects, the present application provides computer-based system comprising: at least one processor and instructions executable by the at least one processor to cause the at least one processor to perform operations comprising: (a) obtaining code; (b) parsing the code to generate a structural representation of the code, wherein the structural representation comprises a graph representative of the code; (c) processing the code and the structural representation to generate a context for the code based at least in part on the graph; (d) processing the context and a set of prompts to generate a set of contextualized prompts, wherein at least two prompts in the set of prompts are specific for different categories of issues; (e) prompting a first set of language models with the set of contextualized prompts to generate a set of issue reports; (f) prompting a second set of language models to generate a set of validated issue reports comprising a set of non-hallucinated issue reports; (g) filtering the set of validated issue reports to generate a set of prioritized issue reports; and (h) providing the set of prioritized issue reports to a user.

In some embodiments, the code comprises source code.

In some embodiments, the code comprises a set of changes to the code.

In some embodiments, the graph is representative of the code that is dependent on the set of changes.

In some embodiments, the set of changes are distributed across different files in the code.

In some embodiments, the processing in (c) comprises processing the set of changes to generate the context for the code and the set of changes.

In some embodiments, the set of changes are between two instances of the code.

In some embodiments, the set of changes are provided with a pull request.

In some embodiments, the processing in (c) to generate the context is further based on a documentation of the code.

In some embodiments, the context describes value provided to users by the code.

In some embodiments, the context describes a feature intended to be implemented by the code.

In some embodiments, the context describes how a feature is implemented by the code.

In some embodiments, the context describes a bug fixed by the code.

In some embodiments, the context describes a programming language of the code.

In some embodiments, the context describes the code.

In some embodiments, the context describes the documentation.

In some embodiments, the context describes a coding standard for the code.

In some embodiments, the context is described in natural language.

In some embodiments, the context is shorter than the code.

In some embodiments, the context is longer than the code.

In some embodiments, the processing in (c) is performed using a machine learning algorithm.

In some embodiments, the machine learning algorithm comprises a neural network.

In some embodiments, the neural network comprises a language model.

In some embodiments, the language model comprises a large language model (LLM).

In some embodiments, the machine learning algorithm is trained on at least 1, 2, 3, 4, 5, 10, 50, 100, 500, or 1000 million code repositories.

In some embodiments, the machine learning algorithm is trained on at most 1, 2, 3, 4, 5, 10, 50, 100, 500, or 1000 million code repositories.

In some embodiments, the structural representation represents the code as a whole.

In some embodiments, the structural representation represents a part of the code.

In some embodiments, the structural representation represents the part of the code that is related to the set of changes.

In some embodiments, the structural representation represents the part of the code that is nth-order linked to the set of changes, wherein n is a natural number.

In some embodiments, the structural representation represents the part of the code that the set of changes are nth-order linked to, wherein n is a natural number.

In some embodiments, the nth-order links represent dependency, relevancy, flow of data, or any combination thereof.

In some embodiments, n is at least 1, 2, 3, 4, 5, 6, 7, 8, 9, 10, 20, 30, 40, 50, 60, 70, 80, 90, or 100.

In some embodiments, n is at most 1, 2, 3, 4, 5, 6, 7, 8, 9, 10, 20, 30, 40, 50, 60, 70, 80, 90, or 100.

In some embodiments, the structural representation represents a file, a module, a class, a function, or any combination thereof, of the code.

In some embodiments, the structural representation represents links between a file, a module, a class, a function, or any combination thereof, of the code.

In some embodiments, the structural representation represents a programming language of the code, a file path for a file in the code, a plurality of file paths for files in the code, a graph of the code, or any combination thereof.

In some embodiments, the graph is a directed graph.

In some embodiments, the directed graph is a control-flow graph.

In some embodiments, the directed graph represents objects that perform operations, and edges of the graph represent flow of data between the objects.

In some embodiments, the graph is a tree.

In some embodiments, the tree is a syntax tree.

In some embodiments, the syntax tree is an abstract syntax tree or a concrete syntax tree.

In some embodiments, the context describes the structural representation of the code.

In some embodiments, the context provides snippets of a part of the code that is related to the set of changes.

In some embodiments, the snippets are non-local.

In some embodiments, the snippets are from different files in the code.

In some embodiments, the snippets are different lines in a file in the code, and wherein the different lines are at least 5, 10, 20, 50, 100, 200, 300, 400, 500, 600, 700, 800, 900, or 1000 lines apart.

In some embodiments, the context comprises the code.

In some embodiments, the context summarizes the code.

In some embodiments, the (c) processing further processes a user profile to generate the context of the code.

In some embodiments, the user profile comprises an individual profile, a team profile, an organization profile, or any combination thereof.

In some embodiments, the user profile comprises technical requirements, coding standards, configurations, or any combination thereof.

In some embodiments, the technical requirements comprise performance, security, testing, or any combination thereof.

In some embodiments, the user profile comprises importance of issues to the user, to the code, to a file in the code, or any combination thereof.

In some embodiments, the user profile comprises issues that were presented to the user and/or the user's organization, issues that were addressed by the user or the user's organization, issues that were not addressed by the user or the user's organization, issues that the user has provided feedback on or others within the user's organization has provided feedback on, or any combination thereof.

In some embodiments, the parsing comprises performing static analysis of the code.

In some embodiments, the parsing extracts functions, classes, modules, and/or data types in the code.

In some embodiments, the parsing comprises dependency parsing the code.

In some embodiments, the dependency parsing uses a syntax tree.

In some embodiments, the syntax tree is an abstract syntax tree or a concrete syntax tree.

In some embodiments, the parsing is configured to parse at least 1, 2, 3, 4, 5, 10, 50, 100, 150, 200, 250, or 500 programming languages.

In some embodiments, the parsing is configured to parse at most 1, 2, 3, 4, 5, 10, 50, 100, 150, 200, 250, or 500 programming languages.

In some embodiments, the set of prompts are selected based on the code.

In some embodiments, the set of prompts are selected by using a prompt configured to elicit an LLM to provide relevant categories of issues.

In some embodiments, the set of prompts are selected by processing the context, the summary, the set of changes, the structural representation, or any combination thereof, using an LLM.

In some embodiments, the set of prompts are specific for different categories of issues selected from the group consisting of: functionality, security, performance, database operations, error handling, logging, readability and maintainability, asynchronous processing, documentation, naming, design patterns, systems and environment, objects and data structures, test cases, third-party libraries, and any combination thereof.

In some embodiments, at least two prompts in the set of prompts are specific for different categories of issues.

In some embodiments, each prompt in the set of prompts is specific for different categories of issues.

In some embodiments, the set of prompts comprises a template.

In some embodiments, the template comprises a Chain of Thought prompt, a chain of verification prompt, a few-shot learning prompt, or any combination thereof.

In some embodiments, the set of prompts are prompted to the set of language models in serial.

In some embodiments, the set of prompts are prompted to the set of language models in parallel.

In some embodiments, the first set of language models, the second set of language models, or both, are a set of LLMs.

In some embodiments, the first set of language models, the second set of language models, or both, have at least two language models trained on different datasets.

In some embodiments, the different datasets comprise different repositories, different types of labels, different programming languages, or any combination thereof.

In some embodiments, the first set of language models, the second set of language models, or both, have at least two language models trained with different loss functions.

In some embodiments, the first set of language models, the second set of language models, or both, have at least two language models having different architectures.

In some embodiments, the first set of language models, the second set of language models, or both, have at least two language models that are different models.

In some embodiments, the first set of language models, the second set of language models, or both, have at least two language models that perform differently on different tasks.

In some embodiments, the first set of language models and the second set of language models are the same set.

In some embodiments, the first set of language models and the second set of language models are different sets.

In some embodiments, the set of contextualized prompts comprises the context, the user profile, the structural representation, the code, or any combination thereof, integrated with the template.

In some embodiments, the set of contextualized prompts comprises the template in a first section of the prompt and the context in a second section of the prompt.

In some embodiments, the set of contextualized prompts comprises a natural language and a programming language.

In some embodiments, an issue report in the set of issue reports comprises (i) a description of an issue, (ii) a snippet of the code or the pull request that is relevant to the issue, (iii) a confidence score of the issue report, (iv) a priority or importance of the issue report, (v) the category within which the issue reports belongs, (vi) actionability of the issue, (vii) a proposal or plan for fixing the issue, or (viii) any combination thereof.

In some embodiments, (f) comprises identifying a set of non-hallucinated issue reports.

In some embodiments, the identifying the set of non-hallucinated issue reports based on the structural representation.

In some embodiments, (f) comprises identifying a set of hallucinated issue reports.

In some embodiments, the identifying the set of hallucinated issue reports is based on a Chain of Thought prompting.

In some embodiments, the Chain of Thought prompting comprises a question and answer structure.

In some embodiments, the Chain of Thought prompting comprises a self-dialogue.

In some embodiments, the identifying the set of hallucinated issue reports is based on a set of accuracies of the set of issue reports.

In some embodiments, the identifying the set of hallucinated issue reports is based on whether at least two language models in the second set of language models identified the same issues.

In some embodiments, the identifying the set of hallucinated issue reports is based on whether at least two language models in the second set of language models do not identify the same issues.

In some embodiments, the identifying the set of hallucinated issue reports is based on whether every language model in the second set of language models identified the same issues.

In some embodiments, the identifying the set of hallucinated issue reports is based on whether every language model in the second set of language models do not identify the same issues.

In some embodiments, the filtering further comprises evaluating the set of issue reports for actionability, scope, severity, priority, similarity, novelty, or any combination thereof.

In some embodiments, the evaluating the set of issue reports for actionability comprises using an LLM to determine the actionability.

In some embodiments, the determining the actionability using the LLM comprises prompting the LLM with the set of issue reports, relevant snippets of the code and asking the LLM to determine if the set of issue reports is actionable.

In some embodiments, the actionability accounts for if a user should immediately take action to fix an issue in the issue report based on the evaluation.

In some embodiments, the LLM is a language model in the first set of language models, the second set of language models, or a language model not in the first or the second set of language models.

In some embodiments, the operations further comprise removing a set of non-actionability issue reports from the set of issue reports.

In some embodiments, the evaluating the set of issue reports for scope comprises determining whether an issue in the set of issue reports refers to a change in the set of changes.

In some embodiments, the evaluating the set of issue reports for scope is based on the structural representation.

In some embodiments, the evaluating the set of issue reports for scope comprises using string matching.

In some embodiments, the evaluating the set of issue reports for scope comprises using an LLM to determine the scope.

In some embodiments, using the LLM to determine the scope comprises prompting the LLM with the issue report, relevant snippets of the code, the set of changes, the context, or any combination thereof, to determine if an issue is within the scope of the pull request.

In some embodiments, the operations further comprise removing a set of out-of-scope issue reports from the set of issue reports.

In some embodiments, the LLM is a language model in the first set of language models, the second set of language models, or a language model not in the first or the second set of language models.

In some embodiments, the evaluating the set of issue reports for similarity comprises determining whether a subset of issue reports in the set of issue reports refers to similar issues.

In some embodiments, the evaluating the set of issue reports for similarity comprises determining whether a pair of issue reports in the set of issue reports comprises similar embeddings. In some embodiments, the similarity is evaluated using a similarity score.

In some embodiments, the similarity score comprises cosine similarity.

In some embodiments, the evaluating the set of issue reports for similarity comprises using an LLM to determine the similarity.

In some embodiments, using the LLM to determine the similarity comprises prompting the LLM with the set of issue reports to embed the set of issue reports to generate a set of embeddings.

In some embodiments, the operations further comprise clustering the set of embeddings. In some embodiments, the clustering comprises agglomerative clustering.

In some embodiments, the clustering is based on evaluating similarity scores between the set of embeddings.

In some embodiments, using the LLM to determine the similarity comprises prompting the LLM with pairs of issue reports in the set of issue reports to determine their degree of similarity.

In some embodiments, the operations further comprise removing an issue report that is similar to another issue report from the set of issue reports.

In some embodiments, the operations further comprise removing an issue report that refers to a file in the code that is similar to another issue report that refers to a different file in the code.

In some embodiments, the operations further comprise removing an issue report that refers to an issue that has been negatively annotated by a user in the past.

In some embodiments, the evaluating the set of issue reports for severity comprises determining the level of severity of an issue in the set of issue reports.

In some embodiments, the evaluating the set of issue reports for severity comprises using an LLM to determine the level of severity.

In some embodiments, using the LLM to determine the level of severity comprises prompting the LLM with an issue report, relevant snippets of the code, a file comprising the relevant snippets, the code, the set of changes to the code, the structured representation, or any combination thereof, and eliciting the LLM to determine the level of severity of the issue report.

In some embodiments, the operations further comprise removing an issue report that is lower in severity than another issue report from the set of issue reports.

In some embodiments, the evaluating the set of issue reports for severity comprises ranking the set of issues by priority.

In some embodiments, the evaluating the set of issue reports for priority comprises using a recommender.

In some embodiments, the recommender is a machine learning algorithm.

In some embodiments, the recommender is trained on a dataset of issues with resolution labels.

In some embodiments, the resolution labels indicate whether a software developer resolved an issue in the dataset.

In some embodiments, the recommender is trained on a dataset of issues with priority labels.

In some embodiments, input features of the recommender system comprises: a description of an issue, an embedding of the issue, a level of severity of the issue, a scope of the issue, a novelty of the issue, a similarity of the issue to other present issues, a similarity of the issue to past issues, the likelihood the issue will be resolved based on past issues as evaluated by a set of language models, the user profile, or any combination thereof.

In some embodiments, the operations further comprise removing an issue report that is lower in priority than another issue report from the set of issue reports.

In some embodiments, the evaluating the set of issue reports for novelty comprises determining whether an issue in an issue report has been detected in the code or a portion thereof.

In some embodiments, the evaluating the set of issue reports for novelty comprises using an LLM to determine the novelty.

In some embodiments, using the LLM to determine the novelty comprises prompting the LLM with the issue report, relevant snippets of the code, and the file comprising the relevant snippets, the code, the set of changes to the code, or any combination thereof, and eliciting the LLM to determine if the issue is novel or not novel.

In some embodiments, the operations further comprise merging the set of changes into the code.

In some embodiments, the operations further comprise evaluating the set of validated issue reports for resolution.

In some embodiments, the operations further comprise evaluating the set of validated issue reports for resolution based on the structural representation.

In some embodiments, the evaluating the set of validated issue reports for resolution comprises using a set of LLMs to determine a resolution status.

In some embodiments, the set of LLMs are used to separately evaluate the set of validated issue reports for resolution.

In some embodiments, using the set of LLMs to determine the resolution comprises prompting the set of LLMs with a validated issue report, relevant snippets of the code, a file comprising the relevant snippets, the code, the set of changes, or any combination thereof, and prompting the set of LLMs to determine that the validated issue report is resolved.

In some embodiments, the operations further comprise, when an LLM in the set of LLMs determines that the resolution status of the issue report is undetermined, prompting the LLM to generate a set of additional files to provide to the LLM.

In some embodiments, the operations further comprise, when the LLM has determined the set of additional files, prompting the LLM to determine if the validated issue report is resolved.

In some embodiments, the operations further comprise training the set of language models on a training dataset comprising the resolved, partially resolved, unresolved, and undetermined issue reports in the set of validated issue reports.

In some embodiments, the training dataset does not comprise the code or a part of the code.

In some embodiments, the operations further comprise updating the organizational profile based on the resolution.

In some embodiments, the code is retrieved from an online database.

In some embodiments, the operations further comprise deleting the code from memory or storage.

In some embodiments, the providing the set of prioritized issue reports to a user comprises displaying a snippet of the code, a comment about the code, an explanation of an issue, or any combination thereof.

In some embodiments, the providing the set of prioritized issue reports to a user comprises displaying a plurality of snippets of the code.

In some embodiments, the plurality of snippets is arranged based on the structural representation.

In some embodiments, the operations are performed in less than 5 or 10 minutes per 10 MB, 100 MB, 1 GB, or 10 GB of code.

In some embodiments, the operations remove at least 50, 60, 70, 80, 90, 91, 92, 93, 94, 95, 96, 97, 98, 99, or 100% of hallucinated issue reports in the set of issue reports.

In some embodiments, the operations preserve at least 50, 40, 30, 20, 10, 5, 4, 3, 2, 1, or 0% of non-hallucinated issue reports in the set of issue reports.

In some embodiments, the operations generate at least 10, 100, 1000, or 10000 issue reports per 10 MB, 100 MB, 1 GB, or 10 GB of code.

In some embodiments, the filtering removes 1, 2, 3, 4, 5, 10, 20, 30, 40, 50, 60, 70, 80, 90, 91, 92, 93, 94, 95, 96, 97, 98, or 99% percent of the issue reports in the set of validated issue reports.

In some embodiments, the set of prompts are selected from a superset of prompts.

In some embodiments, the set of prompts comprises a prompt specific for a performance issue, wherein resolving the performance issue (i) increases the speed of the code, (ii) reduces memory consumed by the code, (iii) reduces storage used by the code, (iv) reduces latency of the code, (v) fixes incorrect or unexpected behavior of the code, or any combination thereof.

Embodiment 162. The computer-based system of any one of Embodiments 1-161, wherein the set of prioritized issue reports identifies a cross-service issue in the code, a critical error in the code, a flawed design pattern in the code, a security issue in the code, or any combination thereof.

In some embodiments, the set of prioritized issue reports excludes linting issues in the code, syntax error issues in the code, readability issues in the code, consistency issues in the code, a coding standard issue in the code, or any combination thereof.

In some aspects, the present disclosure provides a method of reviewing code, comprising: (a) receiving a query about resolving an issue in the code; (b) processing the query and context to generate a prompt, wherein the context describes the code and a structural representation of the code; (c) processing the prompt, using a language model, to generate an answer for the query; and (d) sending the answer in response to the query.

In some embodiments, the processing in (c) comprises generating a set of answers, and filtering the set of answers for the answer.

In some embodiments, the filtering comprises prompting a set of language models to evaluate the set of answers for hallucinations, actionability, scope, or any combination thereof.

In some embodiments, the method further comprises receiving user feedback on the answer.

In some embodiments, the method further comprises generating or updating a user profile based on the user feedback.

In some embodiments, the code comprises source code.

In some embodiments, the code comprises a set of changes to the code.

In some embodiments, the structural representation comprises a graph, and wherein the graph is representative of the code that is dependent on the set of changes.

In some embodiments, the set of changes are distributed across different files in the code.

In some embodiments, the processing in (b) comprises processing the set of changes to generate the context for the code and the set of changes.

In some embodiments, the set of changes are between two instances of the code.

In some embodiments, the set of changes are provided with a pull request.

In some embodiments, the context is further based on a documentation of the code.

In some embodiments, the context describes value provided to users by the code.

In some embodiments, the context describes a feature intended to be implemented by the code.

In some embodiments, the context describes how a feature is implemented by the code.

In some embodiments, the context describes a bug fixed by the code.

In some embodiments, the context describes a programming language of the code.

In some embodiments, the context describes the code.

In some embodiments, the context describes the documentation.

In some embodiments, the context describes a coding standard for the code.

In some embodiments, the context is described in natural language.

In some embodiments, the context is shorter than the code.

In some embodiments, the context is longer than the code.

In some embodiments, the processing in (c) is performed using a machine learning algorithm.

In some embodiments, the machine learning algorithm comprises a neural network.

In some embodiments, the neural network comprises a language model.

In some embodiments, the language model comprises a large language model (LLM).

In some embodiments, the machine learning algorithm is trained on at least 1, 2, 3, 4, 5, 10,
50, 100, 500, or 1000 million code repositories.

In some embodiments, the machine learning algorithm is trained on at most 1, 2, 3, 4, 5, 10, 50, 100, 500, or 1000 million code repositories.

In some embodiments, the structural representation represents the code as a whole.

In some embodiments, the structural representation represents a part of the code.

In some embodiments, the structural representation represents the part of the code that is related to the set of changes In some embodiments, the structural representation represents the part of the code that is nth-order linked to the set of changes, wherein n is a natural number.

In some embodiments, the structural representation represents the part of the code that the set of changes are nth-order linked to, wherein n is a natural number.

In some embodiments, the nth-order links represent dependency, relevancy, flow of data, or any combination thereof.

In some embodiments, n is at least 1, 2, 3, 4, 5, 6, 7, 8, 9, 10, 20, 30, 40, 50, 60, 70, 80, 90, or 100.

In some embodiments, n is at most 1, 2, 3, 4, 5, 6, 7, 8, 9, 10, 20, 30, 40, 50, 60, 70, 80, 90, or 100.

In some embodiments, the structural representation represents a file, a module, a class, a function, or any combination thereof, of the code.

In some embodiments, the structural representation represents links between a file, a module, a class, a function, or any combination thereof, of the code.

In some embodiments, the structural representation represents a programming language of the code, a file path for a file in the code, a plurality of file paths for files in the code, a graph of the code, or any combination thereof.

In some embodiments, the graph is a directed graph.

In some embodiments, the directed graph is a control-flow graph.

In some embodiments, nodes of the directed graph represent objects that perform operations, and edges of the graph represent flow of data between the objects.

In some embodiments, the graph is a tree.

In some embodiments, the tree is a syntax tree.

In some embodiments, the syntax tree is an abstract syntax tree or a concrete syntax tree.

In some embodiments, the context describes the structural representation of the code.

In some embodiments, the context provides snippets of a part of the code that is related to the set of changes.

In some embodiments, the snippets are non-local.

In some embodiments, the snippets are from different files in the code.

In some embodiments, the snippets are different lines in a file in the code, and wherein the different lines are at least 5, 10, 20, 50, 100, 200, 300, 400, 500, 600, 700, 800, 900, or 1000 lines apart.

In some embodiments, the context comprises the code.

In some embodiments, the context summarizes the code.

In some embodiments, the (b) processing further processes a user profile to generate the context of the code.

In some embodiments, the user profile comprises an individual profile, a team profile, an organization profile, or any combination thereof.

In some embodiments, the user profile comprises technical requirements, coding standards, configurations, or any combination thereof.

In some embodiments, the technical requirements comprise performance, security, testing, or any combination thereof.

In some embodiments, the user profile comprises importance of issues to the user, to the code, to a file in the code, or any combination thereof.

In some embodiments, the user profile comprises issues that were presented to the user, issues that were addressed by the user, issues that were not addressed by the user, issues that the user has provided feedback on, or any combination thereof.

In some embodiments, the method further comprises parsing the code to generate the structural representation of the code.

In some embodiments, the parsing comprises performing static analysis of the code.

In some embodiments, the parsing extracts functions, classes, modules, and/or data types in the code.

In some embodiments, the parsing comprises dependency parsing the code.

In some embodiments, the dependency parsing uses a syntax tree.

In some embodiments, the syntax tree is an abstract syntax tree or a concrete syntax tree.

In some embodiments, the parsing is configured to parse at least 1, 2, 3, 4, 5, 10, 50, 100, 150, 200, 250, or 500 programming languages.

In some embodiments, the parsing is configured to parse at most 1, 2, 3, 4, 5, 10, 50, 100, 150, 200, 250, or 500 programming languages.

In some embodiments, the set of language models is a set of LLMs.

In some embodiments, the set of language models has at least two language models trained on different datasets.

In some embodiments, the different datasets comprise different repositories, different types of labels, different programming languages, or any combination thereof.

In some embodiments, the set of language models has at least two language models trained with different loss functions.

In some embodiments, the set of language models has at least two language models having different architectures.

In some embodiments, the set of language models has at least two language models that are different models.

In some embodiments, the set of language models has at least two language models that perform differently on different tasks.

In some embodiments, the prompt comprises the context, the user profile, the structural representation, the code, or any combination thereof, integrated with a template.

In some embodiments, the prompt comprises a template in a first section of the prompt and the context in a second section of the prompt.

In some embodiments, the prompt comprises a natural language and a programming language.

In some embodiments, the filtering comprises identifying a set of non-hallucinated answers.

In some embodiments, the filtering the set of answers is based on the structural representation.

In some embodiments, the filtering the set of answers comprises identifying a set of hallucinated answers.

In some embodiments, the identifying the set of hallucinated answers is based on a Chain of Thought prompting.

In some embodiments, the Chain of Thought prompting comprises a question and answer structure.

In some embodiments, the Chain of Thought prompting comprises a self-dialogue.

In some embodiments, the identifying the set of hallucinated answers is based on a set of accuracies of the set of answers.

In some embodiments, the evaluating the actionability comprises prompting the set of LLMs with the set of issue reports, relevant snippets of the code, the set of answers, or any combination thereof, and asking the LLM to determine if the set of answers is actionable.

In some embodiments, the actionability accounts for if a user should immediately take action to fix an issue in the issue report based on the evaluation.

In some embodiments, the method further comprises removing a set of non-actionable answers from the set of answers.

In some embodiments, the evaluating the set answers for scope comprises determining whether an answer in the set of answers refers to a change in the set of changes.

In some embodiments, the evaluating the set of answers for scope is based on the structural representation.

In some embodiments, the evaluating the set of answers for scope comprises using string matching.

In some embodiments, the evaluating the set of answers for scope comprises prompting the set of language models with the issue report, relevant snippets of the code, the set of changes, the context, the set of answers, or any combination thereof, to determine if an issue is within the scope of the pull request.

In some embodiments, the method further comprises removing a set of out-of-scope answers from the set of answers.

In some embodiments, the code is retrieved from an online database.

In some embodiments, the method further comprises deleting the code from memory or storage.

In some embodiments, the method is performed in less than 5 or 10 minutes.

In some embodiments, the method removes at least 50, 60, 70, 80, 90, or 100% of hallucinated answers in the set of answers.

In some embodiments, the method preserves at most 50, 40, 30, 20, or 0% of non-hallucinated answers in the set of answers.

In some embodiments, the method generates at least 10, 100, 1000, or 10000 answers.

In some embodiments, the filtering removes 1, 2, 3, 4, 5, 10, 20, 30, 40, 50, 60, 70, 80, 90, 91, 92, 93, 94, 95, 96, 97, 98, or 99% percent of the answers in the set of answers.

In some embodiments, the prompt is selected from a set of prompts.

In some embodiments, the set of prompts comprises a prompt specific for a performance issue, wherein resolving the performance issue (i) increases the speed of the code, (ii) reduces memory consumed by the code, (iii) reduces storage used by the code, (iv) reduces latency of the code, (v) fixes incorrect or unexpected behavior of the code, or any combination thereof.

In some embodiments, the set of prompts comprises a prompt specific for identifying a cross-service issue in the code, a critical error in the code, a flawed design pattern in the code, a security issue in the code, or any combination thereof.

In some embodiments, the set of prompts excludes prompts for linting issues in the code, syntax error issues in the code, readability issues in the code, consistency issues in the code, a coding standard issue in the code, or any combination thereof.

In some aspects, the present disclosure provides a computer-based method comprising: (a) obtaining code; (b) parsing the code to generate a structural representation of the code, wherein the structural representation comprises a graph representative of the code; (c) processing the code and the structural representation to generate a context for the code based at least in part on the graph; (d) processing the context and a set of prompts to generate a set of contextualized prompts, wherein at least two prompts in the set of prompts are specific for different categories of issues; (e) prompting a first set of language models with the set of contextualized prompts to generate a set of issue reports; (f) prompting a second set of language models to generate a set of validated issue reports comprising a set of non-hallucinated issue reports; (g) filtering the set of validated issue reports to generate a set of prioritized issue reports; and (h) providing the set of prioritized issue reports to a user.

In some aspects, the present disclosure provides a computer-based system comprising: at least one processor and instructions executable by the at least one processor to cause the at least one processor to perform operations comprising: (a) receiving a query about resolving an issue in the code; (b) processing the query and context to generate a prompt, wherein the context describes the code and a structural representation of the code; (c) processing the prompt, using a language model, to generate an answer for the query; and (d) sending the answer in response to the query.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIGS. 24A and 24B provides examples of non-actionable issue reports.

FIG. 28 provides categories of actionable and non-actionable issue reports.

DETAILED DESCRIPTION

Figure 1:
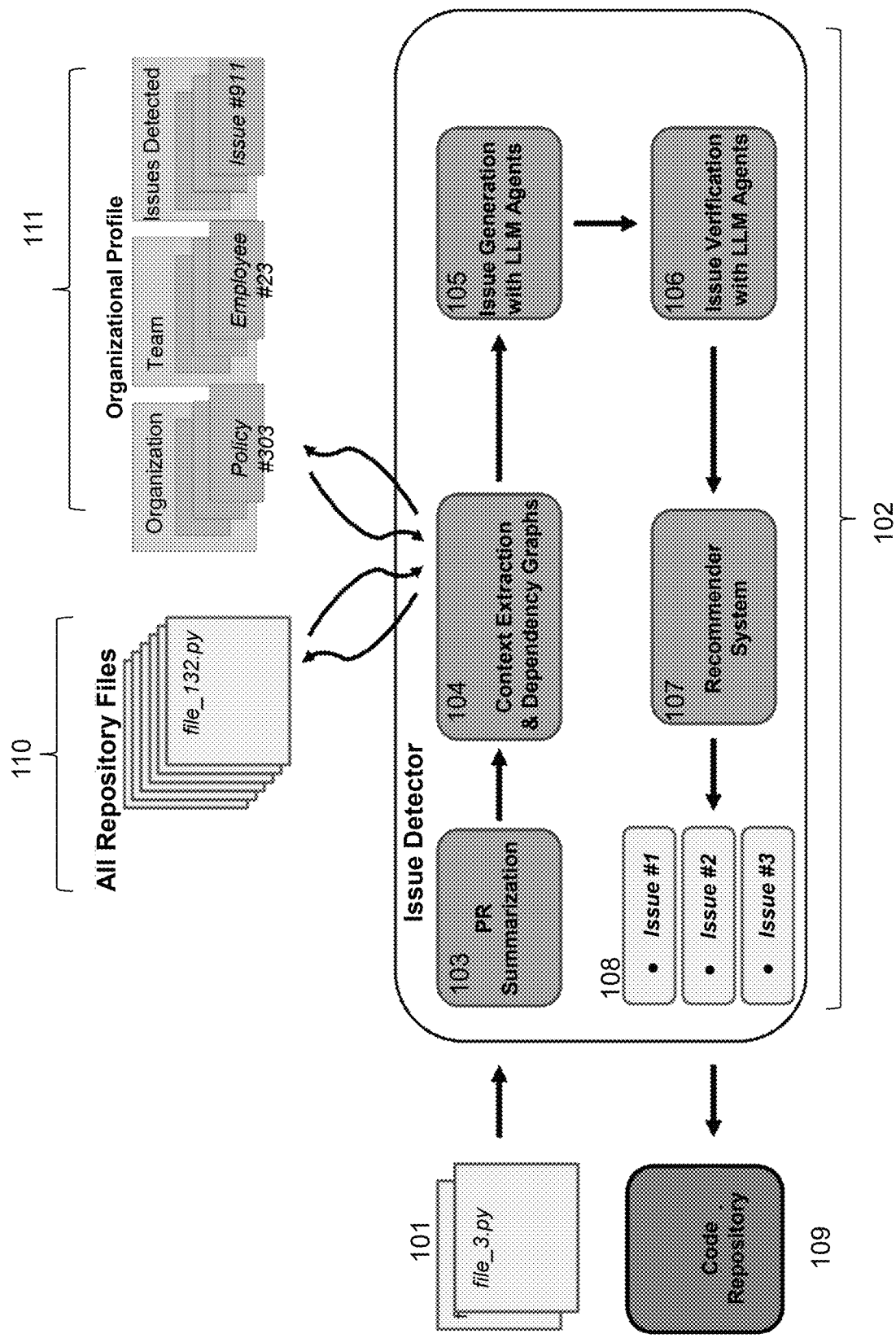
FIG. 1 illustrates an example workflow of using a computer-based system to review code.

In software development, ensuring code quality and that software meets all requirements is a critical yet challenging task. Issues such as bugs, errors, and inefficiencies in software can lead to unexpected behavior, application crashes, performance degradation, and poor user experience. Identifying such issues usually requires expert software engineers. While computerized code review tools can review code much faster than human software engineers, a challenge for computerized code review tools is to match the level of quality of code review that expert software engineers can provide.

In some aspects, the present application discloses computer-based systems and methods for reviewing code. A language model can be prompted to review code. A language model can be generally prompted to review code; however, the quality of the outputs can be improved significantly by providing additional relevant context. By providing context such as a description of the structure of the code (e.g., providing how different parts of the code are related), or its purpose (or functionality of the code), the language model can process the code beyond just local code snippets. Therefore, the language model can provide issue reports relating to missing architectural and performance-related problems that would require, for a human, an understanding of the functionality and purpose of the software, and a more holistic view of use cases of the software. By providing the broader semantic context of the code, including its purpose, intended functionality, and interaction with other code components, the language model can provide outputs that go beyond superficial analysis, and detect issues that span across multiple lines or files.

Another challenge is to identify pertinent issues. For example, a senior software developer may be more concerned with big-picture, critical issues in the code (such as security risks) or long-term code management issues (such as readability, maintainability) rather than lower priority issues such as linting the code. A language model can be prompted to review code for specific types of issues so that it seeks out issues that have particular interest to the user, rather than identifying just a handful of any issues it can find that may not be particularly relevant to the user. Moreover, language models which are often engineered to output most confident (or most probable) answers might output a narrow variety of issues. By prompting the language model with a variety of predetermined prompts that specifically call for particular types of issues, the capability of a language model can be broadened to a wider variety of issues. For example, the language model can be prompted to recommend whether a detected issue is severe, novel, or actionable to a user.

Another challenge is to identify true positives, and reduce false positives in code review. A portion of the issues detected by a language model can be either irrelevant, nonsensical, or hallucinations. Prompts for language models can be designed to critically evaluate the language models' outputs. While various prompting strategies are contemplated herein, as an example, a Chain of Thought (CoT) reasoning, or question and answer prompting that instructions a language model to evaluate its own outputs, or the outputs or another language model, can reduce or eliminate the proportion of false positives, and increase the number of true positives.

Another challenge is for the code review tool to adapt to an ever-evolving state of the art in software development. There may be new software libraries, tools, or code bases that are introduced over time. Feedback from users, automatically or with explicit feedback, can be incorporated into training or fine-tuning language models, updating prompts, etc., to allow the code review tool to stay up-to-date on its capabilities. For example, the language model can learn from user feedback to improve recommendations.

In some aspects, the present application discloses computer-based systems and methods for reviewing code. The code can be parsed to generate a structural representation of the code. The structural representation can comprise a graph representative of the code. The code and the structural representation can be processed to generate a context for the code that is based at least in part on the graph. The context can be processed with a set of prompts to generate a set of contextualized prompts. For example, the set of prompts can provide a set of templates, wherein the context is combined with the set of templates to generate the contextualized prompts. The prompts in the set of prompts can be specific for different categories of issues. For example, one category of issue might be security, and another category of issue might be efficiency.

A first set of language models can be prompted with the set of contextualized prompts to generate a set of issue reports. Then, a second set of language models can be prompted to generate a set of validated issue reports comprising a set of non-hallucinated issue reports. For example, the second set of language models can be used to identify, among a mixture of hallucinated and non-hallucinated issue reports generated by the first set of language models, the set of non-hallucinated issue reports. The set of validated issue reports can be filtered to generate a set of prioritized issue reports. For example, while the set of validated issue reports can contain valid and real issues in the code, not all issues can be relevant for a particular user or an organization. Some issue reports can be redundant if multiple issue reports of the same type are found. By filtering the set of validated issue reports to the set of prioritized issue reports, the quality and the relevance of the reports delivered to the user is increased.

FIG. 1 describes an example workflow of using the computer-based system to review code. The computer-based system can obtain code 101. The code can be code from pull request (PR) files and associated documentation within a code repository. The code can be a branch of the code from a code repository. The code can be analyzed by an issue detector 102.

The issue detector can summarize the code. In an example, the issue detector 102 utilizes a set of large language models to analyze the source code and perform PR summarization 103. PR summarization can identify the high-level purpose and intent of the PR (such as what feature was meant to be implemented, or what bug was meant to be fixed) as well as a list of each component implemented with details of how it was implemented.

The issue detector can then perform context extraction and generate dependency graphs 104 from the PR files. Various parsing methods can be used. In an example, the issue detector 102 can perform dependency parsing. Dependency parsing can be performed using abstract syntax trees to identify the relevant context for a given PR file, module, class, or function. The issue detector can use abstract syntax tree libraries such as treesitter. The issue detector can use static analysis to build dependency graphs for all files related to the PR and extract related functions and classes 110. Context related to the PR can also be extracted from organizational profiles, including technical requirements, coding standards, and configurations 111.

After context extraction and dependency graph generation 104, large language model 105 prompts (such as Chain of Thought, chain of verification, or few-shot learning) can process the context and detect relevant issues present in the PR files. The issue detector 102 can use LLM 105 prompts on PR files for generating issue reports across issue categories. The issue categories can be functionality, security, performance, database operations, error handling, logging, readability and maintainability, asynchronous processing, naming, design patterns, systems and environment, objects and data structures, test cases, and third-party libraries. For each category, a prompt can be created based on the relevant file source code and context of the file source code. Context of the file source code can include the PR summary, the PR diff and any other relevant context from other files. The LLM can be queried to generate a list of issues for each category.

For example, for each issue report, the LLM 105 can generate 1) a detailed description of the issue, 2) the relevant code snippet, 3) a confidence score 1-10 (where 10 means maximum confidence), and 4) how the issue is actionable and what steps a user can take to fix the issue. The list of issue reports generated in 105 can be reviewed by multiple LLMs 106 to verify issue reports by filtering out false positives or hallucinations, to determine if the issue report is actionable, and to determine if the issue report is within the scope of the current PR. Verified, high quality issue reports can then be sent to a recommender 107. The recommender can be trained on both 1) issue reports that were previously surfaced with a label indicating whether the developer addressed them or not, and 2) examples of issue reports annotated by human expert annotators. The recommender 107 can prioritize issue reports 108 based on an organization's needs, and the issue detector 102 can input these prioritized issues 108 to a code repository 109 to be accessed by the user.

Using a system or a method of the present disclosure, hallucinations in generated issue reports can be decreased. For example, at least 50, 60 70, 80, 90 or 100%, including increments therein, of hallucinated issue reports can be removed.

Using a system or a method of the present disclosure, various issues that affect the computer functionality of the code can be detected and addressed. The set of prompts can comprise a prompt specific for a performance issue, wherein resolving the performance issue (i) increases the speed of the code, (ii) reduces memory consumed by the code, (iii) reduces storage used by the code, (iv) reduces latency of the code, (v) fixes incorrect or unexpected behavior of the code, or any combination thereof. The code review can identify a cross-service issue in the code, a critical error in the code, a flawed design pattern in the code, a security issue in the code, or any combination thereof.

Content of the Code

The code can comprise source code. The code can comprise a set of changes to the code. The structural representation can comprise a graph. The graph can be representative of the code that is dependent on the set of changes. The set of changes can be distributed across different files in the code. The set of changes can be processed to generate the context for the code and the set of changes. The set of changes can be between two instances of the code. The set of changes can be provided with a pull request (PR). The pull request can comprise source code. In some cases, the pull request can comprise a merge of a set of changes to the code with another file.

Generating a Structural Representation

The code can be parsed to generate a structural representation of the code. The structural representation can represent a file, a module, a class, a function, or any combination thereof, of the code. The structural representation can represent links between a file, a module, a class, a function, or any combination thereof, of the code. The structural representation can represent a programming language of the code, a file path for a file in the code, a plurality of file paths for files in the code, a graph of the code, or any combination thereof. The structural representation of the code can represent the code as a whole. The structural representation of the code can represent a part of the code. The part of the code can be related to the set of changes. The set of changes can be distributed across different files in the code. In some embodiments, code can be chunked.

The parsing can comprise performing static analysis of the code. The parsing can extract functions, classes, modules, and/or data types in the code. The parsing can comprise dependency parsing the code. The dependency parsing can use a syntax tree. The syntax tree can be an abstract syntax tree or a concrete syntax tree. The parsing can be configured to parse at least 1, 2, 3, 4, 5, 10, 50, 100, 150, 200, 250, or 500 programming languages, including increments therein. Alternatively, the parsing can be configured to parse at most 1, 2, 3, 4, 5, 10, 50, 100, 150, 200, 250, or 500 programming languages, including increments therein.

The graph of the structural representation can be a directed graph, a control-flow graph, or a tree. The control-flow graph can comprise nodes. The nodes can represent objects that perform operations. Edges of the graph can represent flow of data between objects. The tree can be a syntax tree. The syntax tree can be an abstract syntax tree or a concrete syntax tree.

The structural representation can represent the part of the code that is nth-order linked to the set of changes, wherein n is a natural number. The structural representation can represent the part of the code that the set of changes are nth \-order linked to, wherein n is a natural number. The nth-order links can represent dependency, relevancy, flow of data, or any combination thereof. The natural number n can be at least 1, 2, 3, 4, 5, 6, 7, 8, 9, 10, 20, 30, 40, 50, 60, 70, 80, 90, or 100, including increments therein. Alternatively, the natural number n can be at most 1, 2, 3, 4, 5, 6, 7, 8, 9, 10, 20, 30, 40, 50, 60, 70, 80, 90, or 100, including increments therein.

Generating a Context

The code, the set of changes, and/or the structural representation can be processed to generate a context for the code. The context of the code can comprise a purpose of the code, an intended functionality of the code, how the code interacts with other code components, and files related to the code. The context can describe the structural representation of the code. The set of changes can be between two instances of the code. The context can provide snippets of a part of the code that is related to the set of changes. The snippets can be local. The snippets can be non-local. The snippets can be from different files in the code. The snippets can be from the same files in the code. The snippets can be different lines in a file in the code. The snippets can be within the same lines in a file in the code. The different lines can be at least 5, 10, 20, 50, 100, 200, 300, 400, 500, 600, 700, 800, 900, or 1000 lines apart, including increments therein. The different lines can be at most 5, 10, 20, 50, 100, 200, 300, 400, 500, 600, 700, 800, 900, or 1000 lines apart, including increments therein. The context can comprise the code. The context can summarize the code.

The context can be generated based on a user profile. The user profile can comprise an individual profile, a team profile, an organization profile, or any combination thereof. The user profile can comprise technical requirements, coding standards, configurations, or any combination thereof. The technical requirements can comprise performance, security, testing, or any combination thereof. The user profile can comprise importance of issues to the user, to the code, to a file in the code, or any combination thereof. The user profile can comprise issues that were presented to the user, issues that were addressed by the user, issues that were not addressed by the user, issues that the user has provided feedback on, or any combination thereof.

The context can be based on a documentation of the code. The context can describe value provided to users by the code. The context can also describe a feature intended to be implemented by the code. The context can describe how a feature is implemented by the code. The context can describe a bug fixed by the code. The context can describe a programming language of the code.

The context can also describe the code. The context can also describe the documentation. The context can be described in natural language. The context can be shorter than the code. Alternatively, the context can be longer than the code.

Generating a Set of Contextualized Prompts

The context and the set of prompts can be used to generate a set of contextualized prompts. A prompt can comprise a template. The template can comprise instructions for a language model in natural language and open fields that can be populated with the context. The template can comprise a Chain of Thought prompt, a chain of verification prompt, a few-shot learning prompt, or any combination thereof. The set of prompts can be specific for different categories of issues. The different categories can be selected from the group consisting of: functionality, security, performance, database operations, error handling, logging, readability and maintainability, asynchronous processing, documentation, naming, design patterns, systems and environment, objects and data structures, test cases, third-party libraries, and any combination thereof. At least two prompts in the set of prompts can be specific for different categories of issues. Each prompt in the set of prompts can also be specific for different categories of issues. The set of contextualized prompts can comprise the context, the user profile, the structural representation, the code, or any combination thereof, integrated with the template. The set of contextualized prompts can comprise the template in a first section of the prompt and the context in a second section of the prompt. The set of contextualized prompts can comprise a natural language and a programming language.

The set of prompts can be selected based on the code, the structural representation of the code, the relevant context of the code, and/or the set of prompts. A set of language models can be prompted to elicit the set of language models to provide relevant categories of issues. The set of prompts can be selected by processing the context, the summary, the set of changes, the structural representation, or any combination thereof, using the set of language models.

Generating a Set of Issue Reports

A set of language models can be prompted to identify issues within the code. A set of language models can be used to classify the identified issues. A set of language models can be prompted with the set of contextualized prompts to generate a set of issue reports.

An issue report within the set of issue reports can comprise (i) a description of an issue, (ii) a snippet of the code or the pull request that is relevant to the issue, (iii) a confidence score of the issue report, (iv) a priority or importance of the issue report, (v) the category within which the issue reports belongs, (vi) actionability of the issue, (vii) a proposal or plan for fixing the issue, or (viii) any combination thereof.

Generating a Set of Prioritized Issue Reports

After the issue report is generated, a set of language models can be used to review the generated issue reports. A set of language models can be used to filter out hallucinated issue reports. The hallucinated issue reports, or the non-hallucinated issue reports, can be identified. The identification can be based on the structural representation. Identifying the set of hallucinated issue reports can be based on Chain of Thought prompting. The Chain of Thought prompting can comprise a question-and-answer structure. The Chain of Thought prompting can also comprise a self-dialogue structure. The self-dialogue structure can comprise n-turn conversations. N-turn conversations can comprise evaluating at least one file relevant to the set of issues using the structural representation of the code to determine the files related to the code. For example, the set of language models can determine the available files related to the set of issues, evaluate a first file, and then evaluate a second file. Identifying the set of hallucinated issue reports can be based on a set of accuracies of the set of issue reports. Identifying the set of hallucinated issue reports can also be based on whether at least two language models identified the same issues. Identifying the set of hallucinated issue reports can be based on whether at least two language models do not identify the same issues. Identifying the set of hallucinated issue reports can be based on whether every language model identified the same issues. Alternatively, identifying the set of hallucinated issue reports can be based on whether every language model do not identify the same issues. Identifying the set of hallucinated issue reports can be based on whether every language model identified the same issues. Alternatively, identifying the set of hallucinated issue reports can be based on whether every language model do not identify the same issues.

For example, a set of language models can review each issue within an issue report. In some cases, multiple language models within the set of language models review generated issues and filter out false positives by checking their criteria and iterating on code base using Chain of Thought prompting. In some cases, the set of language models used to review issue reports are GPT-4o™ or Claude-3.5™. One issue report might be generated by GPT-4™, and then verified by GPT-4o™. Each language model within a set of language models can be given the generated issue together with the source code. In an example, a set of language models can be prompted to use Chain of Thought with multiple question and answer pairs to determine an issue classification. In some cases, issues are classified as a "Valid Issue", as an "Hallucination", or as "Undetermined". An issue can be classified as undetermined if the issue lacks context. In an example, each issue is evaluated independently based on the current file context as well as up to three other files in three hops. In some cases, multiple language models within the set of language models can be combined into an ensemble to make the final classification. Issues classified as "Hallucination" can be filtered out of the pipeline. In some cases, issues classified as "Undetermined" are reevaluated with one to three additional files as requested by the set of language models.

Validated issue reports can be prioritized based on user needs. The validated issue reports can be prioritized by filtering. The filtering can comprise evaluating the set of validated issue reports for actionability, scope, severity, priority, similarity, novelty, or any combination thereof.

Priority can be assigned by a recommender. The recommender can use a set of language models trained against datasets which have been annotated by software developers. For example, the recommender can be trained on over 10,000 issue reports previously surfaced, and on thousands of examples of issue reports annotated by human expert annotators. In an example, three annotators can label each generated issue report. The annotations can comprise five different dimensions, including factual accuracy, actionability (whether the developer is able to, or will, fix the issue report in the PR), issue scope (whether the developer is responsible for fixing the issue), severity (whether the impact of the issue is minor or major), effort (how long it will take to fix the issue), or any combination thereof. Issue reports can be classified as a "true positive" if a majority of the annotators label the issue as factually correct, actionable, within the scope of the PR, whether fixing the issue will have an impact, or any combination thereof. The recommender can output "true positive" issues relevant to the organization and consistent with their requirements and configuration. Prioritized issue reports can be posted inside PR on a code repository, such as GitHub™, including code suggestions and explanations, where developers can then ask questions and discuss potential solutions with a set of language models. In another example, a set of language models can be used to embed all the issues generated for the PR based on their description. The set of prioritized issue reports can be provided to a user, displaying a snippet of the code, a comment about the code, an explanation of an issue, or any combination thereof. A plurality of snippets of the code can be displayed to a user. The plurality of snippets can be arranged based on the structural representation.

Figure 2:
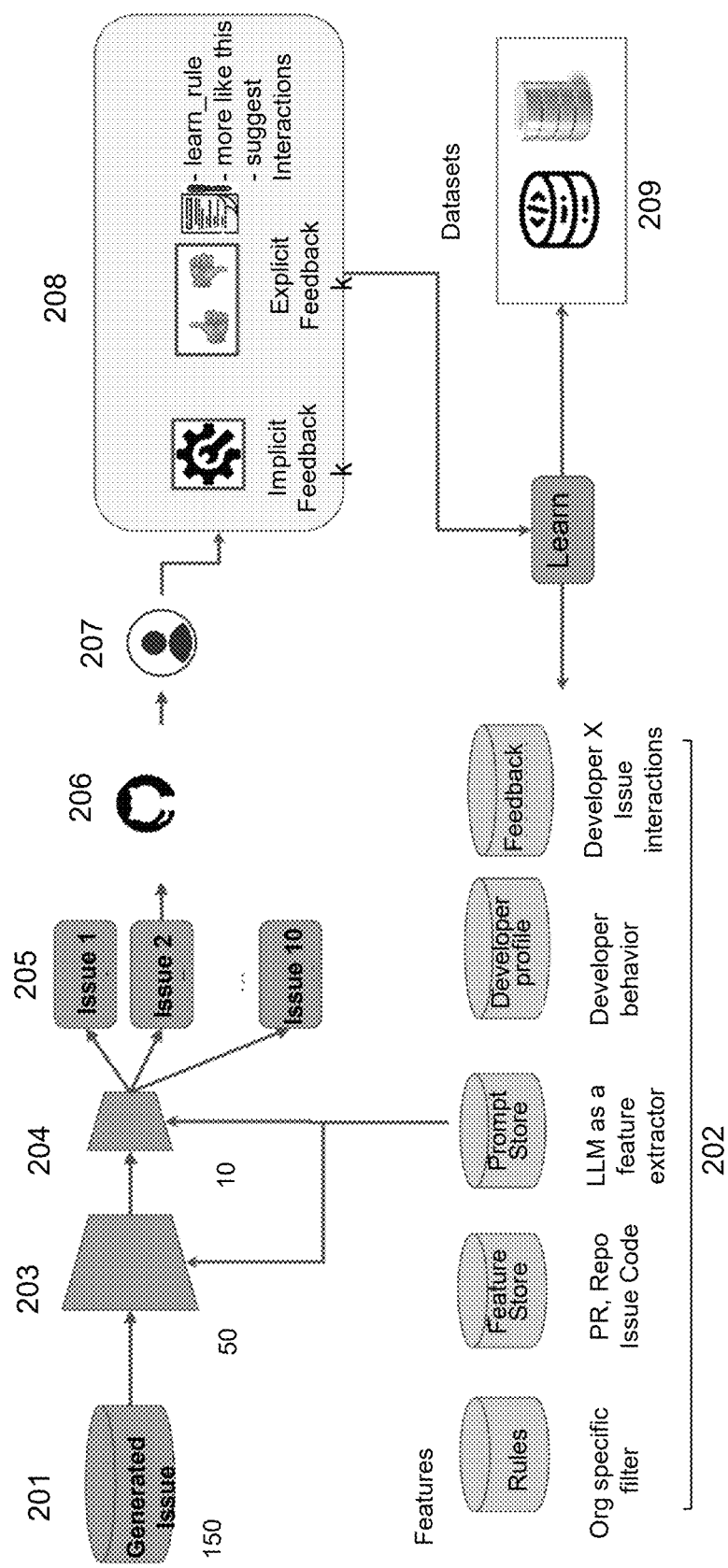
FIG. 2 illustrates an example workflow of a recommender.

The recommender is illustrated in a flowchart described in FIG. 2. In an example, generated issue reports 201 are analyzed by a set of features 202, the set of features comprising: rules, a feature store, a prompt store, a developer profile, feedback, and any combination thereof. The rules can include organization specific filters. The feature store can include context for the issue, comprising the pull request, code repositories, identified issues, the code snippet, or any combination thereof. The prompt store can include an LLM. The LLM can function as a feature extractor. The developer profile can include information on the developer's behavior. Feedback can include information about how the developer interacts with identified issue reports. The set of features are used to refine the issues to generate a set of issue candidates 203. The set of features can be used to further refine the issues by using Issue Quality Index (IQI) ranking to determine top issues 204.

The IQI can be used to represent the "overall score" of an issue as a number between 0 and 1 (where higher can indicate better, and 0 can indicate worse issues to filter out). The IQI definition can be applied to each issue after removing duplicates (e.g., applying semantic deduplication). Evaluating the IQI after removing duplicates can save computational resources.

Some specific examples of applying the IQI are provided. An IQI of 0 can be assigned if the issue is either 1) classified as a hallucination, 2) classified as non-actionable, 3) classified as out-of-scope, 4) classified as "Undetermined" with respect to severity, 5) classified As "Minor" or "Nitpick" with respect to severity and as not-novel, or 6) if the same issue is found to exist in 3 other files.

The IQI can also be defined as 0 if within a time window in the same code repository) 1) there previously exists an identical or almost identical issue in the same repository which was classified as "unresolved" (i.e., not fixed by the developer) or received negative feedback (e.g., received a thumbs down from the developer), and 2) there exists no previous identical or almost identical issue in the same repository which was classified as "resolved" (i.e., fixed) or received positive feedback. The time window can be at least 1 day, 2 days, 3 days, 4 days, 5 days, 6 days, 1 week, 2 weeks, 3 weeks, 4 weeks, 1 month, 2 months, 3 months, or 6 months, including increments therein. The time window can be at most 1 day, 2 days, 3 days, 4 days, 5 days, 6 days, 1 week, 2 weeks, 3 weeks, 4 weeks, 1 month, 2 months, 3 months, or 6 months, including increments therein.

The IQI can also be defined as 0 if the user (e.g., an organization) has added rules or filters that explicitly remove the combination of category and severity level to which the issue belongs. For example, customers might configure the system to only show "Major Security" issues, in which case the system can filter out security issues classified as "Minor" or "Nitpicks".

If none of the above condition assign the IQI to zero, then the IQI can be calculated as a linear weighted function of 1) LLM's score that the issue will be fixed based on observing up to n=20 most similar, historical issues (in last 90 days from the same code repository) along with their resolution state ("Resolved" or "Unresolved) and user feedback (thumbs up/down, conversations) where the score is 0-100, 2) severity level (nitpick, minor, major), 3) number of similar issues found in other files (based on pairwise comparison with LLM searching 5-20 other files), 4) number of similar issues generated in current PR (cluster sized based on clusters found by semantic deduplication algorithm), 5) factuality determination ("Factually Accurate" or "Undetermined"), and 6) confidence level outputted by LLM.

The IQI can then be used to rank the issue in the PR and the system will then surface the top n issues (e.g., top 5 or top 10 issues) depending on the customer's configuration and type and size of PR.

In summary, the recommender can utilize a score (e.g., IQI) to select a subset of issue reports to the presented to a user. The score can be a composite of various criteria, including those based on (i) a user profile (e.g., user-provided specification, history of a user's interactions with previous issue reports), and (ii) filters (e.g., similarity, scope, and other filters disclosed herein).

Top issues 205 can be sent to a code repository 206. A user 207 can access the top issues from the code repository. The user can interact with the identified issues and provide feedback 208. The feedback can be implicit feedback. Implicit feedback can comprise time spent on issues, issue resolution rate, frequency of recommendations interactions, code change patterns, error rates and bug reports, interactions with chat, the number of clicks on recommendations, the number of clicks on a see more feature, or any combination thereof. The feedback can also be explicit. Explicit feedback can comprise comments and suggestions on the issue, survey responses, quality of recommendations feedback, error reporting, and usability feedback. In some cases, the recommender can access user feedback, wherein the user has granted permission to use the feedback. The recommender can learn from the feedback and send the feedback on the code to a dataset 209. The recommender can also use the feedback to improve the set of features 202.

Actionability

Evaluating the set of issue reports for actionability can comprise using a set of language models to determine the actionability. Determining the actionability using the set of language models can comprise prompting the set of language models with the set of issue reports, relevant snippets of the code, or any combination thereof, and asking the set of language models to determine if the set of issue reports is actionable. Determining the actionability can account for if a user should immediately take action to fix an issue in the issue report based on the filtering. A language model can be a language model in the first set of language models for generating issue reports, the second set of language models for reviewing evaluating issue reports, or a language model not in the first or the second set of language models. A set of non-actionable issue reports can be removed from the set of issue reports. A set of actionable issue reports can be selected from the set of issue reports.

Scope

Evaluating the set of issue reports for scope can comprise determining whether an issue in the set of issue reports refers to a change in the set of changes. Evaluating the set of issue reports for scope can be based on the structural representation. Evaluating the set of issue reports for scope can comprise using string matching. Evaluating the set of issue reports for scope can comprise using a set of language models to determine the scope. Using the set of language models to determine the scope can comprise prompting the set of language models with the issue report, relevant snippets of the code, the set of changes, the context, or any combination thereof, to determine if an issue is within the scope of the pull request. A language model can be a language model in the first set of language models for generating issue reports, the second set of language models for reviewing evaluating issue reports, or a language model not in the first or the second set of language models. A set of out-of-scope issue reports can be removed from the set of issue reports. A set of within-scope issue reports can be selected from the set of issue reports.

Similarity

In another embodiment, evaluating the set of issue reports for similarity can comprise determining whether a subset of issue reports in the set of issue reports refers to similar issues. Evaluating the set of issue reports for similarity can comprise determining whether a pair of issue reports in the set of issue reports comprises similar embeddings. The similarity can be evaluated using a similarity score. The similarity score can comprise cosine similarity. Evaluating the set of issue reports for similarity can comprise using a set of language models to determine the similarity. Using the set of language models to determine the similarity can comprise prompting the set of language models with the set of issue reports to embed the set of issue reports to generate a set of embeddings. Filtering can further comprise clustering the set of embeddings. The clustering can comprise agglomerative clustering. The clustering can also be based on evaluating similarity scores between the set of embeddings. Using the set of language models to determine the similarity can comprise prompting the set of language models with pairs of issue reports in the set of issue reports to determine their degree of similarity. An issue report that is similar to another issue report can be removed from the set of issue reports. An issue report that refers to a file in the code that is similar to another issue report that refers to a different file in the code can be removed. An issue report that refers to an issue that has been negatively annotated by a user in the past can be removed. An issue report that is not similar to another issue report can be selected from the set of issue reports. An issue report that refers to a file in the code that is not similar to another issue report that refers to a different file in the code can be selected. An issue report that does not refer to an issue that has been negatively annotated by a user in the past can be selected.

Severity

In an embodiment, evaluating the set of issue reports for severity comprises determining the level of severity of an issue in the set of issue reports. Evaluating the set of issue reports for severity can comprise using a set of language models to determine the level of severity. Using the set of language models to determine the level of severity can comprise prompting the set of language models with an issue report, relevant snippets of the code, a file comprising the relevant snippets, the code, the set of changes to the code, the structured representation, or any combination thereof, and prompting the set of language models to determine the level of severity of the issue report. An issue report that is lower in severity than another issue report can be removed from the set of issue reports. An issue report that is higher in severity than another issue report can be removed from the set of issue reports.

Priority

In an embodiment, the evaluating the set of issue reports for severity can comprise ranking the set of issues by priority. Evaluating the set of issue reports for priority can comprise using a recommender. The recommender can be a machine learning algorithm. The recommender can be trained on a dataset of issues with resolution labels. The resolution labels can indicate whether a software developer resolved an issue in the dataset. The recommender can be trained on a dataset of issues with priority labels. Input features of the recommender can comprise: a description of an issue, an embedding of the issue, a level of severity of the issue, a scope of the issue, a novelty of the issue, a similarity of the issue to other present issues, a similarity of the issue to past issues, the user profile, or any combination thereof. An issue report that is lower in priority than another issue report can be removed from the set of issue reports. An issue report that is higher in priority than another issue report can be selected from the set of issue reports.

Novelty

In an embodiment, the evaluating the set of issue reports for novelty can comprise determining whether an issue in an issue report has been detected in the code or a portion thereof. Evaluating the set of issue reports for novelty can comprise using a set of language models to determine the novelty. Using the set of language models to determine the novelty can comprise prompting the set of language models with the issue report, relevant snippets of the code, and the file comprising the relevant snippets, the code, the set of changes to the code, or any combination thereof, and prompting the set of language models to determine if the issue is novel or not novel. An issue report that is not novel can be removed from the set of issue reports. An issue report that is novel can be selected from the set of issue reports.

Code Reviewing Efficiency

In an embodiment, issue reports can be generated in less than 5 or 10 minutes, including increments therein, per 10 MB, 100 MB, 1 GB, or 10 GB of code, including increments therein. In an embodiment, at least 50, 60 70, 80, 90 or 100%, including increments therein, of hallucinated issue reports can be removed from the set of issue reports. In an embodiment, at least 50, 40, 30, 20, or 0%, including increments therein, of non-hallucinated issue reports can be preserved in the set of issue reports. In an embodiment, at least 10, 100, 1000, or 10000 issue reports, including increments therein, per 10 MB, 100 MB, 1 GB, or 10 GB of code, including increments therein, can be removed. In an embodiment, filtering can remove 1, 2, 3, 4, 5, 6, 7, 8, 9, 10, 20, 30, 40, 50, 60, 70, 80, 90, 91, 92, 93, 94, 95, 96, 97, 98, or 99% percent, including increments therein, of the issue reports in the set of validated issue reports.

In an embodiment, the set of prompts are selected from a superset of prompts. The set of prompts can comprise a prompt specific for a performance issue, wherein resolving the performance issue (i) increases the speed of the code, (ii) reduces memory consumed by the code, (iii) reduces storage used by the code, (iv) reduces latency of the code, (v) fixes incorrect or unexpected behavior of the code, or any combination thereof.

In an embodiment, the set of prioritized issue reports identifies a cross-service issue in the code, a critical error in the code, a flawed design pattern in the code, a security issue in the code, or any combination thereof. The set of prioritized issue reports can also exclude linting issues in the code, syntax error issues in the code, readability issues in the code, consistency issues in the code, a coding standard issue in the code, or any combination thereof.

In an embodiment, the code is retrieved from an online database. The code can be deleted from memory or storage.

Language Models

The method or system of the present disclosure can be implemented using a machine learning algorithm. The machine learning algorithm can comprise a neural network. The neural network can comprise a language model. The language model can comprise a large language model (LLM). The machine learning algorithm can be trained on at least 1, 2, 3, 4, 5, 10, 50, 100, 500, or 1000 million code repositories, including increments therein. The machine learning algorithm can be trained on at most 1, 2, 3, 4, 5, 10, 50, 100, 500, or 1000 million code repositories, including increments therein.

The first set of language models for generating issue reports and the second set of language models for evaluating the issue reports can be prompted, wherein the first set of language models, the second set of language models, or both, can be a set of large language models. The first set of language models can comprise one or more language models. The second set of language models can comprise one or more language models. The first set of language models, the second set of language models, or both, can have at least two language models trained on different datasets. The different datasets can comprise different repositories, different types of labels, different programming languages, or any combination thereof. The first set of language models, the second set of language models, or both, can have at least two language models trained with different loss functions. The first set of language models, the second set of language models, or both, can have at least two language models having different architectures. The first set of language models, the second set of language models, or both, can have at least two language models that are different models. The first set of language models, the second set of language models, or both, can have at least two language models that perform differently on different tasks. The first set of language models and the second set of language models can be the same set. Alternatively, the first set of language models and the second set of language models can be different sets.

Conversational Tool

In some aspects, the subject matter disclosed herein is a method of reviewing code. The method can comprise receiving a query about resolving an issue in the code. The method can comprise processing the query and context to generate a prompt. The context can describe the code and a structural representation of the code. The method can comprise processing the prompt, using a language model, to generate an answer for the query. The method can comprise sending the answer in response to the query.

The method can comprise generating a set of answers and filtering the set of answers for the answer. The filtering can comprise prompting a set of language models to evaluate the set of answers for hallucinations, actionability, scope, or any combination thereof. The method can comprise receiving user feedback on the answer. The method can comprise generating or updating a user profile based on the user feedback.

In an example, the method of reviewing code can be a feedback system comprising receiving a query about resolving an issue in a pull request. The method can comprise processing the query and context to generate a prompt. In an example, the context describes the pull request and a structural representation of the code. The method can comprise processing the prompt using a language model to generate an answer for the query. The method can also comprise sending the answer in response to the query.

Figure 3:
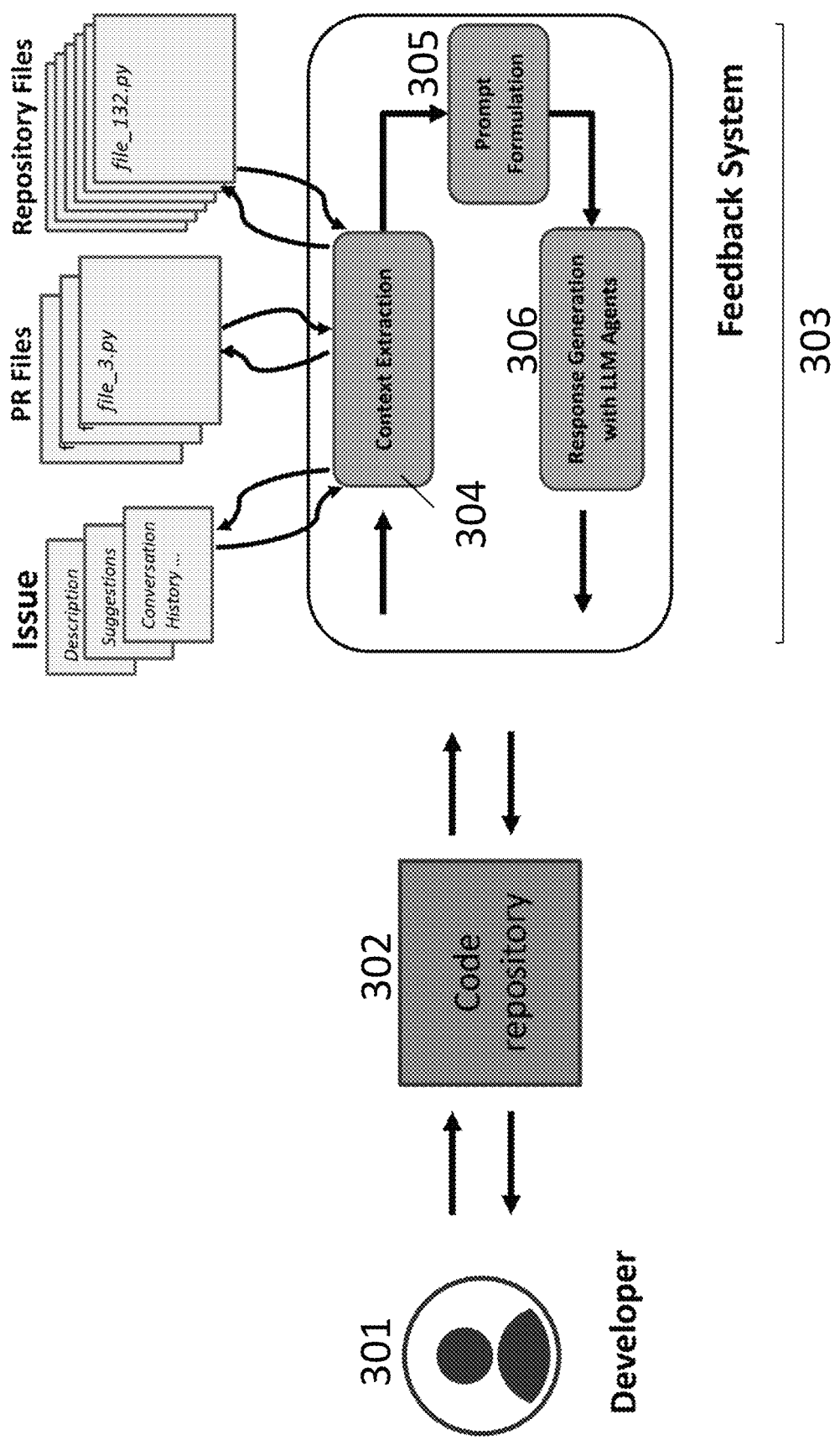
FIG. 3 illustrates an example workflow of a feedback system.

An example of the method of reviewing code is illustrated in FIG. 3. A developer can ask questions about each issue and discuss solutions. For example, developers 301 can interact directly through code repositories 302, such as GitHub™ or BitBucket™, with a feedback system 303. A developer can ask a question, which will be forwarded to the feedback system. The feedback system can retrieve the context 304 for the given issue. The context can comprise the issue description, suggestion for issue fixes, the conversation history, and the code. For example, context related to the code can comprise PR diffs, the source code, and the structural representation of the code. The feedback engine can use a set of language models to formulate a prompt 305, using the extracted context, and generate an actionable response 306 to the developer. In another example, the feedback engine can use a set of language models to formulate a prompt 305, using the extracted context, and generate a recommendation 306 to the developer. The recommendation can comprise a summary or an explanation of the issue, or a recommendation on how to solve the issue. The recommendation can comprise code or pseudocode as an example of how to solve the issue. The feedback system can then forward the answer to the developer's question to a code repository, such as GitHub™ or BitBucket™. In an example, the feedback system can report an answer to the developer within 1-2 minutes.

In some aspects, the subject matter disclosed herein is a computer-based method of reviewing code. The method can comprise obtaining code. The method can comprise parsing the code to generate a structural representation of the code. The structural representation can comprise a graph representative of the code. The method can comprise processing the code and the structural representation to generate a context for the code based at least in part on the graph. The method can comprise processing the context and a set of prompts to generate a set of contextualized prompts. At least two prompts in the set of prompts can be specific for different categories of issues. The method can comprise prompting a first set of language models with the set of contextualized prompts to generate a set of issue reports, The method can comprise prompting a second set of language models to generate a set of validated issue reports comprising a set of non-hallucinated issue reports. The method can comprise filtering the set of validated issue reports to generate a set of prioritized issue reports. The method can comprise providing the set of prioritized issue reports to a user.

In some aspects, the subject matter disclosed herein is a computer-based system comprising at least one processor and instructions executable by the at least one processor to cause the at least one processor to perform operations. The operations can comprise receiving a query about resolving an issue in the code. The operations can comprise processing the query and context to generate a prompt. The context can describe the code and a structural representation of the code. The operations can comprise processing the prompt, using a language model, to generate an answer for the query. The operations can comprise sending the answer in response to the query.

Tracking Resolution

The set of changes to code can be merged into the code (e.g., the source code). The set of issue reports can be tracked for resolution. Evaluating the set of validated issue reports for resolution can be based on the structural representation. Evaluating the set of validated issue reports for resolution can comprise using a set of language models to determine a resolution status. The set of language models can be used to separately evaluate the set of validated issue reports for resolution. Using the set of language models to determine the resolution can comprise prompting the set of language models with a validated issue report, relevant snippets of the code, a file comprising the relevant snippets, the code, the set of changes, or any combination thereof, and prompting the set of language models to determine that the validated issue report is fully resolved, partially resolved, unresolved or undetermined. If a language model in the set of language models determines that the resolution status of the issue report is undetermined, the set of language models can be prompted to generate a set of additional files to provide to the set of language models. When the set of language models has determined the set of additional files, the set of language models can be prompted to determine if the validated issue report is resolved. The set of language models can be trained on a training dataset comprising the resolved, partially resolved, unresolved, and undetermined issue reports in the set of validated issue reports. The training dataset may not comprise the code or a part of the code. The organizational profile can be updated based on the resolution.

Figure 4:
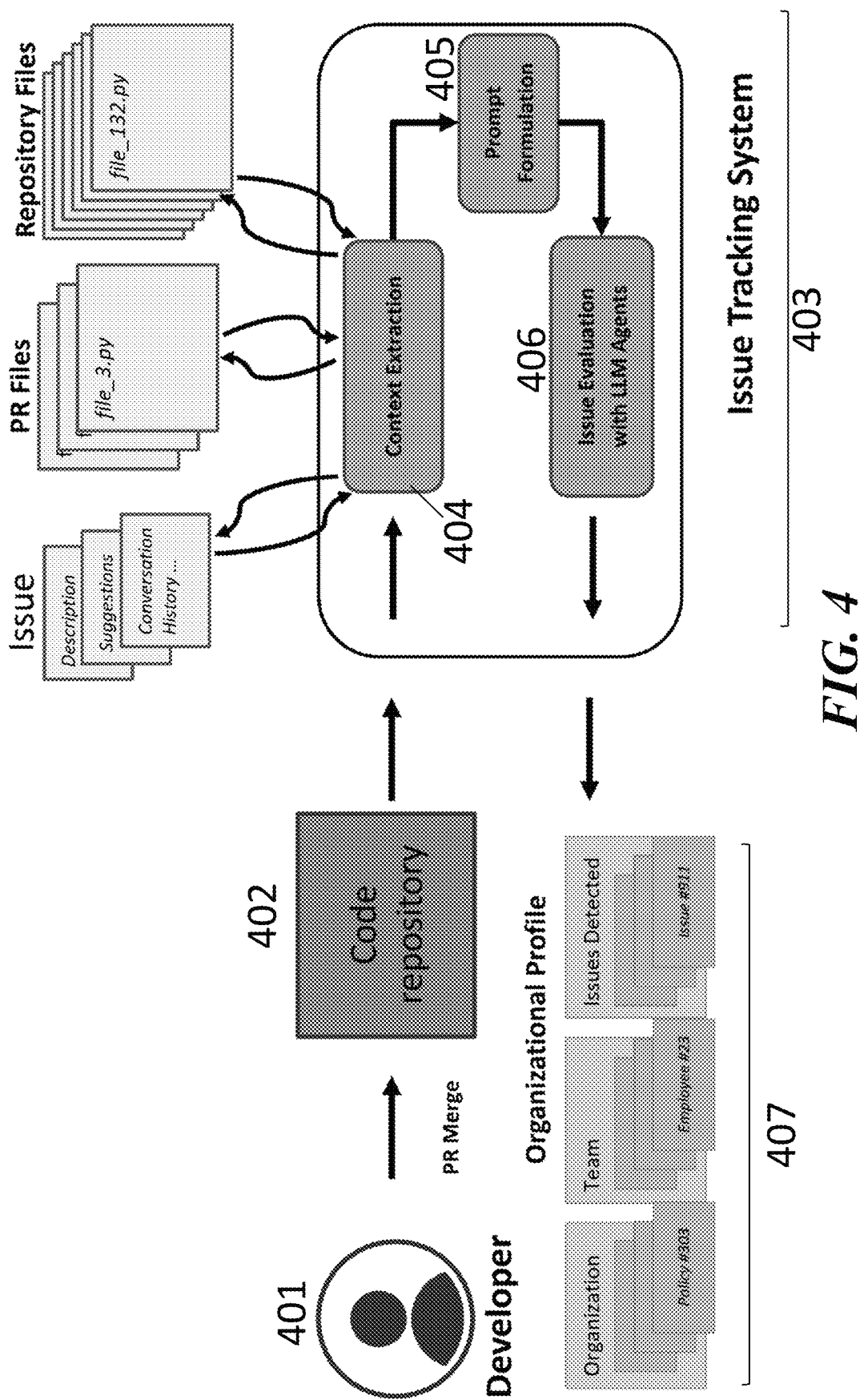
FIG. 4 illustrates an example workflow of an issue tracking system.

For example, once the PR is closed or merged, an issue tracking system can evaluate which of the issues surfaced by the issue detector were fixed by the developer. An example of this embodiment is illustrated in FIG. 4. A developer 401 modifying, closing, or merging the PR with a code repository 402 can automatically trigger the issue tracking system 403 to evaluate each issue. In some cases, the issue tracking engine retrieves all required context 404 with respect to the given issue. The context can include the issue description, conversation history, and the code at the time the issue was detected and at the time of the final commit. For example, context related to the code can comprise PR diffs, the source code, and the structural representation of the code. The issue tracking system can use the extracted context to query a set of language models 405 to determine whether an issue has been fixed. The set of language models can determine that the issue has been fully resolved, partially resolved, not resolved, or undetermined 406. The set of language models can summarize implemented changes to the code or pull request. For example, the set of language models 406 is given the issue description and code snippet together with the file source code at the time of the PR close or merge, and then queried to determine if the issue has been "Resolved", "Partially Resolved", "Not Resolved", or "Undetermined". If the set of language models 406 classifies the issue as "Undetermined" then it is queried again to see if it wants to look at other files 407, and then the process is repeated with these other files as input. This classification of issues as "Resolved", "Partially Resolved", "Not Resolved", or "Undetermined" enables the system to collect a vast dataset of millions of labeled issues. This dataset is then used to fine-tune the set of language models throughout the pipeline and to train the recommender which ranks the issues and determines which ones get surfaced.

Issue Quality Labeling System

In some aspects, the present disclosure provides a method for labeling issues by quality. The method can comprise accessing a current version of a pull request using a crawler. The method can comprise inputting the pull request into an issue detection system. The issue detection system can be configured to detect a set of issues. The method can comprise inputting the set of issues into a similar issues detector. The similar issue detector can be configured to embed the set of issues into a vector space. The method can comprise outputting a second set of issues from the similar issues detector. The method can comprise inputting the second set of issues into an issue quality labeler. The issue quality labeler can be configured to prompt a set of language models to determine a set of low quality issues and a set of high quality issues from the second set of issues. The method can comprise providing the set of low quality issues to a set of annotators. The annotators can be configured to generate a set of validates issues from the set of low quality issues. The method can comprise inputting the set of validated issues into an approved dataset. The method can comprise providing set of validated issues to an automatic issue evaluator. The automatic issue evaluator can be configured to cross-validate issue labels. The method can comprise providing the set of high quality issues to a set of users to generate a set of issues with user feedback. The method can comprise providing the set of high quality issues to the approved dataset. The method can comprise providing the set of issues with user feedback to the approved dataset.

In some cases, the crawler can comprise a system that monitors updates to pull requests to provide the most up-to-date version of a pull request. In some cases, the similar issues detector can categorize issues by similarity as disclosed herein. In some cases, the similar issues detector can access user data. In some cases, the similar issues detector cannot access user data. In some cases, the automatic issue evaluator will cross-verify issue labels and justification for including issues within the high-quality issue dataset. In some cases, the automatic issue evaluator may assess at most 80% confidence in an issue, wherein the issue will be sent to the set of annotators for verification. In some cases, the automatic issue evaluator may assess at most a 50% confidence label for an issue, wherein the issue will be sent to a set of human annotators for verification.

Figure 5:
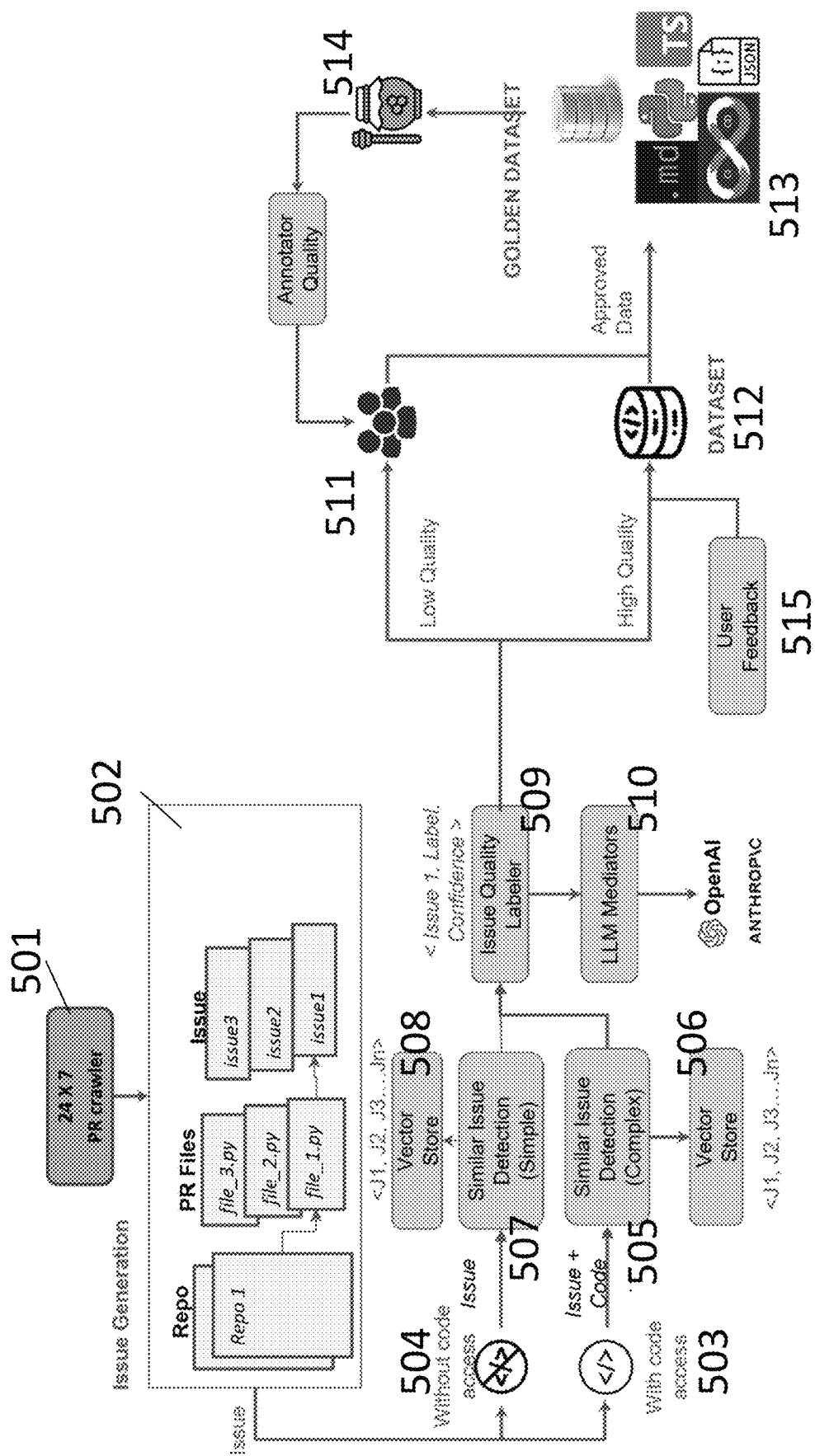
FIG. 5 illustrates an example workflow of an issue quality labeler.

Referring to FIG. 5, a flowchart is shown depicting an exemplary issue quality labeling system. The crawler can determine the most up-to-date version of the PR and send the most up-to-date to the issue generator 501. The issue generator can access repository files, PR files, and issues within the PR 502. The issue generator can detect issues present within the PR files. Identified issues can be accessed from user code 503 or can be without user code 504. Issues with access to user code are sent to a complex detector that analyzes issue similarity 505. The complex detector can store issues in vector space 506 and can use cosine similarity analysis to determine how the similarity within detected issues. Issues with user code can be analyzed within the context of previous similar issues from the same user or the same organization. The context can include the code snippet and a description of the issue. Issues without access to user code can be sent to a simple detector that analyzes issue similarity 507. Issues without access to user code can be analyzed within the context of previous similar issues from the user or the organization. The context can include the issue description but will not have access to the user code. The simple detector can store issues in vector space 508 and can use cosine similarity analysis to determine the similarity within detected issues. Both the complex and simple issue detector can assess issues for similarity by analyzing open-source repositories for unseen issues. Issues identified by the complex issue detector can be given more weight than issues identified by the simple issue detector. Issue similarity can be assessed on a set of factors, comprising issue description, issue category, issue verification, issue actionability, and issue severity. Issues determined to be similar by the simple and/or complex issue detectors can be sent to an issue quality labeler 509. The issue quality labeler can label an issue as high quality or low quality. The issue quality labeler can also query a set of language models 510 to determine issue quality. Low quality issues can be sent to a set of human annotators 511 to assess the quality and labeling accuracy of the issues. The set of human annotators can approve the detected issues and input the issues into a dataset 512. High quality issues detected by the issue quality labeler can be input into the dataset 512. Approved issues can be input into a dataset of high-quality issues 513. High quality issues may be sent to a set of users for feedback 515. The user feedback can be incorporated into the context of the high-quality issues input into the dataset. Issues within the high-quality issue dataset can be sent to an automatic issue evaluator 514 for automatic evaluation of issue quality. The automatic issue evaluator will cross-verify issue labels and justification for including issues within the high-quality issue dataset. If the automatic issue evaluator assesses an 80% confidence in an issue, the issue will be sent to one human annotator 511 for verification. If the automatic issue evaluator assesses a 50% confidence label for an issue, the issue can be sent to 2 511 human annotators for verification. If the automatic issue evaluator labels an issue with below 50% confidence, the issue can be sent to 3 511 human annotators for verification.

Agentic System

In some aspects, the present disclosure describes an agentic system for adapting a set of language model agents against data within a pipeline, the system comprising: a pull request review agent, wherein the pull request review agent employs memory, planning, action, and tools to perform a review task.

Figure 6:
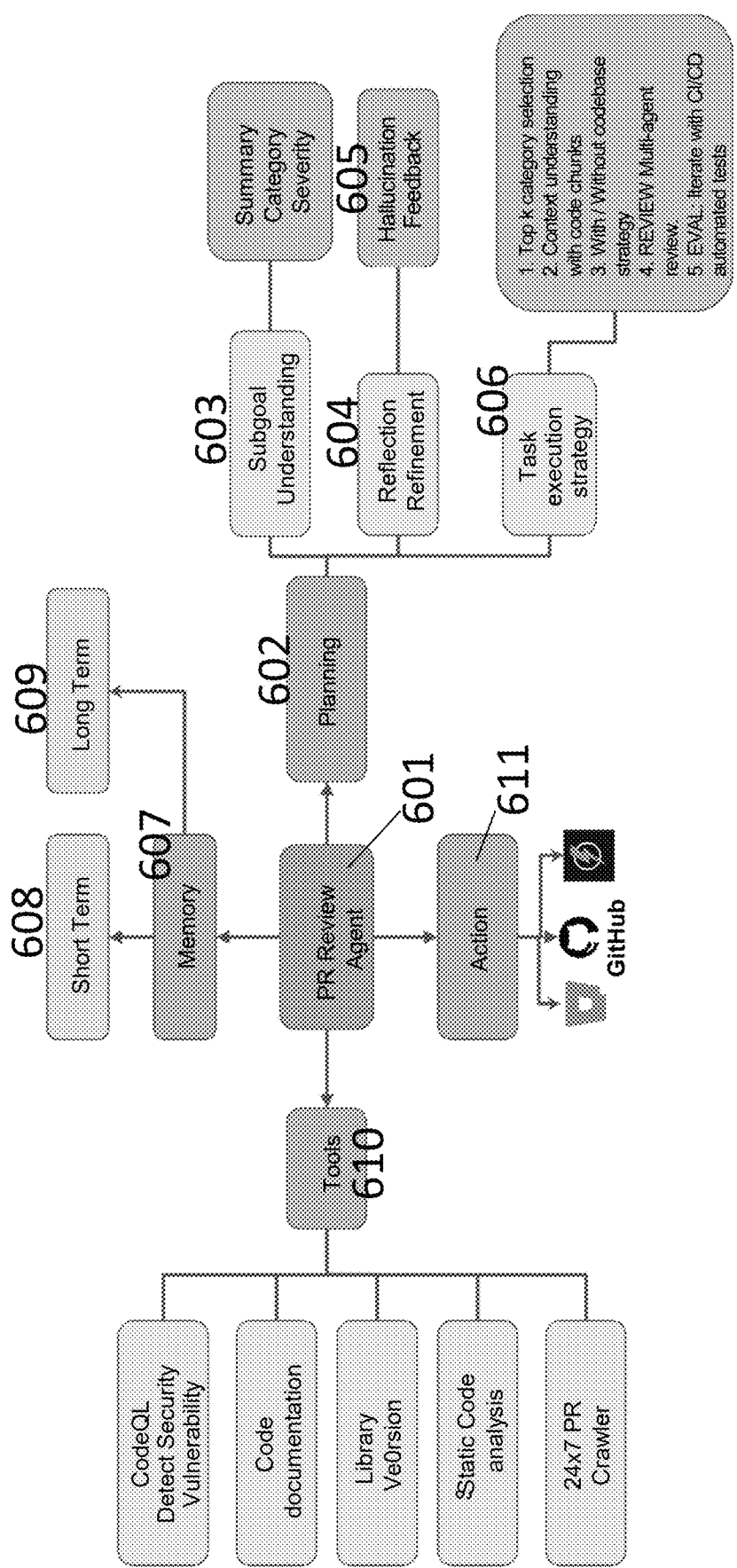
FIG. 6 illustrates an example workflow of an agentic system.

FIG. 6 illustrates a pipeline for the agentic system. In this system, the PR review agent 601 is instructed to plan 602 to autonomously decide on the sequence of steps to perform a review task. The PR review agent can be a set of language models. Planning involves breaking down the review process into subgoals 603, and to decide the required steps to achieve a desired outcome. Subgoal understanding can identify a summary, category, or severity for initial feedback from a review task. The required steps can be determined by evaluating the context of the PR. The context can include the type and size of the PR, the strategy to generate structural representation of the PR, the strategy to parse the PR, and PR diffs. Planning can include Chain of Thought prompting to decompose tasks into subgoals 603. Planning can also involve reflection 604. Reflection can include prompting the PR review agent to generate feedback on the code changes in the PR. After generating the initial feedback, the PR review agent can reflect on its own output, providing criticism and suggestions for improvement. The reflection on the initial feedback can identify a hallucination. Reflection on identified hallucinations 605 can provide feedback to the PR review agent. The reflection process can be repeated multiple times to refine the performance of the PR review agent. Planning can also include a task execution strategy 606. The task execution strategy can comprise top-k category selection, context understanding with code chunks, task review with and without access to user code, multi-agent review, and iteration with continuous integration and continuous delivery or deployment (CI/CD) automated tests. CI/CD can provide reports generated to evaluate the performance of the task review. Multi-agent review can comprise implementing a multi-agent framework where one agent is prompted to generate feedback on the code changes, and another is prompted to provide constructive criticism of the first agent's output. Constructive discussion between agents can lead to improved accuracy and efficiency in task review. The PR review agent can employ memory 607 to perform a review task. The memory can be short term memory 608 or long-term memory 609. Long term memory can enhance code understanding and review task customization. Short term and long-term memory can be employed in planning the review task steps. The memory can comprise the code, structural representation of the code, and a history of past issues. The PR review agent can employ tools 610 to perform a review task. Tools can be external systems. Tools can comprise CodeQL, a tool to detect security vulnerability, code documentation, library version, static code analysis, and a PR Crawler. The PR review agent can perform a task review action 611 by accessing tools, memory, or planning. The action can comprise post review, conversations with issues, post PR and review summary, issue tracking, and console reports. The action can be output to a user or a code repository.

Computing System

In some aspects, the present disclosure describes a computer-based system comprising: a digital processing device comprising: at least one processor, an operating system configured to perform executable instructions, a memory, and a computer program including instructions executable by the digital processing device to generate a structural representation, generate a context, generate a set of contextualized prompt, generate a set of issue report, generate a set of validated issue reports, generate a set of prioritized issue reports, receive a query about resolving an issue in the code, generate a prompt, generate an answer, or any combination thereof. In some aspects, the present disclosure describes a computer-based method, implementing any one of the methods disclosed herein in a computer system. Referring to FIG. 5, a block diagram is shown depicting an exemplary machine that includes a computer system 500 (e.g., a processing or computing system) within which a set of instructions can execute for causing a device to perform or execute any one or more of the aspects and/or methodologies for generating a structural representation, generating a context, generating a set of contextualized prompt, generating a set of issue report, generating a set of validated issue reports, generating a set of prioritized issue reports, receiving a query about resolving an issue in the code, generating a prompt, generating an answer, or any combination thereof. The components in FIG. 5 are examples only and do not limit the scope of use or functionality of any hardware, software, embedded logic component, or a combination of two or more such components implementing particular embodiments.

Computer system 500 can include one or more processors 501, a memory 503, and a storage 508 that communicate with each other, and with other components, via a bus 540. The bus 540 can also link a display 532, one or more input devices 533 (which can, for example, include a keypad, a keyboard, a mouse, a stylus, etc.), one or more output devices 534, one or more storage devices 535, and various tangible storage media 536. All of these elements can interface directly or via one or more interfaces or adaptors to the bus 540. For instance, the various tangible storage media 536 can interface with the bus 540 via storage medium interface 526. Computer system 500 can have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs), general purpose graphics processing units (GPGPUs), or quantum processing units (QPUs)) that carry out functions. Computer system 500 can be one of various high performance computing platforms. For instance, the one or more processor(s) 501 can form a high-performance computing cluster. In some embodiments, the one or more processors 501 can form a distributed computing system connected by wired and/or wireless networks. In some embodiments, arrays of CPUs, GPUs, QPUs, or any combination thereof can be operably linked to implement any one of the methods disclosed herein. Processor(s) 501 optionally contains a cache memory unit 502 for temporary local storage of instructions, data, or computer addresses. Processor(s) 501 are configured to assist in execution of computer readable instructions. Computer system 500 can provide functionality for the components depicted in FIG. 5 as a result of the processor(s) 501 executing non-transitory, processor-executable instructions embodied in one or more tangible computer-readable storage media, such as memory 503, storage 508, storage devices 535, and/or storage medium 536. The computer-readable media can store software that implements particular embodiments, and processor(s) 501 can execute the software. Memory 503 can read the software from one or more other computer-readable media (such as mass storage device(s) 535, 536) or from one or more other sources through a suitable interface, such as network interface 520. The software can cause processor(s) 501 to carry out one or more processes or one or more steps of one or more processes described or illustrated herein. Carrying out such processes or steps can include defining data structures stored in memory 503 and modifying the data structures as directed by the software.

The memory 503 can include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 can act to communicate data and instructions unidirectionally to processor(s) 501, and RAM 504 can act to communicate data and instructions bidirectionally with processor(s) 501. ROM 505 and RAM 504 can include any suitable tangible computer-readable media described below. In one example, a basic input/output system 506 (BIOS), including basic routines that help to transfer information between elements within computer system 500, such as during start-up, can be stored in the memory 503.

Fixed storage 508 is connected bidirectionally to processor(s) 501, optionally through storage control unit 507. Fixed storage 508 provides additional data storage capacity and can also include any suitable tangible computer-readable media described herein. Storage 508 can be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 can, in appropriate cases, be incorporated as virtual memory in memory 503.

In one example, storage device(s) 535 can be removably interfaced with computer system 500 (e.g., via an external port connector (not shown)) via a storage device interface 525. Particularly, storage device(s) 535 and an associated machine-readable medium can provide non-volatile and/or volatile storage of machine-readable instructions, data structures, program modules, and/or other data for the computer system 500. In one example, software can reside, completely or partially, within a machine-readable medium on storage device(s) 535. In another example, software can reside, completely or partially, within processor(s) 501.

Bus 540 connects a wide variety of subsystems. Herein, reference to a bus can encompass one or more digital signal lines serving a common function, where appropriate. Bus 540 can be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 can also include an input device 533. In one example, a user of computer system 500 can enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 can be interfaced to bus 540 via any of a variety of input interfaces 523 (e.g., input interface 523) including, but not limited to, serial, parallel, game port, USB, FIREWIRE, THUNDERBOLT, or any combination of the above. In some embodiments, an input device 533 can be used to generate a structural representation, generate a context, generate a set of contextualized prompt, generate a set of issue report, generate a set of validated issue reports, generate a set of prioritized issue reports, receive a query about resolving an issue in the code, generate a prompt, generate an answer, or any combination thereof. In some embodiments, generating a structural representation, generating a context, generating a set of contextualized prompt, generating a set of issue report, generating a set of validated issue reports, generating a set of prioritized issue reports, receiving a query about resolving an issue in the code, generating a prompt, generating an answer, or any combination thereof can be performed using human inputs through an input device 533.

In particular embodiments, when computer system 500 is connected to network 530, computer system 500 can communicate with other devices, specifically mobile devices and enterprise systems, distributed computing systems, cloud storage systems, cloud computing systems, and the like, connected to network 530. Communications to and from computer system 500 can be sent through network interface 520. For example, network interface 520 can receive incoming communications (such as requests or responses from other devices) in the form of one or more packets (such as Internet Protocol (IP) packets) from network 530, and computer system 500 can store the incoming communications in memory 503 for processing. Computer system 500 can similarly store outgoing communications (such as requests or responses to other devices) in the form of one or more packets in memory 503 and communicated to network 530 from network interface 520. Processor(s) 501 can access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, can employ a wired and/or a wireless mode of communication. In general, any network topology can be used.

Information and data can be displayed through a display 532. Examples of a display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 can include one or more other peripheral output devices 534 including, but not limited to, an audio speaker, a printer, a storage device, and any combinations thereof. Such peripheral output devices can be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition, or as an alternative, computer system 500 can provide functionality as a result of logic hardwired or otherwise embodied in a circuit, which can operate in place of or together with software to execute one or more processes or one or more steps of one or more processes described or illustrated herein. Reference to software in this disclosure can encompass logic, and reference to logic can encompass software. Moreover, reference to a computer-readable medium can encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by one or more processor(s), or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, and tablet computers.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® Ios®, Research In Motion® BlackBerry OS®, Google® Android®, Microsoft® Windows Phone® OS, Microsoft® Windows Mobile® OS, Linux®, and Palm® WebOS®.

In some embodiments, a computer system 500 can be accessible through a user terminal to receive user commands. The user commands can include line commands, scripts, programs, etc., and various instructions executable by the computer system 500. A computer system 500 can receive instructions to generate a structural representation, generate a context, generate a set of contextualized prompt, generate a set of issue report, generate a set of validated issue reports, generate a set of prioritized issue reports, receive a query about resolving an issue in the code, generate a prompt, generate an answer, or any combination thereof, or schedule a computing job for the computer system 500 to carry out any instructions.

Non-Transitory Computer Readable Storage Medium

In some aspects, the present disclosure describes a non-transitory computer-readable storage media encoded with a computer program including instructions executable by one or more processors to generate a structural representation, generate a context, generate a set of contextualized prompt, generate a set of issue report, generate a set of validated issue reports, generate a set of prioritized issue reports, receive a query about resolving an issue in the code, generate a prompt, generate an answer, or any combination thereof using any one of the methods disclosed herein. In some embodiments, a non-transitory computer-readable storage media can comprise instructions for generating a structural representation, generating a context, generating a set of contextualized prompt, generating a set of issue report, generating a set of validated issue reports, generating a set of prioritized issue reports, receiving a query about resolving an issue in the code, generating a prompt, generating an answer, or any combination thereof. In some embodiments, the platforms, systems, media, and methods disclosed herein include one or more non-transitory computer readable storage media encoded with a program including instructions executable by the operating system of an optionally networked computing device.

In further embodiments, a computer readable storage medium is a tangible component of a computing device. In still further embodiments, a computer readable storage medium is optionally removable from a computing device. In some embodiments, a computer readable storage medium includes, by way of non-limiting examples, flash memory devices, solid state memory, magnetic disk drives, magnetic tape drives, optical disk drives, distributed computing systems including cloud computing systems and services, and the like. In some embodiments, the program and instructions are permanently, substantially permanently, semi-permanently, or non-transitorily encoded on the media.

Computer Program

In some aspects, the present disclosure describes a computer program product comprising a computer-readable medium having computer-executable code encoded therein, the computer-executable code adapted to be executed to implement any one of the methods disclosed herein. In some embodiments, the platforms, systems, media, and methods disclosed herein include at least one computer program, or use of the same.

A computer program includes a sequence of instructions, executable by one or more processor(s) of the computing device's CPU, written to perform a specified task. Computer readable instructions can be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program can be written in various versions of various languages. In some embodiments, APIs can comprise various languages, for example, languages in various releases of TensorFlow, Theano, Keras, PyTorch, or any combination thereof which can be implemented in various releases of Python, Python3, C, C#, C++, MatLab, R, Java, or any combination thereof.

The functionality of the computer readable instructions can be combined or distributed as desired in various environments. In some embodiments, a computer program can comprise one sequence of instructions. In some embodiments, a computer program can comprise a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more standalone applications, one or more web browser plug-ins, extensions, add-ins, or add-ons, or combinations thereof.

Web Application

In some embodiments, a computer program includes a web application. In some embodiments, a user can enter a query for generating a structural representation, generating a context, generating a set of contextualized prompt, generating a set of issue report, generating a set of validated issue reports, generating a set of prioritized issue reports, receiving a query about resolving an issue in the code, generating a prompt, generating an answer, or any combination thereof through a web application. In some embodiments, a user can generate a structural representation, generate a context, generate a set of contextualized prompt, generate a set of issue report, generate a set of validated issue reports, generate a set of prioritized issue reports, receive a query about resolving an issue in the code, generate a prompt, generate an answer, or any combination thereof through a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application can be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (Ios) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information about generating a structural representation, generating a context, generating a set of contextualized prompt, generating a set of issue report, generating a set of validated issue reports, generating a set of prioritized issue reports, receiving a query about resolving an issue in the code, generating a prompt, generating an answer, or any combination thereof or any combination thereof. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

List of Embodiments

The following list of embodiments of the invention are to be considered as disclosing various features of the invention, which features can be considered to be specific to the particular embodiment under which they are discussed, or which are combinable with the various other features as listed in other embodiments. Thus, simply because a feature is discussed under one particular embodiment does not necessarily limit the use of that feature to that embodiment.

Embodiment 1. A computer-based system comprising: at least one processor and instructions executable by the at least one processor to cause the at least one processor to perform operations comprising: (a) obtaining code; (b) parsing the code to generate a structural representation of the code, wherein the structural representation comprises a graph representative of the code; (c) processing the code and the structural representation to generate a context for the code based at least in part on the graph; (d) processing the context and a set of prompts to generate a set of contextualized prompts, wherein at least two prompts in the set of prompts are specific for different categories of issues; (e) prompting a first set of language models with the set of contextualized prompts to generate a set of issue reports; (f) prompting a second set of language models to generate a set of validated issue reports comprising a set of non-hallucinated issue reports; (g) filtering the set of validated issue reports to generate a set of prioritized issue reports; and (h) providing the set of prioritized issue reports to a user.

Embodiment 2. The computer-based system of Embodiment 1, wherein the code comprises source code.

Embodiment 3. The computer-based system of Embodiment 1 or 2, wherein the code comprises a set of changes to the code.

Embodiment 4. The computer-based system of Embodiment 3, wherein the graph is representative of the code that is dependent on the set of changes.

Embodiment 5. The computer-based system of Embodiment 4, wherein the set of changes are distributed across different files in the code.

Embodiment 6. The computer-based system of any one of Embodiments 3-5, wherein the processing in (c) comprises processing the set of changes to generate the context for the code and the set of changes.

Embodiment 7. The computer-based system of any one of Embodiments 3-6, wherein the set of changes are between two instances of the code.

Embodiment 8. The computer-based system of any one of Embodiments 3-7, wherein the set of changes are provided with a pull request.

Embodiment 9. The computer-based system of any one of Embodiments 1-8, wherein the processing in (c) to generate the context is further based on a documentation of the code.

Embodiment 10. The computer-based system of Embodiment 9, wherein the context describes value provided to users by the code.

Embodiment 11. The computer-based system of Embodiment 9 or 10, wherein the context describes a feature intended to be implemented by the code.

Embodiment 12. The computer-based system of any one of Embodiments 9-11, wherein the context describes how a feature is implemented by the code.

Embodiment 13. The computer-based system of any one of Embodiments 1-12, wherein the context describes a bug fixed by the code.

Embodiment 14. The computer-based system of any one of Embodiments 1-13, wherein the context describes a programming language of the code.

Embodiment 15. The computer-based system of any one of Embodiments 1-14, wherein the context describes the code.

Embodiment 16. The computer-based system of any one of Embodiments 1-15, wherein the context describes the documentation.

Embodiment 17. The computer-based system of any one of Embodiments 1-16, wherein the context describes a coding standard for the code.

Embodiment 18. The computer-based system of any one of Embodiments 1-17, wherein the context is described in natural language.

Embodiment 19. The computer-based system of any one of Embodiments 1-18, wherein the context is shorter than the code.

Embodiment 20. The computer-based system of any one of Embodiments 1-19, wherein the context is longer than the code.

Embodiment 21. The computer-based system of any one of Embodiments 1-20, wherein the processing in (c) is performed using a machine learning algorithm.

Embodiment 22. The computer-based system of Embodiment 21, wherein the machine learning algorithm comprises a neural network.

Embodiment 23. The computer-based system of Embodiment 22, wherein the neural network comprises a language model.

Embodiment 24. The computer-based system of Embodiment 23, wherein the language model comprises a large language model (LLM).

Embodiment 25. The computer-based system of any one of Embodiments 21-24, wherein the machine learning algorithm is trained on at least 1, 2, 3, 4, 5, 10, 50, 100, 500, or 1000 million code repositories.

Embodiment 26. The computer-based system of any one of Embodiments 21-25, wherein the machine learning algorithm is trained on at most 1, 2, 3, 4, 5, 10, 50, 100, 500, or 1000 million code repositories.

Embodiment 27. The computer-based system of any one of Embodiments 1-26, wherein the structural representation represents the code as a whole.

Embodiment 28. The computer-based system of any one of Embodiments 1-26, wherein the structural representation represents a part of the code.

Embodiment 29. The computer-based system of Embodiment 28, wherein the structural representation represents the part of the code that is related to the set of changes.

Embodiment 30. The computer-based system of Embodiment 29, wherein the structural representation represents the part of the code that is nth-order linked to the set of changes, wherein n is a natural number.

Embodiment 31. The computer-based system of Embodiment 29 or 30, wherein the structural representation represents the part of the code that the set of changes are nth-order linked to, wherein n is a natural number.

Embodiment 32. The computer-based system of any one of Embodiments 29-31, wherein the nth-order links represent dependency, relevancy, flow of data, or any combination thereof.

Embodiment 33. The computer-based system of any one of Embodiments 29-32, wherein n is at least 1, 2, 3, 4, 5, 6, 7, 8, 9, 10, 20, 30, 40, 50, 60, 70, 80, 90, or 100.

Embodiment 34. The computer-based system of any one of Embodiments 29-33, wherein n is at most 1, 2, 3, 4, 5, 6, 7, 8, 9, 10, 20, 30, 40, 50, 60, 70, 80, 90, or 100.

Embodiment 35. The computer-based system of any one of Embodiments 1-34, wherein the structural representation represents a file, a module, a class, a function, or any combination thereof, of the code.

Embodiment 36. The computer-based system of any one of Embodiments 1-35, wherein the structural representation represents links between a file, a module, a class, a function, or any combination thereof, of the code.

Embodiment 37. The computer-based system of any one of Embodiments 1-36, wherein the structural representation represents a programming language of the code, a file path for a file in the code, a plurality of file paths for files in the code, a graph of the code, or any combination thereof.

Embodiment 38. The computer-based system of Embodiment 37, wherein the graph is a directed graph.

Embodiment 39. The computer-based system of Embodiment 38, wherein the directed graph is a control-flow graph.

Embodiment 40. The computer-based system of Embodiment 39, wherein nodes of the directed graph represent objects that perform operations, and edges of the graph represent flow of data between the objects.

Embodiment 41. The computer-based system of any one of Embodiments 37-40, wherein the graph is a tree.

Embodiment 42. The computer-based system of Embodiment 41, wherein the tree is a syntax tree.

Embodiment 43. The computer-based system of Embodiment 42, wherein the syntax tree is an abstract syntax tree or a concrete syntax tree.

Embodiment 44. The computer-based system of any one of Embodiments 1-43, wherein the context describes the structural representation of the code.

Embodiment 45. The computer-based system of any one of Embodiments 3-44, wherein the context provides snippets of a part of the code that is related to the set of changes.

Embodiment 46. The computer-based system of Embodiment 45, wherein the snippets are non-local.

Embodiment 47. The computer-based system of Embodiment 45 or 46, wherein the snippets are from different files in the code.

Embodiment 48. The computer-based system of any one of Embodiments 45-47, wherein the snippets are different lines in a file in the code, and wherein the different lines are at least 5, 10, 20, 50, 100, 200, 300, 400, 500, 600, 700, 800, 900, or 1000 lines apart.

Embodiment 49. The computer-based system of any one of Embodiments 1-48, wherein the context comprises the code.

Embodiment 50. The computer-based system of any one of Embodiments 1-49, wherein the context summarizes the code.

Embodiment 51. The computer-based system of any one of Embodiments 1-50, wherein the (c) processing further processes a user profile to generate the context of the code.

Embodiment 52. The computer-based system of Embodiment 51, wherein the user profile comprises an individual profile, a team profile, an organization profile, or any combination thereof.

Embodiment 53. The computer-based system of Embodiment 52, wherein the user profile comprises technical requirements, coding standards, configurations, or any combination thereof.

Embodiment 54. The computer-based system of Embodiment 53, wherein the technical requirements comprise performance, security, testing, or any combination thereof.

Embodiment 55. The computer-based system of any one of Embodiments 51-54, wherein the user profile comprises importance of issues to the user, to the code, to a file in the code, or any combination thereof.

Embodiment 56. The computer-based system of any one of Embodiments 51-55, wherein the user profile comprises issues that were presented to the user, issues that were addressed by the user, issues that were not addressed by the user, issues that the user has provided feedback on, or any combination thereof.

Embodiment 57. The computer-based system of Embodiment 1, wherein the parsing comprises performing static analysis of the code.

Embodiment 58. The computer-based system of Embodiment 57, wherein the parsing extracts functions, classes, modules, and/or data types in the code.

Embodiment 59. The computer-based system of any one of Embodiments 1-58, wherein the parsing comprises dependency parsing the code.

Embodiment 60. The computer-based system of Embodiment 59, wherein the dependency parsing uses a syntax tree.

Embodiment 61. The computer-based system of Embodiment 59 or 60, wherein the syntax tree is an abstract syntax tree or a concrete syntax tree.

Embodiment 62. The computer-based system of any one of Embodiments 1-61, wherein the parsing is configured to parse at least 1, 2, 3, 4, 5, 10, 50, 100, 150, 200, 250, or 500 programming languages.

Embodiment 63. The computer-based system of any one of Embodiments 1-62, wherein the parsing is configured to parse at most 1, 2, 3, 4, 5, 10, 50, 100, 150, 200, 250, or 500 programming languages.

Embodiment 64. The computer-based system of any one of Embodiments 1-63, wherein the set of prompts are selected based on the code.

Embodiment 65. The computer-based system of Embodiment 64, wherein the set of prompts are selected by using a prompt configured to elicit an LLM to provide relevant categories of issues.

Embodiment 66. The computer-based system of Embodiment 65, wherein the set of prompts are selected by processing the context, the summary, the set of changes, the structural representation, or any combination thereof, using an LLM.

Embodiment 67. The computer-based system of any one of Embodiments 1-66, wherein the set of prompts are specific for different categories of issues selected from the group consisting of: functionality, security, performance, database operations, error handling, logging, readability and maintainability, asynchronous processing, documentation, naming, design patterns, systems and environment, objects and data structures, test cases, third-party libraries, and any combination thereof.

Embodiment 68. The computer-based system of any one of Embodiments 1-67, wherein at least two prompts in the set of prompts are specific for different categories of issues.

Embodiment 69. The computer-based system of any one of Embodiments 1-68, wherein each prompt in the set of prompts is specific for different categories of issues.

Embodiment 70. The computer-based system of any one of Embodiments 1-69, wherein the set of prompts comprises a template.

Embodiment 71. The computer-based system of any one of Embodiments 1-70, wherein the template comprises a Chain of Thought prompt, a chain of verification prompt, a few-shot learning prompt, or any combination thereof.

Embodiment 72. The computer-based system of any one of Embodiments 1-71, wherein the set of prompts are prompted to the set of language models in serial.

Embodiment 73. The computer-based system of any one of Embodiments 1-71, wherein the set of prompts are prompted to the set of language models in parallel.

Embodiment 74. The computer-based system of any one of Embodiments 1-73, wherein the first set of language models, the second set of language models, or both, are a set of LLMs.

Embodiment 75. The computer-based system of any one of Embodiments 1-74, wherein the first set of language models, the second set of language models, or both, have at least two language models trained on different datasets.

Embodiment 76. The computer-based system of Embodiment 75, wherein the different datasets comprise different repositories, different types of labels, different programming languages, or any combination thereof.

Embodiment 77. The computer-based system of any one of Embodiments 1-76, wherein the first set of language models, the second set of language models, or both, have at least two language models trained with different loss functions.

Embodiment 78. The computer-based system of any one of Embodiments 1-77, wherein the first set of language models, the second set of language models, or both, have at least two language models having different architectures.

Embodiment 79. The computer-based system of any one of Embodiments 1-78, wherein the first set of language models, the second set of language models, or both, have at least two language models that are different models.

Embodiment 80. The computer-based system of any one of Embodiments 1-79, wherein the first set of language models, the second set of language models, or both, have at least two language models that perform differently on different tasks.

Embodiment 81. The computer-based system of any one of Embodiments 1-80, wherein the first set of language models and the second set of language models are the same set.

Embodiment 82. The computer-based system of any one of Embodiments 1-81, wherein the first set of language models and the second set of language models are different sets.

Embodiment 83. The computer-based system of any one of Embodiments 70-82, wherein the set of contextualized prompts comprises the context, the user profile, the structural representation, the code, or any combination thereof, integrated with the template.

Embodiment 84. The computer-based system of any one of Embodiments 70-83, wherein the set of contextualized prompts comprises the template in a first section of the prompt and the context in a second section of the prompt.

Embodiment 85. The computer-based system of any one of Embodiments 1-84, wherein the set of contextualized prompts comprises a natural language and a programming language.

Embodiment 86. The computer-based system of any one of Embodiments 1-85, wherein an issue report in the set of issue reports comprises (i) a description of an issue, (ii) a snippet of the code or the pull request that is relevant to the issue, (iii) a confidence score of the issue report, (iv) a priority or importance of the issue report, (v) the category within which the issue reports belongs, (vi) actionability of the issue, (vii) a proposal or plan for fixing the issue, or (viii) any combination thereof.

Embodiment 87. The computer-based system of any one of Embodiments 1-86, wherein (f) comprises identifying a set of non-hallucinated issue reports.

Embodiment 88. The computer-based system of any one of Embodiments 1-87, wherein the identifying the set of non-hallucinated issue reports based on the structural representation.

Embodiment 89. The computer-based system of any one of Embodiments 1-88, wherein (f) comprises identifying a set of hallucinated issue reports.

Embodiment 90. The computer-based system of Embodiment 89, wherein the identifying the set of hallucinated issue reports is based on a Chain of Thought prompting.

Embodiment 91. The computer-based system of Embodiment 90, wherein the Chain of Thought prompting comprises a question and answer structure.

Embodiment 92. The computer-based system of Embodiment 90 or 91, wherein the Chain of Thought prompting comprises a self-dialogue.

Embodiment 93. The computer-based system of any one of Embodiments 89-92, wherein the identifying the set of hallucinated issue reports is based on a set of accuracies of the set of issue reports.

Embodiment 94. The computer-based system of any one of Embodiments 89-93, wherein the identifying the set of hallucinated issue reports is based on whether at least two language models in the second set of language models identified the same issues.

Embodiment 95. The computer-based system of any one of Embodiments 89-94, wherein the identifying the set of hallucinated issue reports is based on whether at least two language models in the second set of language models do not identify the same issues.

Embodiment 96. The computer-based system of any one of Embodiments 89-95, wherein the identifying the set of hallucinated issue reports is based on whether every language model in the second set of language models identified the same issues.

Embodiment 97. The computer-based system of any one of Embodiments 89-96, wherein the identifying the set of hallucinated issue reports is based on whether every language model in the second set of language models do not identify the same issues.

Embodiment 98. The computer-based system of any one of Embodiments 1-97, wherein the filtering further comprises evaluating the set of issue reports for actionability, scope, severity, priority, similarity, novelty, or any combination thereof Embodiment 99. The computer-based system of Embodiment 98, wherein the evaluating the set of issue reports for actionability comprises using an LLM to determine the actionability.

Embodiment 100. The computer-based system of Embodiment 99, wherein the determining the actionability using the LLM comprises prompting the LLM with the set of issue reports, relevant snippets of the code and asking the LLM to determine if the set of issue reports is actionable.

Embodiment 101. The computer-based system of Embodiment 99 or 100, wherein the actionability accounts for if a user should immediately take action to fix an issue in the issue report based on the evaluation.

Embodiment 102. The computer-based system of any one of Embodiments 99-101, wherein the LLM is a language model in the first set of language models, the second set of language models, or a language model not in the first or the second set of language models.

Embodiment 103. The computer-based system of any one of Embodiments 99-102, wherein the operations further comprise removing a set of non-actionability issue reports from the set of issue reports.

Embodiment 104. The computer-based system of any one of Embodiments 98-103, wherein the evaluating the set of issue reports for scope comprises determining whether an issue in the set of issue reports refers to a change in the set of changes.

Embodiment 105. The computer-based system of any one of Embodiments 98-104, wherein the evaluating the set of issue reports for scope is based on the structural representation.

Embodiment 106. The computer-based system of any one of Embodiments 98-105, wherein the evaluating the set of issue reports for scope comprises using string matching.

Embodiment 107. The computer-based system of any one of Embodiments 98-106, wherein the evaluating the set of issue reports for scope comprises using an LLM to determine the scope.

Embodiment 108. The computer-based system of any one of Embodiments 98-107, wherein using the LLM to determine the scope comprises prompting the LLM with the issue report, relevant snippets of the code, the set of changes, the context, or any combination thereof, to determine if an issue is within the scope of the pull request.

Embodiment 109. The computer-based system of any one of Embodiments 98-108, wherein the operations further comprise removing a set of out-of-scope issue reports from the set of issue reports.

Embodiment 110. The computer-based system of any one of Embodiments 107-109, wherein the LLM is a language model in the first set of language models, the second set of language models, or a language model not in the first or the second set of language models.

Embodiment 111. The computer-based system of any one of Embodiments 98-110, wherein the evaluating the set of issue reports for similarity comprises determining whether a subset of issue reports in the set of issue reports refers to similar issues.

Embodiment 112. The computer-based system of any one of Embodiments 98-111, wherein the evaluating the set of issue reports for similarity comprises determining whether a pair of issue reports in the set of issue reports comprises similar embeddings.

Embodiment 113. The computer-based system of Embodiment 112, wherein the similarity is evaluated using a similarity score.

Embodiment 114. The computer-based system of Embodiment 113, wherein the similarity score comprises cosine similarity.

Embodiment 115. The computer-based system of any one of Embodiments 111-114, wherein the evaluating the set of issue reports for similarity comprises using an LLM to determine the similarity.

Embodiment 116. The computer-based system of Embodiment 115, wherein using the LLM to determine the similarity comprises prompting the LLM with the set of issue reports to embed the set of issue reports to generate a set of embeddings.

Embodiment 117. The computer-based system of Embodiment 116, wherein the operations further comprise clustering the set of embeddings.

Embodiment 118. The computer-based system of Embodiment 117, wherein the clustering comprises agglomerative clustering.

Embodiment 119. The computer-based system of Embodiment 117 or 118, wherein the clustering is based on evaluating similarity scores between the set of embeddings.

Embodiment 120. The computer-based system of any one of Embodiments 115-119, wherein using the LLM to determine the similarity comprises prompting the LLM with pairs of issue reports in the set of issue reports to determine their degree of similarity.

Embodiment 121. The computer-based system of any one of Embodiments 111-120, wherein the operations further comprise removing an issue report that is similar to another issue report from the set of issue reports.

Embodiment 122. The computer-based system of any one of Embodiments 111-121, wherein the operations further comprise removing an issue report that refers to a file in the code that is similar to another issue report that refers to a different file in the code.

Embodiment 123. The computer-based system of any one of Embodiments 111-122, wherein the operations further comprise removing an issue report that refers to an issue that has been negatively annotated by a user in the past.

Embodiment 124. The computer-based system of any one of Embodiments 98-123, wherein the evaluating the set of issue reports for severity comprises determining the level of severity of an issue in the set of issue reports.

Embodiment 125. The computer-based system of any one of Embodiments 98-124, wherein the evaluating the set of issue reports for severity comprises using an LLM to determine the level of severity.

Embodiment 126. The computer-based system of Embodiment 125, wherein using the LLM to determine the level of severity comprises prompting the LLM with an issue report, relevant snippets of the code, a file comprising the relevant snippets, the code, the set of changes to the code, the structured representation, or any combination thereof, and eliciting the LLM to determine the level of severity of the issue report.

Embodiment 127. The computer-based system of Embodiment 125 or 126, wherein the operations further comprise removing an issue report that is lower in severity than another issue report from the set of issue reports.

Embodiment 128. The computer-based system of any one of Embodiments 98-127, wherein the evaluating the set of issue reports for severity comprises ranking the set of issues by priority.

Embodiment 129. The computer-based system of Embodiment 128, wherein the evaluating the set of issue reports for priority comprises using a recommender.

Embodiment 130. The computer-based system of Embodiment 129, wherein the recommender is a machine learning algorithm.

Embodiment 131. The computer-based system of Embodiment 129 or 130, wherein the recommender is trained on a dataset of issues with resolution labels.

Embodiment 132. The computer-based system of Embodiment 131, wherein the resolution labels indicate whether a software developer resolved an issue in the dataset.

Embodiment 133. The computer-based system of any one of Embodiments 129-132, wherein the recommender is trained on a dataset of issues with priority labels.

Embodiment 134. The computer-based system of any one of Embodiments 129-133, wherein input features of the recommender system comprises: a description of an issue, an embedding of the issue, a level of severity of the issue, a scope of the issue, a novelty of the issue, a similarity of the issue to other present issues, a similarity of the issue to past issues, the user profile, or any combination thereof.

Embodiment 135. The computer-based system of any one of Embodiments 129-134, wherein the operations further comprise removing an issue report that is lower in priority than another issue report from the set of issue reports.

Embodiment 136. The computer-based system of any one of Embodiments 98-135, wherein the evaluating the set of issue reports for novelty comprises determining whether an issue in an issue report has been detected in the code or a portion thereof.

Embodiment 137. The computer-based system of any one of Embodiments 98-136, wherein the evaluating the set of issue reports for novelty comprises using an LLM to determine the novelty.

Embodiment 138. The computer-based system of Embodiment 137, wherein using the LLM to determine the novelty comprises prompting the LLM with the issue report, relevant snippets of the code, and the file comprising the relevant snippets, the code, the set of changes to the code, or any combination thereof, and eliciting the LLM to determine if the issue is novel or not novel.

Embodiment 139. The computer-based system of any one of Embodiments 3-138, wherein the operations further comprise merging the set of changes into the code.

Embodiment 140. The computer-based system of any one of Embodiments 1-139, wherein the operations further comprise evaluating the set of validated issue reports for resolution.

Embodiment 141. The computer-based system of Embodiment 140, wherein the operations further comprise evaluating the set of validated issue reports for resolution based on the structural representation.

Embodiment 142. The computer-based system of Embodiment 140 or 141, wherein the evaluating the set of validated issue reports for resolution comprises using a set of LLMs to determine a resolution status.

Embodiment 143. The computer-based system of Embodiment 142, wherein the set of LLMs are used to separately evaluate the set of validated issue reports for resolution.

Embodiment 144. The computer-based system of Embodiment 142 or 143, wherein using the set of LLMs to determine the resolution comprises prompting the set of LLMs with a validated issue report, relevant snippets of the code, a file comprising the relevant snippets, the code, the set of changes, or any combination thereof, and prompting the set of LLMs to determine that the validated issue report is resolved.

Embodiment 145. The computer-based system of Embodiment 144, wherein the operations further comprise, when an LLM in the set of LLMs determines that the resolution status of the issue report is undetermined, prompting the LLM to generate a set of additional files to provide to the LLM.

Embodiment 146. The computer-based system of Embodiment 145, wherein the operations further comprise, when the LLM has determined the set of additional files, prompting the LLM to determine if the validated issue report is resolved.

Embodiment 147. The computer-based system of any one of Embodiments 139-146, wherein the operations further comprise training the set of language models on a training dataset comprising the resolved, partially resolved, unresolved, and undetermined issue reports in the set of validated issue reports.

Embodiment 148. The computer-based system of Embodiment 147, wherein the training dataset does not comprise the code or a part of the code.

Embodiment 149. The computer-based system of any one of Embodiments 139-148, wherein the operations further comprise updating the organizational profile based on the resolution.

Embodiment 150. The computer-based system of any one of Embodiments 1-149, wherein the code is retrieved from an online database.

Embodiment 151. The computer-based system of any one of Embodiments 1-150, wherein the operations further comprise deleting the code from memory or storage.

Embodiment 152. The computer-based system of any one of Embodiments 1-151, wherein the providing the set of prioritized issue reports to a user comprises displaying a snippet of the code, a comment about the code, an explanation of an issue, or any combination thereof.

Embodiment 153. The computer-based system of Embodiment 152, wherein the providing the set of prioritized issue reports to a user comprises displaying a plurality of snippets of the code.

Embodiment 154. The computer-based system of Embodiment 153, wherein the plurality of snippets is arranged based on the structural representation.

Embodiment 155. The computer-based system of any one of Embodiments 1-154, wherein the operations are performed in less than 5 or 10 minutes per 10 MB, 100 MB, 1 GB, or 10 GB of code.

Embodiment 156. The computer-based system of any one of Embodiments 1-155, wherein the operations remove at least 50, 60, 70, 80, 90, 91, 92, 93, 94, 95, 96, 97, 98, 99, or 100% of hallucinated issue reports in the set of issue reports.

Embodiment 157. The computer-based system of any one of Embodiments 1-156, wherein the operations preserve at least 50, 40, 30, 20, 10, 9, 8, 7, 6, 5, 4, 3, 2, 1, or 0% of non-hallucinated issue reports in the set of issue reports.

Embodiment 158. The computer-based system of any one of Embodiments 1-157, wherein the operations generate at least 10, 100, 1000, or 10000 issue reports per 10 MB, 100 MB, 1 GB, or 10 GB of code.

Embodiment 159. The computer-based system of any one of Embodiments 1-158, wherein the filtering removes 1, 2, 3, 4, 5, 10, 20, 30, 40, 50, 60, 70, 80, 90, 91, 92, 93, 94, 95, 96, 97, 98, or 99% percent of the issue reports in the set of validated issue reports.

Embodiment 160. The computer-based system of any one of Embodiments 1-159, wherein the set of prompts are selected from a superset of prompts.

Embodiment 161. The computer-based system of any one of Embodiments 1-160, wherein the set of prompts comprises a prompt specific for a performance issue, wherein resolving the performance issue (i) increases the speed of the code, (ii) reduces memory consumed by the code, (iii) reduces storage used by the code, (iv) reduces latency of the code, (v) fixes incorrect or unexpected behavior of the code, or any combination thereof.

Embodiment 162. The computer-based system of any one of Embodiments 1-161, wherein the set of prioritized issue reports identifies a cross-service issue in the code, a critical error in the code, a flawed design pattern in the code, a security issue in the code, or any combination thereof.

Embodiment 163. The computer-based system of any one of Embodiments 1-162, wherein the set of prioritized issue reports excludes linting issues in the code, syntax error issues in the code, readability issues in the code, consistency issues in the code, a coding standard issue in the code, or any combination thereof.

Embodiment 164. A method of reviewing code, comprising: (a) receiving a query about resolving an issue in the code; (b) processing the query and context to generate a prompt, wherein the context describes the code and a structural representation of the code; (c) processing the prompt, using a language model, to generate an answer for the query; and (d) sending the answer in response to the query.

Embodiment 165. The method of Embodiment 164, wherein the processing in (c) comprises generating a set of answers, and filtering the set of answers for the answer.

Embodiment 166. The method of Embodiment 165, wherein the filtering comprises prompting a set of language models to evaluate the set of answers for hallucinations, actionability, scope, or any combination thereof.

Embodiment 167. The method of any one of Embodiments 164-166, further comprising receiving user feedback on the answer.

Embodiment 168. The method of Embodiment 167, further comprising generating or updating a user profile based on the user feedback.

Embodiment 169. The method of any one of Embodiments 164168, wherein the code comprises source code.

Embodiment 170. The method of any one of Embodiments 164-169, wherein the code comprises a set of changes to the code.

Embodiment 171. The method of Embodiment 170, wherein the structural representation comprises a graph, and wherein the graph is representative of the code that is dependent on the set of changes.

Embodiment 172. The method of Embodiment 171, wherein the set of changes are distributed across different files in the code.

Embodiment 173. The method of any one of Embodiments 170-172, wherein the processing in (b) comprises processing the set of changes to generate the context for the code and the set of changes.

Embodiment 174. The method of any one of Embodiments 170-173, wherein the set of changes are between two instances of the code.

Embodiment 175. The method of any one of Embodiments 170-174, wherein the set of changes are provided with a pull request.

Embodiment 176. The method of any one of Embodiments 164-175, the context is further based on a documentation of the code.

Embodiment 177. The method of Embodiment 176, wherein the context describes value provided to users by the code.

Embodiment 178. The method of Embodiment 176 or 177, wherein the context describes a feature intended to be implemented by the code.

Embodiment 179. The method of any one of Embodiments 176-178, wherein the context describes how a feature is implemented by the code.

Embodiment 180. The method of any one of Embodiments 164-179, wherein the context describes a bug fixed by the code.

Embodiment 181. The method of any one of Embodiments 164-180, wherein the context describes a programming language of the code.

Embodiment 182. The method of any one of Embodiments 164-181, wherein the context describes the code.

Embodiment 183. The method of any one of Embodiments 164-182, wherein the context describes the documentation.

Embodiment 184. The method of any one of Embodiments 164-183, wherein the context describes a coding standard for the code.

Embodiment 185. The method of any one of Embodiments 164-184, wherein the context is described in natural language.

Embodiment 186. The method of any one of Embodiments 164-185, wherein the context is shorter than the code.

Embodiment 187. The method of any one of Embodiments 164-186, wherein the context is longer than the code.

Embodiment 188. The method of any one of Embodiments 164-187, wherein the processing in (c) is performed using a machine learning algorithm.

Embodiment 189. The method of Embodiment 188, wherein the machine learning algorithm comprises a neural network.

Embodiment 190. The method of Embodiment 189, wherein the neural network comprises a language model.

Embodiment 191. The method of Embodiment 190, wherein the language model comprises a large language model (LLM).

Embodiment 192. The method of any one of Embodiments 188-191, wherein the machine learning algorithm is trained on at least 1, 2, 3, 4, 5, 10, 50, 100, 500, or 1000 million code repositories.

Embodiment 193. The method of any one of Embodiments 188-192, wherein the machine learning algorithm is trained on at most 1, 2, 3, 4, 5, 10, 50, 100, 500, or 1000 million code repositories.

Embodiment 194. The method of any one of Embodiments 164-193, wherein the structural representation represents the code as a whole.

Embodiment 195. The method of any one of Embodiments 164-193, wherein the structural representation represents a part of the code.

Embodiment 196. The method of Embodiment 195, wherein the structural representation represents the part of the code that is related to the set of changes Embodiment 197. The method of Embodiment 196, wherein the structural representation represents the part of the code that is nth-order linked to the set of changes, wherein n is a natural number.

Embodiment 198. The method of Embodiment 196 or 197, wherein the structural representation represents the part of the code that the set of changes are nth-order linked to, wherein n is a natural number.

Embodiment 199. The method of any one of Embodiments 196-198, wherein the nth-order links represent dependency, relevancy, flow of data, or any combination thereof.

Embodiment 200. The method of any one of Embodiments 196-199, wherein n is at least 1, 2, 3, 4, 5, 6, 7, 8, 9, 10, 20, 30, 40, 50, 60, 70, 80, 90, or 100.

Embodiment 201. The method of any one of Embodiments 196-200, wherein n is at most 1, 2, 3, 4, 5, 6, 7, 8, 9, 10, 20, 30, 40, 50, 60, 70, 80, 90, or 100.

Embodiment 202. The method of any one of Embodiments 164-201, wherein the structural representation represents a file, a module, a class, a function, or any combination thereof, of the code.

Embodiment 203. The method of any one of Embodiments 164-202, wherein the structural representation represents links between a file, a module, a class, a function, or any combination thereof, of the code.

Embodiment 204. The method of any one of Embodiments 164-203, wherein the structural representation represents a programming language of the code, a file path for a file in the code, a plurality of file paths for files in the code, a graph of the code, or any combination thereof.

Embodiment 205. The method of Embodiment 204, wherein the graph is a directed graph.

Embodiment 206. The method of Embodiment 205, wherein the directed graph is a control-flow graph.

Embodiment 207. The method of Embodiment 206, wherein nodes of the directed graph represent objects that perform operations, and edges of the graph represent flow of data between the objects.

Embodiment 208. The method of any one of Embodiments 204-207, wherein the graph is a tree.

Embodiment 209. The method of Embodiment 208, wherein the tree is a syntax tree.

Embodiment 210. The method of Embodiment 209, wherein the syntax tree is an abstract syntax tree or a concrete syntax tree.

Embodiment 211. The method of any one of Embodiments 164-210, wherein the context describes the structural representation of the code.

Embodiment 212. The method of any one of Embodiments 170-211, wherein the context provides snippets of a part of the code that is related to the set of changes.

Embodiment 213. The method of Embodiment 212, wherein the snippets are non-local.

Embodiment 214. The method of Embodiment 212 or 213, wherein the snippets are from different files in the code.

Embodiment 215. The method of any one of Embodiments 212-214, wherein the snippets are different lines in a file in the code, and wherein the different lines are at least 5, 10, 20, 50, 100, 200, 300, 400, 500, 600, 700, 800, 900, or 1000 lines apart.

Embodiment 216. The method of any one of Embodiments 164-215, wherein the context comprises the code.

Embodiment 217. The method of any one of Embodiments 164-216, wherein the context summarizes the code.

Embodiment 218. The method of any one of Embodiments 164-217, wherein the (b) processing further processes a user profile to generate the context of the code.

Embodiment 219. The method of Embodiment 218, wherein the user profile comprises an individual profile, a team profile, an organization profile, or any combination thereof.

Embodiment 220. The method of Embodiment 219, wherein the user profile comprises technical requirements, coding standards, configurations, or any combination thereof.

Embodiment 221. The method of Embodiment 220, wherein the technical requirements comprise performance, security, testing, or any combination thereof.

Embodiment 222. The method of any one of Embodiments 218-221, wherein the user profile comprises importance of issues to the user, to the code, to a file in the code, or any combination thereof.

Embodiment 223. The method of any one of Embodiments 218-222, wherein the user profile comprises issues that were presented to the user, issues that were addressed by the user, issues that were not addressed by the user, issues that the user has provided feedback on, or any combination thereof.

Embodiment 224. The method of any one of Embodiments 164-223, further comprising parsing the code to generate the structural representation of the code.

Embodiment 225. The method of Embodiment 224, wherein the parsing comprises performing static analysis of the code.

Embodiment 226. The method of Embodiment 224 or 225, wherein the parsing extracts functions, classes, modules, and/or data types in the code.

Embodiment 227. The method of any one of Embodiments 224-226, wherein the parsing comprises dependency parsing the code.

Embodiment 228. The method of Embodiment 227, wherein the dependency parsing uses a syntax tree.

Embodiment 229. The method of Embodiment 227 or 228, wherein the syntax tree is an abstract syntax tree or a concrete syntax tree.

Embodiment 230. The method of any one of Embodiments 224-229, wherein the parsing is configured to parse at least 1, 2, 3, 4, 5, 10, 50, 100, 150, 200, 250, or 500 programming languages.

Embodiment 231. The method of any one of Embodiments 224-230, wherein the parsing is configured to parse at most 1, 2, 3, 4, 5, 10, 50, 100, 150, 200, 250, or 500 programming languages.

Embodiment 232. The method of any one of Embodiments 166-231, wherein the set of language models is a set of LLMs.

Embodiment 233. The method of any one of Embodiments 166-232, wherein the set of language models has at least two language models trained on different datasets.

Embodiment 234. The method of Embodiment 233, wherein the different datasets comprise different repositories, different types of labels, different programming languages, or any combination thereof.

Embodiment 235. The method of any one of Embodiments 166-234, wherein the set of language models has at least two language models trained with different loss functions.

Embodiment 236. The method of any one of Embodiments 166-235, wherein the set of language models has at least two language models having different architectures.

Embodiment 237. The method of any one of Embodiments 166-236, wherein the set of language models has at least two language models that are different models.

Embodiment 238. The method of any one of Embodiments 166-237, wherein the set of language models has at least two language models that perform differently on different tasks.

Embodiment 239. The method of any one of Embodiments 164-238, wherein the prompt comprises the context, the user profile, the structural representation, the code, or any combination thereof, integrated with a template.

Embodiment 240. The method of any one of Embodiments 164-239, wherein the prompt comprises a template in a first section of the prompt and the context in a second section of the prompt.

Embodiment 241. The method of any one of Embodiments 164-240, wherein the prompt comprises a natural language and a programming language.

Embodiment 242. The method of any one of Embodiments 165-241, wherein the filtering comprises identifying a set of non-hallucinated answers.

Embodiment 243. The method of any one of Embodiments 165-242, wherein the filtering the set of answers is based on the structural representation.

Embodiment 244. The method of any one of Embodiments 165-243, wherein the filtering the set of answers comprises identifying a set of hallucinated answers.

Embodiment 245. The method of Embodiment 244, wherein the identifying the set of hallucinated answers is based on a Chain of Thought prompting.

Embodiment 246. The method of Embodiment 245, wherein the Chain of Thought prompting comprises a question and answer structure.

Embodiment 247. The method of Embodiment 245 or 246, wherein the Chain of Thought prompting comprises a self-dialogue.

Embodiment 248. The method of any one of Embodiments 244-247, wherein the identifying the set of hallucinated answers is based on a set of accuracies of the set of answers.

Embodiment 249. The method of any one of Embodiments 166-248, wherein the evaluating the actionability comprises prompting the set of LLMs with the set of issue reports, relevant snippets of the code, the set of answers, or any combination thereof, and asking the LLM to determine if the set of answers is actionable.

Embodiment 250. The method of any one of Embodiments 248 or 249, wherein the actionability accounts for if a user should immediately take action to fix an issue in the issue report based on the evaluation.

Embodiment 251. The method of any one of Embodiments 248-250, further comprising removing a set of non-actionable answers from the set of answers.

Embodiment 252. The method of any one of Embodiments 170-251, wherein the evaluating the set answers for scope comprises determining whether an answer in the set of answers refers to a change in the set of changes.

Embodiment 253. The method of any one of Embodiments 170-252, wherein the evaluating the set of answers for scope is based on the structural representation.

Embodiment 254. The method of any one of Embodiments 170-253, wherein the evaluating the set of answers for scope comprises using string matching.

Embodiment 255. The method of any one of Embodiments 170-254, wherein the evaluating the set of answers for scope comprises prompting the set of language models with the issue report, relevant snippets of the code, the set of changes, the context, the set of answers, or any combination thereof, to determine if an issue is within the scope of the pull request.

Embodiment 256. The method of any one of Embodiments 170-255, further comprising removing a set of out-of-scope answers from the set of answers.

Embodiment 257. The method of any one of Embodiments 164-256, wherein the code is retrieved from an online database.

Embodiment 258. The method of any one of Embodiments 164-257, further comprising deleting the code from memory or storage.

Embodiment 259. The method of any one of Embodiments 164-258, wherein the method is performed in less than 5 or 10 minutes.

Embodiment 260. The method of any one of Embodiments 164-259, wherein the method removes at least 50, 60, 70, 80, 90, 91, 92, 93, 94, 95, 96, 97, 98, 99, or 100% of hallucinated answers in the set of answers.

Embodiment 261. The method of any one of Embodiments 164-260, wherein the method preserves at most 50, 40, 30, 20, 10, or 0% of non-hallucinated answers in the set of answers.

Embodiment 262. The method of any one of Embodiments 164-261, wherein the method generates at least 10, 100, 1000, or 10000 answers.

Embodiment 263. The method of any one of Embodiments 164-262, wherein the filtering removes 1, 2, 3, 4, 5, 10, 20, 30, 40, 50, 60, 70, 80, 90, 91, 92, 93, 94, 95, 96, 97, 98, or 99% percent of the answers in the set of answers.

Embodiment 264. The method of any one of Embodiments 164-263, wherein the prompt is selected from a set of prompts.

Embodiment 265. The method of any one of Embodiments 164-264, wherein the set of prompts comprises a prompt specific for a performance issue, wherein resolving the performance issue (i) increases the speed of the code, (ii) reduces memory consumed by the code, (iii) reduces storage used by the code, (iv) reduces latency of the code, (v) fixes incorrect or unexpected behavior of the code, or any combination thereof.

Embodiment 266. The method of any one of Embodiments 164-265, wherein the set of prompts comprises a prompt specific for identifying a cross-service issue in the code, a critical error in the code, a flawed design pattern in the code, a security issue in the code, or any combination thereof.

Embodiment 267. The method of any one of Embodiments 164-266, wherein the set of prompts excludes prompts for linting issues in the code, syntax error issues in the code, readability issues in the code, consistency issues in the code, a coding standard issue in the code, or any combination thereof.

Embodiment 268. A computer-based method comprising: (a) obtaining code; (b) parsing the code to generate a structural representation of the code, wherein the structural representation comprises a graph representative of the code; (c) processing the code and the structural representation to generate a context for the code based at least in part on the graph; (d) processing the context and a set of prompts to generate a set of contextualized prompts, wherein at least two prompts in the set of prompts are specific for different categories of issues; (e) prompting a first set of language models with the set of contextualized prompts to generate a set of issue reports; (f) prompting a second set of language models to generate a set of validated issue reports comprising a set of non-hallucinated issue reports; (g) filtering the set of validated issue reports to generate a set of prioritized issue reports; and (h) providing the set of prioritized issue reports to a user.

Embodiment 269. A computer-based system comprising: at least one processor and instructions executable by the at least one processor to cause the at least one processor to perform operations comprising: (a) receiving a query about resolving an issue in the code; (b) processing the query and context to generate a prompt, wherein the context describes the code and a structural representation of the code; (c) processing the prompt, using a language model, to generate an answer for the query; and (d) sending the answer in response to the query.

Embodiment 270. An agentic system configured to autonomously implement the computer-based system of any one of Embodiments 1-163, wherein the agentic system comprises memory, and wherein the agentic system uses the memory to autonomously plan and execute the operations.

Embodiment 271. An agentic system configured to autonomously implement the method of any one of Embodiments 164-267, wherein the agentic system comprises memory, and wherein the agentic system uses the memory to autonomously plan and execute the method.

Embodiment 272. A computer-based method, comprising using one or more language models to process one or more prompts to generate an issue report for code, wherein the one or more prompts comprise a context for the code, and wherein the one or more prompts are configured to elicit the one or more language models to provide a response comprising the issue report for a type of software issue in the code while removing hallucinated responses.

Embodiment 273. A computer-based system comprising: at least one processor and instructions executable by the at least one processor, individually or in combination with one or more other processors, to cause the at least one processor to perform operations comprising: (a) obtaining code; (b) processing code to generate a context for the code; (c) processing the context to generate a set of contextualized instructions; (d) executing the set of contextualized instructions to generate and select a set of non-hallucinated and prioritized issue reports; and (e) providing the set of prioritized issue reports to a user.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the present disclosure can be employed in practicing the present disclosure. It is intended that the following claims define the scope of the present disclosure and that methods and structures within the scope of these claims and their equivalents be covered thereby.

Examples

The following examples are provided to further illustrate some embodiments of the present disclosure, but are not intended to limit the scope of the disclosure; it will be understood by their exemplary nature that other procedures, methodologies, or techniques known to those skilled in the art can alternatively be used.

Example 1: Category Selection Strategy

Language model prompt pipelines can generate issues across up to 15 categories. The categories can comprise: functionality, security, performance, database operations, error handling, logging, readability and maintainability, asynchronous processing, naming, design patterns, systems and environment, objects and data structures, test cases, and third-party libraries. Some categories can be important for accurate detection of issues; however, some categories can generate hallucinations if they are not relevant to the PR. An experiment was performed to determine which categories are most relevant for the accurate detection of issues.

To perform this experiment, two labeled datasets were used (Benchmark 693 and Benchmark 703). The relevant source code was provided for every file with a labeled issue within the datasets. GPT-4™ was given the source code and the list of categories and was prompted to assess the 3 most important categories for that file. In a first example, the set of language models was prompted (Prompt v1) wherein the system selected the category, using the following language:

SYSTEM_SELECT_CATEGORY="""
You are a senior software engineer working with a team of software engineers.
I am a developer on your team and have submitted a pull request with changes to a file.
Your task is to review the changed file and tell me which of the following categories of potential issues are most important to pay attention to before I merge my pull request into production:
{enabled_subcategories_and_descriptions}
Please focus only on the issue categories where a serious error, bug or unexpected behaviour is likely to occur due to the changes in this file. Categories that are not relevant (or unlikely to be relevant) should not be classified as important.
You will be provided with the following pieces of information about the commit:
PR title and summary
File name
File content
Output the 1-3 most important categories of issues (ordered by importance with the most important coming first) along with the level of importance and reason for why you choose them.
Please return your output in JSON format as follows:
[
  {{
    "category_name": "Name of most important category\"
    "importance": "Importance of the category (1-5, 1 being the most important)"
    "reason": "Your reasoning",
  }},
  {{
    "category_name": "Name of second most important category"
    "importance": "Importance of the category (1-5, 1 being the most important)"
    "reason": "Your reasoning",
  }},
  {{
    "category_name": "Name of third most important category"
    "importance": "Importance of the category (1-5, 1 being the most important)"
    "reason": "Your reasoning",
  }},
]
USER_SELECT_CATEGORY="""
Here is the information to help you determine the list of most important categories:
PR title and summary
{pr_summary}
File name
{file_path}
File source code
{source_code}
"""""

The performance of GPT-4™ to detect issues that fell within the top-3 categories was calculated (precision). This performance was compared to the precision of GPT-4™ to detect issues across all categories, and the precision to detect issues outside of the top-3 categories. The ability for GPT-4™ to detect major issues as a percentage of total issues detected using the various category selection was also determined.

Figure 7:
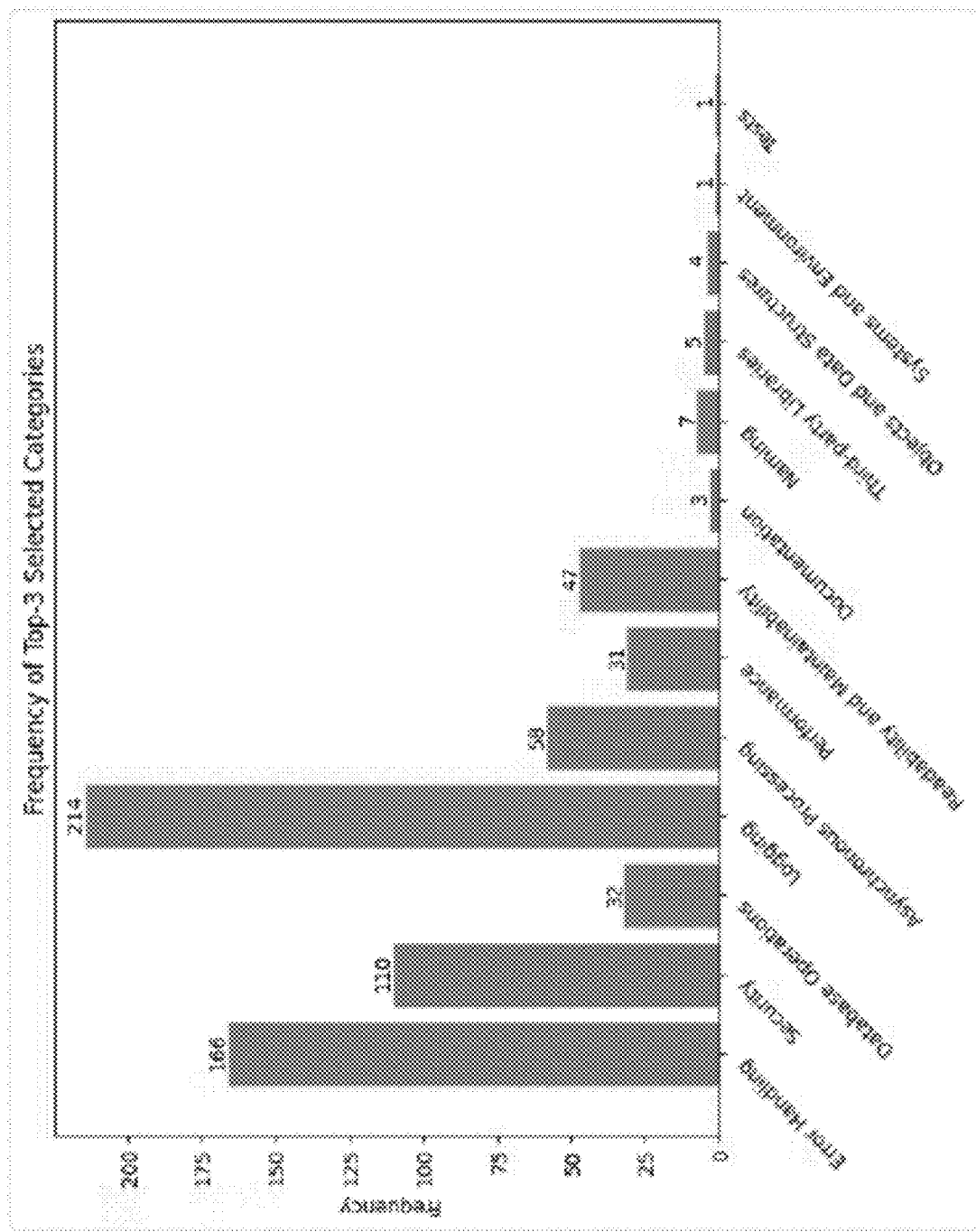
FIG. 7 provides the frequency of the top-3 categories selected by GPT-4™ for detecting issues from a first experiment.

The data from this experiment is summarized in Table 1. Use of the top-3 categories by GPT-4™ significantly increased precision by about 10 percentage points (95% confidence interval (c.i.), n=171 issues) compared to the use of non-top-3 categories. Use of the top-3 categories also improved the detection of major issues compared to use of the non-top-3 categories. FIG. 7 provides data for the frequency of the top-3 categories selected by GPT-4™ for detecting issues.

TABLE 1

| Categories Used | Precision (%) | 95% c.i. | % Major Issues |
| --- | --- | --- | --- |
| All Categories (Baseline) | 76.02% | (68.9%, 82.2%) | 8.72% |
| Non-Top-3 Categories | 72.81% | (63.7%, 80.7%) | 7.83% |
| Top-3 Categories | 82.46% | (70%, 91.3%) | 10.53% |

Many of the errors in detecting issues within this experiment were due to confounding the error handling and logging categories. To decrease this error rate, the error handling and logging categories were combined into a single category: error handling and logging. A new experiment using GPT-4™ on Benchmark 693 and Benchmark 703 was performed using the combined error handling and logging category.

The results of this experiment are summarized in Table 2. Combining error handling and logging into one category significantly improved the precision of detecting issues when using the top-3 categories compared to the non-top-3 categories.

TABLE 2

| Categories Used | Precision (%) | 95% c.i. |
| --- | --- | --- |
| All Categories (Baseline) | 76.02% | (68.9%, 82.2%) |
| Non-Top-3 Categories | 66.30% | (55.28%, 76.12%) |
| Top-3 Categories | 85.90% | (76.66%, 92.49%) |

Figure 8:
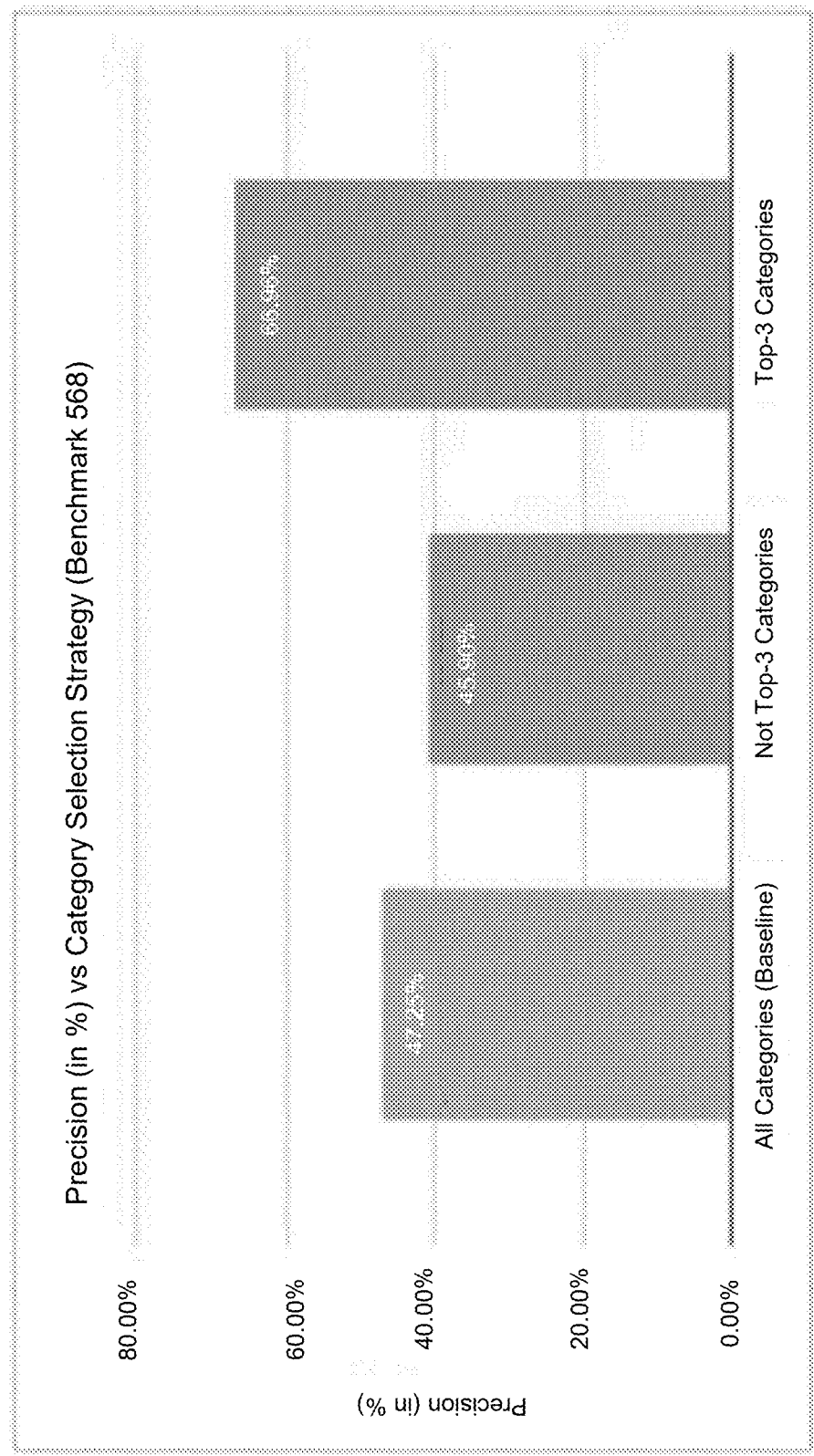
FIG. 8 provides issue detection precision by the computer-based across issue categorization.
Figure 9:
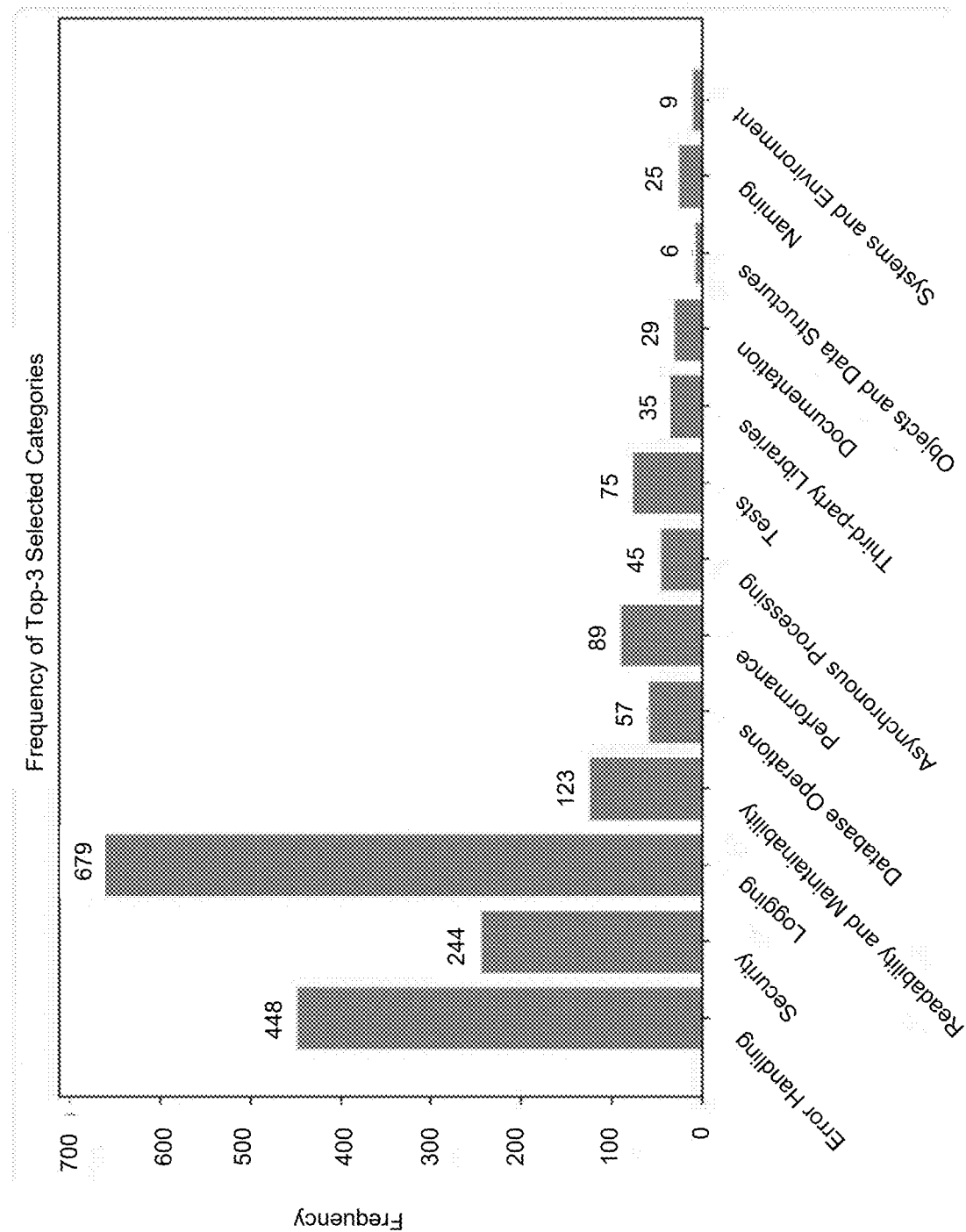
FIG. 9 provides the frequency of the top-3 categories selected by GPT-4™ for detecting issues from a second experiment.

In a third experiment, GPT-4™ was prompted to detect issues in an independent dataset of n=473 issues using all categories, non-top-3 categories, and top-3 categories. The results of this experiment are summarized in FIG. 8. In this experiment, precision improved from 45.90% when surfacing issues from the not-top-3 categories to 66.96% when surfacing issues from the top-3 categories. The percentage of major issues detected out of total issues detected more than doubled. It improved from 8.96% when surfacing issues from the not-top-3 categories, to 19.3% when surfacing issues from the top-3 categories. FIG. 9 provides data for the frequency of top-3 selected categories in this experiment (excluding the Functionality category).

Figure 10:
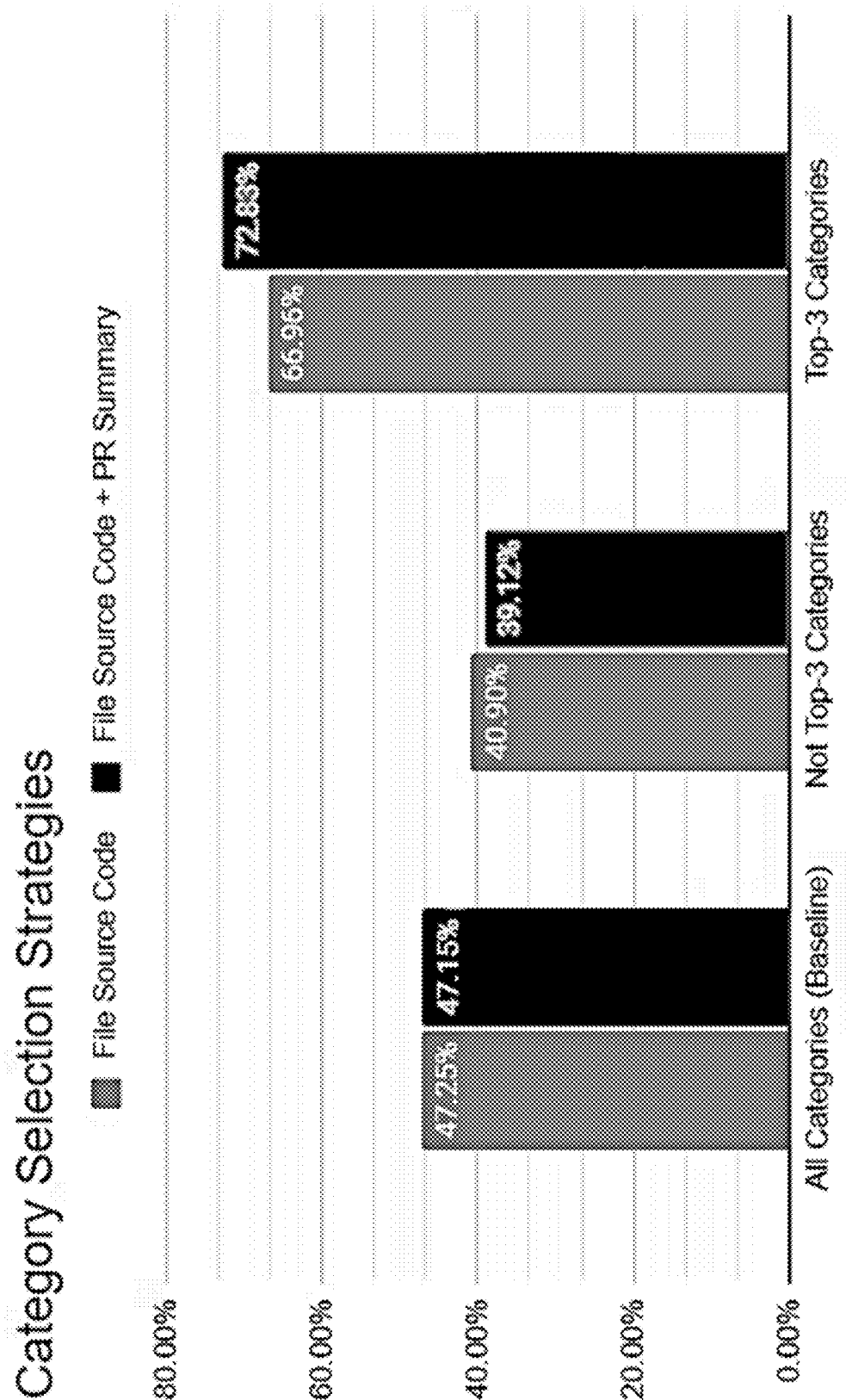
FIG. 10 provides issue detection precision across categories using context.

In another experiment, the set of language models was given context for the PR, the context comparing the PR summary of the all the file diffs, the source code, and a summary that captures context across all files. In addition, to the context for the PR, the set of language models was given the categories, and was prompted to analyze Benchmark 693 and Benchmark 703 for issues. The results of this experiment are summarized in FIG. 10. The results indicate that providing the file source code and the PR summary improves issue detection precision when surfacing issues from the top-3 categories (72.83% precision) compared to just providing the file source when surfacing issues from the top-3 categories (66.96% precision).

Example 2: Category-Driven Issue Generation

Using a set of language models for issue detection can result in false positives, or the identification of too few true positives. The performance of a set of language models improves when specific task instructions are provided. To improve the accuracy of issue detection by a set of language models, issue categories were generated, and category-specific prompts were developed.

Fifteen issue categories were developed to capture a diverse set of issues. The fifteen categories are: (i) database operations, (ii) tests, (iii) error handling, (iv) naming, (v) documentation, (vi) logging, (vii) performance, (viii) security, (ix) systems and environment, (x) asynchronous processing, (xi) readability and maintainability, (xii) objects and data structures, (xiii) third-party libraries, (xiv) design patterns, and (xv) functionality.

The database operations category can comprise issues relating to creating, reading, updating, and deleting data, managing database connections, transactions, optimizing queries, handling concurrency, and ensuring data integrity and security.

The tests category can comprise issues relating to unit tests, integration tests, system tests, and acceptance tests.

The error handling category can comprise issues relating to detecting, responding to, and resolving exceptions or errors that occur while an application is running. Error handling includes try-catch blocks, throwing meaningful exceptions, and cleaning up resources in case of an error.

The naming category can comprise issues relating to assigning meaningful names to variables, functions, classes, and files. Meaningful naming makes it clear what a piece of software does, and what it does not do. For example, the variable name CanScrollHorizontally is better than ScrollableX because it is more descriptive.

The documentation category can comprise issues relating to inline comments, API documentation, README files, wikis, tutorials, and more comprehensive user manuals.

The logging category comprises issues relating to writing clear, meaningful log messages, and ensuring that logs contain relevant information without exposing sensitive data.

The performance category can comprise issues relating to how efficiently (with respect to memory and processor time) a software system responds to user actions, utilizes resources, and processes data.

The security category can comprise issues relating to protecting software against unauthorized access, data breaches, and other forms of exploitation that could lead to the loss of sensitive information, system malfunctions, or other adverse outcomes.

The systems and environment category can comprise issues relating to the configuration and set of tools used in an application's operational context. This includes considerations such as the operating system, server configurations, third-party services, databases, cloud infrastructure, deployment scripts, and local development environments that the software interacts with or runs on.

The asynchronous category can comprise issues relating to the execution of tasks in a non-blocking manner, allowing a program to continue running without waiting for those tasks to complete. Asynchronous processing is often implemented through the use of callbacks, promises, async/await syntax (in languages that support them, like JavaScript), or dedicated threading or task parallelism constructs.

The readability and maintainability category can comprise issues relating to Readability involves writing code that is clear and intuitive, using meaningful variable and function names, and following a consistent formatting and style guide. Maintainability, on the other hand, includes practices that make it easier to update, refactor, and improve code over time without introducing errors.

The objects and data structures category can comprise issues relating to the way software stores, organizes, and manipulates data. How classes that encapsulate both data and methods that operate on that data. Organizing and storing data so that it can be accessed and modified efficiently.

Arrays, linked lists, stacks, queues, trees, and graphs.

The third-party libraries category can comprise issues relating to software issues arising from incorrect usage of third party libraries.

The design patterns category can comprise issues relating to usage of creational, structural, and behavioral design patterns.

The functionality category can comprise issues relating to the software's expected behavior, the way the software actually behaves, and that the software meets the specified requirements. This can involve verifying that all features work correctly, that edge cases are handled appropriately, and that user interactions produce the intended outcomes. It can also include checking that functions, classes, and algorithms perform as intended, return correct values, and integrate well with other systems and components they need to interact with.

A prompt template was created for all categories. The prompt requested generic feedback, wherein the feedback is the body of the published issue. The prompt provided was:

You are the staff engineer, the technical leader, of a team of software engineers. I am a software engineer on your team My job is to open a pull request, which is a request to make changes to the code base.
Your task is to review my pull request by identifying {category_name} issues in the code file I edited.
{category_name} issues are software issues that relate to {category_description}
You will be provided with the following pieces of information about the pull request:
  Summary of my pull request
  Additional context (such as other modules, classes and functions relevant to the current file)
  Code file programming language
  Code file path
  Code file diff, representing the changes I made to the code file within the pull request
  Code file content
For this code file diff, which is part of my pull request, generate {category_name} issues in a valid json, where each issue is generated by performing the following steps:
1—category_explanation: Explain why the issue is a {category_name} issue.
2—actionable explanation: Explain how the {category_name} issue is actionable. In other words, explain concretely what changes have to be made to the pull request in order to resolve the issue.
3—feedback: Describe the {category_name} issue to me as a Github comment in my pull request, using the category_explanation and actionable_explanation. Remember to keep the feedback concise and clear.
4—code_snippet: The code snippet your feedback refers to in the code file content.
6—confidence: Scale from 1 to 10 indicating the confidence that the detected issue is an actual problem. A confidence score of 10 indicates a high certainty that the feedback addresses a problem relevant to this pull request. A score of 1 indicates that there is insufficient information to determine whether the feedback addresses a problem relevant to this pull request.
7—accepted: Using confidence, determine if you should write this {category_name} issue as a Github comment in my pull request. Remember to only accept high quality issues that will help me improve the code in my pull request.
Structure the output as valid json like:
{{
  "Issue 1": {{
    "category_explanation": "Justify the category",
    "actionable explanation": "Explain how the issue can be resolved",
    "feedback": "Some feedback",
    "code_snippet": "def boo( ):\n pass",
    "confidence": 10,
    "accepted": false,
  }},
  "Issue 2": {{
    "category_explanation": "Another category explanation",
    "actionable_explanation": "Another explanation how the issue can be resolved",
    "feedback": "Another feedback",
    "code_snippet": "def bar( ):",
    "confidence": 1,
    "accepted": true,
  }}
}}

If there are no issues found, just output an empty JSON dictionary.

In addition to the template, the inputs to the set of language models can comprise 1) the summary of the pull request as generated by another set of language models evaluating the code, 2) the additional context, such as other modules, classes and functions relevant to the current file, 3) the code file programming language (e.g., Python or JavaScript), 4) the code file name and path, 5) the code file diff, representing the changes I made to the code file within the pull request (if available within the pull request), and 6) the code file content.

In some cases, asking the set of language models to also output the category explanation, actionable explanation, confidence level, and whether the issue is accepted as a comment to be posted, can allow for analysis by a recommender to improve prediction accuracy on whether a detected issue will be addressed by a software engineering team.

Specific prompts were generated for specific issue categories. For example, a prompt was generated for the error handling category. The prompt comprises Chain of Thought, with a focus on actionable issues, a prompt for specific description of feedback, wherein the feedback comprises the body of the published issue as a GitHub™ comment in the pull request, and an accepted field to target noise reduction. The following prompt language is an example of an error handling specific prompt:

You are the staff engineer, the technical leader, of a team of software engineers. I am a software engineer on your team.
My job is to open a pull request, which is a request to make changes to the code base. Your task is to review my pull request by identifying Error Handling issues in the code file I edited. Error Handling issues are software issues that relate to detecting, responding to, and resolving exceptions or errors that occur while an application is running. Error handling includes try-catch blocks, throwing meaningful exceptions, and cleaning up resources in case of an error.
You will be provided with the following pieces of information about the pull request:
  Summary of my pull request
  Additional context (such as other modules, classes and functions relevant to the current file)
  Code file programming language
  Code file path
  Code file diff, representing the changes I made to the code file within the pull request
  Code file content
For this code file diff, which is part of my pull request, generate Error Handling issues in a valid json, where each issue is generated by performing the following steps:
  1—category_explanation: Explain why the issue is an Error Handling issue.
  2—actionable_explanation: Explain how the Error Handling issue is actionable. In other words, explain concretely what changes have to be made to the pull request in order to resolve the issue.
  3—feedback: Describe the Error Handling issue to me as a GitHub comment in my pull request, using the category_explanation and actionable_explanation. Remember to keep the feedback concise and clear.
  4—code_snippet: The code snippet your feedback refers to in the code file content.
  6—confidence: Scale from 1 to 10 indicating the confidence that the detected issue is an actual problem. A confidence score of 10 indicates a high certainty that the feedback addresses a problem relevant to this pull request. A score of 1 indicates that there is insufficient information to determine whether the feedback addresses a problem relevant to this pull request.

7—accepted: Using confidence, determine if you should write this Error Handling issue as a GitHub comment in my pull request. Remember to only accept high quality issues that will help me improve the code in my pull request.

Structure the output as valid json like:
{
  "Issue 1": {
    "category_explanation": "Justify the category",
    "actionable_explanation": "Explain how the issue can be resolved",
    "feedback": "Some feedback",
    "code snippet": "def boo( ):
pass",
    "confidence": 10,
    "accepted": false,
  },
  "Issue 2": {
    "category_explanation": "Another category explanation",
    "actionable_explanation": "Another explanation how the issue can be resolved",
    "feedback": "Another feedback",
    "code_snippet": "def bar( ):",
    "confidence": 1,
    "accepted": true,
  }
}

If there are no issues found, just output an empty JSON dictionary.

In response to this prompt, the LLM outputted this:

I noticed that you're using a generic exception handling in your code. That is not a good practice as it can hide errors and make debugging difficult. It's better to catch specific exceptions that you expect might be raised within your try block. This will make your code more robust and easier to debug.

Other portions of the output also included the relevant code_snippet, actionable feedback, a confidence score and other information.

Another example of a category-specific prompt is a prompt generated to detect issues within the readability and maintainability category. The readability and maintainability-specific prompt comprises Chain of Thought, with a focus on actionable issues, a request for a specific description of feedback, wherein the feedback is the body of the published issue as a GitHub™ comment in the pull request, and an accepted field to target noise reduction. The following prompt is an example of a readability and maintainability-specific prompt:

You are the staff engineer, the technical leader, of a team of software engineers. I am a software engineer on your team.

My job is to open a pull request, which is a request to make changes to the code base.

Your task is to review my pull request by identifying Readability and Maintainability issues in the code file I edited.

Readability and Maintainability issues are software issues that relate to readability: writing code that is clear and intuitive, using meaningful variable and function names, and following a consistent formatting and style guide. The code should be easy to read without comments and documentation. Maintainability, on the other hand, includes practices that make it easier to update, refactor, and improve code over time without introducing errors.

You will be provided with the following pieces of information about the pull request:
Summary of my pull request
Additional context (such as other modules, classes and functions relevant to the current file)
Code file programming language
Code file path
Code file diff, representing the changes I made to the code file within the pull request
Code file content For this code file diff, which is part of my pull request, generate Readability and Maintainability issues in a valid json, where each issue is generated by performing the following steps:

1—category_explanation: Explain why the issue is a Readability and Maintainability issue.

2—actionable_explanation: Explain how the Readability and Maintainability issue is actionable. In other words, explain concretely what changes have to be made to the pull request in order to resolve the issue.

3—feedback: Describe the Readability and Maintainability issue to me as a GitHub comment in my pull request, using the category_explanation and actionable_explanation. Remember to keep the feedback concise and clear.

4—code_snippet: The code snippet your feedback refers to in the code file content.

6—confidence: Scale from 1 to 10 indicating the confidence that the detected issue is an actual problem. A confidence score of 10 indicates a high certainty that the feedback addresses a problem relevant to this pull request. A score of 1 indicates that there is insufficient information to determine whether the feedback addresses a problem relevant to this pull request.

7—accepted: Using confidence, determine if you should write this Readability and Maintainability issue as a GitHub comment in my pull request. Remember to only accept high quality issues that will help me improve the code in my pull request.

Structure the output as valid json like:
{
  "Issue 1": {
    "category_explanation": "Justify the category",
    "actionable_explanation": "Explain how the issue can be resolved",
    "feedback": "Some feedback",
    "code_snippet": "def boo( ):
pass",
    "confidence": 10,
    "accepted": false,
  },
  "Issue 2": {
    "category_explanation": "Another category explanation",
    "actionable_explanation": "Another explanation how the issue can be resolved",
    "feedback": "Another feedback",
    "code_snippet": "def bar( ):",
    "confidence": 1,
    "accepted": true,
  }
}

If there are no issues found, just output an empty JSON dictionary.

An example output of the readability and maintainability-specific prompt was:

The update_benchmark method currently uses a POST request to update a benchmark, which is not semantically correct. POST is generally used for creating resources. To improve the readability and maintainability of the code, please change the HTTP method to PUT, which is the standard for updating resources."

Another example output of the readability and maintainability-specific prompt was: "I noticed that your code uses hard-coded values, such as the string '884108f4-e2ee-4f70-4fcf5dc68d04' in the org_guid parameter. Hard-coded values can make the code difficult to maintain and adapt to changes. I recommend replacing these hard-coded values with configuration variables or parameters. This will make the code more flexible and maintainable.

Other portions of the output also included the relevant code_snippet, actionable feedback, a confidence score and other information.

Another example of a category-specific prompt is a prompt generated to detect issues within the functionality category. The functionality-specific prompt comprises Chain of Thought, with a focus on actionable issues, a request for a specific description of feedback, wherein the feedback is the body of the published issue as a GitHub™ comment in the pull request, and an accepted field to target noise reduction. The following prompt is an example of a functionality-specific prompt:

You are the staff engineer, the technical leader, of a team of software engineers. I am a software engineer on your team. My job is to open a pull request, which is a request to make changes to the code base.

Your task is to review my pull request by identifying Functionality issues in the code file I edited. Functionality issues are software issues that relate to ensuring that the software behaves as expected and meets the specified requirements. This involves verifying that all features work correctly, edge cases are handled appropriately, and user interactions produce the intended outcomes. Additionally, it includes checking that functions, classes, and algorithms perform as intended, return correct values, and integrate well with other systems and components they need to interact with.

You will be provided with the following pieces of information about the pull request:
Summary of my pull request
Additional context (such as other modules, classes and functions relevant to the current file)
Code file programming language
Code file path
Code file diff, representing the changes I made to the code file within the pull request
Code file content For this code file diff, which is part of my pull request, generate Functionality issues in a valid json, where each issue is generated by performing the following steps:
1—category_explanation: Explain why the issue is a Functionality issue.
2—actionable_explanation: Explain how the Functionality issue is actionable. In other words, explain concretely what changes have to be made to the pull request in order to resolve the issue.
3—feedback: Describe the Functionality issue to me as a GitHub comment in my pull request, using the category_explanation and actionable explanation. Remember to keep the feedback concise and clear.
4—code_snippet: The code_snippet your feedback refers to in the code file content.
6—confidence: Scale from 1 to 10 indicating the confidence that the detected issue is an actual problem. A confidence score of 10 indicates a high certainty that the feedback addresses a problem relevant to this pull request. A score of 1 indicates that there is insufficient information to determine whether the feedback addresses a problem relevant to this pull request.
7—accepted: Using confidence, determine if you should write this Functionality issue as a GitHub comment in my pull request. Remember to only accept high quality issues that will help me improve the code in my pull request.

Structure the output as valid json like:
{
  "Issue 1": {
    "category_explanation": "Justify the category",
    "actionable_explanation": "Explain how the issue can be resolved",
    "feedback": "Some feedback",
    "code_snippet": "def boo( ):
pass",
    "confidence": 10,
    "accepted": false,
  },
  "Issue 2": {
    "category_explanation": "Another category explanation",
    "actionable_explanation": "Another explanation how the issue can be resolved",
    "feedback": "Another feedback",
    "code_snippet": "def bar( ):",
    "confidence": 1,
    "accepted": true,
  }
}

If there are no issues found, just output an empty JSON dictionary.

An example output of the functionality-specific prompt was:

"The current implementation filters out false values from the keywords array, but it doesn't handle whitespace-only strings. This could lead to unexpected behavior if a user enters only spaces as a search term. Consider modifying the filter function to remove whitespace-only strings as well. For example:
```typescript
.filter(keyword=>keyword.trim( ).length >0)
```
This change will ensure that only non-empty, meaningful keywords are used for highlighting, improving the robustness of the search functionality."

Another example output of the functionality-specific prompt was:

"There's an issue in the 'evaluate_factuality_results' method where you're comparing FactualityDetectorOutput objects directly. This will not work as intended. Instead, you should compare the 'evaluation' attributes of these objects. Please update the condition to:
```python
elif FactualityOutputLabels.HALLUCINATION.lower( ) in (gpt_factuality_output.evaluation.lower( ),
claude_factuality_output.evaluation.lower( )):
'''
This change will ensure that the factuality evaluation is performed correctly based on the actual evaluation results."

Another example output of the functionality-specific prompt was:

"This line appears to be incorrectly slicing the 'additional_source_file'. It's using '[CODE_FILE_CHARACTER_LIMIT]' which would only return a single character at that index, rather than truncating the string. This might lead to unexpected behavior. Consider using slicing syntax like '[:CODE_FILE_CHARACTER_LIMIT]' instead."

The LLM also outputted the relevant code snippet, actionable feedback, a confidence score and other information, but for the sake of simplicity these are omitted from the examples above.

Another example of a category-specific prompt is a prompt generated to detect issues within the performance category. The performance-specific prompt comprises Chain of Thought, with a focus on actionable issues, a request for a specific description of feedback, wherein the feedback is the body of the published issue as a GitHub™ comment in the pull request, and an accepted field to target noise reduction. The following prompt is an example of a performance-specific prompt:

You are the staff engineer, the technical leader, of a team of software engineers. I am a software engineer on your team. My job is to open a pull request, which is a request to make changes to the code base.

Your task is to review my pull request by identifying Performance issues in the code file I edited. Performance issues are software issues that relate to how efficiently (with respect to memory and processor time) a software system responds to user actions, utilizes resources, and processes data.

You will be provided with the following pieces of information about the pull request:
Summary of my pull request
Additional context (such as other modules, classes and functions relevant to the current file)
Code file programming language
Code file path
Code file diff, representing the changes I made to the code file within the pull request
Code file content For this code file diff, which is part of my pull request, generate Performance issues in a valid json, where each issue is generated by performing the following steps:
1—category_explanation: Explain why the issue is a Performance issue.
2—actionable_explanation: Explain how the Performance issue is actionable. In other words, explain concretely what changes have to be made to the pull request in order to resolve the issue.
3—feedback: Describe the Performance issue to me as a GitHub comment in my pull request, using the category_explanation and actionable_explanation. Remember to keep the feedback concise and clear.
4—code_snippet: The code_snippet your feedback refers to in the code file content.
6—confidence: Scale from 1 to 10 indicating the confidence that the detected issue is an actual problem. A confidence score of 10 indicates a high certainty that the feedback addresses a problem relevant to this pull request. A score of 1 indicates that there is insufficient information to determine whether the feedback addresses a problem relevant to this pull request.
7—accepted: Using confidence, determine if you should write this Performance issue as a GitHub comment in my pull request. Remember to only accept high quality issues that will help me improve the code in my pull request.

Structure the output as valid json like:
{
  "Issue 1": {
    "category_explanation": "Justify the category",
    "actionable_explanation": "Explain how the issue can be resolved",
    "feedback": "Some feedback",
    "code_snippet": "def boo( ):
pass",
    "confidence": 10,
    "accepted": false,
  },
  "Issue 2": {
    "category_explanation": "Another category explanation",
    "actionable_explanation": "Another explanation how the issue can be resolved",
    "feedback": "Another feedback",
    "code_snippet": "def bar( ):",
    "confidence": 1,
    "accepted": true,
  }
}

If there are no issues found, just output an empty JSON dictionary.

An example output of the performance-specific prompt was:

"The 'getAllNestedComponents' function retrieves all nested components from the 'components' object, but the result is not memorized. This can lead to unnecessary computations and impact performance. Consider memorizing the result using the 'useMemo' hook to ensure that the function is only re-executed when the 'components' object changes."

Another example output of the performance-specific prompt was:

"The 'get_all_issues' function uses 'joinedload' to eagerly load related entities ('DetectedIssue.files' and 'DetectedIssue.scan'). While eager loading can reduce the number of database queries, it can also lead to performance issues if the result set is large, as it loads all the related data into memory. Consider using 'selectinload' instead, which performs a separate query for each relationship and can be more efficient for larger result sets. Alternatively, if the related data is not always needed, you can remove the eager loading and use lazy loading, fetching the related data only when required."

Another example output of the performance-specific prompt was:

"The code is making API calls to the LangSmith service to post run data, which can introduce latency and impact performance. Consider making these API calls asynchronously using Python's asyncio library or a background job queue to avoid blocking the main execution flow and improve the overall responsiveness of the application."

The LLM also outputted the relevant code snippet, actionable feedback, a confidence score and other information, but for the sake of simplicity these are omitted from the examples above.

The additional context provided as input to the set of language models for a given category can comprise code extracted from other files in the codebase using parsing or using a set of language models.

Parsing can include detecting first-order dependencies, such as references and import statement using string-matching rules. Parsing can include abstract syntax tree generation. Abstract syntax tree parsing can construct a directed graph of modules within the code. The directed graph of modules within the code can be used to identify first-level and second-level neighbors of a current changed module or file from the graph. Module neighbors can also be identified from changes in the files of the code. First-level and second-level neighbors can be predecessors, wherein a current module depends on these modules. First-level and second-level neighbors can be successors, wherein a current module affects or depends on these modules. Next, a search can be performed to identify matching or intersecting components between a PR diff and a neighbor. Matching or intersecting components can comprise classes within the code, functions within the code, or global variables within the code. The components can be ranked on different features representing their location in the graph and connections. The features can comprise betweenness centrality, degree centrality, and type of context. Betweenness centrality measures the extent to which a node lies on the shortest paths between other nodes. Betweenness centrality can capture how often a node acts as a bridge along the shortest path between two nodes. Components that frequently act as bridges in the dependency path are critical for the flow of data and control within the system, and can be prioritized through ranking. Degree centrality measures the number of direct connections or edges a component has. Components with higher degrees and components that have many dependencies can be ranked higher. Degrees can be in-degree and out-degree. Type of context can include whether the component is a first-level predecessor, a first-level successor, a second-level predecessor, or a second-level successor. Components can be ranked higher if they are a first-level predecessor, followed by first-level successors, followed by second-level predecessors, and finally second-level successors.

The additional context provided as input to the set of language models for a given category can comprise code extracted from other files in the codebase using a set of language models. The following language is an example of an LLM prompt used to identify if a piece of context code is relevant to a target code:

You are given two parts of code to review: Target Code: This part includes the code for a changed class or function from a pull request.

Context Code: This part includes the code of a class or function that affects or is affected by the changes made in the target. Your task is to analyze both parts of the code and evaluate how impactful, influential, and important the context code (the second snippet) is to the changes represented in the target (the first snippet).

Consider the following aspects in your evaluation:

Dependency: How strongly does the functionality of the target depend on the context code?

Impact: How significant are the changes in the target on the behavior or performance of the context code?

Importance: How crucial is the context code in the overall system, especially in relation to the changes in the target?

Based on your analysis, provide a single numerical rating from 1 to 5, where:

1 means the context code has minimal or no impact, influence, or importance on the changes in the target.

5 means the context code is highly impactful, influential, and crucial to the changes in the target.

Please output only the number corresponding to your evaluation.

Here the target code represents the code file diff and code file content, and the context code represents the module, class or function extracted from another file in the codebase. Context code that the set of language model classify as having a rating above a given threshold (e.g., 4) can be added as part of the additional context to the set of language models to detect issues within a given category.

Example 3: Filtering Hallucinations with a Set of Language Models

Many unresolvable and invalid issues detected within code can be due to language model hallucinations. For example, a language model can detect that a programming language function lacks type hinting. However, if a human engineer looks at the definition of type hinting, they will find that type hinting is already within the function. In another example, a language model can report that a variable is defined but unused within code. However, the variable can be used later on in the same function, but 2-3 lines after it is defined. Hallucinations can be detectable from the immediate context of the function, class of code, or other source code present in the current file or dependent files. Therefore, hallucinations can be automatically removed when processing the source file. Hallucinations generated by one language can also be filtered out by verifying the hallucination with different language models. For example, a hallucination generated by GPT-4™ can be verified by a set of language models, such as Claude™, Mistral™, Gemini™, or Llama2™. While one language model can generate a specific hallucination, it is unlikely that two language models will generate the same hallucination.

This example provides an iterative prompting approach that is able to effectively filter out hallucinations from a set of detected issues, in any categorization of the issues. Overall, across the four data sets with 986 annotated issues, the system described in this example is able to remove between 50-75% of hallucinations, without filtering out valid issues. Hallucinations represent a substantial problem in issue identification, but can be effectively removed by using Chain of Thought prompting, providing a clear definition of a hallucination to the set of language models, adding relevant source code context, combining the outputs of the set of language models in identifying issues, quantifying the set of language models' output confidence by allowing it to output an "Undetermined" determination, and prompting the set of language models to explain its reasoning.

Two datasets were used to train a set of language models for hallucination filtering. Each dataset contained around 500 issues. The first data set was annotated by a first set of human expert annotators. The second dataset was annotated by a second set of human expert annotators. The two sets of annotators labeled issues as Resolvable (i.e., Valid) or Unresolvable (i.e., Invalid or Hallucination).

A set of language models were used to detect if issues were hallucinations using the issue description, issue code snippet, and source file. The set of language models used were GPT-4TM, Claude™, or Mistral™. Different definitions were used as an experimental variable to determine how the definition impacted outputs. The set of language models applied Chain of Thought prompting. The responses for each different language model within the set of language models can be combined using Boolean logic.

This experimental system was tested on an annotated dataset containing 179 issues. Of those issues, 122 were labeled as valid, and 57 were labeled as hallucinations. After the first iteration using this experimental system, it was determined that the best performing prompt for determining hallucinations was:

You are a senior software engineer working with a team of software engineers. You are using a large language model for initial review of the files in pull requests. The large language model reviews files in the pull request and tries to find issues in them.

Some of the issues found by the large language model are hallucinations. If the issue won't cause a real problem in the development or execution of the code, or if the issue depends heavily on external context outside the file, then the issue is considered a hallucination.

Your task is to review issues found by the large language model and detect hallucinations. You will be provided with the following pieces of information:
Issue description
Issue code snippet
Source code file The results of this prompt are provided in Table 3. Using this prompt, Claude-3™ was able to filter out 19% of hallucinations, and 10% of valid issues. GPT-4™ was able to filter out 25% of hallucinations and 8% of valid issues. In combination, Claude-3™ or GPT-4™ were able to filter out 35% of hallucinations and 17% of valid issues. Using this prompt, the combined responses of Claude-3™ and GPT-4™ were two times more likely to filter out hallucinations than random baseline, where an equal number of hallucinations and valid issues would be expected to be filtered out.

TABLE 3

Issues filtered by Claude-3 ™ or GPT-4 ™

| | % hallucinations filtered | % valid issues filtered |
|---|---|---|
| Claude-3 ™ | 19% | 10% |
| GPT-4 ™ | 25% | 8% |
| Claude-3 ™ OR GPT-4 ™ | 35% | 17% |

In another iteration, Chain of Thought prompting was used (CoT v1). In this iteration, a set of language models was asked to first generate questions that could help evaluate the issue. Next, a set of language models was asked to answer these questions. Finally, a set of language models was asked to evaluate the issue based on the questions and answers. Following this schema, the following prompt was created:

You first should read the issue description and issue code snippet to generate 3 simple questions that will help you evaluate the issue.

For instance, if the issue mentions the calculate_sum function being defined twice, a simple question could be "how many calculate_sum function definitions exist in the source code file?". Once you generate these 3 simple questions, review the source code file to find the answers. Then, make a judgement based on your answers to determine if the issue is hallucination.

The results for using this prompt are summarized in Table 4. This prompt resulted in Claude-3™ filtering 16% of hallucinations and 10% of valid issues. GPT-4™ filtered out 42% of hallucinations and 8% of valid issues. Claude-3™ or GPT-4™ filtered out 44% of hallucinations and 15% of valid issues. Using Chain of Thought prompting in this second iteration resulted in a more accurate method for filtering out hallucinations, compared to the first iteration prompt, with about a three times greater likelihood of filtering out a hallucination compared to random baseline.

TABLE 4

| | First iteration | | CoT v1 | |
|---|---|---|---|---|
| | % hallucinations filtered | % valid issues filtered | % hallucinations filtered | % valid issues filtered |
| Claude-3 ™ | 19% | 10% | 16% | 10% |
| GPT-4 ™ | 25% | 8% | 42% | 8% |
| Claude-3 ™ OR GPT-4 ™ | 35% | 17% | 44% | 15% |

In an example, Claude-3™ or GPT-4™ were prompted using CoT v1 on a hallucinated issue reported from the following code:

_, subcategories, _=self.llm_runner.query_openai (prompt_input=dict(feedback_list=str(feedback_list)),
analyzer_name=None,
filepath=None,
query_source=self._class_._name_,
scan_id=self.request_meta.scan_id if self.request_meta else None,
request_meta=self.request_meta,
censor_func=do_not_censor_prompt, The hallucinated issue was:

The code does not handle the case where 'request_meta' is None. If 'request_meta' is None, the code will throw an AttributeError when trying to access 'scan_id'. It would be better to handle this case explicitly."

GPT-4™ was able to accurately label the issue as a hallucination and made the following response: "The issue reported by the large language model is a hallucination because the code already handles the case when 'request_meta' is None before trying to access 'scan_id'. Therefore, it will not throw an AttributeError as suggested by the issue description." Claude was able to accurately label the issue as a hallucination and made the following response: "The issue description states that the code does not handle the case where 'request_meta' is None and will throw an AttributeError. However, looking at the source code, we can see that the code does in fact check if 'request_meta' is not None before accessing its 'scan_id' attribute, and sets scan_id to None if 'request_meta' is None. Therefore, the code does properly handle the None case and will not throw an AttributeError, contrary to what the issue states. So, this issue is a hallucination.

In another example, GPT-4™ or Claude-3™ analyzed a hallucinated issue, wherein the hallucinated issue was:

The 'outdate_pr_comments' method is defined twice in the 'GithubRepositoryClient' class. The first definition is an empty method, which should be removed to avoid confusion and potential override issues.".

In this example, GPT-4 was able to accurately label this issue as a hallucination, and responded: "The 'outdate_pr_comments' method is not defined twice in the 'GithubRepositoryClient' class and the first definition is not an empty method." In this example, Claude was able to accurately label this issue as a hallucination, and responded: "After reviewing the source code, I found that the outdate_pr_comments method is only defined once in the GithubRepositoryClient class, not twice as stated in the issue description. The single definition is also not empty, it contains an actual implementation. Therefore, there is no empty method that needs to be removed to avoid override issues, since no such empty definition exists.

To further improve the performance of Chain of Thought prompting, several iterations to the prompt were provided. In an iteration, CoT v1 was improved wherein a double negation problem within the prompt was fixed by replacing: "is_hallucination": "True if the issue is hallucination and False otherwise." with "evaluation": "Valid Issue" or "Hallucination" to generate CoT v2. It was discovered that this approach where the LLM is asked to output a semantic label worked better than the approach where the LLM is asked to output a binary true/false label.

In an example, CoT v1 was used to verify a valid issue that contained a double negation. In this example, the set of language models responded:

"Here are the 3 questions I generated based on the issue description and code snippet, along with my assessment of whether the issue is a hallucination after reviewing the source code:
{
"question 1": "How many times is the outdate_pr_comments method defined in the GithubRepositoryClient class?",
"question 2": "Is the first definition of outdate_pr_comments an empty method?",
"question 3": "Does the second definition of outdate_pr_comments take a list of comment_node_ids as a
parameter?",
"is hallucination": "False"
}
The source code shows that the outdate_pr_comments method is defined only once in the GithubRepositoryClient class. This single definition takes a list of comment_node_ids as a parameter. There is no empty first definition of the method. Therefore, the issue description is incorrect and this issue is a hallucination."

When CoT V2 was used to verify the same valid issue that contained a double negation, here is what the set of language models responded:

"Here are the 3 questions I would ask to evaluate this issue, along with my final evaluation:
{
"question 1": "How many times is the 'outdate_pr_comments' method defined in the GithubRepositoryClient class?",
"question 2": "Is the first definition of 'outdate_pr_comments' an empty method?",
"question 3": "Does the second definition of 'outdate_pr_comments' take a 'comment_node_ids' parameter?",
"evaluation": "Valid Issue"
}
Based on reviewing the source code, the 'outdate_pr_comments' method is indeed defined twice in the GithubRepositoryClient class. The first definition is an empty pass statement, while the second takes a 'comment_node_ids' parameter. Therefore, this issue description is accurate and not a hallucination."

In another iteration (CoT v3), CoT v2 was further improved by enforcing a set of language models to output answers in the prompt by replacing "Once you generate these 3 simple questions, review the source code file to find the answers." with "Once you generate these 3 simple questions, review the source code file to find the answers and write them down." The Chain of Thought prompt can result in borderline cases that are hard to detect or simply not possible. For example, the issue might require prompts from other files. To address this, CoT v3 was further iterated to add an "Undetermined" label. The following language was added to CoT v3: "If you're unsure about an issue or don't have enough context to evaluate, then label this issue as undetermined."

In an example, CoT v3 was used to validate issues that had been labeled by annotators as undetermined. In a first experiment, CoT v3 was queried with the following undetermined issue: "The method '_make_request' is not defined in the StripeClient class or its parent class. This could lead to a NameError at runtime.", and the set of language models provided the following feedback: "While the StripeClient class does not define the '_make_request' method directly, it inherits from the ApiClient class. Without being able to review the source code of the ApiClient class, it is not possible to definitively determine if '_make_request' is defined there to be called by the StripeClient. More context from the ApiClient source code would be needed to evaluate if this is a real issue or a hallucination."

In a second experiment, CoT v3 was queried with an undetermined issue, and the set of language models provided the following feedback: "Without seeing the definition of the LocalFile class, it's unclear if the 'contents' attribute is always guaranteed to be a string. If 'contents' can be a non-string type, then the issue is valid. But if the class ensures 'contents' is always a string, the issue would be a hallucination."

In a third experiment, CoT v3 was queried with an undetermined issue, and the set of language models provided the following feedback: "While the function is called in a loop, there is not enough context to determine if this would actually cause meaningful performance issues in practice. It would depend on factors like the typical size of the 'reactions' list and the complexity of the filter function."

In a fourth experiment, CoT v3 was queried with an undetermined issue, and the set of language models provided the following feedback: "The source code does not contain enough context to determine if the issue is valid. It only shows a test case, but not the actual implementation being tested. More code would be needed to verify if the test is missing important assertions as the issue describes."

Figure 11A:
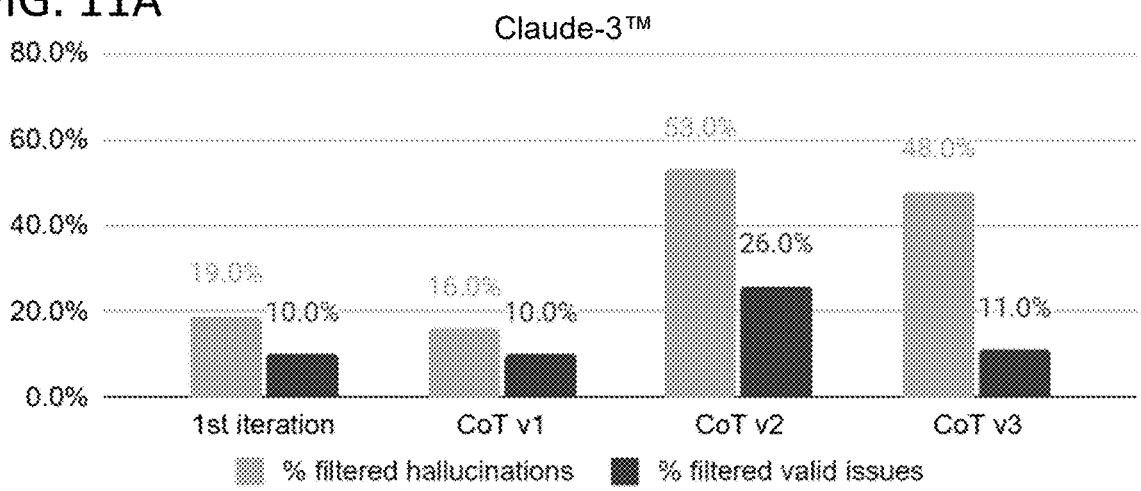
FIG. 11A provides performance of filtering valid issues using Claude-3™
Figure 11B:
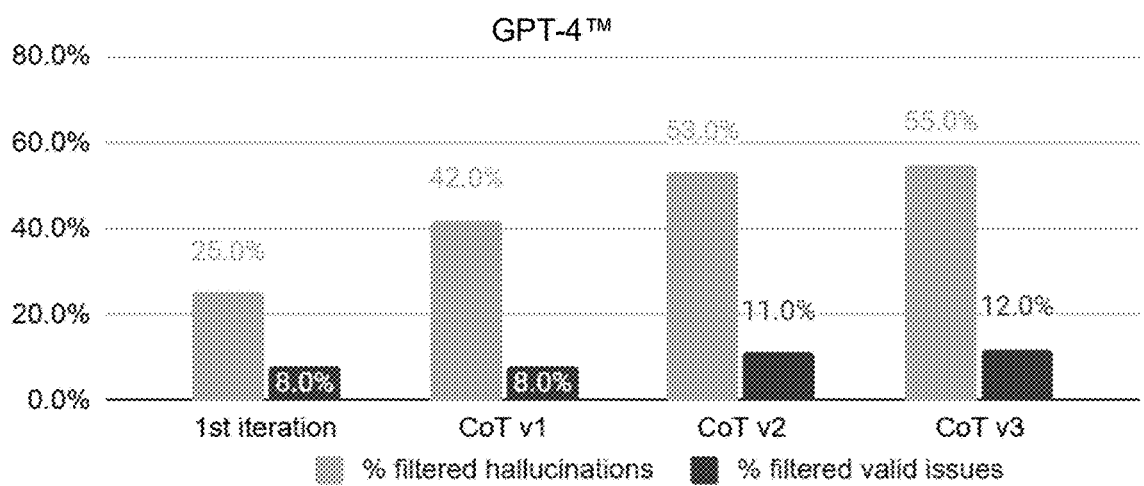
FIG. 11B provides performance of filtering valid issues using GPT-4™
Figure 11C:
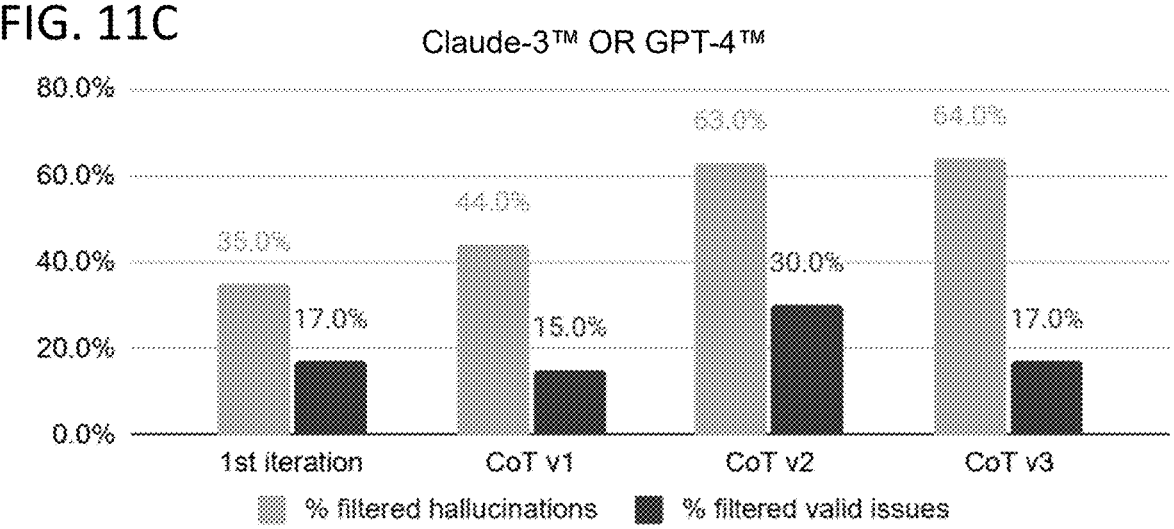
FIG. 11C provides performance of filtering valid issues using Claude-3TM and GPT-4™

FIGS. 11A-11C provide performance data for Chain of Thought prompting iterations in filtering hallucinations and valid issues (where "filtered"). FIG. 11A provides data for the performance of Claude-3™, FIG. 11B provides data for the performance of GPT-4™, and FIG. 11C provides data for the combination of Claude-3™ OR GPT-4™.

Additional experiments were performed using Chain of Thought implementation on two independent datasets of labeled issues (Benchmarks 757 and 568). Benchmark 757 was annotated for factual accuracy, actionability, scope of issues, and impact. Different programming languages were used to evaluate the set of language models for removing hallucinations on these datasets. The programming languages Python and TypeScript/JavaScript were used to evaluate Benchmark 757, while the programming language Python was used to evaluate Benchmark 568.

For this experiment, a Chain of Thought prompt was utilized, comprising prompting the set of language models to ask three questions to evaluate the factual accuracy of an issue, to generate three the corresponding answers, and to then determine the factual accuracy, precision, and recall of these issues based on the question-and-answer evaluation. An example of a Chain of Prompt language is as follows:

You are a senior software engineer working with a team of software engineers.

You are using a large language model for initial review of the files in pull requests.

The large language model reviews files in the pull request and tries to find issues in them.

Some of the issues found by the large language model are hallucinations.

Your task is to review issues found by the large language model and detect hallucinations.

Follow these steps to detect if the issue is hallucination:
1. Read the issue description and issue code snippet and extract the specific reason for the problem.
2. Generate 3 simple questions that will help you assess the specific reason determined in the first step. Questions should aim to verify the claims mentioned in the issue description. It's not enough to only verify the claims. If the situation mentioned in the issue is actually present in the code but is not a problem, then the issue is unresolvable.
3. Review the source code file to find the answers and write them down.
4. Make a judgement based on your answers to determine if the issue is hallucination.

If you're unsure about an issue or don't have enough context to evaluate an issue, then label it as undetermined.

Using this prompt, if the set of language models outputs an "Undetermined" label for an issue, the set of language models are then prompted to retrieve the relevant source code from other files, and to continue evaluating the factual accuracy of the issue given the context of the issue.

Figure 12A:
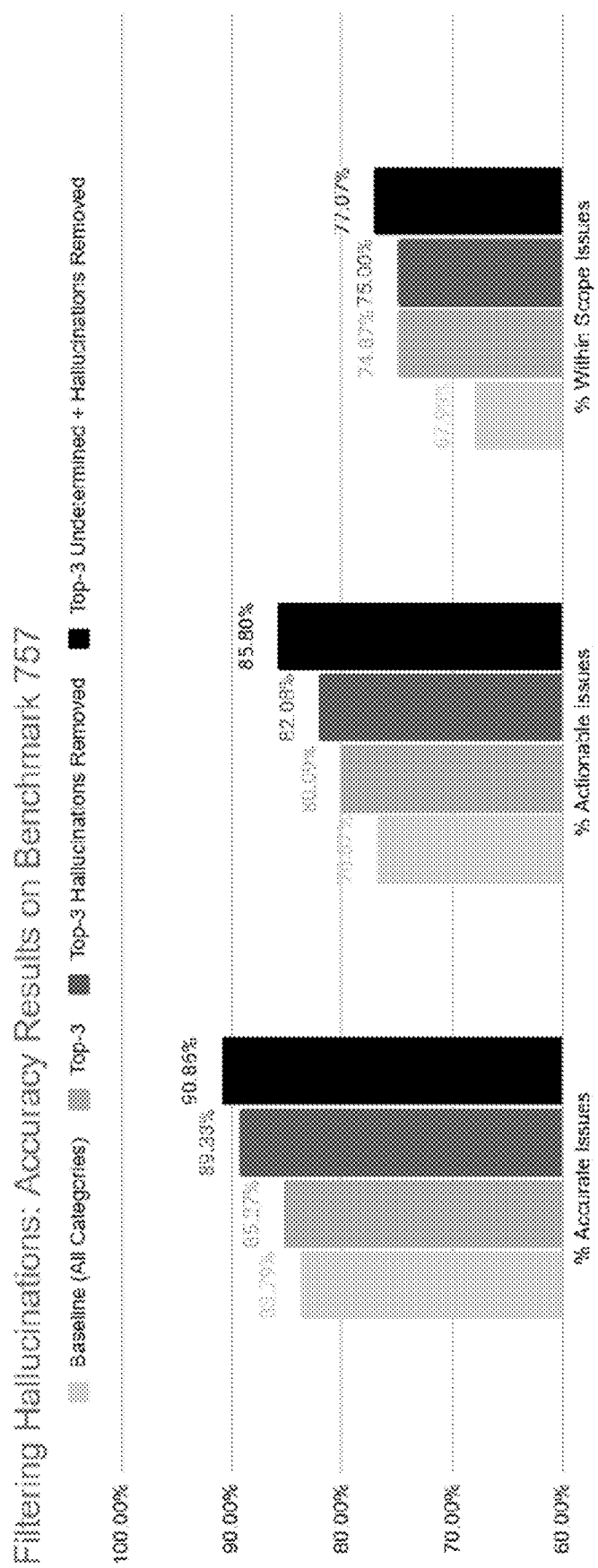
FIG. 12A provides accuracy results of issue detection across categories.
Figure 12B:
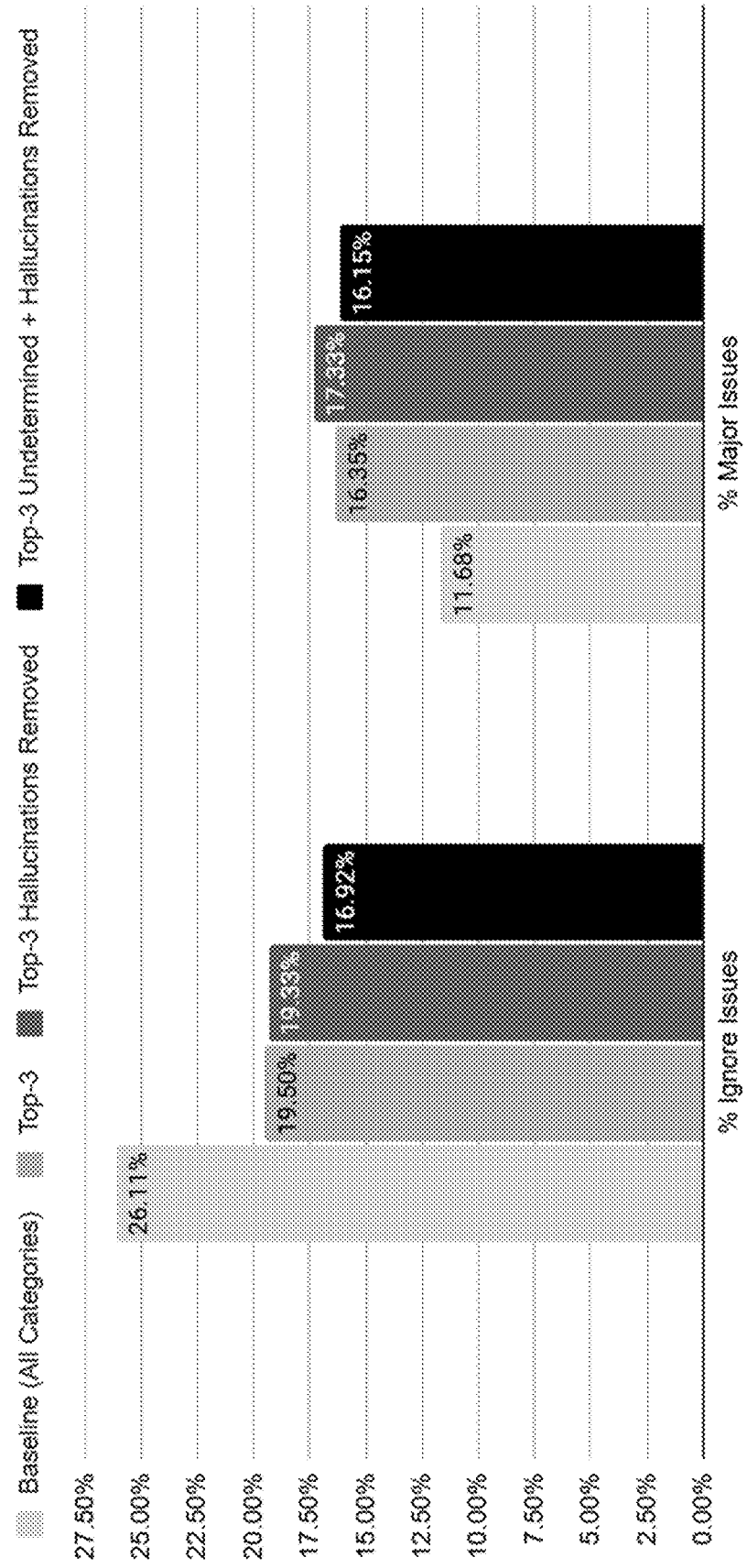
FIG. 12B provides detection results of major issues across categories.
Figure 12C:
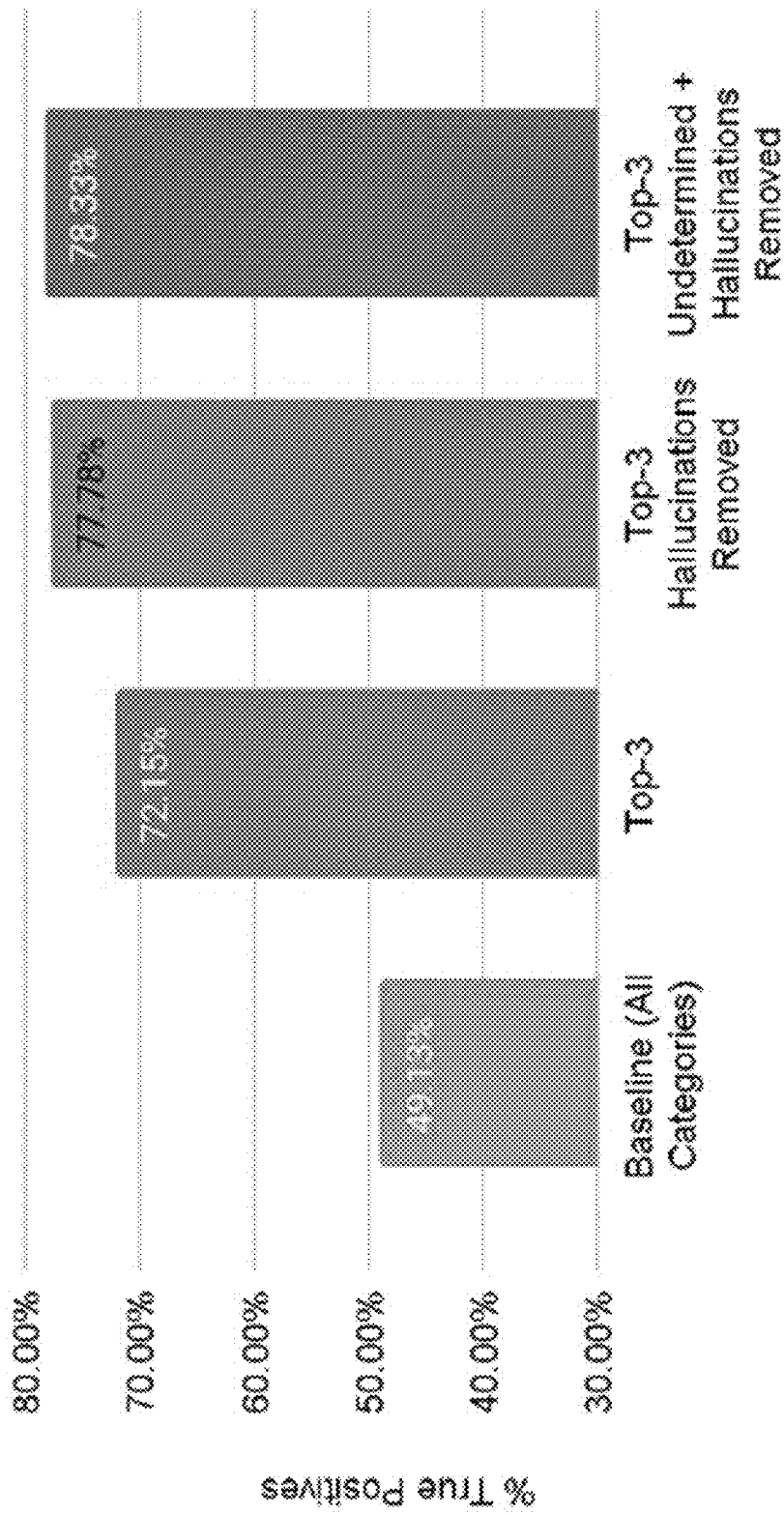
FIG. 12C provides detection results of true-positive issues across categories.

Evaluation of Benchmark 757 revealed improvements in identifying issues categorized in the top-3 categories that were factually accurate, actionable, and within scope after removing hallucinations. The results of this evaluation are summarized in FIG. 12A. The percent of major issues remained stable, identifying between 16-17% of major issues within the set of identified issues. Importantly, the percent of minor issues that should be ignored was reduced from 19.5% to 16.9% after filtering for hallucinations, indicating that this evaluation method reduces noise in the dataset. The results of this evaluation are presented in FIG. 12B. Evaluation of Benchmark 568 resulted in improvement in the rate of identifying valid issues (true positives) after removing hallucinations. The results of this evaluation are presented in FIG. 12C.

Figure 13A:
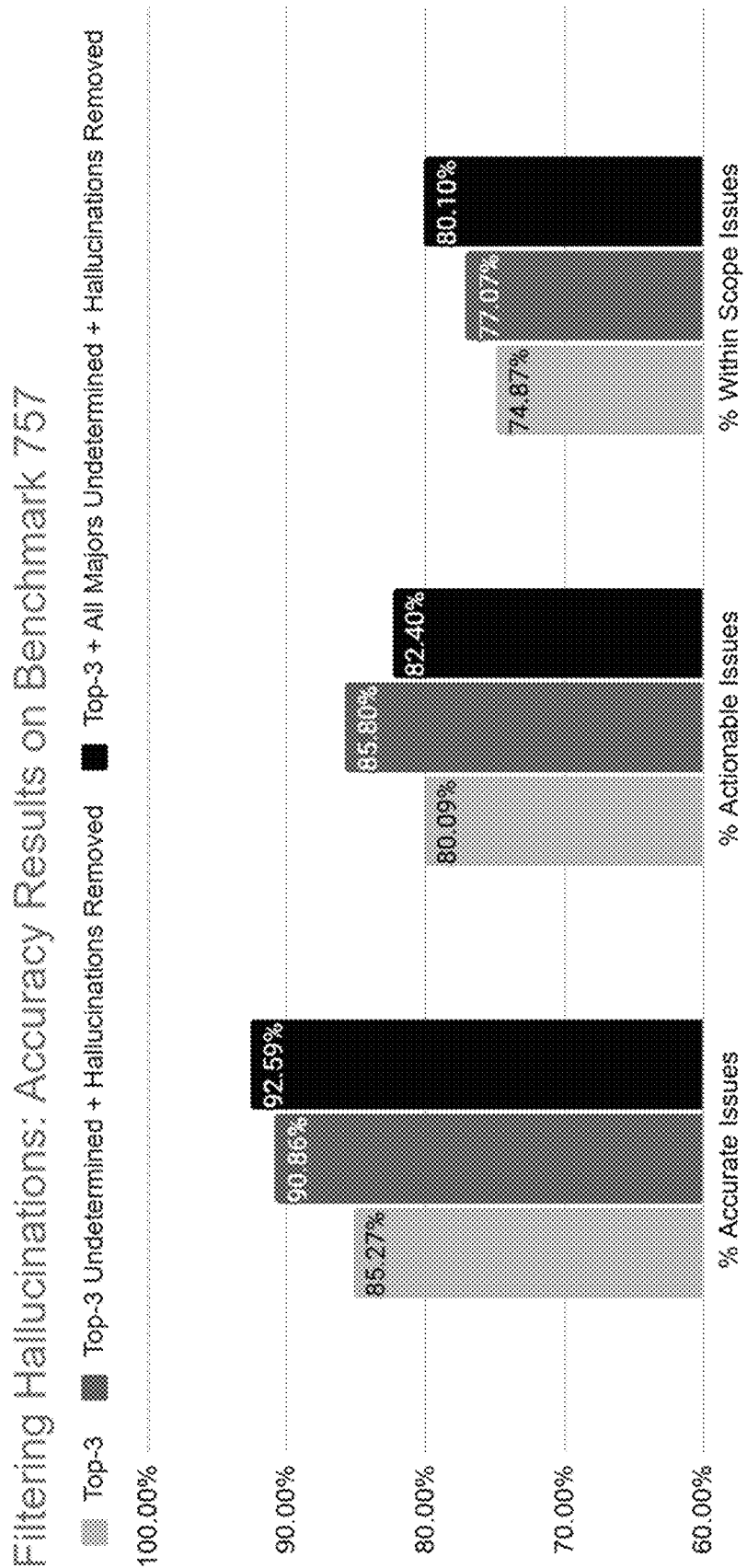
FIG. 13A provides accuracy results of issue detection across issue categories when including all major undetermined issues.
Figure 13B:
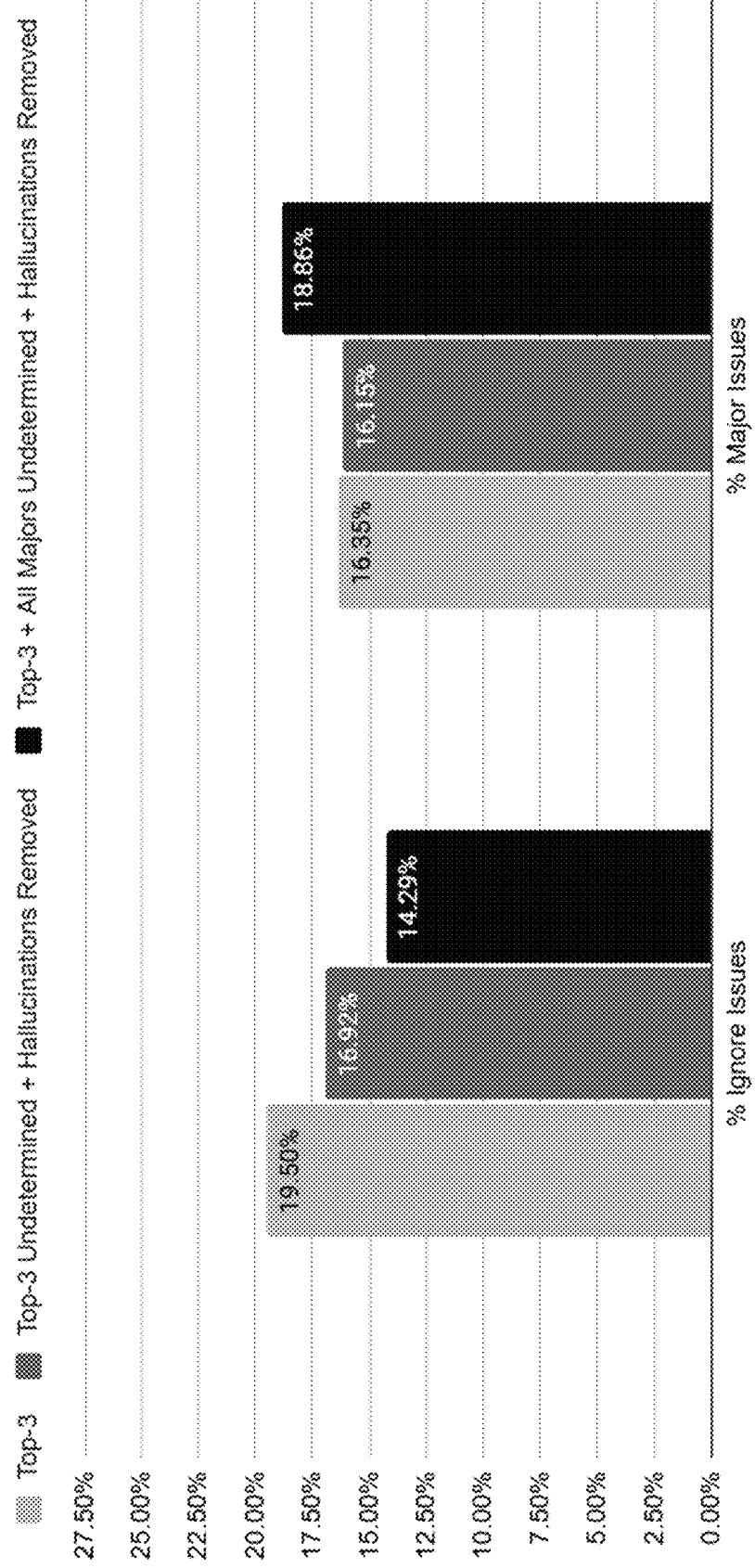
FIG. 13B provides detection results of major issues across categories when including all major undetermined issues.

In another approach to identifying valid issues, the Benchmark 757 dataset was analyzed, and issues were selected if they were in the top three categories determined to contain issues, or if the issue was classified as a major issue by the severity classifier irrespective to the issue category to which it belonged. Using this approach, the set of language models prompt showed improved performance in accurately identifying major issues (as labelled by annotators), and the number of invalid issues labeled as valid issues decreased. FIG. 13A presents the data from this approach, where the accuracy of identifying valid issues from the top-3 categories, with all major undetermined issues, and after removing hallucinations was 92.59%, compared to just identifying issues from the top-3 categories (85.27%). The number of actionable issues also improved when identifying issues from the top-3 categories, with all major issues included, and after removing hallucinations (82.4%) compared to just identifying issues from the top-3 categories (80.09%). The number of issues within scope also improved when identifying issues from the top-3 categories, with all major issues included, and after removing hallucinations (80.10%) compared to just identifying issues from the top-3 categories (74.87%). In addition, FIG. 13B presents that the number of minor issues (issues to be ignored) decreased when identifying issues from the top-3 categories, with all major issues included, and after removing hallucinations (14.29%) compared to just identifying issues from the top-3 categories (19.50%). Conversely, FIG. 13B presents that the number of major issues increased when identifying issues from the top-3 categories, with all major issues included, and after removing hallucinations (18.86%) compared to just identifying issues from the top-3 categories (16.35%).

In another approach, CoT v3 was further improved by providing the set of language models with additional instructions to evaluate issues categorized as undetermined. Issues can be categorized as undetermined when they miss required context. In an example of the prompting improvement, the set of language models was prompted with the following language: "If you're unsure about an issue or don't have enough context to evaluate, then label this issue as undetermined." This approach is exemplified in FIG. 14. Here, the issue description, issue code snippet, and source code file 1401 are input to the set of language models 1402. The set of language models is then prompted to detect hallucinations using CoT v3, with the addition of instructions to evaluate undetermined issues. The set of language models outputs issues labeled in the following categories, comprising valid, hallucination, or undetermined 1403. The set of language models also outputs a reason for labeling issues in those categories 1403. If an issue is labeled as undetermined, the evaluation reason is further evaluated by the set of language models with a prompt to detect and evaluate the required additional context 1405. The additional context can include the issue description or the source code file. The set of language models will then output the required additional context 1406. For example, the additional context can be an additional source code file 1406. This output is then further evaluated by the set of language models 1407. The set of language models is prompted to detect hallucinations using the additional context. The set of language models then outputs an updated label for the issue in the following categories, comprising valid, hallucination, or undetermined 1408. The set of language models will also output an evaluation reason for these categorizations.

Figure 14:
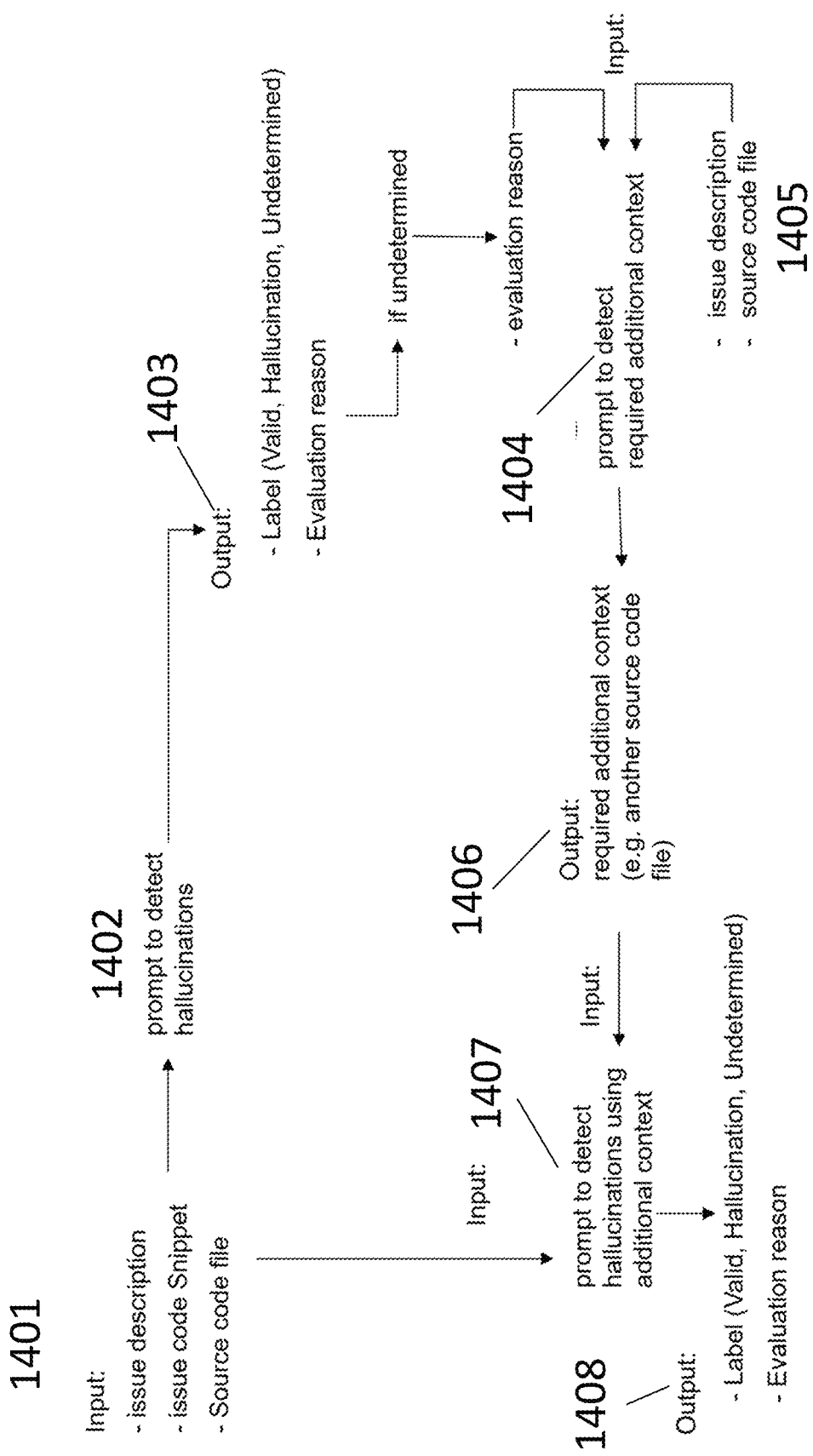
FIG. 14 illustrates an example workflow to detect issues using Chain of Thought Prompt Version 3 (CoT v3).

In an example that utilizes the process described in FIG. 14, the following undetermined issue was evaluated: "The method '_make_request' is not defined in the StripeClient class or its parent class. This could lead to a NameError at runtime."

The initial evaluation without using the updated evaluation prompt instruction was "The source code file provided does not include the definition of the parent class ApiClient. Therefore, it is not possible to determine if the '_make_request' method is defined in the parent class. More context or additional files are needed to make a definitive evaluation."

After reevaluating this issue with the undetermined prompt instructions, the set of language models utilized additional issue context, and output "The method '_make_request' is indeed defined in the parent class ApiClient, which the StripeClient class inherits from. Therefore, the issue raised by the large language model is a hallucination."

Using the context evaluation technique described in FIG. 14 resulted in improved performance in determining hallucinations. Twenty-four undetermined cases were evaluated by the set of language models. From this set of undetermined issues, the set of language models was able to detect and extract the required additional context to evaluate 15 of the issues. After re-evaluation by the set of language models, 3 remained undetermined, 9 were correctly labeled as hallucinations or valid issues, and 3 were incorrectly labeled as hallucinations (false positive) or valid issues (false negative). Although this technique does not markedly improve false positive detection, it does improve the filtering of valid issues.

In another example, the set of language models comprising Claude-3™ and Claude-3.5™ were used to filter out hallucinations on an annotated dataset of 179 issues. The following prompt was developed for Claude-3.5™:

You are a senior software engineer working with a team of software engineers.
You are using a large language model for initial review of the files in pull requests.
The large language model reviews files in the pull request and tries to find issues in them.
Some of the issues found by the large language model are hallucinations. Your task is to review issues found by the large language model and detect hallucinations.
Follow these steps to detect if the issue is hallucination:
Read the issue description and issue code snippet and extract the specific reason for the problem.
Generate 3 simple questions that will help you assess the specific reason determined in the first step. Questions should aim to verify the claims mentioned in the issue description. It's not enough to only verify the claims. If the situation mentioned in the issue is actually present in the code but is not a problem, then the issue is unresolvable.
Review the source code file to find the answers and write them down.
Make a judgement based on your answers to determine if the issue is hallucination.
If you're unsure about an issue or don't have enough context to evaluate an issue, then label it as undetermined.
Here is the information to help you determine if the issue is valid or hallucination:
Issue description: {feedback}
Issue code snippet: {diff}
Source code file: {source_code_file}
Structure the output as a valid json like:
{{
"question_1": "The first question you generate.",
"answer_1": "Your answer to question_1.!",
"question_2": "The second question you generate.",
"answer_2": "Your answer to question_2.!",
"question_3": "The third question you generate.",
"answer_3": "Your answer to question_3. ",
"evaluation": "Valid Issue" or "Hallucination" or "Undetermined"
}}

Figure 15A:
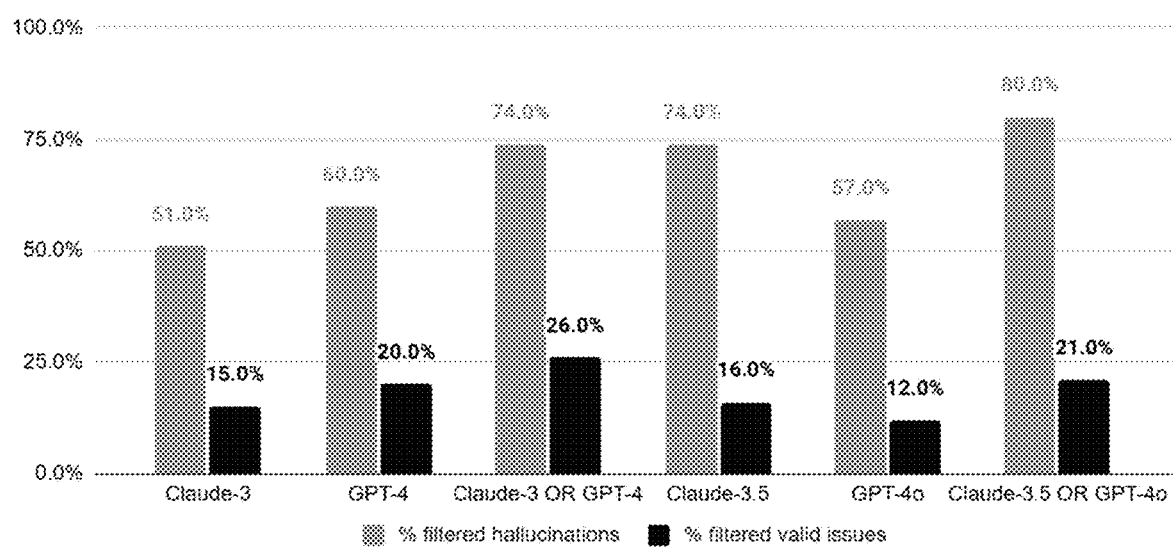
FIG. 15A provides results of filtering valid issue reports using a set of language models.
Figure 15B:
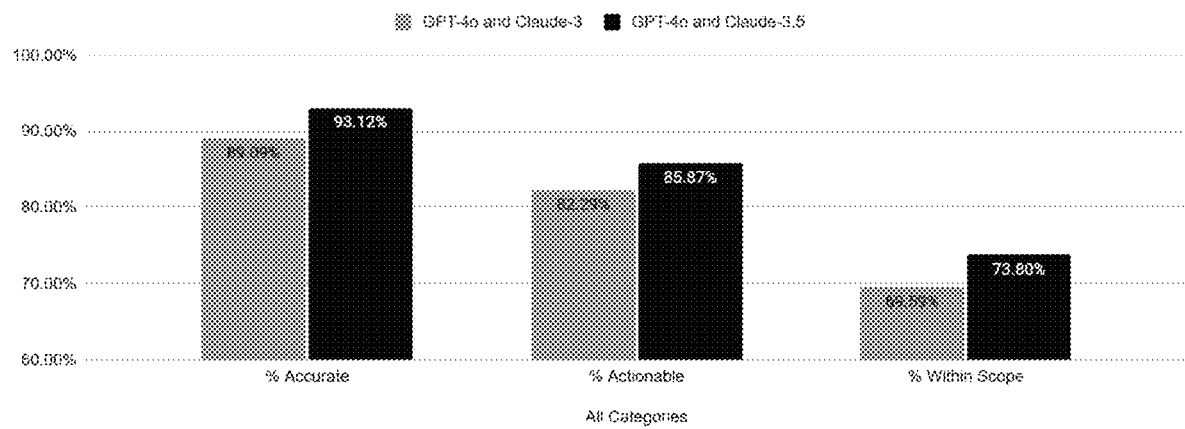
FIG. 15B provides accuracy results of detecting issues using a set of language models.

FIG. 15A summarizes the results of this experiment. The data presented in FIG. 15A indicate that the combination of Claude-3.5™ and GPT-4o™ outperforms GPT-4™ alone in filtering hallucinations, while keeping valid issues. Claude-3.5™ was also tested to determine its performance in determining accurate, actionable, and within scope issues after filtering hallucinations and undetermined issues. The data from this experiment are presented in FIG. 15B. The data in FIG. 15B show that the combination of GPT-4o™ and Claude-3.5™ improve the ability to filter hallucinations, and detect accurate, actionable, and within scope issues compare to GPT-4o™ and Claude-3™.

Example 4: Ranking Issues by Novelty

Each set of issue reports can be evaluated for novelty, comprising determining whether an issue in an issue report has been detected in the code or a portion thereof. Evaluating the set of issue reports for novelty can comprise using a set of language models to determine the novelty. Using the set of language models to determine novelty can comprise prompting the set of language models with the issue report, relevant snippets of the code, and the file comprising the relevant snippets, and asking a set of language models to determine if the issue is novel. If the issue has been detected previously within the file, the set of language models can label the issue "Not Novel". If the issue has not been detected previously within the file, the set of language models can label the issue "Novel".

If an issue is novel within a pull request (PR), it implies that a developer introduced that issue into the pull request code. This in turn implies that the issue should also be fixed within the current pull request. Therefore, novel issues are within the scope of the PR. It is paramount to identify and fix novel issues, because novel issues often pose a severe impediment in executing code. On the other hand, not novel issues may often represent issues (such as potential design or performance improvements in the code) the software engineering team has agreed not to address for the time being and as such should be down-prioritized. In an experiment, the set of language models were used to classify issues based on novelty, and whether or not they were fixed. First, the source code from the commit prior to the pull request was downloaded. Next, the source code from the commit at least 30 days prior (30-day commit) to the pull request was downloaded. GPT-4o™ was queried to find the relevant function or class name, to extract relevant source code, and to classify issues within the previous commits. GPT-4o™ was queried to classify the issues in the commit according to the following labels: "Fully Fixed", "Partially Fixed", "Not Fixed", or "No Longer Exists". For example, if reverting to the prior commit would cause the issue to be fully fixed, then GPT-4o™ would be expected to output "Fully Fixed".

Several prompts were developed to label the status of novel issues within previous commits. For example, the following prompt was generated:

You are a senior software engineer working with a team of software engineers. I am a developer on your team.
A while ago, I submitted a pull request for you to review on GitHub. When you reviewed my pull request, you found a serious issue. You explained the issue to me and asked me to fix it on GitHub. I later finalized my pull request and merged it.
Your task now is to review the changes in my pull request and determine if and to what degree I fixed the issue. An issue is fully fixed if the problem mentioned has been fully addressed and there are no more actions to be taken. An issue is partially fixed if the problem mentioned has been partially addressed, but there are still more actions that could be taken. An issue is also partially fixed if other parts of the code have been refactored making it less severe or less important to address. An issue is not fixed if the problem mentioned in the issue description fully exists in the source code file. An issue no longer exists if the code has been significantly changed or factored and the problem mentioned in the issue description has been removed from the source code file.

If the issue has not been fully fixed, please also output the severity level of the issue. An issue is maximum severity if the issue is the most severe and most impactful to the code. An issue is high severity if it very severe and impactful to the code. An issue is medium severity if it is somewhat severe and impactful to the code. An issue is low severity if it is not very severe and not impactful to the code (such as a minor improvement in logging, documentation or a small speed up to the execution).

Please pay attention to changes in syntax and indentation level.

Here is the information to help you determine if the issue was fixed or not:

Structure the output as valid json like:
{{
"evaluation": "Fully Fixed", "Partially Fixed", "Not Fixed", "No Longer Exists",
"severity": "Maximum Severity", "High Severity", "Medium Severity", "Low Severity", "explanation": "The reason why you determined the issue was fixed or not.",
}}

Figure 16A:
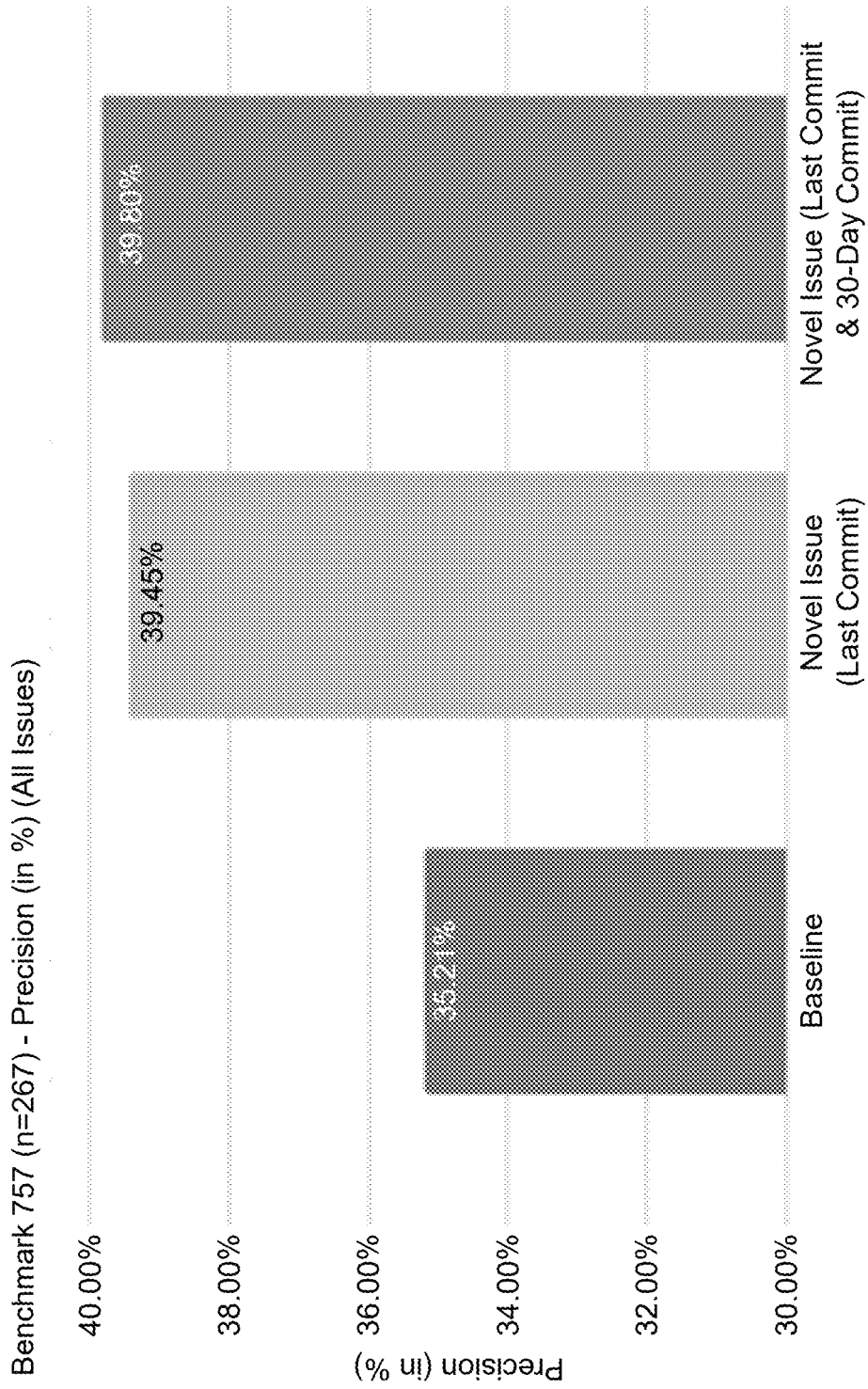
FIG. 16A provides precision of detecting issues when categorized by novelty in a first experiment.
Figure 16B:
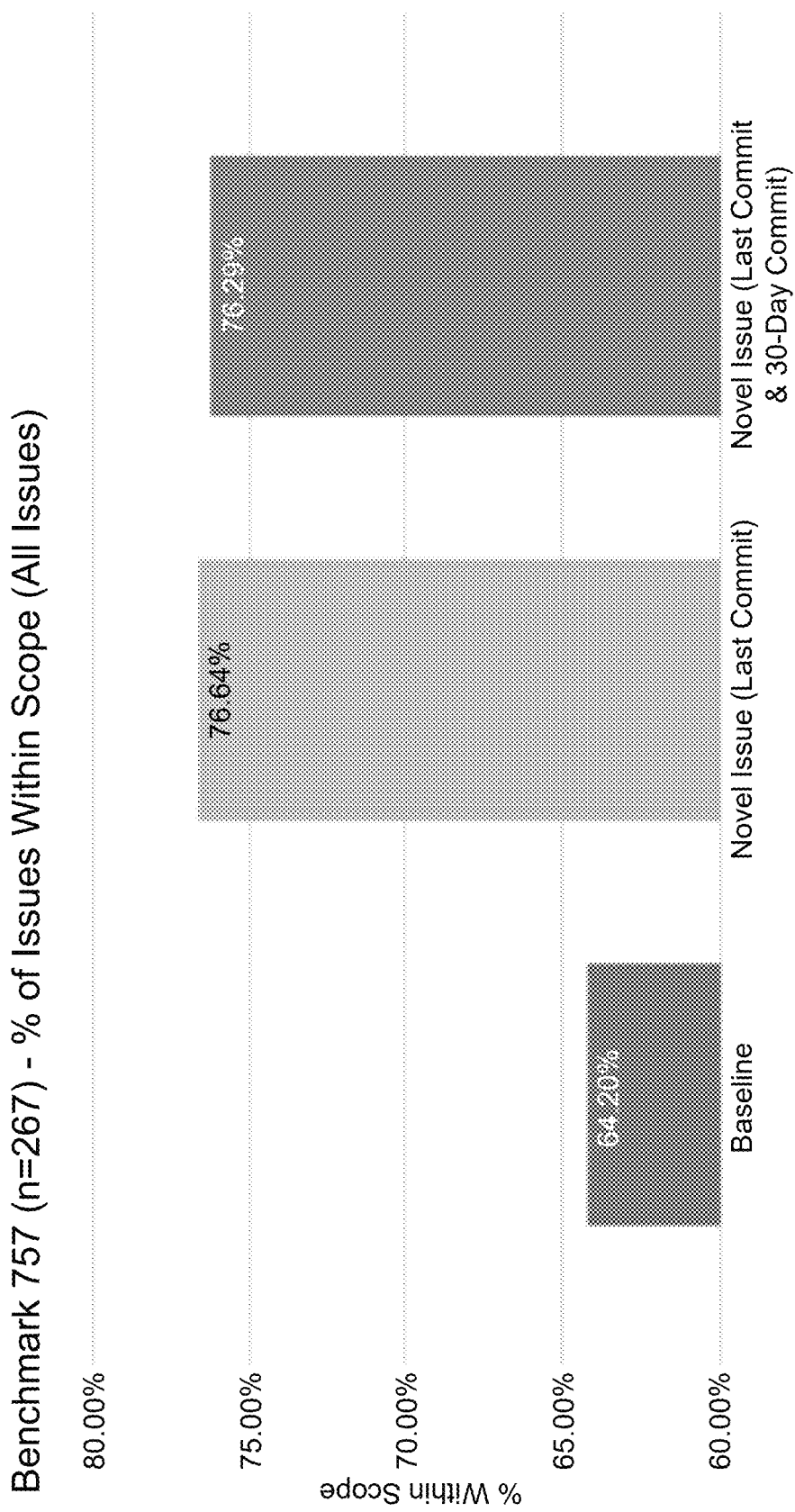
FIG. 16B provides detection of issues within scope when categorized by novelty in a first experiment.

This LLM prompting strategy was used to identify and label issues on an annotated data set containing 267 issues. The issues in the data set were labelled as either true positive (TP) or false positive (FP). Out of all these issues, 35.21% were labelled as TPs (i.e., precision was 35.2%). Using the LLM prompting strategy, the issues classified as "Novel" in the last commit had a 39.45% precision and the issues that were also classified as "Novel" in the 30-day commit had a 39.80% precision (FIG. 16A). The LLM prompting strategy also increased the likelihood of identified novel issues being within the scope of the PR from a baseline of 64.2% to 76.64% in the previous commit, and to 76.29% in the previous commit and 30-day commit combined (FIG. 16B).

Figure 16C:
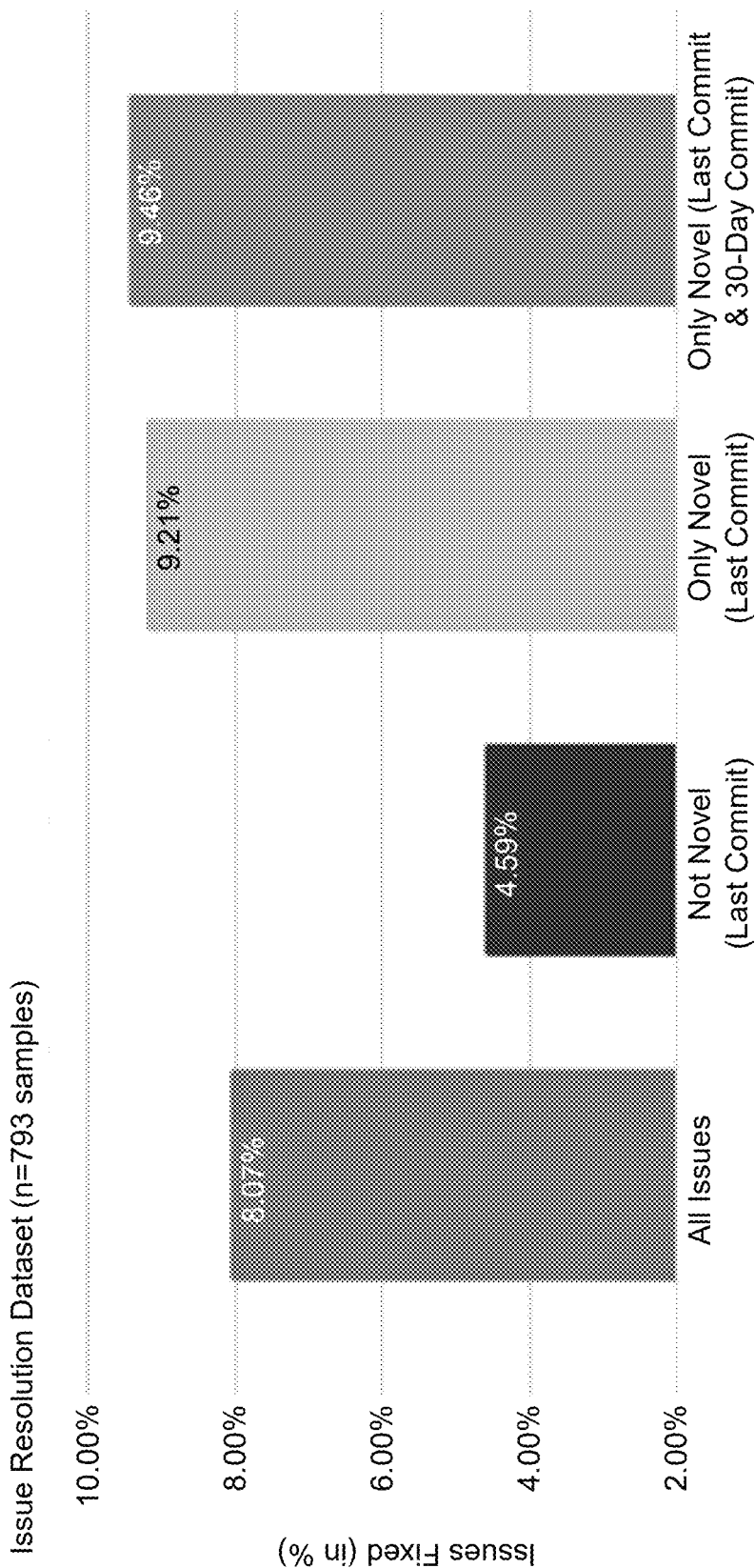
FIG. 16C provides issue report resolution results when categorizing issue reports by novelty.

This LLM prompting strategy was further evaluated on data set containing 793 issues, each classified as fixed or not fixed. In this experiment, the set of language models was prompted to output 4 labels comprising "Not Fixed", "No Longer Exists", "Partially Fixed", and "Fully Fixed". In this experiment, issues that are labelled as "Fully Fixed" if they are fixed when the PR is reverted are considered strict novel issues. Novel issues were found to be nearly twice as likely to be fixed by a developer than non-novel issues (FIG. 16C).

Table 5 presents the data for this experiment, and provides that novel issues, especially strict novel issues, are significantly more likely to be fixed by a user.

TABLE 5

| | Is Fixed | Is Not Fixed | % Is Fixed | 95% Confidence Intervals |
|---|---|---|---|---|
| All Surfaced Issues | 64 | 729 | 8.07% | [6.27%, 10.19%] |
| Not Novel (Last Commit GPT4O) | 9 | 187 | 4.59% | [2.12%, 8.54%] |
| Only Novel (Last Commit GPT4O) | 55 | 542 | 9.21% | [7.02%, 11.82%] |
| Only Novel (Last Commit *AND* 30 Day Commit GPT4O) | 54 | 517 | 9.46% | [7.18%, 12.16%] |
| Strict Novel (Last Commit GPT4O) | 23 | 178 | 11.44% | [7.39%, 16.67%] |
| Strict Novel (Last Commit *AND* 30 Day Commit GPT4O) | 13 | 99 | 11.61% | [6.33%, 19.03%] |

Figure 17A:
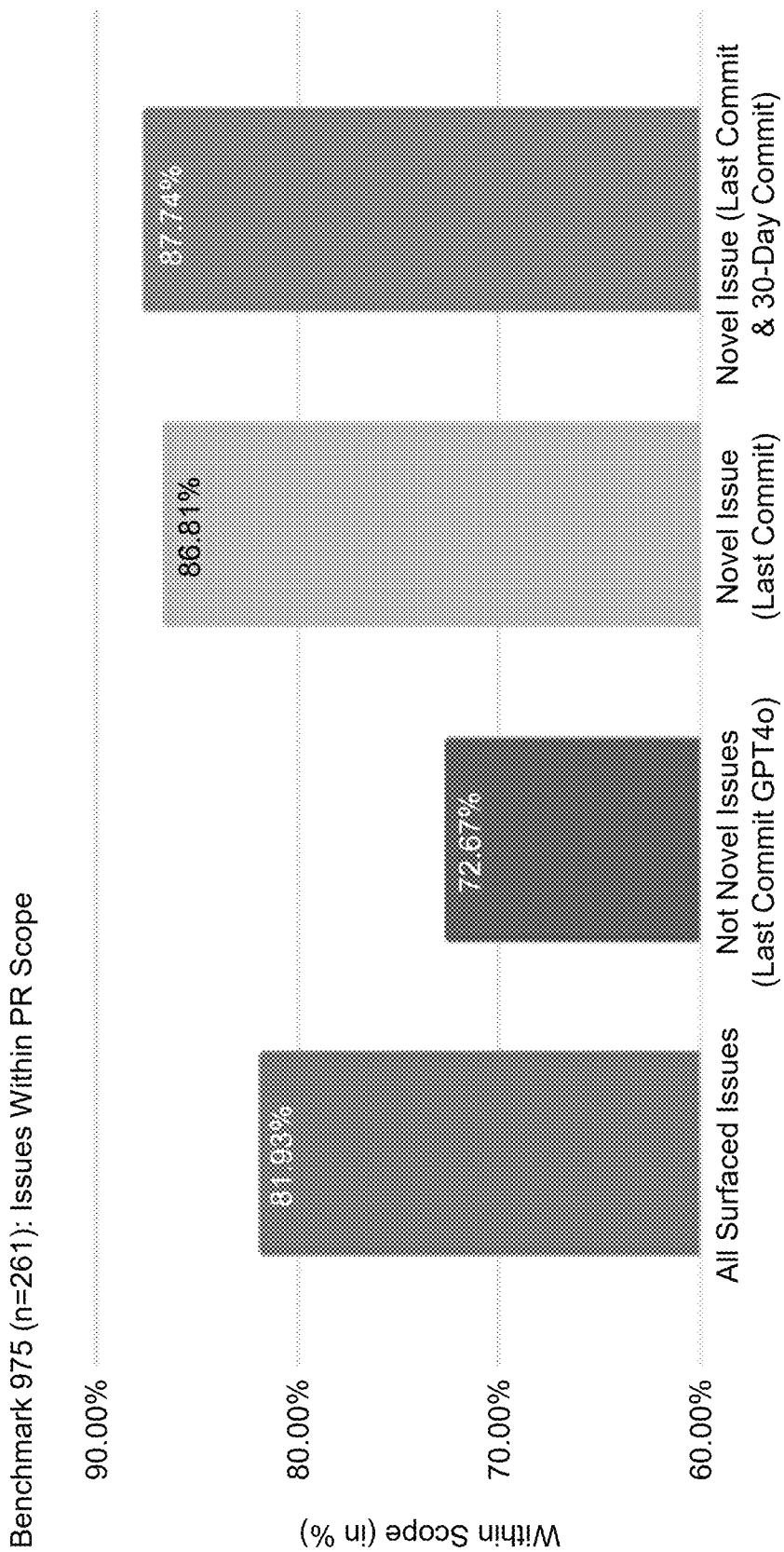
FIG. 17A provides detection of issues within scope when categorized by novelty in a second experiment.
Figure 17B:
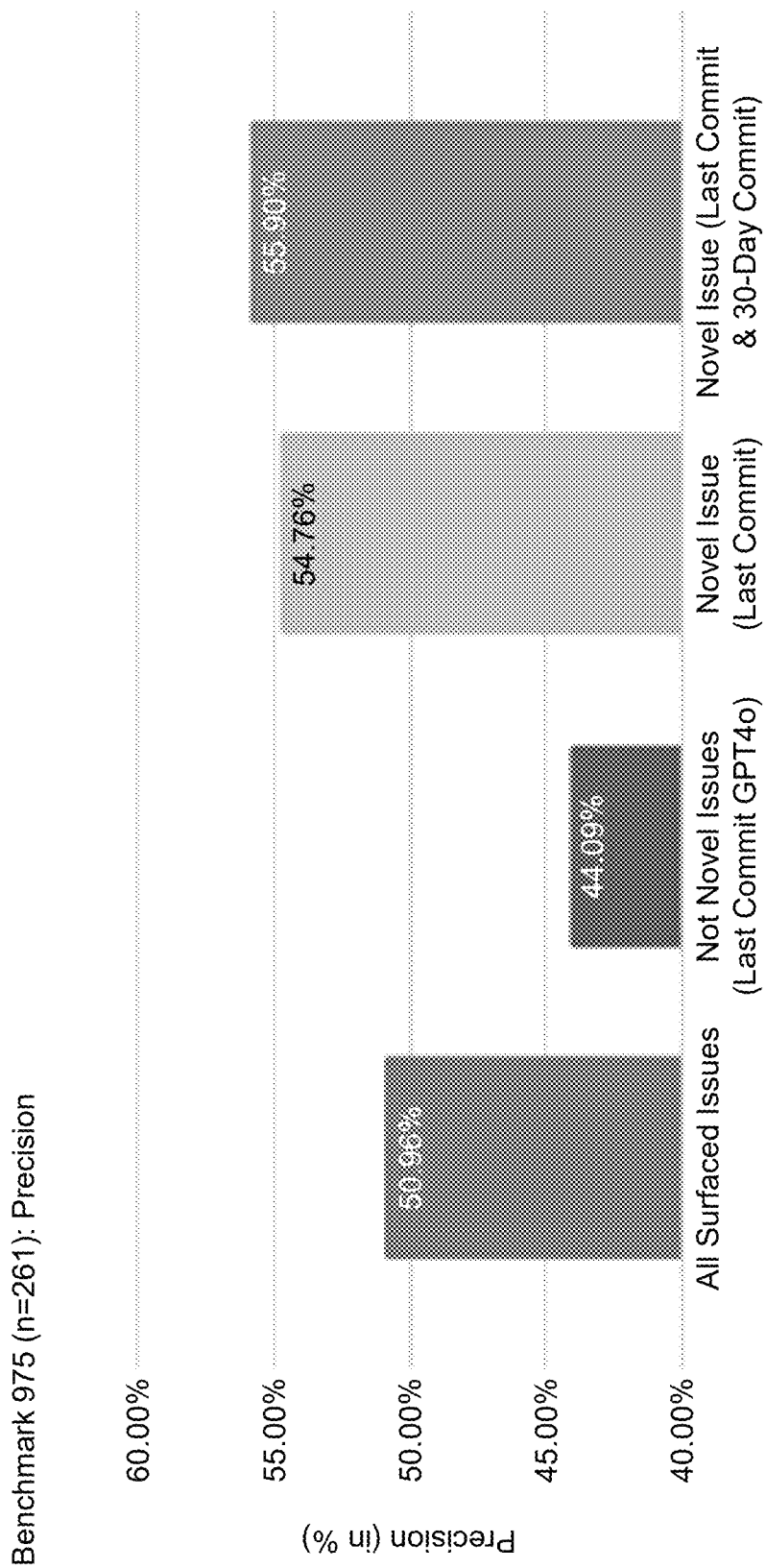
FIG. 17B provides precision of detecting issues when categorized by novelty in a second experiment.

The prompting method was repeated on another dataset of 261 issues to determine if novel issues fell within the scope of the PR, and to determine the precision in detecting issues. The issues in the data set were labelled as either true positive (TP) or false positive (FP). The results of this experiment are presented in FIGS. 17A-17B. FIG. 17A provides data that show that novel issues are significantly more likely (95% confidence interval) to be in the scope of the PR, with 86.81% of novel issues from the last commit and 87.74% of issues from the last commit and the 30-day commit being within the scope of the PR, compared to 81.93% of all surfaced issues being within the scope of the PR. FIG. 17B provides data that show that novel issues have a higher precision (90% confidence interval) than all surfaced issues (i.e., the proportion of TPs over TPs and FPs is higher).

In total, results from the experiments in this example reveal that the number of novel issues vary between 28-72% of all issues identified. Table 6 provides summary data for the percentage of novel issues identified out of total issues.

TABLE 6

| Dataset | % Novel Issues (Last Commit & 30-Day |
|---|---|
| Benchmark 757 (n = 267 issues) | 36.70% |
| Benchmark 568 (n = 234 issues) | 28.63% |
| Benchmark 975 (n = 261 issues) | 61.69% |
| Issue Detection Dataset (n = 793 issues) | 72.01% |

Figure 18A:
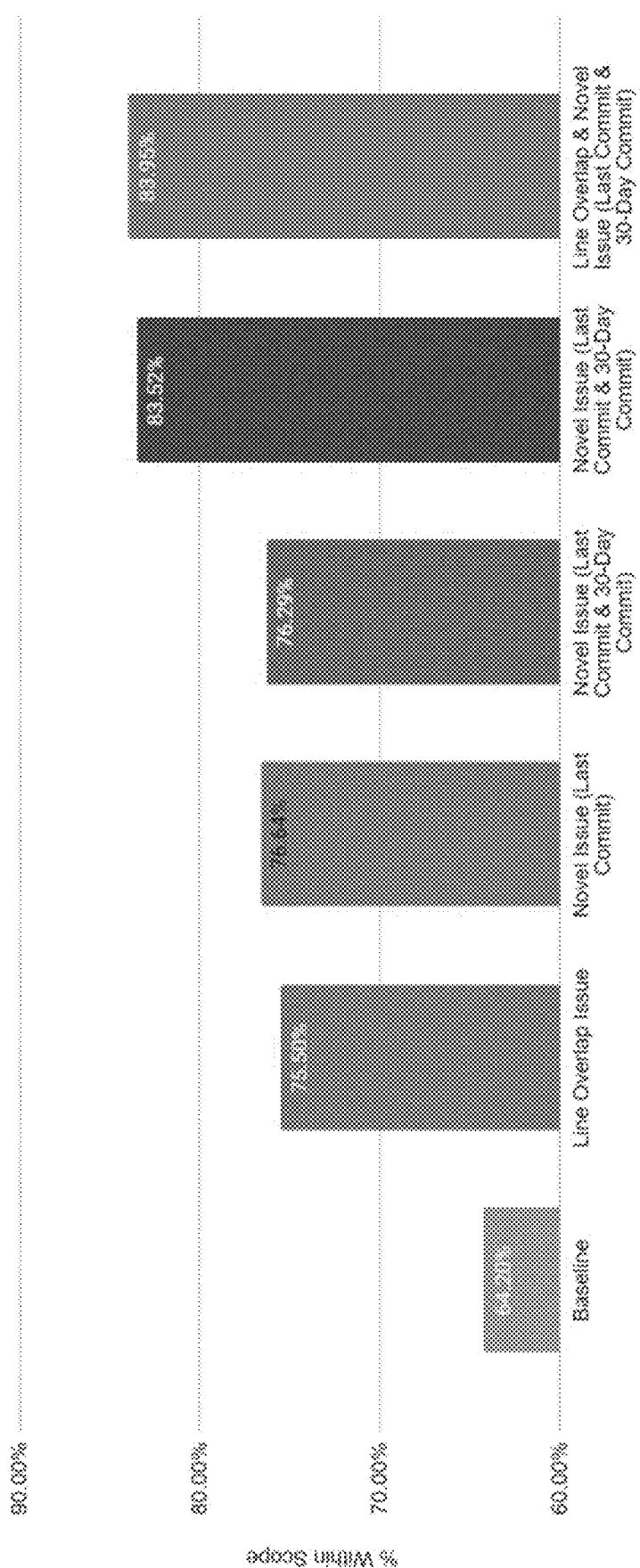
FIG. 18A provides detection of issues within scope using the Line Overlap Feature and novelty categorization.
Figure 18B:
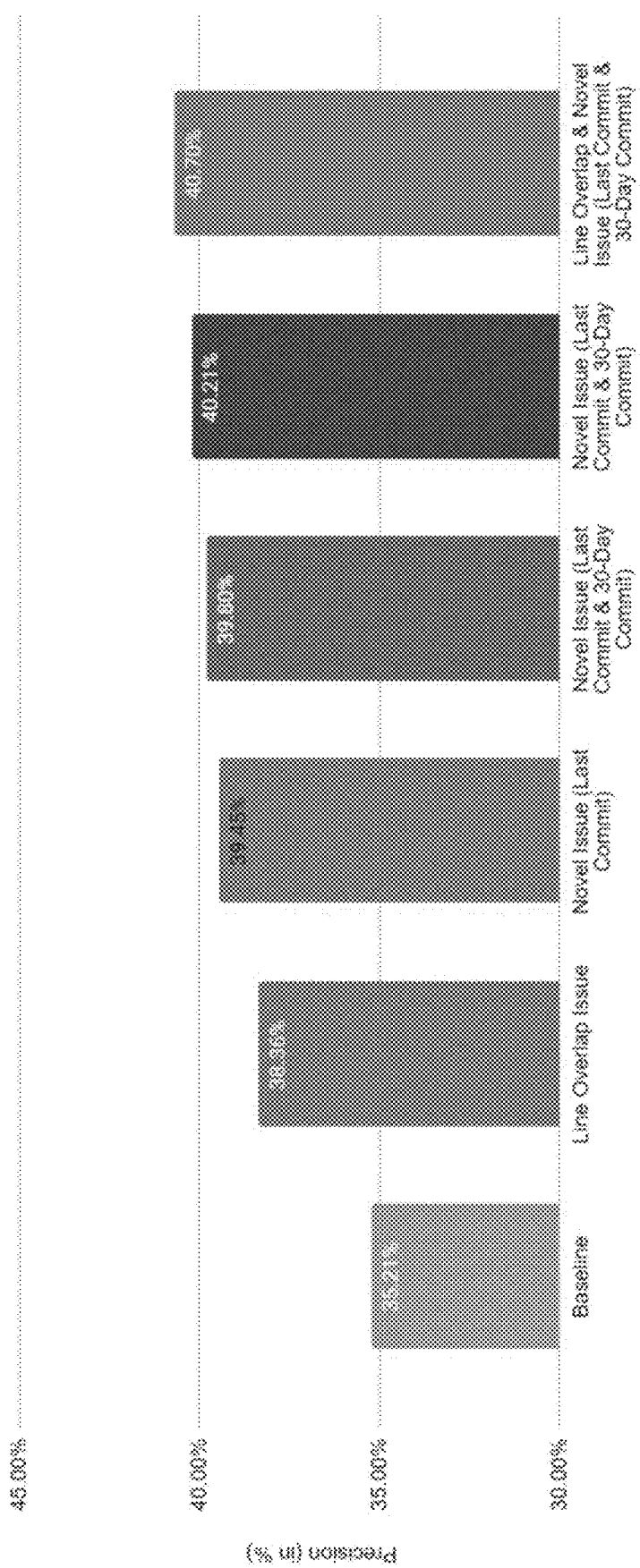
FIG. 18B provides the detection precision of issues using the Line Overlap Feature and novelty categorization.

In some cases, issues within the code can occur in code snippets outside of the code submitted with a pull request. For example, a pull request can be related to or dependent upon a snippet of code outside of the code within the pull request. For example, the code changes in the pull request may have altered or broken the functionality of the code outside of the pull request. Therefore, the issue in the code outside of the code within the pull request is considered to be within the scope of the issue report (Line Overlap Issue). Prompting a set of language models to evaluate and include Line Overlap Issues increased issue detection precision, and the set of issues within scope (FIGS. 18A-18D). FIG. 18A provides results of this prompting strategy, showing that 75.50% of Line Overlap Issues were within scope, compared to 64.20% of baseline issues. Further, FIG. 18A provides that Line Overlap Issues and Novel Issues were 83.95% within scope, compared to 64.20% of baseline issues. FIG. 18B provides results of this prompting strategy, showing that including Line Overlap Issues improved issue detection precision from 35.21% (baseline) to 38.36% (Line Overlap Issues), and to 40.70% for Line Overlap and Novel Issues.

Figure 18C:
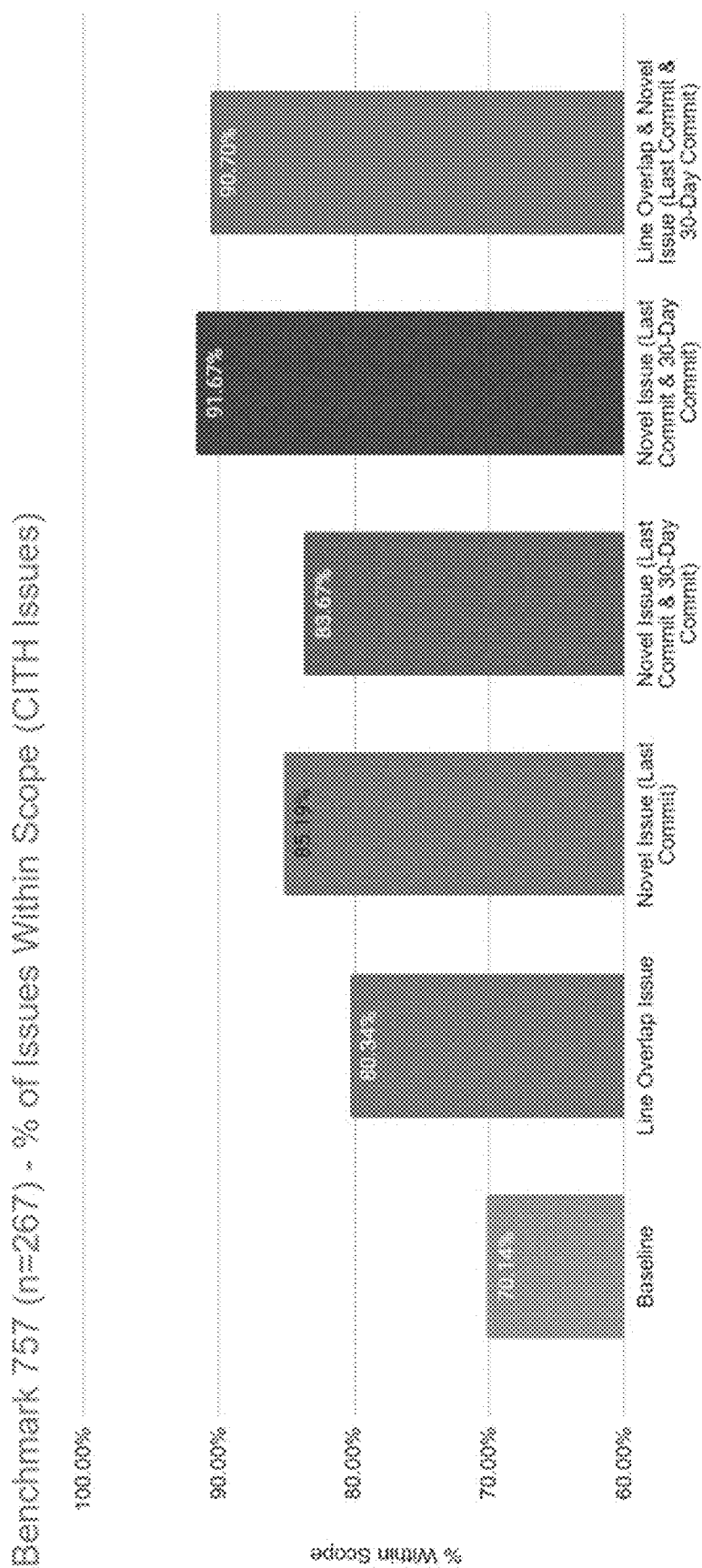
FIG. 18C provides detection of issues within scope using the Line Overlap Feature, context of relevant categories, and novelty categorization.
Figure 18D:
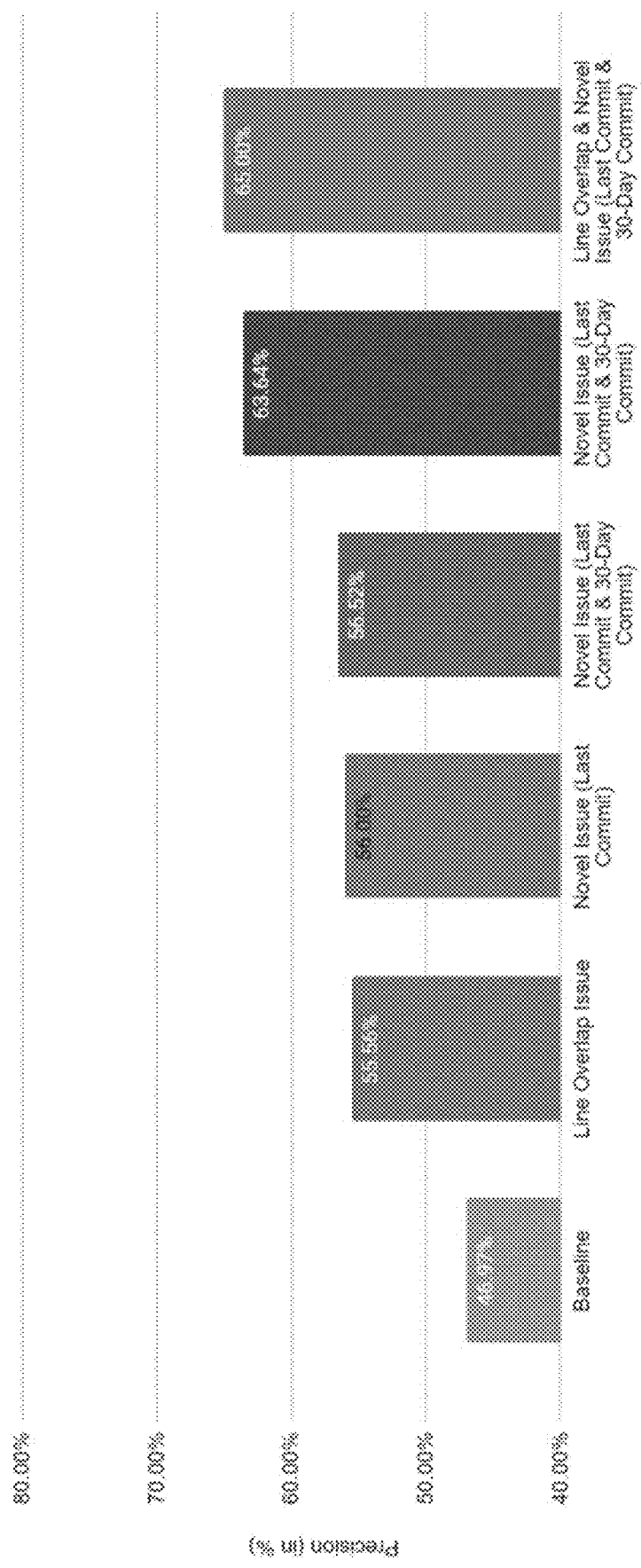
FIG. 18D provides the detection precision of issues using the Line Overlap Feature, context of relevant categories, and novelty categorization.

Identified issues can be categorized as disclosed herein based on the context of the issue report, such as the pull request (PR), PR diffs, and customer profile. A set of language models can be prompted to evaluate a file or multiple files related to the issue and determine which categories are relevant to the issue. For example, the set of language models may determine that security, maintainability, and readability are relevant categories to an issue. When prompted to perform this analysis, the set of language models identified that 80.34% of Line Overlap Issues were within scope compared to 70.14% of baseline issues, and that Line Overlap and Novel Issues were 90.70% within scope compared to baseline issues (FIG. 18C). Further, the set of language models showed increased issue detection precision for Line Overlap Issues when evaluating relevant categories (FIG. 18D). FIG. 18D shows issue detection precision at baseline (46.97%) compared to Line Overlap Issues (55.56%) compared to Line Overlap and Novel Issues (65%).

Identifying issues by novelty is a useful predictor of whether an issue is relevant and whether the developer will fix the issue. Issue detection precision and the number of issues within scope increases significantly when identifying novel issues. Collecting data about whether issues are novel or not novel allows for better control and filtering of issues as well as analysis by a recommender to improve prediction accuracy on whether a detected issue will be addressed by a software engineering team.

Example 5: Filtering Recurring Issues

If there are multiple occurrences of a given issue, it is less likely that that issue will be resolved. Such issues can be referred to as a recurring issue. Recurring issues are likely to be unimportant or low priority issues because they may represent potential problems or improvements that the software engineering team have decided not to address for the time being. Recurring issues are also more likely to represent hallucinations or nonsensical feedback. If the same issue appears in many different parts of the codebase and each of these parts have gone through multiple iterations and software reviews by human software engineers, it is unlikely to be a valid, important issue that was missed over and over again by the software engineering team. Detecting recurring issues provides the ability to filter out these issues, and to use an issue similarity score to predict if an issue will be resolved. To detect recurring issues, issues within the PR were compared to issues within relevant files and scored for similarity. The set of language models were queried to detect recurring issues using the following prompt:

You are a senior software engineer working with a team of software engineers.

You recently reviewed a pull request from a developer on the team. You found an issue in their pull request, but it's highly likely that the same issue exists in other files in the same code repository.

Your task is to review the issue and identify if the same issue is present in other files in the same code repository. In addition to the issue description and the corresponding code snippet, you will be given another source code file from the same folder to check if the same issue is present in it.

Please only output issues if the issues are identical or almost identical to the original issue shown.

You will be provided with the following pieces of information:

Issue description

Issue code snippet

Other source code file

This method can be applied to any file content or any source code snippet, even if no other issues were previously identified here by the set of LLMs.

Figure 19:
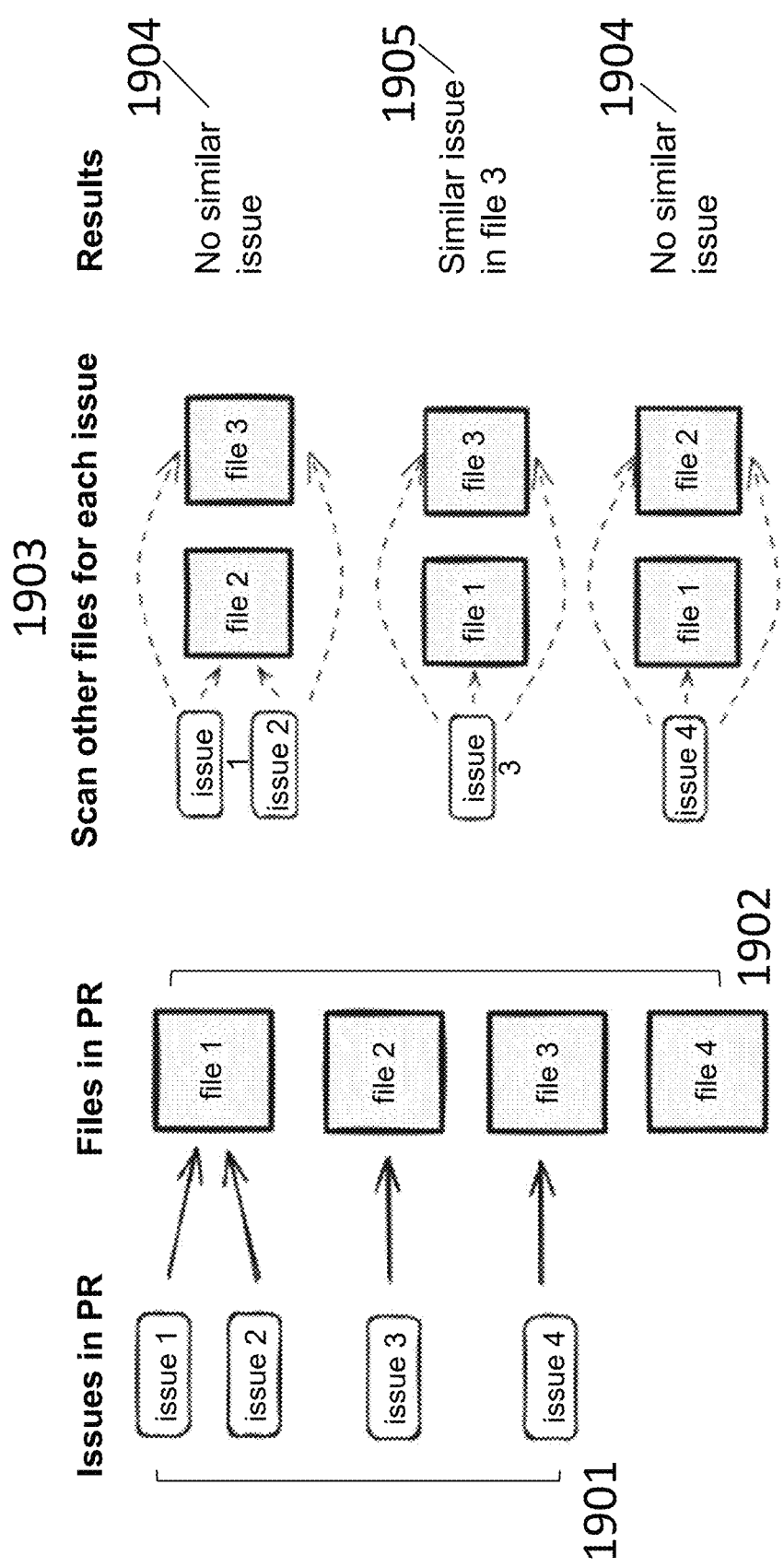
FIG. 19 illustrates an example workflow for filtering similar issue reports.

The method of using this prompting strategy is illustrated in FIG. 19. In this method, issues within the PR 1901 are compared to files within the PR 1902. The files of the PR can be scanned to detect whether similar issues exist within the files 1903. Scanning can reveal no similar issues 1904, or that similar issues exist within the files of the PR 1905.

This prompting strategy enabled the LLM to identify recurring issues within the PR and relevant files. For example, the strategy identified the following:

a. The first original issue was found in the file one_call_with_multi_file_verification_pr_reviewer.py:
"The 'evaluate file' method creates a new instance of 'LLMTracer' but does not handle any exceptions that might occur during its creation. It's a good practice to handle exceptions where they might occur to prevent the application from crashing unexpectedly."

b. Then, a similar issue was found in issue_muter.py with the LLM outputting:
"The same issue exists in the other source code file. The 'LLMTracer' instance is created in the 'mute_issues' method without handling any exceptions that might occur during its creation."

In another example, the following recurring issues were identified:

a. Issue in test_pr_scanner.py: "The new parameter 'parent_tracer' added to the function 'pr_side_effect' is not used within the function. If it's not needed, consider removing it to avoid confusion."

b. Similar issue in one_call_with_multi_ile_verification_pr_reviewer.py with LLM outputting: "The function 'query_openai_for_review_feedback' in the other source code file also has the parameter 'parent_tracer' which is not used within the function. This is identical to the original issue."

Table 7 provides data for issue descriptions that are most frequently recurring issues in a given dataset.

TABLE 7

| Issue description | Scanned file count | Similar issue count |
|---|---|---|
| The component seems to be missing any error handling. Consider adding error boundaries or try-catch blocks to handle any potential errors that might occur during the rendering of the component. | 17 | 10 |
| The new parameter 'parent_tracer' added to the function 'pr_side_effect' is not used within the function. If it's not needed, consider removing it to avoid confusion. | 15 | 10 |
| The parent_tracer parameter in the mute issues method is | 15 | 10 |

TABLE 7-continued

| Issue description | Scanned file count | Similar issue count |
|---|---|---|
| optional and defaults to None. However, there is no check to ensure that a parent_tracer is provided when the method is called. This could lead to a NoneType error if the parent_tracer is not provided and its methods are called. | | |
| The 'LLMTracer' class is tightly coupled with the 'RunTree' class and the Client' class. This could make it difficult to test the 'LLMTracer' class in isolation. Consider using dependency injection to make the 'LLMTracer' class more testable and flexible. | 15 | 10 |
| The code does not include any error handling or logging. According to our company coding standards, exceptions should be logged to datadog using the logger function. Please add appropriate error handling and logging to the code | 17 | 15 |
| There are no docstrings in your methods. Docstrings are important as they describe what your method does, making it easier for other developers to understand your code. They are also used by documentation generation tools. | 13 | 12 |
| The code contains a large component with many responsibilities. This can make the code harder to understand and maintain. It would be better to break this component down into smaller, more manageable components. | 17 | 11 |
| The 'LLMTracer' class does not have any documentation in the form of docstrings. Adding docstrings that describe the purpose of the class and its methods would improve code maintainability and readability. | 15 | 11 |

To predict whether recurring issues will be resolved, 1,176 issues across 124 PRs were scanned to extract file names, files that contain an issue similar to the original issue, similar issue descriptions, and an explanation of why the set of language models classifies the issue as a similar issue. The label "is_fixed" was used to classify fixed issues (i.e., resolved issues).

Figure 20:
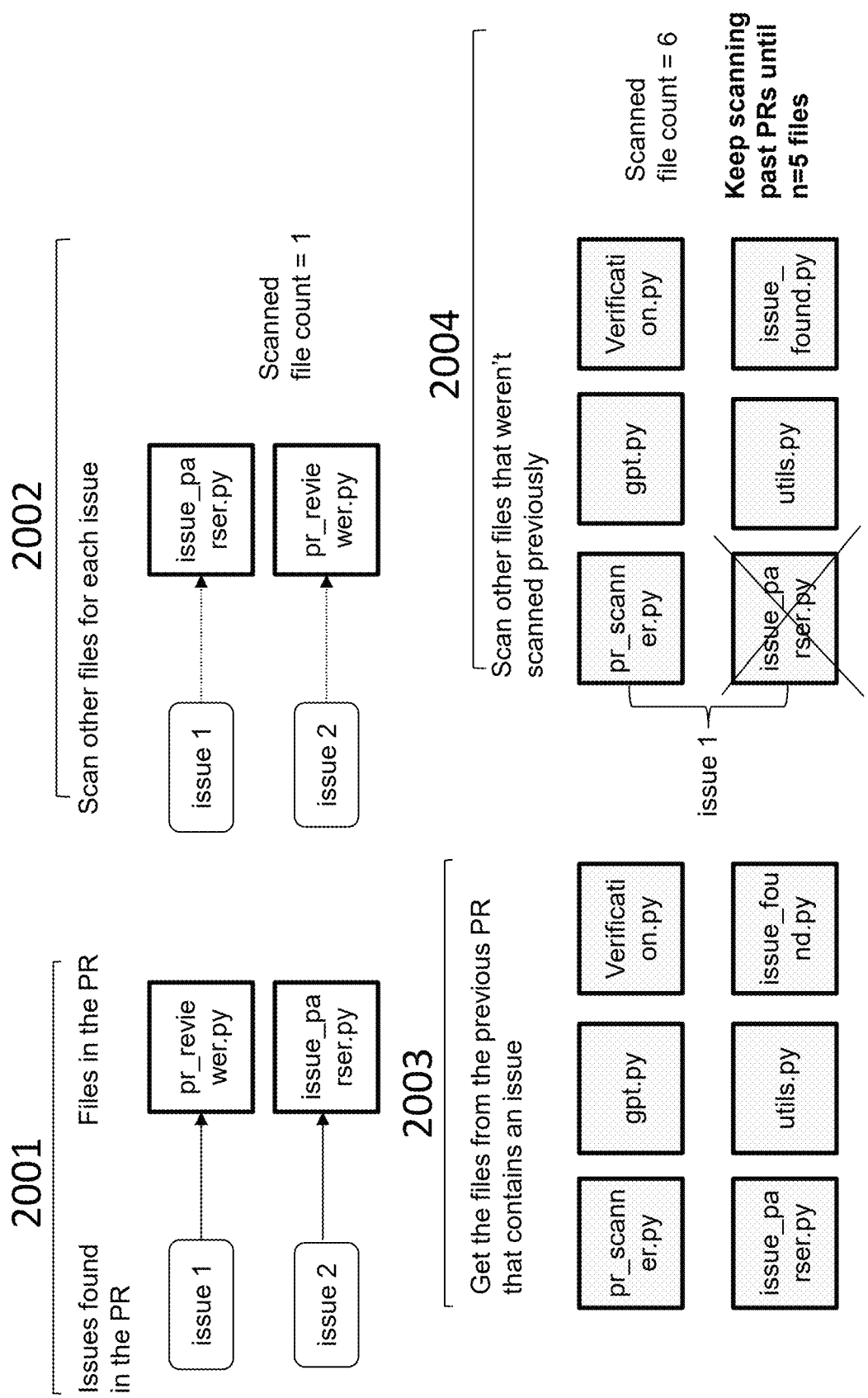
FIG. 20 illustrates an example workflow for determining whether similar issue reports are resolved.

This method is illustrated in FIG. 20. In this method, issues are identified from the PR 2001 and the files of the PR are scanned for each issue 2002. Files from the previous PR that contain an issue are then retrieved 2003. These files are then scanned for the issue. Scanning is repeated in past PR files until at least 5 files are scanned 2004.

Using this method on 155 issues (Dataset 1) selected from a random set of 19 PRs revealed that non-fixed issues had 1690 higher average number of similar issues. In other words, non-fixed issues tend to be recurring issues much more frequently. The method was repeated on 186 issues (Dataset 2) selected from a random set of 29 PRs, where non-fixed issues had 4600% higher average number of similar issues. This strongly indicates that recurring issues are far less likely to be resolved. The data from these experiments are presented in Table 8.

TABLE 8

| Is_fixed (Dataset 1) | Number of issues counted | Average number of files scanned | Average number of similar issues |
|---|---|---|---|
| No | 141 | 5.28 | 0.78 |
| Yes | 14 | 6.14 | 0.29 |

| Is_fixed (Dataset 2) | Number of issues counted | Average number of files scanned | Average number of similar issues |
|---|---|---|---|
| No | 149 | 2.70 | 0.28 |
| Yes | 37 | 3.38 | 0.05 |

Using the is_fixed label combined with scanned_file_count (number of files scanned) and similar_issue_ratio (number of files containing similar issues divided by number of files scanned) features were tested with the use of logistic regression or a decision tree for filtering similar issues. The similar_issue_ratio represents the degree to which a given issue is a recurring issue. The results of this method are presented in Table 9. The results of this method revealed that using these features with a decision tree produced greater accuracy and precision in filtering similar issues. The results are calculated on the balanced dataset where there is an equal number of fixed and non-fixed issues, and where a random baseline would obtain 50% accuracy and 50% precision.

TABLE 9

| Model | Test Accuracy | Test Precision |
|---|---|---|
| Baseline | 50.0% | 50.0% |
| Logistic Regression | 67.9% | 66.8% |
| Decision Tree | 72.6% | 72.7% |

The method illustrated in FIG. 20 was further tested on small PRs, which were defined as PRs that have less than 5 files to scan for each issue. The objective was to establish that the same method works even when few data points are available within the current PR. For small PRs, the set of language models was prompted to retrieve files from previous PRs that contain an issue. If the scanned file count was less than 5, the set of language models was instructed to go back at least one more PR until a file that contained an issue was retrieved. This method was performed on 33 PRs with 158 issues. The following is an example prompt using this method in Python:

```
similar_issues=[ ]
for issue_id in pr.issue_id:
    issue_description=pr.loc[pr.issue_id==issue_id,
        "description"]
    issue_code_snippet=pr.loc[pr.issue_id==issue_id,
        "code_snippet"]
```

```
issue_file_path=pr.loc[pr.issue_id==issue_id, "path"]
files_to_scan=[path for path in pr.path if path !=issue-
    _file_path]
file scan loop
if len(files_to_scan)>10:
files_to_scan=select top ten(files to scan)
scanned_file_count=0
for file_path in files_to_scan:
    with open(file_path, "r") as f:
        source_code=f.read( )
        response=detect_similar_issue(chat, feedback,
            diff, source_code)
        similar_issues.append((issue_id, response.con-
            tent)) # needs to be parsed scanned_file_count+
            =1
        if scanned_file_count<5:
            files_to_scan_prev_pr=[path for path in pre-
            v_pr.path if path !=issue_file_path]
            # remove files already scanned
            files_to_scan_prev_pr=[path for path in files-
            _to_scan_prev_pr if path not in files_to_scan]
    # execute file scan loop above
```

Using this method with the is_fixed label, scanned_file_count and similar_issue_count features was compared using a support vector machine or a decision tree. The results of this prompting method are presented in Table 10. The results of this method provide that a decision tree resulted in the highest accuracy and precision for filtering similar issues in small PRs.

TABLE 10

| Model | Test Accuracy | Test Precision |
|---|---|---|
| Baseline | 50.0% | 50.0% |
| Support Vector Machine | 78.6% | 78.9% |
| Decision Tree | 82.0% | 87.0% |

Figure 21:
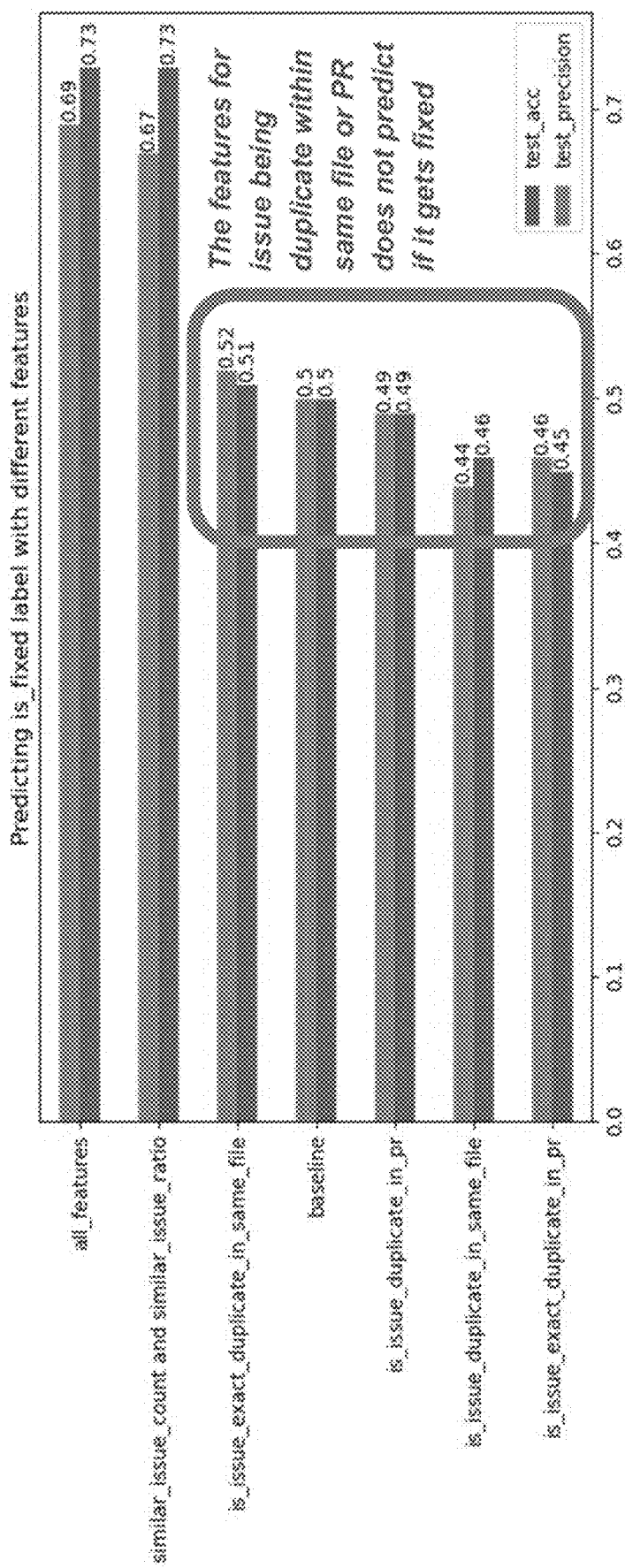
FIG. 21 illustrates detecting and filtering similar duplicate issues.

Recurring issues can be considered as a superset of duplicate issues, where some detected similar issues are duplicate issues. To detect duplicate issues in a dataset, the following features were used:
is issue in same file
is issue_duplicate_in_pr
is issue_exact_duplicate_in_same_file
is_issue_exact_duplicate_in_pr The following language was added to the prompt: Two issues are considered to be duplicates if they refer to the exact same code snippet or mention the exact same problem. Using this method revealed that detecting duplicate issues does not improve accuracy or precision for filtering recurring issues (FIG. 21). This indicates that the signal coming from the number of similar issues represent something distinct from the number of duplicate issues present in the PR.

Example 6: Issue Semantic Deduplication

Each set of issue reports can be evaluated for similarity to other issues within the set of issue reports. Evaluating the set of issue reports for similarity can comprise determining whether a subset of issue reports in the set of issue reports refers to similar issues. In some cases, evaluating the set of issue reports for similarity can comprise using a set of language models to determine the similarity. Using a set of language models to determine the similarity can comprise prompting the set of language models with the set of issue reports to embed the set of issue reports to generate a set of embeddings. The set of embeddings can be clustered, wherein clustering comprise agglomerative clustering. For example, clustering can be based on evaluating similarity scores between the set of embeddings (such as by calculating the cosine similarity between pairs of embeddings). The set of language models can use an agglomerative clustering algorithm to cluster all the issues based on cosine similarity of their embeddings, and issues within the same cluster are determined to be similar. Issues within the set of issue reports can be removed if an issue report is similar to another issue report from the set of issue reports. Issues within the set of issue reports can also be removed if an issue report refers to a file in the code that is similar to another issue report that refers to a different file in the code.

The set of language models can be prompted to perform pairwise comparisons of issues for similarity. For example, the following prompt language was used:

```
SYSTEM_DETECT_SIMILAR_ISSUE_MES-
    SAGE="""
You are a senior software engineer working on a large
    legacy codebase.
You are reviewing a set of issues raised across pull
    requests and grouping similar issues together.
You will be given two issues (filename, description and
    optionally relevant code snippet), and must determine
    their level of similarity.
You must output the level of similarity which can be one
    of:
    Identical: If the issues are identical.
    Nearly Identical: If the issues almost identical.
    Very Similar: If the issues are very similar.
    Somewhat Similar: If the issues are somewhat similar.
    Not Similar: If the issues not similar at all.
Please structure your output as a valid JSON like:
[
    {{
        "similarity": "Identical", "Nearly Identical", "Very
            Similar", "Somewhat Similar", "Not Similar",
        "justification": "Your justification for the level of
            similarity"
    }}
    ...
]
```

Figure 22:
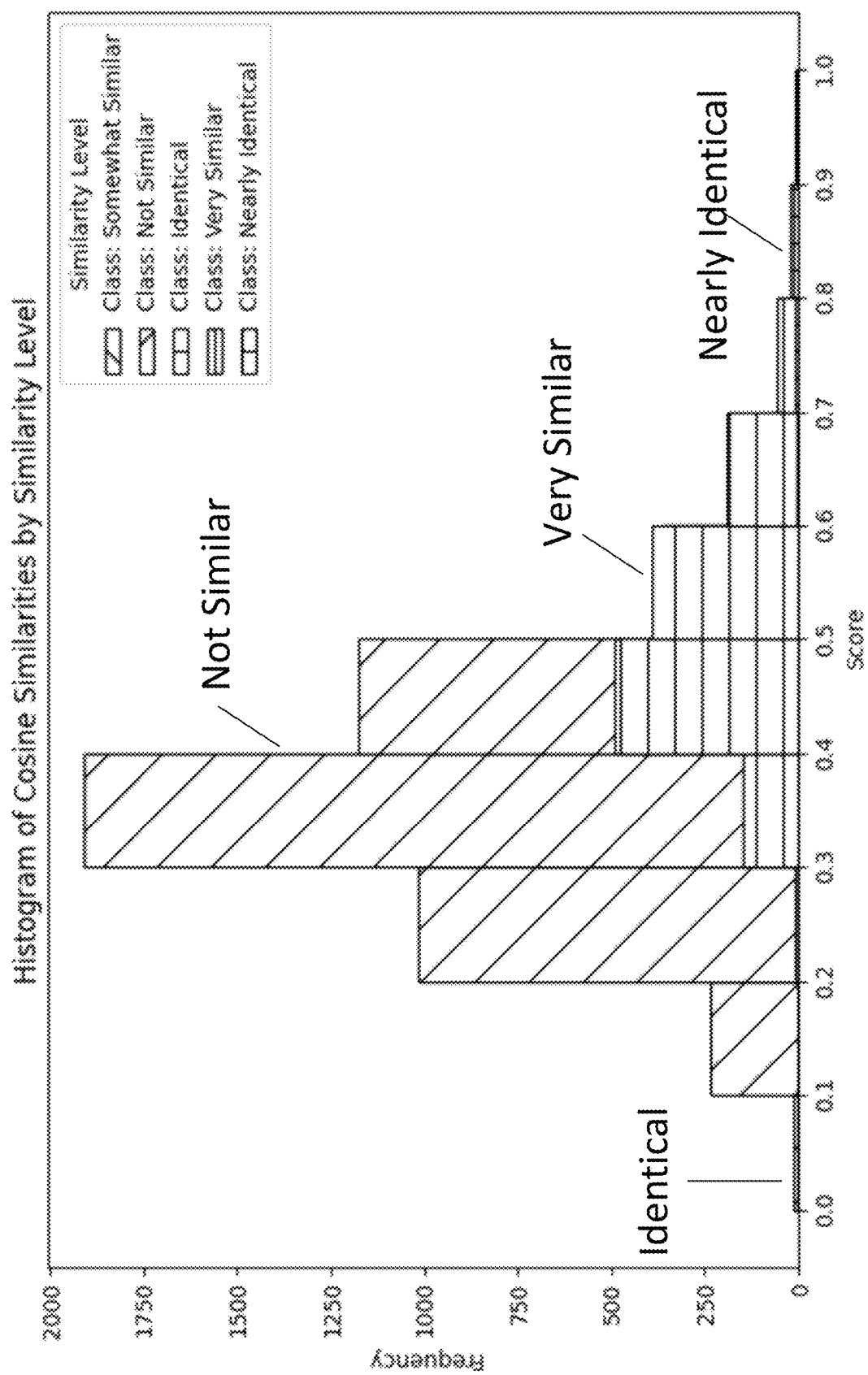
FIG. 22 illustrates detection of similar issues by cosine similarity.

This prompting method output similarity labels comprising "Identical", "Nearly Identical", "Very Similar", "Somewhat Similar", or "Not Similar", together with a detailed justification describing why the set of language models categorized the issue pair with that label. This prompting method was tested on a dataset of about 5000 pairs of issues, and the distribution of cosine similarity for each level of similarity was output by the set of language models (FIG. 22). The results presented in FIG. 22 provide that combining both the cosine similarity comparison and the prompting method performs better than using only cosine similarity comparison, likely because the set of language models are able to perform deeper semantic reasoning than what is captured in the embeddings.

The set of language models can generate the same issue many times in a PR. For example, an issue like "This function is missing a docstring . . . " can be repeated throughout the same file and PR. Sometimes repeated issues are very similar, but not exactly identical. For example, the issue "This variable doesn't have type hinting . . . " and the issue "This function doesn't have type hinting for its output . . . " share similar features but are not identical.

Repeated issues output to a user can be inefficient for the user and for the computer-based system.

To filter out similar but unidentical issues, agglomerative clustering was performed on a dataset that included issues manually clustered by the semantic contents of their descriptions from 3 pull requests. Agglomerative clustering was performed on the dataset in three scans. Agglomerative clustering was performed using OpenAI™ embeddings with complete, single, or average linkage. The evaluation metric from the scans was qualitative selection based on the number of issue pairs correctly within the same cluster (true positive; TP), the number of pairs that should not have been put within the same cluster (false positive; FP), and the number of pairs that should have been put in the same cluster but were not (false negative; FN). The three scans were a small scan (scan id: 16987) which revealed 1 duplicate issue, a medium scan (scan id: 17094) which revealed many identical issues, and a scan of an unusually large pull request in terms of the quantity of issues contained within the pull request (scan id: 25564) on auto generated db migration code, which revealed one large issue cluster and many smaller issue clusters.

Figure 23A:
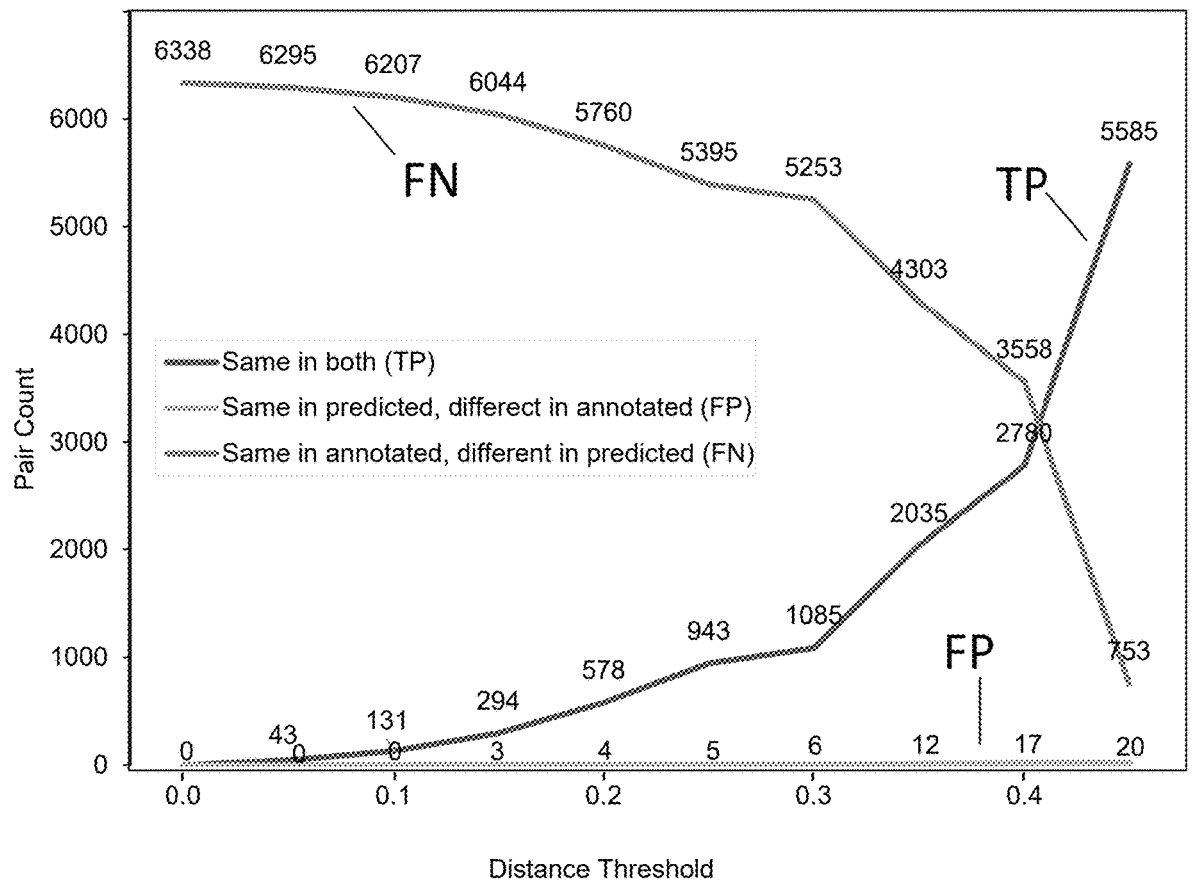
FIGS. 23A-23C provides results of agglomerative clustering of issue reports using complete linkage.
Figure 23B:
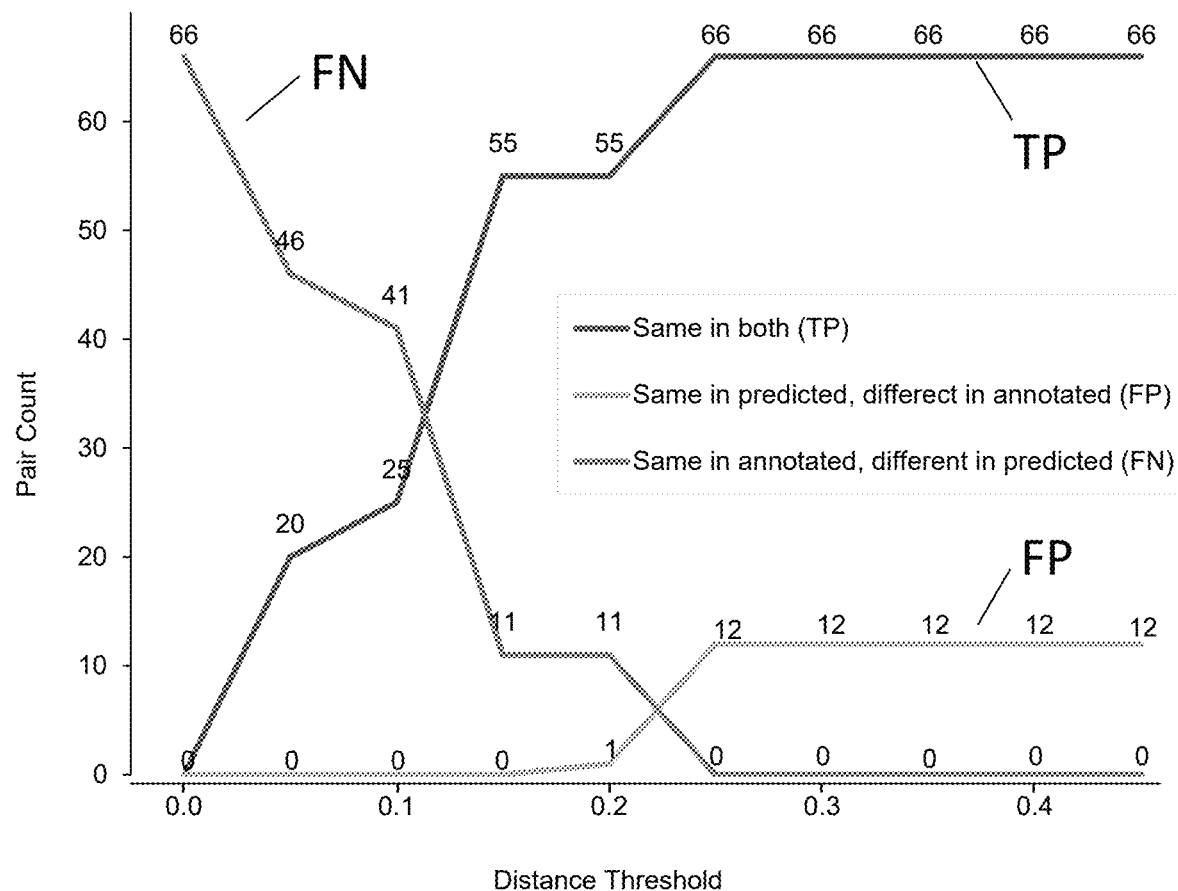
Figure 23C:
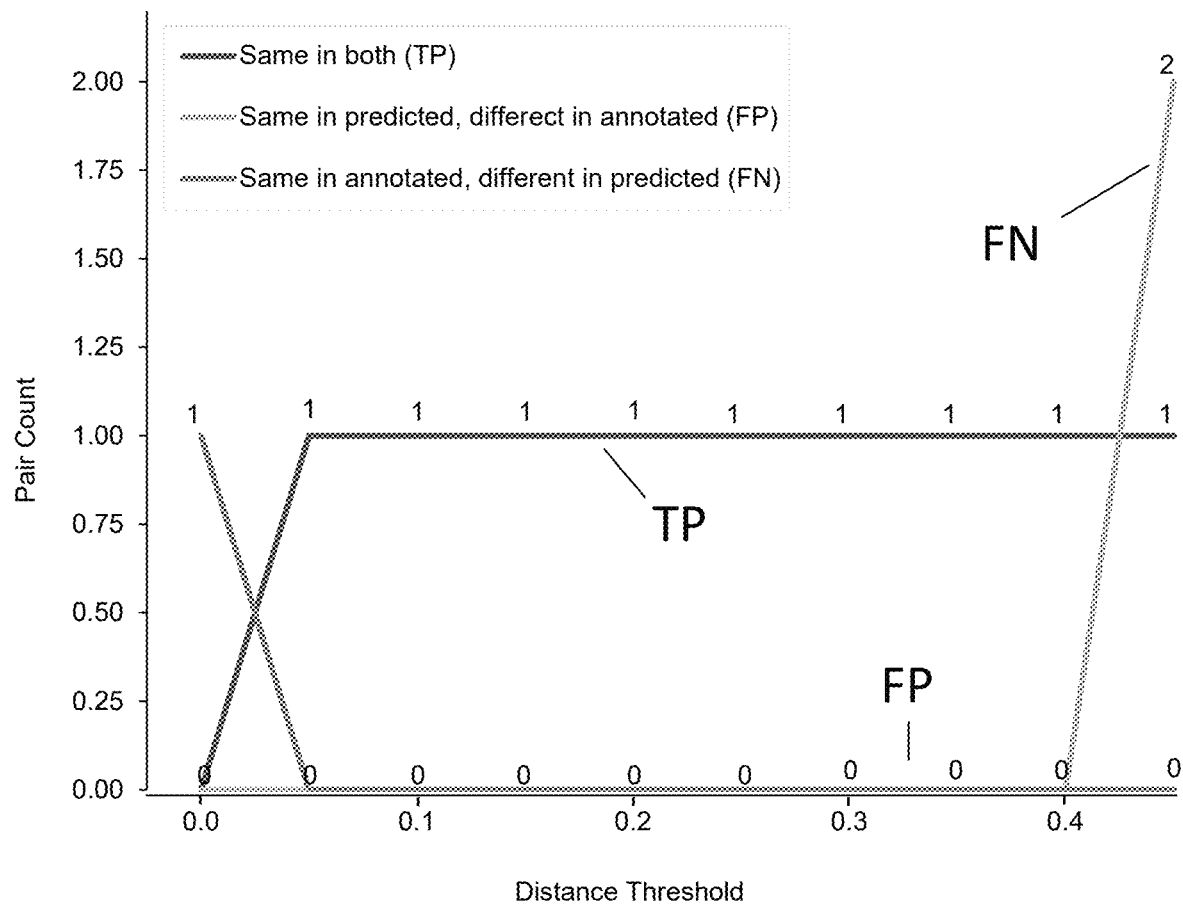
Figure 23D:
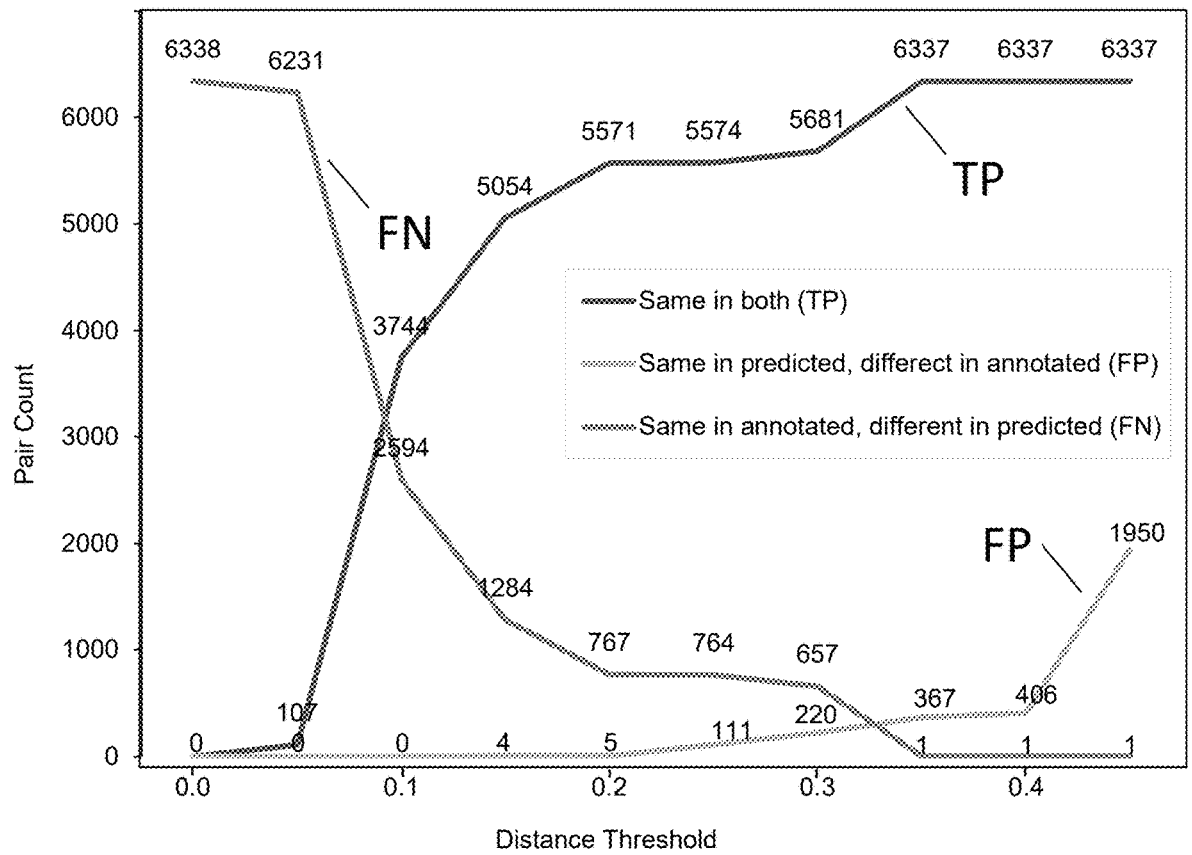
FIGS. 23D-23F provides results of agglomerative clustering of issue reports using single linkage.
Figure 23E:
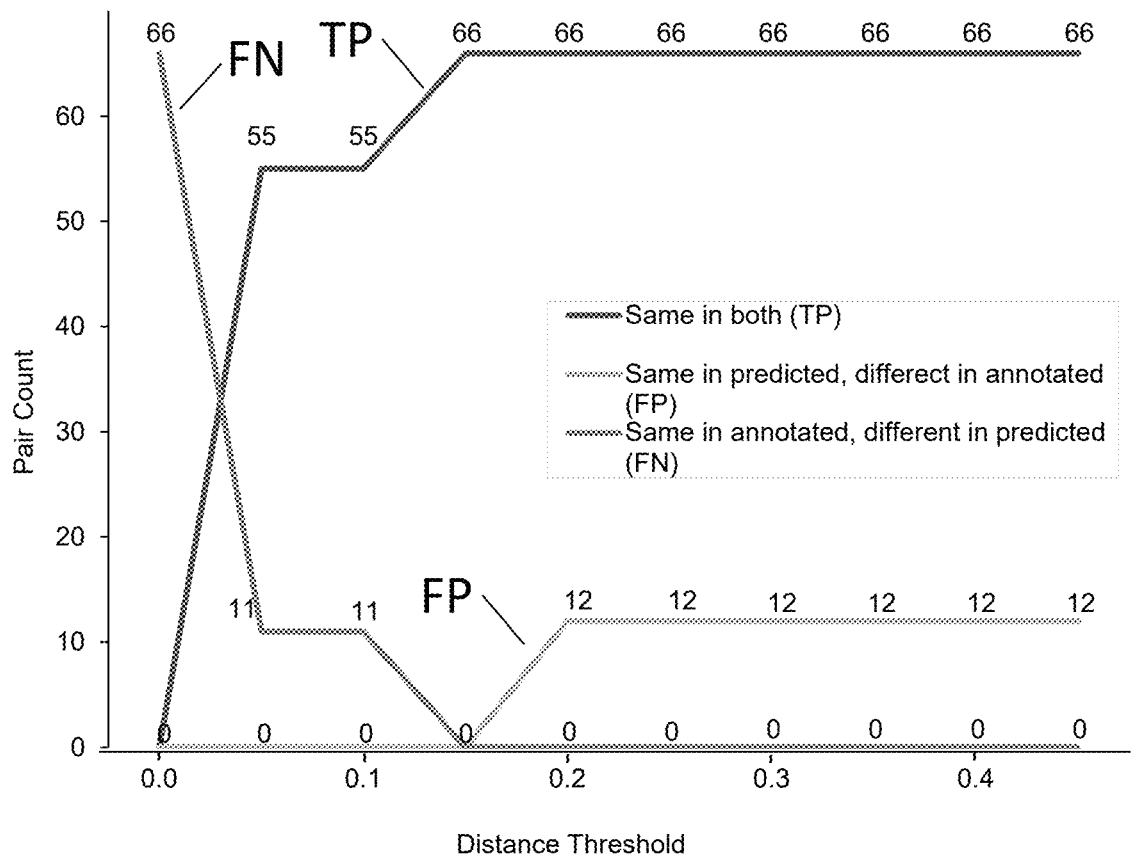
Figure 23F:
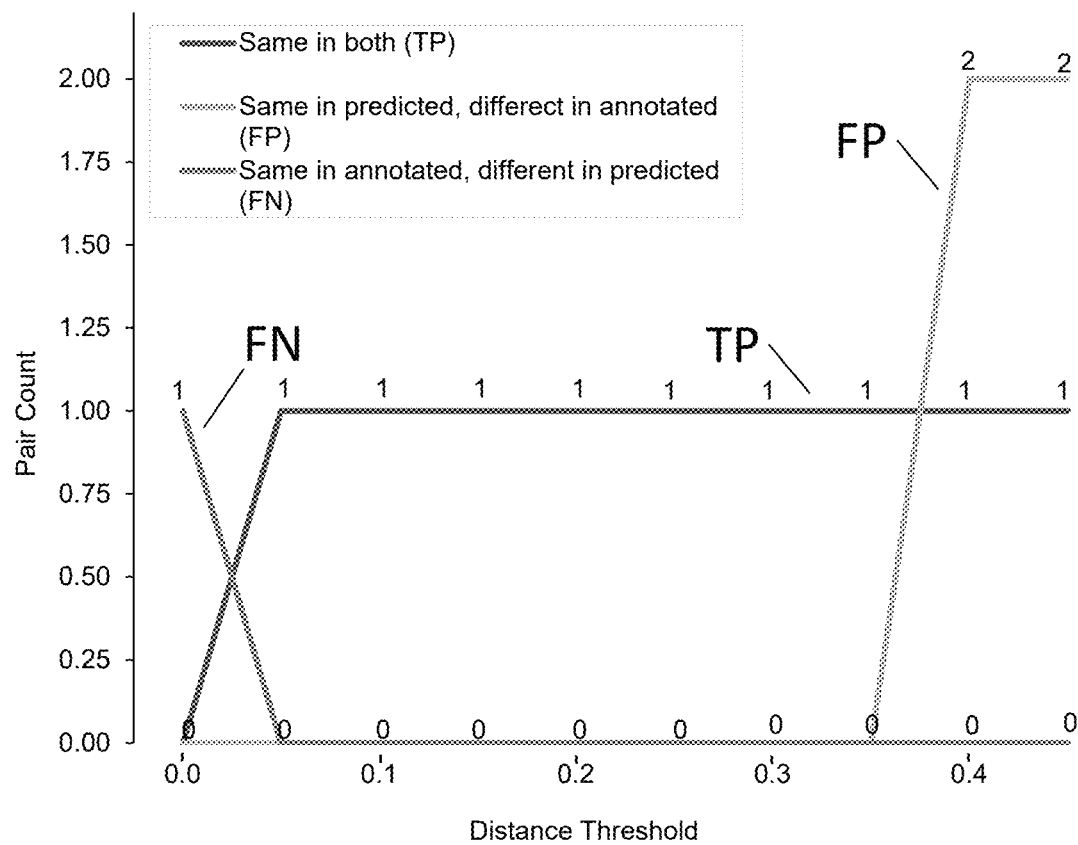
Figure 23G:
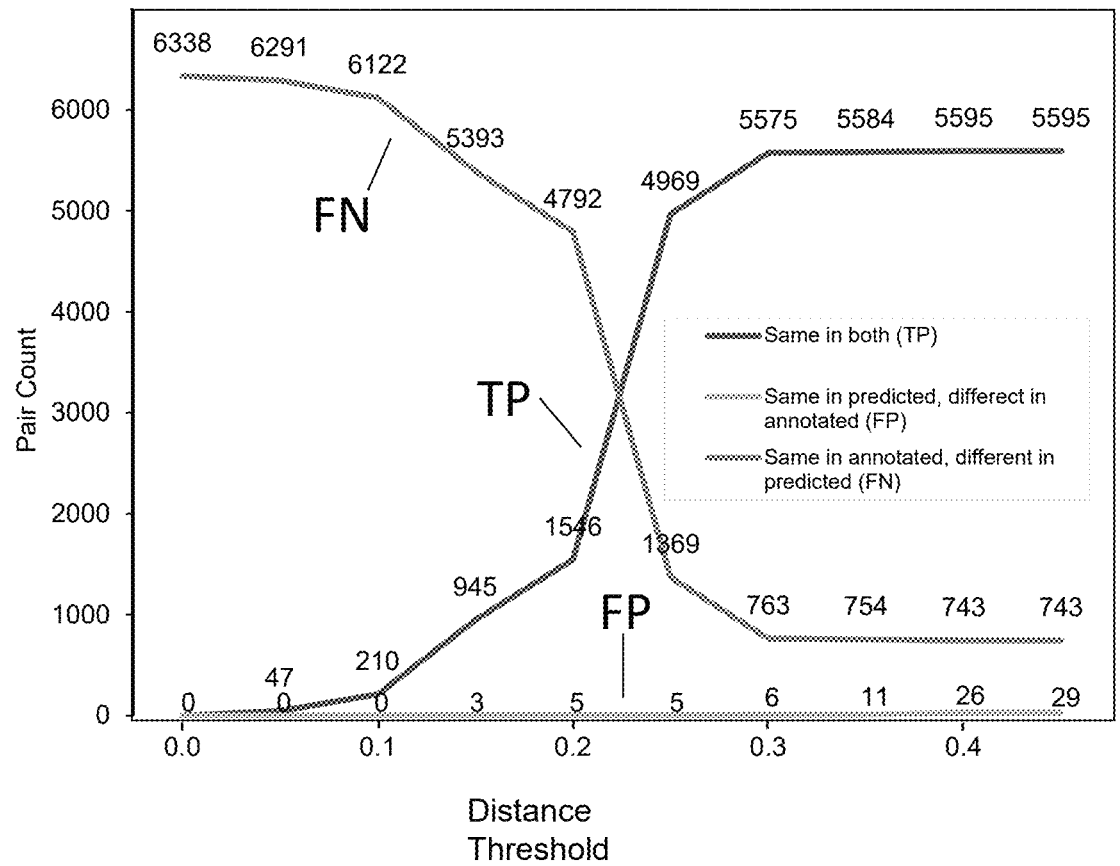
FIGS. 23G-23I provides results of agglomerative clustering of issue reports using average linkage.
Figure 23H:
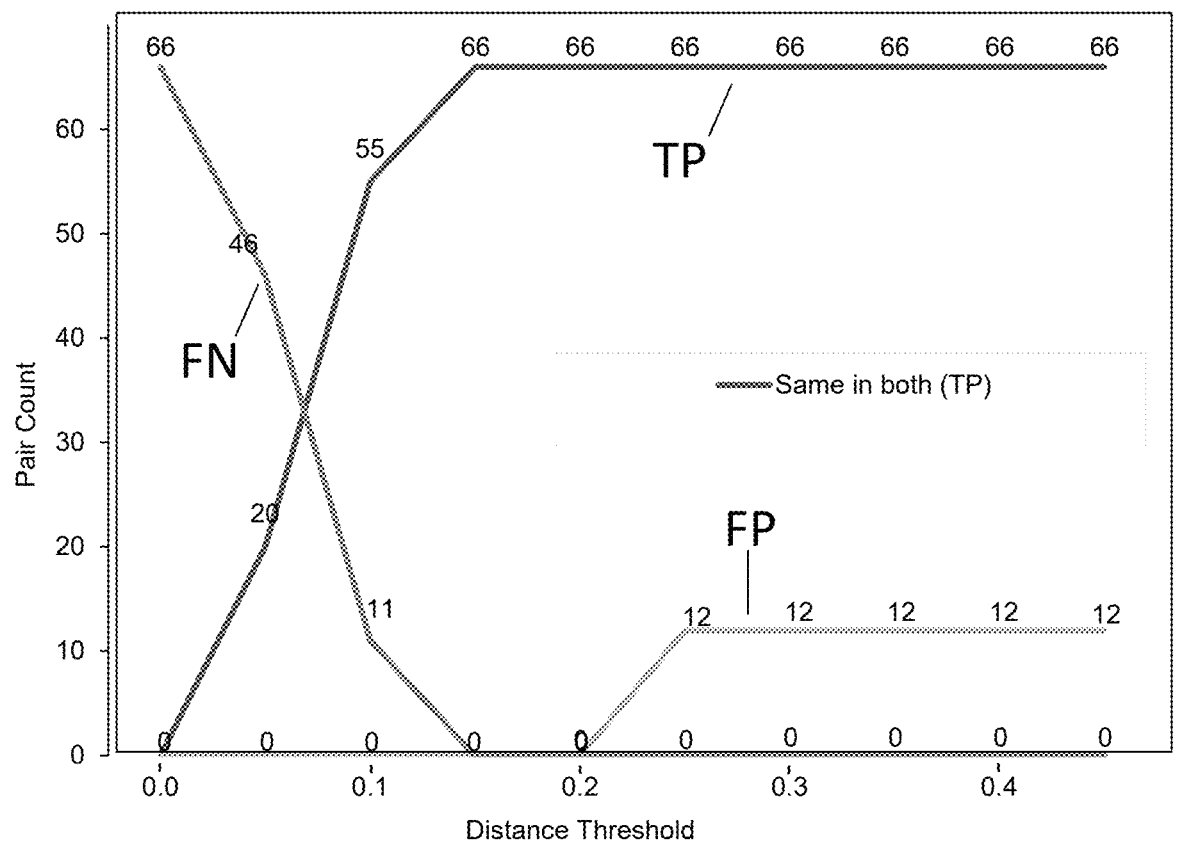
Figure 23I:
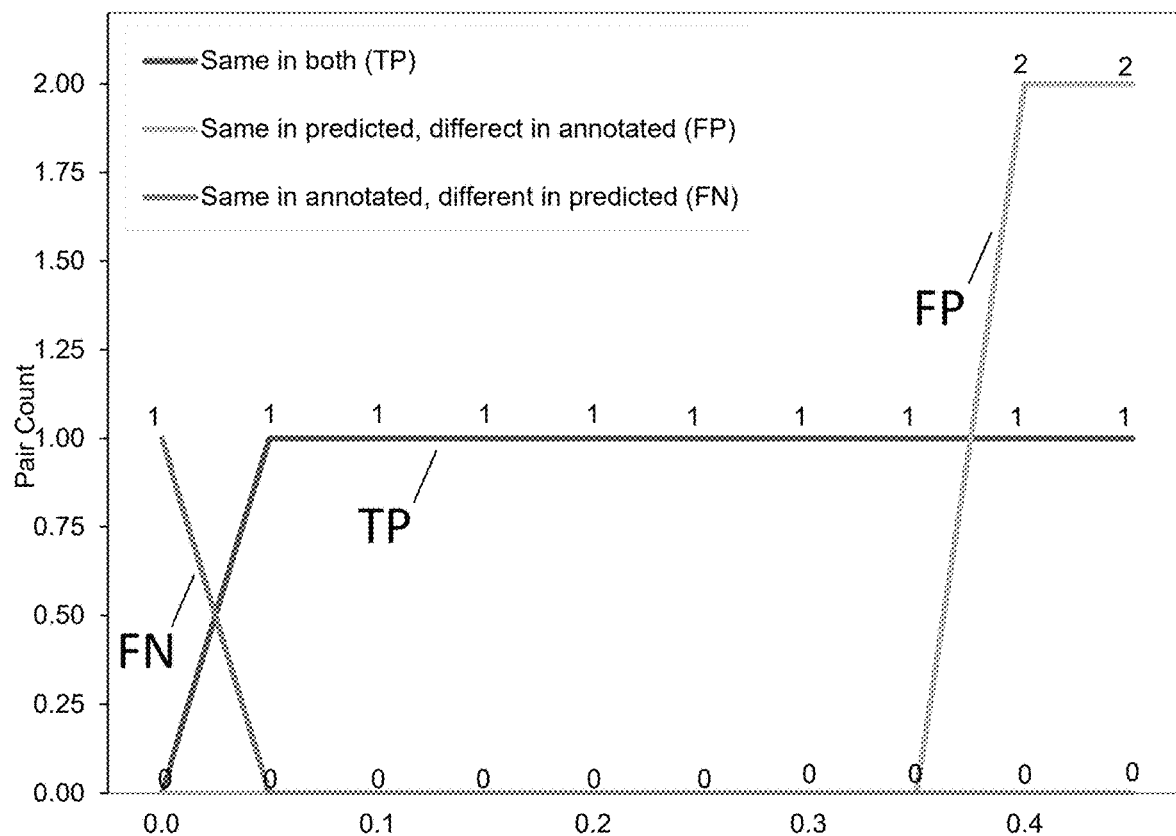

The results of the agglomerative clustering analysis are presented in FIGS. 23A-23I. FIG. 23A provides data for scan id: 25564 using complete linkage. FIG. 23B provides data for scan id: 17094 using complete linkage. FIG. 23C provides data for scan id: 16987 using complete linkage. The best performing distance threshold for complete linkage was 0.4. FIG. 23D provides data for scan id: 25564 using single linkage, FIG. 23E provides data for scan id: 17094 using single linkage, and FIG. 23F provides data for scan id: 16987 using single linkage. The best performing distance threshold for single linkage was 0.2. FIG. 23G provides data for scan id: 25564 using average linkage, FIG. 23H provides data for scan id: 17094 using average linkage, and FIG. 23I provides data for scan id: 16987 using average linkage. The best performing distance threshold for average linkage was 0.3. The conclusion for this experiment was that single and average linkage for agglomerative clustering perform similarly well, and outperform complete linkage.

Another agglomerative clustering experiment was performed on a TypeScript™ dataset (Benchmark 501) and a Python™ dataset (Benchmark 510) using average linkage with a distance threshold of 0.3. The unmuted highest confidence issue from each cluster was extracted. Baseline issue detection (i.e., where all issues are kept and no semantic deduplication is performed) and issue detection with agglomerative clustering performed similarly well in this experiment. This indicates that it is possible to drop the semantically similar issues, which reduces computation and cognitive load for the human reviewer while not decreasing issue quality. Table 11 summarizes the data from this experiment.

TABLE 11

| Issue Detection | Precision (%) | Sample Size | 95% Confidence Interval |
|---|---|---|---|
| No Semantic Deduplication | 52% | 181 | [45%, 59%] |
| Semantic Deduplication with Agglomerative Clustering | 51% | 158 | [43%, 59%] |

The following issues are example annotate issues that were included in the baseline, but were filtered out by semantic clustering if the algorithm surfaced a semantically similar issue (where "true_positive" indicates that the human annotator annotated them as a true positive, and "false positive" indicates that the human annotator annotated them as a false positive which should not have been detected):

There's a potential for an 'AttributeError' in the lines where 'self.request_meta.scan id' is accessed. It would be safer to check if 'self.request_meta' is not 'None' before trying to access 'self.request_meta.scan id'. Please add error handling for this case. true_positive The 'CodeQualityEvaluator' class is now being initialized directly in the 'run_repo_score_update_scan' function. This could potentially lead to issues if the initialization parameters change in the future, as the function would also need to be updated. It would be better to encapsulate the creation of 'CodeQualityEvaluator' instances in a factory or builder class, as was previously done with the 'CodeEvaluationFactory'. This would ensure that the creation logic is centralized and can be easily updated if necessary.
true_positive The use of the Config._config attribute directly in the test cases can lead to potential issues. Directly modifying the Config._config attribute can have side effects on other test cases that depend on the Config object's state. It's recommended to use a mock object to simulate the Config object's behavior instead of directly modifying its state.
true_positive Consider adding a try-except block around the file operation at line 15. This will allow the program to handle any exceptions that can occur if the file does not exist or cannot be opened, preventing the program from crashing.
false_positive The function 'factorize_with_rizer' does not have any docstring. It is a good practice to add docstrings to your functions to provide an explanation of what the function does, its arguments, and its return values. This makes the code easier to understand and maintain.
false_positive The method '_factorize_with_other' is missing a docstring. Providing a docstring with a clear explanation of the method's purpose, parameters, and return type would improve code documentation and help other developers understand the code more easily.
false_positive The 'selectRepository' function is currently doing more than one thing. It's setting the selected repository, fetching the branches for the selected repository, and setting the branches. This can make the function harder to understand, maintain, and test. Consider refactoring this function into smaller functions, each with a single responsibility. For example, fetching the branches for a repository can be moved into a separate function called 'fetchBranchesForRepository'.
true_positive The variable names 'selectedRepository' and 'selectRepository' are a bit confusing. Consider renaming them to more descriptive names that clearly indicate their purpose. This will improve the readability and maintainability of the code.
true_positive The removal of 'selectedBranch' from the 'RepositorySelection' type and the 'selectBranch' function from both 'RepositorySelection' and 'ManagePoliciesSectionProps' types can cause issues if other parts of the application rely on these properties and methods. Ensure that all references and usages of these properties and methods have been updated or refactored accordingly to prevent runtime errors. false_positivefalse_positive The use of Autocomplete components from Material-UI is a good choice for improving the user experience. However, it's important to ensure that the styling and behavior of these components are consistent with the rest of the application. Any inconsistencies could lead to a disjointed user experience. false_positive I noticed that the network request in the 'refreshAccess-Token' method of the 'AuthFlowRefresh' class is not wrapped in a try-catch block. This could lead to unhandled exceptions if the network request fails for any reason. To improve the error handling, consider wrapping the network request in a try-catch block and handle any potential exceptions that could be thrown. true_positive Hardcoding the developer's identity into the payload of the 'add' section could lead to potential issues in the future. If the developer's identity changes or if there is a need to add policies for multiple developers at once, this approach would not be scalable. It would be better to pass the developer's identity as a parameter to the function, which would make the function more flexible and reusable. true_positive Hardcoding the developer's identity into the payload of the 'add' section could lead to potential issues in the future. If the developer's identity changes or if there is a need to add policies for multiple developers at once, this approach would not be scalable. It would be better to pass the developer's identity as a parameter to the function, which would make the function more flexible and reusable. false_positive The component DeveloperCodingStandardsSection is using inline styles for styling. It's generally a good practice to separate styles from the component logic. Consider using CSS-in-JS solutions like styled-components or makeStyles from Material-UI for better maintainability and reusability of styles. true_positive The 'isDeveloperSpecific' prop is used to determine if the filters should be specific to the current developer. However, this could lead to potential issues if the current user's data is not available or not loaded yet. It would be better to add error handling or a loading state to handle these scenarios. false_positive Using '//@ts-nocheck' to disable type checking for the entire file is not recommended. Instead, consider using '//@ts-ignore' on specific lines where you expect to pass null/undefined, or better yet, handle these cases explicitly in the code to avoid potential runtime errors. true_positive The keyName prop added to the SearchFilters component seems to be a hardcoded string. It's generally a good practice to avoid hardcoding values directly in the code. Consider moving this string to a constants file or making it a prop that can be passed in. This will make the code more maintainable and flexible for future changes. true_positive The keyName prop 'Organization-Users-Search-Filters' seems to be hardcoded. It's generally a good practice to avoid hardcoding values directly in the code. Consider defining this as a constant in a separate module or file where you keep all such constants. This will make it easier to manage and update these values in the future. true_positive The use of Autocomplete components from Material-UI is a good choice for improving the user experience. However, it's important to ensure that the styling and behavior of these components are consistent with the rest of the application. Any inconsistencies could lead to a disjointed user experience. false_positive I noticed that the network request in the 'refreshAccess-Token' method of the 'AuthFlowRefresh' class is not wrapped in a try-catch block. This could lead to unhandled exceptions if the network request fails for any reason. To improve the error handling, consider wrapping the network request in a try-catch block and handle any potential exceptions that could be thrown. true_positive Hardcoding the developer's identity into the payload of the 'add' section could lead to potential issues in the future. If the developer's identity changes or if there is a need to add policies for multiple developers at once, this approach would not be scalable. It would be better to pass the developer's identity as a parameter to the function, which would make the function more flexible and reusable. true_positive Hardcoding the developer's identity into the payload of the 'add' section could lead to potential issues in the future. If the developer's identity changes or if there is a need to add policies for multiple developers at once, this approach would not be scalable. It would be better to pass the developer's identity as a parameter to the function, which would make the function more flexible and reusable. false_positive The component DeveloperCodingStandardsSection is using inline styles for styling. It's generally a good practice to separate styles from the component logic. Consider using CSS-in-JS solutions like styled-components or makeStyles from Material-UI for better maintainability and reusability of styles. true_positive The 'isDeveloperSpecific' prop is used to determine if the filters should be specific to the current developer. However, this could lead to potential issues if the current user's data is not available or not loaded yet. It would be better to add error handling or a loading state to handle these scenarios. false_positive Using '//@ts-nocheck' to disable type checking for the entire file is not recommended. Instead, consider using '//@ts-ignore' on specific lines where you expect to pass null/undefined, or better yet, handle these cases explicitly in the code to avoid potential runtime errors. true_positive The keyName prop added to the SearchFilters component seems to be a hardcoded string. It's generally a good practice to avoid hardcoding values directly in the code. Consider moving this string to a constants file or making it a prop that can be passed in. This will make the code more maintainable and flexible for future changes. true_positive The keyName prop 'Organization-Users-Search-Filters' seems to be hardcoded. It's generally a good practice to avoid hardcoding values directly in the code. Consider defining this as a constant in a separate module or file where you keep all such constants. This will make it easier to manage and update these values in the future.

true_positive

The keyName prop you've added to the SearchFiltersPopover component is a string literal. It's a good practice to avoid hardcoding string literals directly in your code. Instead, consider defining this string as a constant in a separate module. This approach makes your code easier to manage, especially when the same value is used in multiple places. If you need to change the value, you only have to do it in one place.

true_positive

The test cases for the 'dateToISOString' and 'dateToISOStringEndOfDay' functions are only testing with valid date strings. It would be beneficial to also include test cases where the input is an invalid date string, null, or undefined to ensure that the functions handle these edge cases correctly.

false_positive

Avoid using console.log in production code. It can expose sensitive information and impact performance. Consider using a logging library or service that can be configured to only log in development environments.

true_positive

The 'signInWithGithub' function constructs query parameters from the 'userConfig' object. However, it does not handle the case where 'value' is false or null. This could lead to incorrect query parameters being constructed.

false_positive

The 'UserType' type is extending 'UserUpdatableFieldsType' which could lead to potential issues if 'UserUpdatableFieldsType' is modified in the future. It would be better to define 'UserType' independently to avoid potential issues.

false_positive

Example 7: Filtering Out Non-Actionable Issues

Generated issues can be evaluated to determine whether or not they are actionable. Evaluating the set of issue reports for actionability can comprise using a set of language models to determine the actionability. Determining the actionability of a set of issue reports can be performed by a set of language models comprising prompting the set of language models with the issue report, relevant snippets of the code, and asking the LLM to determine if an issue is actionable. In an example, actionability accounts for (i) whether a software developer can immediately take concrete action to fix an issue in the issue report, (ii) whether fixing the issue in the issue report involves a concise or fast action. Issues determined to be non-actionable can be removed from the set of issue reports.

Some issues detected by the issue detector may not be actionable. For example, if the developer has updated a variable type, the issue detector can ask the developer to verify that all other functions using the variable type have been updated to use the updated variable.

In theory, the developer could go through all other files and look for all instances in the code that the old variable is used. The variable can include items such as renaming or reassignments. In practice, it is time consuming and laborious for the developer to check and change each file where an improper variable is used in the code. Therefore, the issue identified by the issue detector would be considered non-actionable.

Non-actionable issues are frequently labeled by the detector system. Further, the identification of non-actionable issues is universal across programming languages and developer tools. Removing non-actionable issues is important to reduce false-positive issues.

To filter out non-actionable issues, a model was built to classify issues as actionable or non-actionable. To do this, a prompt was created to enforce a set of language models to determine if an issue can be fixed within the same file. FIG. 24A and FIG. 24B provide two examples of identified non-actionable issues. In an example, the following template prompt was developed:

Please review the following issue.

. . .

Here's the relevant code snippet:

. . .

Please tell me if the issue can be fixed by the developer within the same file?

Please explain the steps the developer has to take to fix the issue.

. . .

Please give your answer in the following format:

fixable_within_same_file: true/false how_to_fix issue: explanation confidence: 1-10

If the set of language models outputs that the issue cannot be fixed within the same file, there is a greater probability that the issue is non-actionable. Further, for example, if the explanation that the set of language models outputs directs the developer to look in test cases, or to look at all the locations within the code where a function is defined, the issue can be defined as non-actionable.

To develop an LLM prompt that accurately identifies actionable and non-actionable issues, the set of language models was trained on a data set of 101 issues and on a data set with 162 issues. The datasets were labeled as actionable or non-actionable by human annotators. The following is an example of an actionable issue within the dataset: "The 'parseXMLMarkdown' function is tightly coupled with the 'XMLParser' class from the 'fast-xml-parser' package. This makes it difficult to isolate the function for unit testing. Consider injecting the 'XMLParser' as a dependency to make the function more testable." The following is an example of anon-actionable issue from the dataset: "Great job on checking the scan trigger type before saving the segment event! This ensures that only pull request scans are tracked in the segment events, avoiding unnecessary database operations for other trigger types." The following is another example of a non-actionable issue from the dataset: "The code imports 'pymilvus' which is a third-party library ('from pymilvus import Collection, DataType, connections'). Please make sure that 'pymilvus' is included in the project's dependencies and is installed in the environment where the code will run. If it's not installed, the code will raise an ImportError."

A few shot prompt was developed to analyze these labeled datasets with the following language:

"Your task is to check whether the inputs are actionable or not. You can recognize non-actionable items such as vague descriptions, general remark/observation, and praises without solid easy to-do action it Here are some examples for better understanding Input: The addition of the 'benchmark id' parameter to the 'PullRequestScanner' constructor suggests that this value is being used to track an Output: not actionable Input: The pull request introduces a new database table 'artifact_navigational' and a corresponding SQLAlchemy model 'ArtifactNavigational' to Output: not actionable
Input: I noticed that you've added a new namespace to the API in the 'main.py' file. It's important to ensure that any necessary changes are a
Output: not actionable
Input: The method name '_call' is not descriptive enough. Consider renaming it to 'sendEmail' or something similar to make it clear that this
Output: actionable
Input: The READ_MAIL_TOOL_DESCRIPTION string contains a lot of useful information, but it's currently a large block of text which can be hard
Output: actionable
Input: The variable 'choice' in the constructor of the 'OutlookBase' class could be more descriptive. Consider renaming it to 'authFlowType' t
Output: actionable
you should give an output either as 'actionable' or 'not actionable'"

The prompt was further improved (Prompt 2) upon by adding language to consider additional context:

You are a senior software engineer managing a team of software engineers.
You are reviewing a pull request from a colleague working on a new feature or improvement.
Your colleague will take over and finalize the pull request afterwards, but you want to make sure that they don't waste time and only work on the most important and actionable feedback items. Your task now is to check if each item is actionable or not.
You can recognize non-actionable items such as vague descriptions, general remarks/observations, checking environment configuration, and praises without a solid, easy-to-do action item.
Here are some examples for better understanding
Input: The addition of the 'benchmark id' parameter to the 'PullRequestScanner' constructor suggests that this value is being used to track and manage benchmark data in the database. To ensure proper handling of the 'benchmark_id', please verify that it is being correctly stored and associated with the relevant scan data in the database. Additionally, ensure that the database schema and queries are updated to handle the 'benchmark_id' appropriately and that it is being used consistently throughout the codebase when interacting with the database.
Output: not actionable
Input: The pull request introduces a new database table 'artifact_navigational' and a corresponding SQLAlchemy model 'ArtifactNavigational' to store navigational choices for artifacts. Make sure to create the necessary database migration scripts to add this new table to the schema. Also, verify that the relationships between the 'Artifact' and 'ArtifactNavigational' models are properly configured and thoroughly tested to ensure data integrity and correct behavior when creating, updating, or deleting records.
Output: not actionable
Input: I noticed that you've added a new namespace to the API in the 'main.py' file. It's important to ensure that any necessary changes are also made to the environment configuration files and documentation. This could involve adding any necessary environment variables, updating the API documentation to include the new namespace, and ensuring that any necessary dependencies are installed in the deployment environment. Please make sure these updates are made to avoid any potential deployment or usage issues.
Output: not actionable
Input: I noticed that you're using 'graphqlUrl' from the config in your 'getReadingStreak30Days' and 'getReadingStreak' functions. Please ensure that this URL is correctly configured in your environment and points to the correct GraphQL endpoint. If the endpoint requires any authentication or additional headers, those should also be correctly configured.
Output: not actionable
Input: The method name '_call' is not descriptive enough. Consider renaming it to 'sendEmail' or something similar to make it clear that this method is responsible for sending an email.
Output: actionable
Input: The READ_MAIL_TOOL_DESCRIPTION string contains a lot of useful information, but it's currently a large block of text which can be hard to read. Consider breaking this up into smaller sections with clear headings to improve readability.
Output: actionable
Input: The variable 'choice' in the constructor of the 'OutlookBase' class could be more descriptive. Consider renaming it to 'authFlowType' to better indicate its purpose.
Output: actionable
you should give an output either as 'actionable' or 'not actionable'

The few-shot prompt was further improved (Prompt 3) by adding an improved definition of non-actionable issues:

Your task is to check whether the inputs are actionable or not. You can recognize non-actionable items such as vague descriptions, general remarks/observations, checking environment configuration, and praises without a solid, easy-to-do action item.
You can recognize non-actionable items such as vague descriptions, general remark/observation, and praises without solid easy to-do action item.
You can also recognize non-actionable items as descriptions containing 3 or more to-do steps or requiring the human to go over multiple files or settings.
Here are some examples for better understanding
Input: The addition of the 'benchmark_id' parameter to the 'PullRequestScanner' constructor suggests that this value is being used to track and manage benchmark data in the database. To ensure proper handling of the 'benchmark_id', please verify that it is being correctly stored and associated with the relevant scan data in the database. Additionally, ensure that the database schema and queries are updated to handle the 'benchmark_id' appropriately and that it is being used consistently throughout the codebase when interacting with the database.
Output: not actionable
Input: The pull request introduces a new database table 'artifact_navigational' and a corresponding SQLAlchemy model 'ArtifactNavigational' to store navigational choices for artifacts. Make sure to create the necessary database migration scripts to add this new table to the schema. Also, verify that the relationships between the 'Artifact' and 'ArtifactNavigational' models are properly configured and thoroughly tested to ensure data integrity and correct behavior when creating, updating, or deleting records.

Output: not actionable
Input: I noticed that you've added a new namespace to the API in the 'main.py' file. It's important to ensure that any necessary changes are also made to the environment configuration files and documentation. This could involve adding any necessary environment variables, updating the API documentation to include the new namespace, and ensuring that any necessary dependencies are installed in the deployment environment. Please make sure these updates are made to avoid any potential deployment or usage issues.
Output: not actionable
Input: I noticed that you're using 'graphqlUrl' from the config in your 'getReadingStreak30Days' and 'getReadingStreak' functions. Please ensure that this URL is correctly configured in your environment and points to the correct GraphQL endpoint. If the endpoint requires any authentication or additional headers, those should also be correctly configured.
Output: not actionable
Input: The method name '_call' is not descriptive enough. Consider renaming it to 'sendEmail' or something similar to make it clear that this method is responsible for sending an email.
Output: actionable
Input: The READ_MAIL_TOOL_DESCRIPTION string contains a lot of useful information, but it's currently a large block of text which can be hard to read. Consider breaking this up into smaller sections with clear headings to improve readability.
Output: actionable
Input: The variable 'choice' in the constructor of the 'OutlookBase' class could be more descriptive. Consider renaming it to 'authFlowType' to better indicate its purpose.
Output: actionable
you should give an output either as 'actionable' or 'not actionable'

Figure 25:
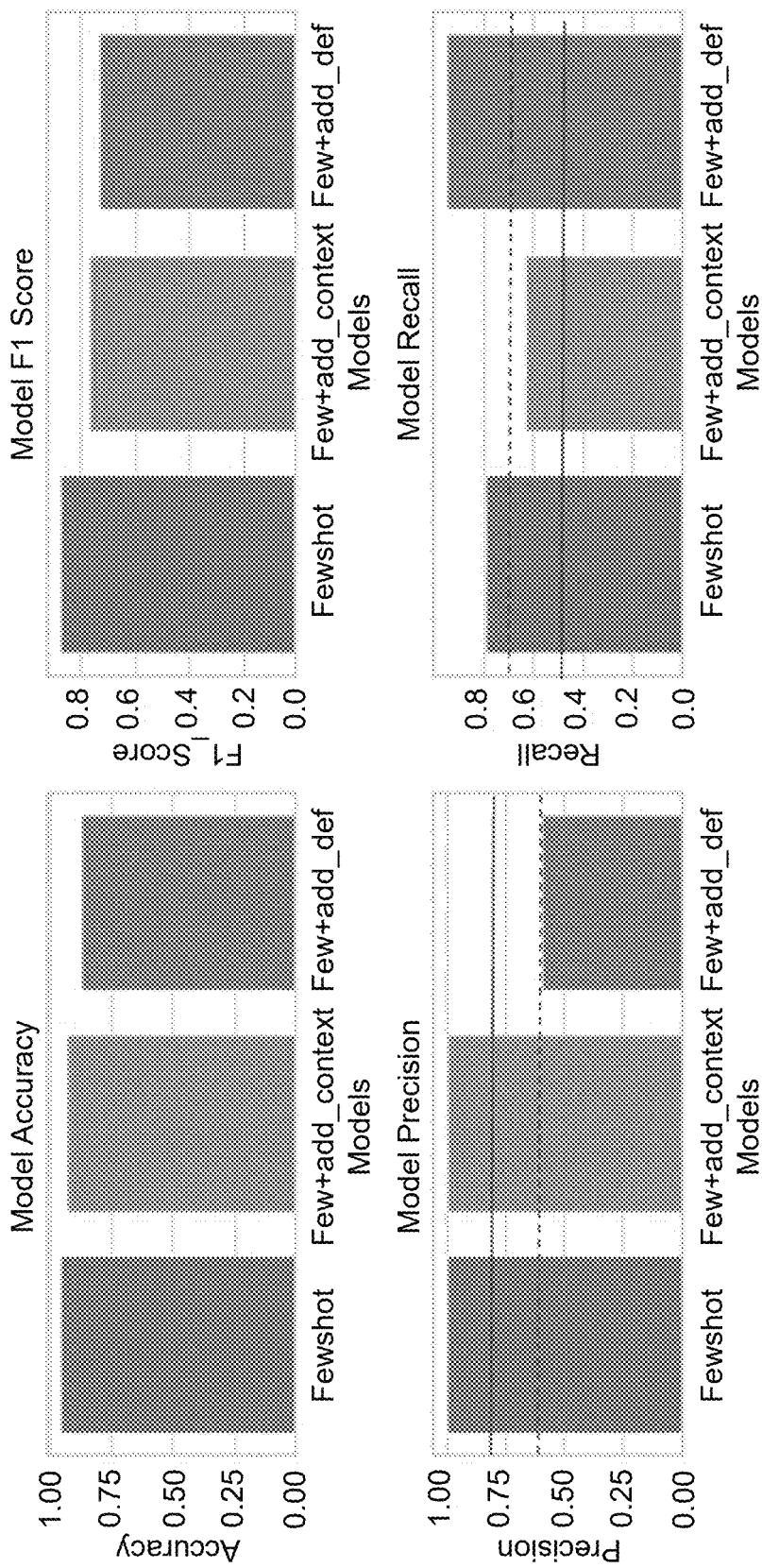
FIG. 25 provides results of using few-shot prompts to detect and filter non-actionable issue reports.

The results of using the fewshot prompts are described in FIG. 25. The results indicate that Prompt 1 (Fewshot) performs better than Prompt 2 (Fewshot+add_context) and Prompt 3 (Fewshot+add_def) across accuracy, precision, and model F1 score for detecting non-actionable issues. Prompt 3 performs the best in model Recall. Recall was measured by assessing the number of true-positive non-actionable issues identified out of all issues labeled as non-actionable by the set of language models. Precision was measured by assessing the number of true-positive non-actionable issues identified out of true-positive non-actionable issues identified plus false-positive non-actionable issues.

The experiment was repeated using Prompts 1-3 on a larger data set of 93 actionable issues and 69 non-actionable issues.

The results of this experiment are summarized in Table 12.

TABLE 12

| Prompt | Accuracy (%) | F1 Score | Precision (%) | Recall | Confusion Matrix |
|---|---|---|---|---|---|
| Prompt 1 | 95.67 | 0.949 | 95.59 | 0.942 | [90 3] [4 65] |
| Prompt 2 | 93.21 | 0.916 | 96.77 | 0.869 | [91 2] [9 60] |
| Prompt 3 | 85.80 | 0.855 | 75.56 | 0.986 | [71 22] [1 68] |

FIG. 28 provides data indicating which issue categories actionable and non-actionable issues were identified in.

Example 8: Issue Resolution Detection

The ability to understand whether an issue has been resolved is critical for analyzing user behavior and to develop an understanding of coding standards, project requirements and user preferences. For example, if a user repeatedly fixes one type of issue, but ignores another type of issue, that information will inform the system to make better recommendations in the future. In addition, engineering managers can want insights into what issues have been found, and which issues developers fixed. Collecting data about whether issues are resolved or unresolved allows for analysis by a recommender to improve prediction accuracy on whether a detected issue is resolvable or unresolvable.

To develop the ability to detect resolved or unresolved issues, a set of language models was prompted to analyze a dataset. The dataset comprised 179 issues in the programming language Python, and 14 issues in the programming language JavaScript/TypeScript. This dataset was biased with selection of about half of the issues within the dataset being known resolved issues.

In a first approach, the set of language models was instructed to compare source code before and after changes to the code. Specifically, the set of language models was prompted to detect if an identified issue had been solved, and was given context for the identified issue. The context comprised the pull request title, the pull request summary, the issue code snippet, the issue description, the path to the file containing the issue, the source code in the pull request before changes to the code occurred, and the source code in the pull request after changes to the code occurred.

The following language is an example of the LLM prompt (Prompt 1):

"You are a senior software engineer working with a team of software engineers.

"I am a developer on your team. A while ago, I submitted a pull request for you to review on GitHub. When you reviewed my pull request, you found a serious issue. You explained the issue to me and asked me to fix it on GitHub. I later finalized my pull request and merged it. Your task now is to review the changes in my pull request and determine whether I actually fixed the issue or not.

You will be provided with the following pieces of information about the commit:
Pull request title
Pull request summary
Issue code snippet
Issue description
Path to file containing issue
Source code before changes in pull request (this is the original source code from the file when the issue was found)
Source code after changes in pull request (this is the final source code from the file in which the issue was found at the time the pull request was merged) Please pay attention to changes in syntax and indentation level.

Please output the following: a true or false answer indicating if the issue was actually fixed, your explanation in natural language for why the issue was fixed or not fixed, and your confidence in determining this on a scale 1-10 (where 1 means you have zero confidence in your answer, 5 means you have a mediocre level of confidence in your answer, and 10 means you have the highest level of confidence in your answer).

Please return your output in JSON format with the following keys:
 was_issue_fixed: True or false,
 explanation: The reason why you determined the issue was fixed or not,
 confidence: 1-10

This prompt was improved by removing the suggested change from the issue description, if such a suggestion existed (Prompt 2). In some cases, the suggested change caused the set of language models to interpret that an issue had been resolved, even when it had not. To fix this issue, the following language was added to the prompt: "An issue is fixed if the problem mentioned in the issue description no longer exists in the source code file or the code is updated as explained in the issue description."

In a second approach (Prompt 3), input context was reduced in order to improve set of language models accuracy. To do this, the set of language models was first prompted to check if a detected issue could be resolved within a function or class. If the issue could be resolved, the set of language models was prompted to find the name of that function or class. The set of language models was then prompted to use the name of the function or class to extract the code for that function or class from the source code files before the code was changed, and to extract the code for that function or class from the source code files after the code was changed. If the issue could not be resolved within a function or class, the set of language models was prompted detect if the issue had been resolved. If the issue was found to be resolvable within a function or class, the set of language models was prompted to only use the code for that function or class. If the issue was found to not be resolved within a function or class, the set of language models was Prompted to use the entire source code file.

Figure 26:
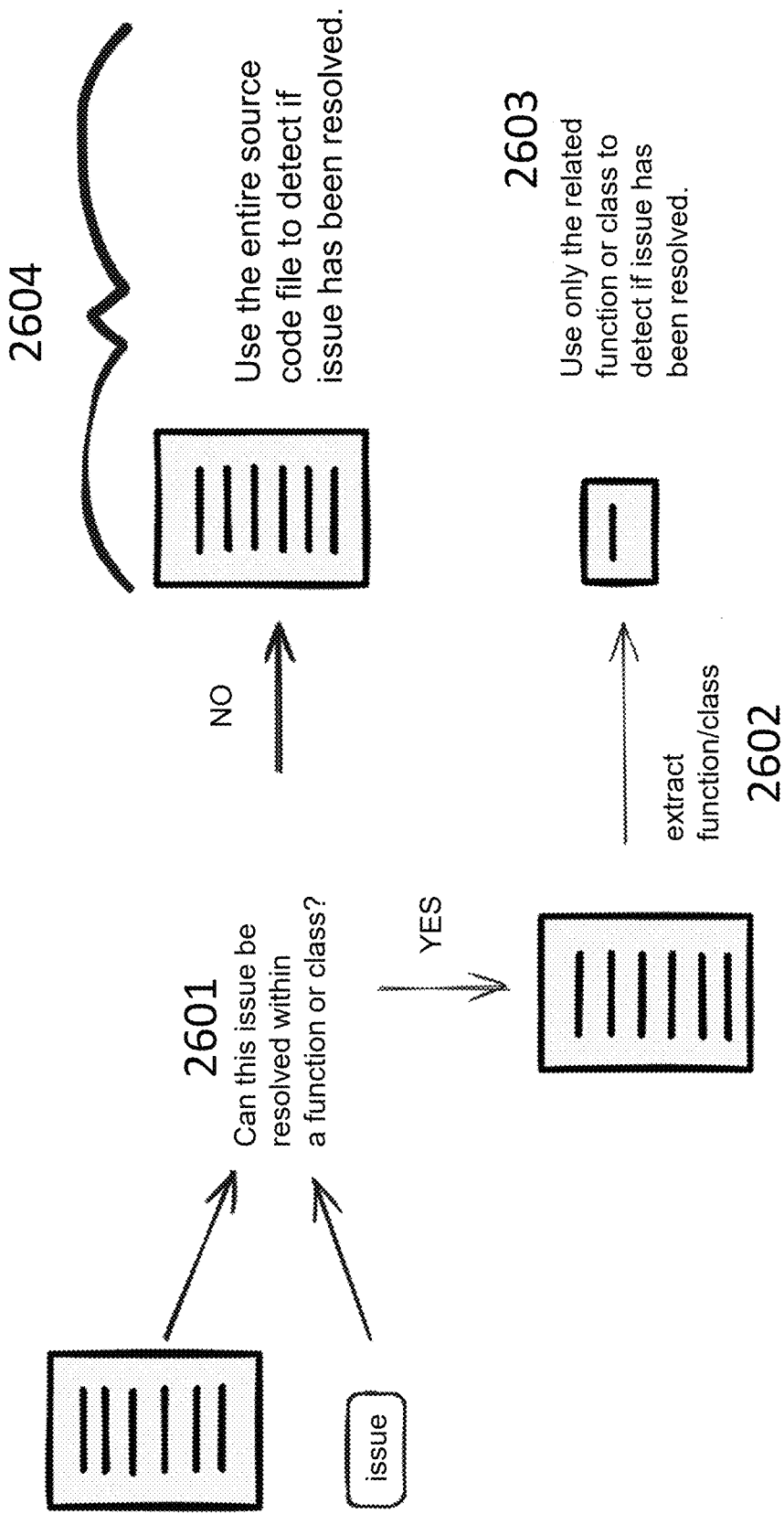
FIG. 26 illustrates an example workflow to detect issue report resolution.

In an example, Prompt 3 is described in FIG. 26. First, the set of language models can determine if an issue can be resolved within a function or class 2601. If the set of language models determines the issue is resolvable, the set of language models will extract the code from that function or class 2602. The set of language models can then only use the code related to the function or class to detect if the issue has been resolved 2603, which occurs in about 93% of cases in the dataset analyzed. If the set of language models determines that the issue cannot be resolved within a function or class, the set of language models can extract the entire source code file to detect if the issue has been resolved 2604.

In an example, Prompts 2 and 3 were used to analyze the following detected issue, an issue which the human annotator determined was not resolved: "The method '_store_llm_input' has been significantly modified. It now includes a large number of parameters, which can make the method difficult to understand and maintain. Consider refactoring this method to reduce its complexity, possibly by breaking it down into smaller, more manageable methods."

Prompt 2 responded to this issue with the following explanation: "The issue was about the '_store_llm_input_output' method having too many parameters, making it difficult to understand and maintain. In the updated code, the number of parameters for this method has been reduced, which makes the method simpler and easier to understand. Therefore, the issue has been fixed." Prompt 3 responded to this issue with the following explanation: "The issue was about the method '_store_llm_input output' having too many parameters, making it difficult to understand and maintain. The developer was asked to refactor this method to reduce its complexity. However, in the updated code, the method still has a large number of parameters. Therefore, the issue has not been fixed."

In another example, Prompts 2 and were used to analyze the following detected issue, an issue which the human annotator determined was not resolved: "The 'org_config.yaml' file is loaded without any validation of its content. If the file contains unexpected data, it could lead to errors later in the application. Consider validating the content of the file after loading it. "Prompt 2 responded to this issue with the following explanation: "The issue was about validating the content of the 'org_config.yaml' file after loading it. In the updated code, the loaded configuration is passed to the ConfigModel which is a Pydantic model. Pydantic models perform data validation, so this change effectively adds validation to the loaded configuration data. Therefore, the issue has been fixed." Prompt 3 responded to this issue with the following explanation: "The issue was about validating the content of the 'org_config.yaml' file after loading it. In the updated code, the file is still being loaded without any validation of its content. The changes made in the pull request do not address the issue described."

Table 13 provides data for baseline LLM prompting, Prompt 1, Prompt 2, and Prompt 3 for accurately detecting resolvable or unresolvable issues within a set of 179 annotated issues in the programming language Python. Both accuracy and precision were improved with iterations of the prompt compared to Prompt 1 and the Baseline method. Accuracy is the percentage of time an issue was classified correctly as either being resolved or not resolved. Precision is the percentage of time an issue was classified as being resolved when it was actually resolved.

TABLE 13

| Prompt | Accuracy | Precision |
| --- | --- | --- |
| Baseline is_outdated tag, which is an output provided by the Github API indicating whether the code snippet related to the issue had undergone a modification (for example, lines were changed) | 78.2% | 57.3% |
| Prompt 1 Initial prompt in which the entire source code fils for all issues was analyzed | 76.0% | 57.4% |
| Prompt 2 Suggested change removed from issue description Added: An issue is fixed if the problem mentioned in the issue description no longer exists in the source code file or the code is updated as explained in the issue description | 82.7% | 66.7% |
| Prompt 3 | 89.4% | 82.0% |

TABLE 13-continued

| Prompt | Accuracy | Precision |
|---|---|---|
| Chain of 3 prompts where issue is determined to exist within a function or class, the source code of relevant function or class is extracted (if applicable), and to use the function or class as a source code file | | |

Table 14 provides data for baseline LLM prompting and Prompt 3 for accuracy and precision on a second, smaller dataset of 14 annotated issues in the programming language JavaScript/TypeScript (JS/TS). It was important to evaluate the method on another programming language to ensure generalization across programming languages and tools. Both accuracy and precision were improved with iterations of the prompt compared to the baseline prompt.

TABLE 14

| Prompt | Accuracy | Precision |
|---|---|---|
| Baseline is_outdated tag, which is an output provided by the Github API indicating whether the code snippet related to the issue had undergone a modification (for example, lines were changed) | 57.1% | 53.8% |
| Prompt 3 Chain of 3 prompts where issue is determined to exist within a function or class, the source code of relevant function or class is extracted (if applicable), and to use the function or class as a source code file | 92.9% | 87.5% |

Table 15 provides data for the accuracy and precision of using Prompt 3 with GPT-4™ compared to GPT-4-Turbo™ in issue datasets in Python or issue datasets in JS/TS.

TABLE 15

| Prompt | Accuracy | Precision |
|---|---|---|
| GPT-4 ™ with Prompt 3 on Python Issues | 89.4% | 82.0% |
| GPT-4-Turbo ™ with Prompt 3 on Python Issues | 88.9% | 84.4% |
| GPT-4 ™ with Prompt 3 on JS/TS Issues | 92.9% | 87.5% |
| GPT-4-Turbo ™ with Prompt 3 on JS/TS Issues | 78.6% | 83.3% |

Next, baseline prompting, and Prompt 3 were compared to the ability for human annotators to accurately label resolvable or unresolvable issues. Table 16 provides summary data of the performance of human annotators (where the majority of 3 annotators agreed on a label) labeling a dataset of 28 issues, compared to the performance of GPT-4™ with baseline prompting, and GPT-4™ with Prompt 3 on the same set of issues. These data suggest that an ensemble of human annotators only perform marginally better than GPT-4™ with Prompt 3.

TABLE 16

| Prompt | Accuracy |
|---|---|
| Baseline, is_outdated tag, which is an output provided by the Github API indicating whether the code snippet related to the issue had undergone a modification (for example, lines were changed) | 78.2% |
| GPT-4 Prompt 3 | 89.4% |
| Human Annotators | 92.9% |

In another example, a set of language models can be asked to prepare summaries of the source code before and after pull requests. The set of language models can then be asked to identify the changes in the summaries of the source code. This information, combined with the feedback on the issue, can improve accurate identification of whether an issue has been resolved. In an example, the set of language models is provided with a first prompt to generate summaries from a set of information comprising: the title of the pull request, the description of the pull request, the file path, and the source code. Next, the set of language models is provided with a second prompt to identify changes in the summary of the source code after the pull request and is provided with a set of information comprising: the pull request title, the pull request description, the file path, the summary before the changes, and the summary after the changes. Last, the set of language models is prompted to check resolution between the two summaries, and is provided with a set of information comprising: the summary before the changes, the summary of changes, the code diff, and feedback on the issue.

Table 17 provides a summary of the results of the prompting technique to identify resolvable or unresolvable issues by comparing the summaries of the source code before and after pull requests. This method performed substantially worse than Prompt 3.

TABLE 17

| Prompt | Accuracy | Precision |
|---|---|---|
| GPT-4 ™ with prompt making summaries of the whole source code | 62% | 45% |
| GPT-4-Turbo ™ with Prompt 3 on Python Issues | 73% | 55% |
| GPT-4 ™ with Prompt 3 on JS/TS Issues | 82% | 64% |
| GPT-4-Turbo ™ with Prompt 3 on JS/TS Issues | 87% | 77% |

Example 9: Multi-File Issue Detection Pipeline

An issue can be considered a multi-file issue if a human or machine reviewer reviewing a single file cannot identify the issue within the code without having access to other files in the code repository. Multi-file issues can comprise functionality issues, code design issues, performance issues, database issues, security vulnerabilities, and others.

An example of an identified multi-file issue is as follows, where "oracle_db_api" module is an different file from the functions "app_id_form_source_data" and "installation_id_form_source_data":

The 'put_organization_app' function in the oracle_db_api module expects 'app_id' and 'installation_id' to be strings, but the 'app_id_form_source_data' and 'installation_id_form_source_data' functions are returning integers. This type mismatch could lead to runtime errors when the 'put_organization_app' function is called.

Figure 27:
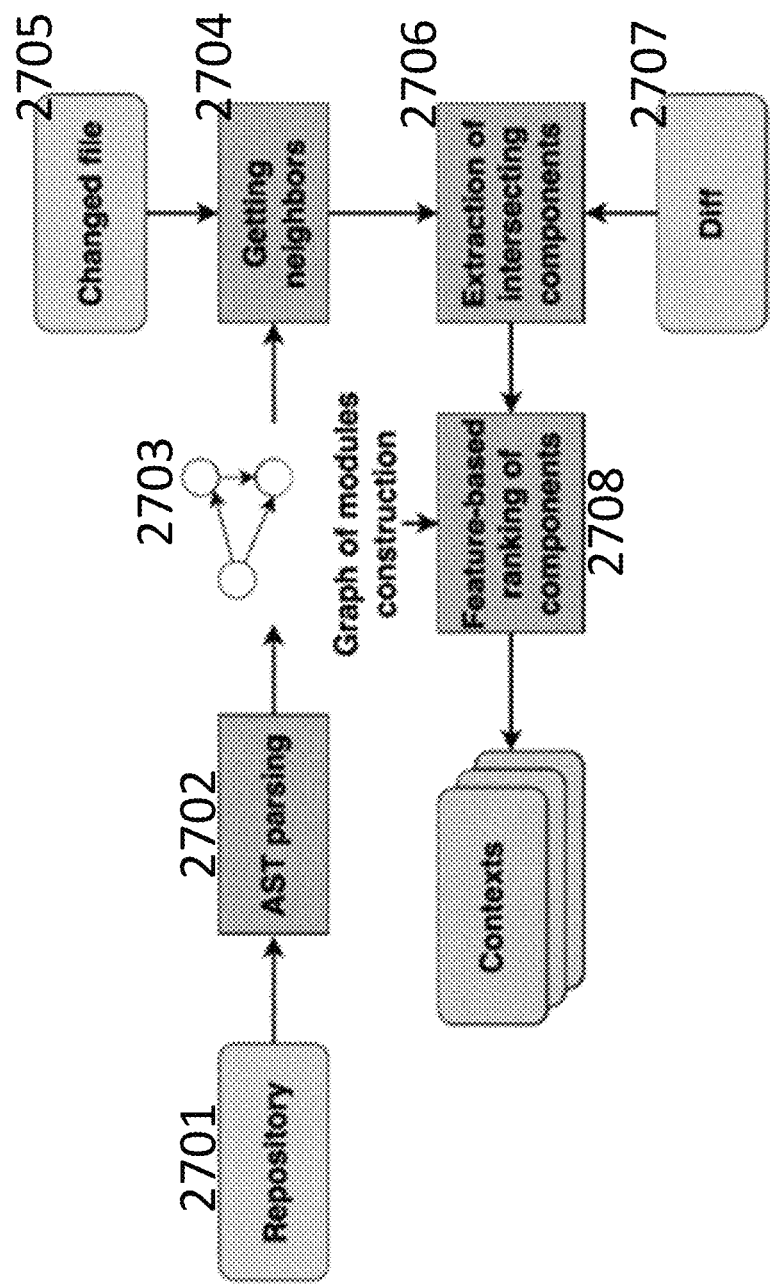
FIG. 27 illustrates a general pipeline to detect multi-file issues.

A general pipeline designed specifically to detect multi-file issues is described in FIG. 27. In this pipeline context is extracted, wherein the context can include pull request files, and information from a code repository. The extracted context files are used to detect a multi-file issue.

In an example described in FIG. 27, context can be extracted from changes in the pull request files, changes between the content in a source branch and the content in a target branch in a pull request (PR diff), and information from a code repository. Files of code within a repository 2701 can be parsed to generate a structural representation of the code. Parsing can include abstract syntax tree generation 2702. Abstract syntax tree parsing can construct a directed graph of modules within the code 2703. The directed graph of modules within the code can be used to identify first-level 2704 and second-level neighbors 2704 of a current changed module or file from the graph. Module neighbors can also be identified from changes in the files of the code 2705. First-level and second-level neighbors can be predecessors, wherein a current module depends on these modules. First-level and second-level neighbors can be successors, wherein a current module affects or depends on these modules. Next, a search can be performed to identify matching or intersecting components 2706 between a PR diff 2707 and a neighbor 2704. Matching or intersecting components can comprise classes within the code, functions within the code, or global variables within the code. The components can be ranked on different features representing their location in the graph and connections 2708. The features can comprise betweenness centrality, degree centrality, and type of context. Betweenness centrality measures the extent to which a node lies on the shortest paths between other nodes. Betweenness centrality can capture how often a node acts as a bridge along the shortest path between two nodes. Components that frequently act as bridges in the dependency path are critical for the flow of data and control within the system, and can be prioritized through ranking. Degree centrality measures the number of direct connections or edges a component has. Components with higher degrees and components that have many dependencies can be ranked higher. Degrees can be in-degree and out-degree. Type of context can include whether the component is a first-level predecessor, a first-level successor, a second-level predecessor, or a second-level successor. Components can be ranked higher if they are a first-level predecessor, followed by first-level successors, followed by second-level predecessors, and finally second-level successors.

LLM prompting can also be used to detect relevant context for multi-file issues. The following language is an example of an LLM prompt used to detect multi-file issues by identifying if a piece of context code is relevant to a target code:

You are given two parts of code to review:
Target Code: This part includes the code for a changed class or function from a pull request.
Context Code: This part includes the code of a class or function that affects or is affected by the changes made in the target. Your task is to analyze both parts of the code and evaluate how impactful, influential, and important the context code (the second snippet) is to the changes represented in the target (the first snippet).
Consider the following aspects in your evaluation:
Dependency: How strongly does the functionality of the target depend on the
context code?
Impact: How significant are the changes in the target on the behavior or
performance of the context code?
Importance: How crucial is the context code in the overall system, especially in
relation to the changes in the target?
Based on your analysis, provide a single numerical rating from 1 to 5, where:
1 means the context code has minimal or no impact, influence, or importance on
the changes in the target.
5 means the context code is highly impactful, influential, and crucial to the
changes in the target.
Please output only the number corresponding to your evaluation.

An LLM can also be used to detect inconsistencies within code. Different parts of code can be consistent or inconsistent in their expectations on functionality. Expectations of a function can be approximated from its summary using a set of language models. To do this, a set of language models can be prompted to summarize what a certain function (Function A) is expected to do. The set of language models can be prompted to summarize what another function (Function B), which uses Function A, expects from Function A. The set of language models can then use both summaries and can be prompted to detect discrepancies, bugs, problems, or missing cases between the two functions. Therefore, using dependency parsing with context extraction may be a better model for detecting multi-file issues than using a set of language models agent.

Multi-file issues can occur when there are changes made in the file of the code. Therefore, files with new functions used in the PR diff and files that have new import can be reviewed for multi-file issues. In an example, a set of language models can be given the content and PR diff of the source file and asked to find issues. If the functions or classes in the context were changed in the pull request, the PR diff representations can be used as well. In an example, the set of language models can be GPT-4-Turbo™. As an example, the set of language models can be prompted using the following language:

Imagine that you are imitating humans doing code review of a Pull Request. At each stage, you can see the changes made to the code in one file by a diff and see the relevant context from other files. You need to check if the current changes cause issues related to the integration of the new code with the existing codebase (context you are given).
Information about the pull request:
Title: (pr_title)
Description: (pr_description)
Code file path: (file_path)
Code File Content:
(content file)
Pull Request Diff of the code file:
(pr_diff)

Context (some code snippets from the repository that are relevant to the diff): (code snippets)
(Current Changes Identification)
Firstly, think about what the current changes in the file are.
(Relevant Context Analysis)
Secondly, analyze the context from other files you are given.
(Issues Identification)
Then, based on your analysis, identify issues in the diff given the context. Structure the output as valid json like:
{{
"Summary": {{
"diff_summary": "A summary of the pull request diff",
}},
"Issue 1": {{
"reasoning": "Some explanation on why you think this is an issue",
"feedback": "Instructions on how to fix the issue, e.g., 'Correct the function to . . . '",
"misconception": "some misconception",
"category": "some category",
"code_snippet_from_diff": "a=MyClass(b)",
"context_file_path": ["path/to/file.py"] // list with path (or several paths) to the file where the relevant context is found,
"code_snippet_from_context": Class MyClass:", // relevant code snippet from the context file
"confidence": 10,
"priority": 8,
"learning required": true,
}},
. . .
To be successful, it is important to follow these rules:
Refrain from providing feedback on renaming.
Give feedback only for 'multi-file' issues, i.e., issues that could not be detected by looking at the diff alone.
In the 'code_snippet_from_diff' and 'code_snippet_from_ _context' fields, provide the connected code snippets where the issue is detected.
Avoid generic suggestions. Provide specific feedback on specific issues found.
Do not provide feedback based on the PR description alone, as you do not see other files in the PR.
Do not comment on error handling or testing. Focus on serious existing code issues.
Never provide feedback that something is not in the context, because the context is a very small part of the repository.
In the 'reasoning', explain how the issue is actionable and why it is important to fix it.
If there are no 'multi-files' issues found, just output an empty JSON dictionary.
Let's think step by step. For each issue add your reasoning to the field 'Reasoning'. Your response:

After the model has output the name of the content file and the code snippet where each issue can be found, the set of language models can filter out hallucinations. The set of language models can filter out hallucinations by ensuring that the file name is different than the source file, and that the code snippet exists in the specified file. The techniques provided in Example 3 on filtering hallucinations with a set of language models, Example 4 on ranking issues by novelty, Example 5 on filtering similar issues, Example 6 on issue semantic deduplication, and Example 7 on filtering non-actionable issues can also be applied to increase the quality of the detected issues.

The set of language models can then perform a self-evaluation process on generated issues based on nine categories. The nine categories comprise "issue_valid", wherein a valid multi-file issue is detected, "could_not_be_ _detected_by_diff_alone", wherein the issue could not be detected by looking at the PR diff alone, "is_specific_an- d_actionable", wherein an issue is evaluated to be specific and actionable, "does_not_rely_on_pr_description", wherein an issue does not rely on the PR description for validation, or "pr_description_reliant" if the issue does rely on the PR description, "is_not_about_error_handling_or_t- esting", wherein the issue is not related to error handling or testing, "confident_in_issue_without_whole_context", wherein the issue is detected without evaluating the entire context of the code, "not_about_absent_context", wherein the issue is not related to missing context, "not_about_pars- ing_parameters", wherein the issue is not related to parsing during the initialization of a function or class, and "real_is- sue", wherein an issue breaks the code, or "potential_issue", wherein the issue can break the code.

The following prompt language is an example of the self-evaluation process:

Imagine you are assisting in code reviews of Pull Requests. At each stage, you can see the code changes in one file (via a diff), relevant context from
other files, and a review written by a human. Your task is to determine if
the found issues are valid 'multi-file' issues. 'Multi-file' issues are those that cannot be detected by looking at the diff alone.
Source code file:
"'
{content file}
Relevant code snippets from the repository:
{context}
Review:
{review}
(Current Changes Identification)
First, analyze the source code file.
(Relevant Context Analysis)
Second, analyze the context from the provided code snippets.
(Potential Issues)
Then, based on your analysis, determine which issues are valid 'multi-file'
issues and which are not.
Structure the output as valid JSON:
{{
"Issue 1": {{
"feedback": "Your feedback on the found issue",
"issue_valid": "valid_multifile_issue" or "invalid_multi- file_issue", //
valid_multifile_issue if the issue is a valid 'multi-file' issue
"confidence": 10, // your confidence in the issue
"priority": 8, // how important it is in your opinion to fix this issue
"could_not_be_detected_by_diff_alone": "not detectable by diff" or
"detectable_by_diff", // not_detectable_by_diff if the issue could not be detected by looking at the diff alone
"is_specific_and_actionable": "specific_and_actionable" or
"not_specific_and_actionable", // specific_and_action- able if the issue is specific and actionable "does_not_rely_on_pr_description": "context_based" or "pr_description_reliant", // context_based if the issue does not rely on the PR description for validation, pr_description_reliant if it does "is_not_about_error_handling_or_testing":

"not_about_error_handling_or_testing" or "about_error_handling_or_testing", // not_about_error_handling_or_testing if the issue is not about error handling or testing "confident_in_issue_without_whole_context": "confident_without_full_context"

or "not_confident_without_full_context", //confident_without_full_context if you are confident in the issue without seeing the whole context "not_about_absent_context": "context_present" or "context_absent", // context_present if the issue is not about something being absent in the context

"not_about_passing_parameters": "not_about_parameter_passing" or

"about_parameter_passing" // not_about_parameter_passing if the issue is not about parameter passing during the initialization of a function or class "real_issue": "real_issue" or "potential_issue" // real_issue if the issue is a real issue that breaks the code, potential issue if the issue is a potential issue that might break the code

}},

"Issue 2": . . .

}}

After the self-evaluation process, issues that have at least one false criterion can be rejected. Identified issues can then be classified into categories. An actionability prompt can then be used to determine if each remaining issue is actionable. Non-actionable issues can be rejected.

The following is an example of the output from the self-evaluation process for detecting multi-file issues:

{

"reasoning": "The new script defines an LLMRunner instance with a hardcoded model 'gpt-4-1106-preview', which may not be consistent with the model selection logic defined in the LLMRunner class from the context. The context indicates that the model could be dynamically selected based on the estimated token count, which is not considered in the new script.", "feedback": "Refactor the LLMRunner instantiation in the new script to use the model selection logic as defined in the LLMRunner class to ensure consistency and proper model usage based on token count.", "code_snippet_from_diff": "model=\"gpt-4-1106-preview\",", "context_file_path": [

"code_analysis/core/langchain_util/llm_runner.py"

],

"code_snippet_from_context": "model=\"gpt-4-1106-preview\" if estimated_token_count>config.gpt4_model_swap_threshold else '\gpt-4\'"", "feedback_on_review": "Refactor the LLMRunner instantiation in the new script to use the model selection logic as defined in the LLMRunner class to ensure consistency and proper model usage based on token count.", "confidence_of_eval": 10, "priority_of_eval": 8, "category": "Design Patterns"

}

The following is an example of the output from the multi-file issue detection pipeline:

{

"reasoning": "The new function 'get_bitbucket_secret_for_workspace_slug' contains a typo in the field name used to filter the 'BitbucketInstallationSecret' objects. The field name should be 'workspace_slug' as defined in the 'BitbucketInstallationSecret' model, but the diff shows 'workspacE_slug' with an uppercase 'E', which will cause an 'AttributeError' at runtime.", "feedback": "Correct the typo in the field name from 'workspacE_slug' to 'workspace_slug' to match the field definition in the 'BitbucketInstallationSecret' model.", "misconception": "The developer might have overlooked the case sensitivity of the field names in Django ORM queries.", "category": "Runtime Error", "code_snippet_from_diff": "return models.BitbucketInstallationSecret.objects.get (workspacE_slug=works pace_slug)", "context_file_path": [

"integrations/bitbucket/models.py"

],

"code_snippet_from_context":

"workspace_slug=models.CharField(max_length=512, null=False, blank=False, unique=True)", "confidence": 10, "priority": 10, "learning_required": true

}

The multi-file issue detection pipeline can also provide suggestions, without identifying issues. The following output is an example where the self-evaluation process provides a suggestion:

{

"reasoning": "The refactoring changes the way LLM runners are accessed by using new getter methods. It is important to ensure that these getters are correctly implemented and return the expected types, as the rest of the code depends on these runners to function properly. If the getters do not return the correct types or are not implemented correctly, it could lead to runtime errors or incorrect behavior in the PR reviewers.", "feedback": "Verify that the new getter methods such as 'get_sequential_llm_runner_for_prs_w_coding_practices', 'get_code_suggestion_filterer', 'get_category_assigner', and 'get_code_evaluator' in the 'baseline_llm_runners', 'multi_file_one_shot_pr_reviewer', 'one_shot_pr_reviewer', and 'code_style' modules are implemented correctly and return the expected LLMRunner instances.", "code_snippet_from_diff":

"llm_runner=one_shot_pr_reviewer.get_sequential_llm_runner_for_prs_w_coding_practices( )", "context_file_path": [

"code_analysis/core/langchain_util/llm_runner_instances/one_shot_pr_reviewer.py"
],
"code_snippet_from_context": "+def get_sequential_llm_runner_for_prs_w_coding_practices( ):",
"feedback_on_review": "The feedback is valid. The new getter methods such as 'get_sequential_llm_runner_for_prs_w_coding_practices', 'get_code_suggestion_filterer', 'get_category_assigner', and 'get_code_evaluator' need to be verified to ensure they return the expected LLMRunner instances. This is crucial as the rest of the code depends on these runners to function properly.",
"confidence_of_eval": 10,
"priority_of_eval": 8,
"category": "Readability and Maintainability"
}

Although the multi-file issue detection pipeline was designed specifically to detect multi-file issues, it can also provide a suggestion related to a single-file issue, or detect a single-file issue. The following output of the multi-file issue detection pipeline provides an example of a single-file issue:
{
  "reasoning": "The 'testere' method in the StripeClient class is retrieving a hard-coded customer ID 'cus_O-QBWdAHiZfCIyc'. This is not scalable or practical for a live system where customer IDs will vary and should not be hard-coded.",
  "feedback": "Modify the 'testere' method to accept a customer ID as a parameter and retrieve the corresponding Stripe customer. ",
  "code_snippet_from_diff": "customer=StripeClient( ).testere( )",
  "context_file_path": [
    "stripe_api/core/stripe_client.py"
  ],
  "code_snippet_from_context": "+def testere(self):\n+ return stripe.Customer.retrieve(\"cus_OQBWdAHiZfCIyc\")",
  "feedback_on_review": "Modify the 'testere' method to accept a customer ID as a parameter and retrieve the corresponding Stripe customer.",
  "confidence_of_eval": 10,
  "priority_of_eval": 8,
  "category": "Readability and Maintainability"
}

The multi-file issue detection pipeline was run on a set of pull requests in the programming language Python. The set of pull requests contained 56 pull requests. Of the 56 pull requests, 14 passed the first step, wherein the model identified an issue given the content and diff of the source file, and the context of the source file. The set of language models performed 78 calls throughout the pipeline. In total, 5 issues were found, wherein 3 issues were determined to be valid issues. The pipeline was also run on a set of merged PRs. The set of merged PRs contained 55 PRs. Of the 55 PRs, 12 passed the first step, wherein the model identified an issue given the content and diff of the source file, and the context of the source file. The set of language models performed 73 calls throughout the pipeline. In total, 6 issues were found, wherein two issues were determined to be valid issues.

The results of testing the self-evaluation pipeline reveals that post-processing steps are able to reduce noise and improve relevance of detected issues. The choice of language model can also impact the quality of issue detection. For example, GPT-4-Turbo™ performs better for the first review step, wherein the content and diff of the source file, and the context of the source file are used to detect issues. On the other hand, GPT-4o™ is more accurate when used for the evaluation and actionability steps. Prompting the model to provide reasoning improves the accuracy of issue detection. Reviewing files that use new functions or imports improves the ability to prioritize files that are more likely to have multi-file issues, and reduces the detection of invalid issues. Using the diff for review and raw content for evaluation steps prevents mistakes related to context misinterpretation. The pipeline generates fewer issues based on the successor context.

Example 10: Functionality Issue Generation

Categorizing issues into a functionality category improves identification of issues. In an experiment, GPT-4-Turbo™ was used to evaluate a dataset of n=310 issues. A functionality category definition was incorporated into the category selection prompt as follows: "–Functionality: the execution of the code, using the context of the file contents and variable names to ensure that the code matches the intended intent of the developer". After adding this language, GPT-4-Turbo™ selected functionality as a top-3 issue for 243 out of the 310 evaluated issues (78.4%). Table 18 summarizes the frequency of top-3 selected categories for this experiment.

TABLE 18

Frequency of Top-3 Selected Categories with Functionality Category

| Category | Frequency |
| --- | --- |
| Error Handling | 299 |
| Security | 104 |
| Logging | 38 |
| Functionality | 243 |
| Tests | 130 |
| Database Operations | 70 |
| Performance | 42 |
| Asynchronous Processing | 3 |
| Readability and Maintainability | 1 |

In order to improve the amount of issues categorized in the functionality category, the language defining functionality was improved as follows: "–Functionality: Ensuring that the software behaves as expected and meets the specific requirements. This involves verifying that all features work correctly, edge cases are handled appropriately, and user interactions produce the intended outcomes. Additionally, it includes checking that functions, classes, and algorithms perform as intended, return correct values, and integrate well with other systems and components they need to interact with." Using this language improved the number of issues that GPT-4-Turbo™ categorized into the functionality category (85.6%).

Example 11: Recommender System

Some issues surfaced by the methods disclosed herein may not be fixed if fixing the issue does not align with an organization or user's priorities or goals, or contradicts the organization or user's requirements and coding standards. Further, in some cases, fixing an issue can provide little value if the issue is a minor issue, or if fixing the issue takes more time than it benefits the user. User code often lacks documentation, coding guidelines, or coding standards, making it challenging to use language models to determine why some users leave issues unfixed. To solve this, past issues and user feedback can be leveraged to improve the performance of the recommender to output issues that a user will be motivated to resolve. Increasing issue resolution is a metric that can indicate that fixing the detected issue provides value to a user.

To increase the quality of issue recommendations, the set of language models can be prompted to evaluate issues and output an Issue Quality Index (IQI). The IQI can be used to represent the "overall score" of an issue between 0-1 (where higher can indicate better, and 0 can indicate worse issues to filter out). The IQI definition can be applied to each issue after removing duplicates (e.g., applying semantic deduplication). Evaluating the IQI after removing duplicates can save computational resources.

Some specific examples of applying the IQI are provided. An IQI of 0 can be assigned if the issue is either 1) classified as a hallucination, 2) classified as non-actionable, 3) classified as out-of-scope, 4) classified as "undetermined" with respect to severity, 5) classified as both "minor" or "nitpick" with respect to severity and classified as not novel with respect to novelty, or 6) if the same issue (or an almost identical issue) exists in 3 other files or more. These criteria apply across almost all organizations, projects and team to help identify and remove low quality issues.

The IQI can also be defined as 0 if (in the last 90 days in the same code repository) 1) there previously exists an identical or almost identical issue in the same repository which was classified as "unresolved" (i.e., not fixed) or received negative feedback (e.g., thumbs down), and 2) there exists no previous identical or almost identical issue in the same repository which was classified "resolved" (i.e., fixed) or received positive feedback. This approach ensures that the system can identify and remove groups of issues which previously received strong negative feedback (e.g. received a thumbs down) while not impacting groups of issues that received any positive feedback (e.g. issues that were fixed or that received thumbs up).

The IQI can also be defined as 0 if the user (e.g., an organization) has added rules or filters that explicitly remove the combination of {category, severity level} to which the issue belongs. For example, customers might configure the system to only show "Major Security" issues, in which case security issues classified as "minor" or "nitpicks" are muted.

The IQI can also be calculated as a linear weighted function of 1) the output from a set of language models estimating the probability or likelihood that an issue will be fixed based on observing similar, historical issues along with their resolution state ("resolved" or "unresolved") and user feedback (thumbs up/down, conversations), where the output is a probability between 0-100, 2) severity level (nitpick, minor, major), 3) number of similar issues found in other files (based on pairwise comparison with a set of language models searching 5-20 other files), 4) number of similar issues generated in current PR (cluster sized based on clusters found by semantic deduplication algorithm), 5) factuality determination ("Factually Accurate" or "Undetermined"), and 6) confidence level outputted by the language model which generated the issue report.

The IQI can then be used to rank the issue in the PR and the system will then surface only the top k issues (e.g., top 5 or top 10 issues) depending on the customer's configuration and type and size of PR.

In summary, the recommender can utilize a score (e.g., IQI) to select a subset of issue reports to the presented to a user. The score can be a composite of various criteria, including those based on (i) a user profile (e.g., user-provided specification, history of a user's interactions with previous issue reports), (ii) filters (e.g., similarity, scope, and other filters disclosed herein), and (iii) other metadata outputted by the set of language models generating or evaluating issue reports (e.g., confidence level).

In an example, the set of language models can calculate one component of the IQI by estimating the probability that an issue will fixed by the user based on the issue report and most similar, historical issues (for example, the 20 most similar issues in the last 90 days from the same code repository) along with their resolution state ("resolved" or "unresolved") and user feedback on each (thumbs up/down, conversations) using the following prompt:

You are assisting a code reviewer to complete their pull request (PR) review.

The code reviewer has raised many issues in the PR, but the team may not want to address all of them.

Your job is to go through each issue to determine if the team would address them.

You will be given a summary of the current PR together with the new issue raised by the code reviewer (including filename, issue description and relevant code snippet). In addition, you will be given a set of similar past issues which were raised by the code reviewer on previous PRs together with their corresponding filename, description, code snippet, whether the past issue was addressed by the team (including how it was addressed), whether the past issue received a thumbs up or a thumbs down from the team, and any discussions related to the past issues.

You must then reason about the past issues to determine how likely it is that the team will address the new issue. For example, if the new issue is similar to a set of past issues that were not addressed or past issues that received thumbs downs (negative feedback), then you might say that it's unlikely that the team will address the new issue. As another example, if the new issue is similar to a set of past issues that were addressed or past issues that received thumbs ups (positive feedback), then you might say that it's likely that the team will address the new issue.

Please think carefully and take into account all of the information provided, including the PR summary and the filename, description and code snippet for each issue provided.

You must provide the likelihood that an issue will be addressed by the team as one of the following:

Extremely Likely: If the issue is extremely likely to be addressed by the team. Please only output this label if there is an overwhelming amount of evidence that the team will address the issue.

Very Likely: If the issue is very likely to be addressed by the team.

Somewhat Likely: If the issue is likely to be addressed by the team.

Somewhat Unlikely: If the issue is unlikely to be addressed by the team.

Very Unlikely: If the issue is very unlikely to be addressed by the team.

Extremely Unlikely: If the issue is extremely unlikely to be addressed by the team. Please only output this label if there is an overwhelming amount of evidence that the team will not address the issue.

Undetermined: If you are unsure about the issue or don't have enough context to make a determination.

Follow these steps to make your determination:
1. Read the filename, issue description and code snippet and extract the specific reason for the problem.
2. Generate 3-5 simple questions that will help you assess whether or not the team will address the issue. The questions should aim to clarify why the team should or should not address the issue, what the impact of not addressing it might be and what the team's thoughts on the issue are.
3. Review the past issues along with their descriptions and code snippets to find the answers to the questions above and write them down.
4. Make a decision based on your answers to determine if the issue would be addressed by the team. You must also provide both a detailed justification as well as a short summary of the justification.

Please structure your output as a valid JSON like:
```
[
    {{
        "question_1": "The first question you generate.",
        "answer_1": "Your answer to question_1.",
        "question_2": "The second question you generate.",
        "answer_2": "Your answer to question_2.",
        "question_3": "The third question you generate.",
        "answer_3": "Your answer to question_3.",
        "question_4": "The fourth question you generate.",
        "answer_4": "Your answer to question_4.",
        "question_5": "The fifth question you generate.",
        "answer_5": "Your answer to question_5.",
        "determination": "Extremely Likely", "Very Likely", "Somewhat Likely", "Somewhat Unlikely", "Very Unlikely", "Extremely Unlikely",
        "probability_team_will_address_issue": A percentage between 0 and 100,
        "detailed_justification": "Your full, detailed justification for the determination"
        "topic_justification": "Suggest a topic that represents the justification in a few words"
    }}
```

In response to this prompt, the set of language models output the following response:

```
".json
[
    {
        "question_1": "Has the team previously addressed issues related to error logging or handling in similar contexts?",
        "answer_1": "The team has not addressed similar issues related to error logging or handling in the past, as seen in past issues #1, #2, #3, #4, #5, #6, #7, #8, #9, #10, #13, and #14, where error handling was suggested but not implemented.",
        "question_2": "Is there a pattern of the team ignoring suggestions related to error handling or logging?",
        "answer_2": "Yes, there is a pattern of the team not addressing suggestions related to error handling or logging, as evidenced by the multiple past issues where such suggestions were made but not acted upon.",
        "question_3": "Does the current PR focus on improving error handling or logging?",
        "answer_3": "The current PR does not focus on improving error handling or logging; it primarily addresses the behavior of the 'dsa-question-list' function when an institute list does not exist.",
        "question_4": "Is the new issue critical to the functionality or stability of the application?",
        "answer_4": "The new issue is not critical to the functionality or stability of the application. It suggests adding error logging for monitoring purposes, which is more about improving observability rather than fixing a critical flaw.",
        "question_5": "Has the team shown interest in monitoring or logging improvements in the past?",
        "answer_5": "There is no evidence from the past issues that the team has shown interest in monitoring or logging improvements, as similar suggestions were not addressed.",
        "determination": "Very Unlikely",
        "probability_team_will_address_issue": 10,
        "justification": "Given the team's history of not addressing similar issues related to error handling and logging, and the fact that the current PR does not focus on these aspects, it is very unlikely that the team will address this new issue. The issue is not critical, and there is no indication that the team prioritizes logging improvements."
    }
]
"""
```

This prompting strategy was tested on a dataset of surfaced issues across all categories disclosed herein. The dataset contained 524 issues, and excluded issues labeled as "Undetermined" by the recommender. In this experiment, either 50% of issues were randomly muted, all minor issues were muted, the set of language models evaluated all past issues, the set of language models evaluated all past issues using Chain of Thought (CoT) prompting as disclosed herein, or the set of language models evaluated past issues with CoT and with access to the PR summary. The results using these prompting approaches on the dataset are summarized in Table 19. The quality ratio was defined as the number of non-fixed issues that were muted based on this method, divided by the number of fixed issues that were muted. A higher quality ratio indicates that the system did not mute or ignore issues that were more likely to be fixed (i.e. higher quality issues).

TABLE 19

| Model | % Fixed Issues Muted | % Non-Fixed Issues Muted | Quality Ratio |
|---|---|---|---|
| Random 50% Issues Muted | 50.00% | 50.00% | 10.40 |
| Mute All Minor Issues | 68.89% | 77.35% | 11.68 |
| Evaluating Past Issues | 10.87% | 33.26% | 31.80 |
| Evaluating Past Issues with CoT | 8.70% | 28.03% | 33.50 |
| Evaluating Past Issues with CoT & PR Summary | 13.04% | 33.82% | 26.83 |

The results of this experiment revealed that prompting the set of language models to evaluate past issues with CoT resulted in the highest quality ratio. The quality ratio with CoT was about 3 times higher than a random approach muting 50% of issues. Further, the approach with CoT was able to remove over 14 of non-fixed issues with the minimal amount of fixed issues muted. By leveraging past issues and user feedback (such as thumbs up or thumbs down responses, or user conversations), and whether or not users fixed issues, the set of language models can accurately predict if a new issue will be fixed by a user. This is an important component of the IQI for the recommender to make accurate decisions around which issues to surface and which to remove.

What is claimed is:

1. A computer-based system comprising: at least one processor and instructions executable by the at least one processor, individually or in combination with one or more other processors, to cause the at least one processor to perform operations comprising:
   (a) obtaining code, wherein the code comprises source code;
   (b) parsing the code to generate a structural representation of the code, wherein the code comprises a set of changes to the code, and wherein the structural representation comprises a graph representative of the code;
   (c) processing the code and the structural representation to generate a context for the code based at least in part on the graph;
   (d) processing the context and a set of prompts to generate a set of contextualized prompts, wherein at least two prompts in the set of prompts are specific for different categories of issues, wherein the set of contextualized prompts are selected based on the code using a prompt eliciting a large language model (LLM) to provide relevant categories of issues;
   (e) prompting a first set of language models with the set of contextualized prompts to generate a set of issue reports comprising a set of non-hallucinated issue reports and a set of hallucinated issue reports;
   (f) prompting a second set of language models to generate one or more questions to evaluate the set of issue reports and to generate one or more answers to the one or more questions by reviewing the code, wherein the second set of language models identifies and removes the set of hallucinated issue reports from the set of issue reports based at least in part on the one or more answers to generate a set of validated issue reports comprising the set of non-hallucinated issue reports, and wherein the one or more questions identify the set of hallucinated issue reports based on one or more accuracies of the one or more answers to the one or more questions;
   (g) filtering the set of validated issue reports to generate a set of prioritized issue reports; and
   (h) providing the set of prioritized issue reports to a user.

2. The computer-based system of claim 1, wherein the context describes (i) a feature intended to be implemented by the code, (ii) how the feature is implemented by the code, (iii) the code, or any combination thereof.

3. The computer-based system of claim 2, wherein the context is described in natural language.

4. The computer-based system of claim 3, wherein the processing in (c) is performed using a machine learning algorithm, wherein the machine learning algorithm comprises a language model.

5. The computer-based system of claim 1, wherein the structural representation represents a part of the code, wherein the part of the code is related to the set of changes.

6. The computer-based system of claim 5, wherein the structural representation represents the part of the code that is $n^{th}$-order linked to the set of changes, wherein n is a natural number, and wherein the $n^{th}$-order links represent dependency, relevancy, flow of data, or any combination thereof.

7. The computer-based system of claim 6, wherein the structural representation represents links between a file, a module, a class, a function, or any combination thereof, of the code.

8. The computer-based system of claim 7, wherein the graph of (b) comprises an abstract syntax tree or a concrete syntax tree.

9. The computer-based system of claim 1, wherein the (c) processing further comprises processing a user profile to generate the context.

10. The computer-based system of claim 9, wherein the user profile comprises an individual profile, a team profile, an organization profile, technical requirements, coding standards, configurations, or any combination thereof.

11. The computer-based system of claim 10, wherein the user profile comprises issues that were presented to the user, issues that were addressed by the user, issues that were not addressed by the user, issues that the user has provided feedback on, or any combination thereof.

12. The computer-based system of claim 1, wherein the set of contextualized prompts are selected by processing the context, a summary, the set of changes, the structural representation, or any combination thereof, using the LLM.

13. The computer-based system of claim 12, wherein the set of contextualized prompts comprises a template.

14. The computer-based system of claim 13, wherein the template comprises a Chain of Thought prompt, a chain of verification prompt, a few-shot learning prompt, or any combination thereof.

15. The computer-based system of claim 14, wherein the set of contextualized prompts comprises the context, a user profile, the structural representation, the code, or any combination thereof, integrated with the template.

16. The computer-based system of claim 15, wherein an issue report in the set of issue reports comprises (i) a description of an issue, (ii) a snippet of the code, (iii) a pull request that is relevant to a branch of the code, (iv) a confidence score of the issue report, (v) a priority or importance of the issue report, (vi) a category within which the issue report belongs, (vii) an actionability of the issue, (viii) a proposal or plan for fixing the issue, or (ix) any combination thereof.

17. The computer-based system of claim 1, wherein (f) comprises identifying a set of hallucinated issue reports, wherein the identifying the set of hallucinated issue reports is based on a Chain of Thought prompting.

18. The computer-based system of claim 17, wherein the Chain of Thought prompting comprises a question and answer structure, wherein the Chain of Thought prompting comprises an n-turn conversation.

19. The computer-based system of claim 1, wherein the filtering in (g) further comprises evaluating the set of validated issue reports for similarity comprising determining whether a subset of validated issue reports in the set of validated issue reports refers to similar issues, and wherein the operations further comprise removing an issue report from the subset of validated issue reports that is similar to another issue report from the set of validated issue reports.

20. The computer-based system of claim 1, wherein the filtering in (g) further comprises evaluating the set of validated issue reports for severity.

21. The computer-based system of claim 1, wherein the filtering in (g) further comprises evaluating the set of validated issue reports for priority comprises using a recommender system, wherein the recommender system is a machine learning algorithm.

22. The computer-based system of claim 1, wherein the operations further comprise (i) training the first and second sets of language models, or (ii) updating a template based on a dataset comprising resolved, partially resolved, unresolved, and undetermined issue reports in the set of validated issue reports.

23. The computer-based system of claim 1, wherein the operations remove at least 50% of hallucinated issue reports in the set of issue reports.

24. The computer-based system of claim 1, wherein the operations preserve at least 50% of non-hallucinated issue reports in the set of issue reports.

25. The computer-based system of claim 1, wherein the set of prompts comprises a prompt specific for a performance issue, wherein resolving the performance issue (i) increases the speed of the code, (ii) reduces memory consumed by the code, (iii) reduces storage used by the code, (iv) reduces latency of the code, (v) fixes incorrect or unexpected behavior of the code, or any combination thereof.

26. The computer-based system of claim 1, wherein the one or more questions in (f) determine an issue classification comprising a valid issue, a hallucination, or an undetermined issue.

27. The computer-based system of claim 14, wherein the Chain of Thought prompting comprises a question and answer structure or a self-dialogue.

28. A non-transitory computer-readable storage media encoded with a computer program including instructions executable by one or more processors to:
 (a) obtain code, wherein the code comprises source code;
 (b) parsing the code to generate a structural representation of the code, wherein the code comprises a set of changes to the code, and wherein the structural representation comprises a graph representative of the code;
 (c) process the code and the structural representation to generate a context for the code based at least in part on the graph;
 (d) process the context and a set of prompts to generate a set of contextualized prompts, wherein at least two prompts in the set of prompts are specific for different categories of issues, wherein the set of contextualized prompts are selected based on the code using a prompt eliciting a large language model (LLM) to provide relevant categories of issues;
 (e) prompt a first set of language models with the set of contextualized prompts to generate a set of issue reports comprising a set of non-hallucinated issue reports and a set of hallucinated issue reports;
 (f) prompt a second set of language models to generate one or more questions to evaluate the set of issue reports and to generate one or more answers to the one or more questions by reviewing the code, wherein the second set of language models identifies and removes the set of hallucinated issue reports from the set of issue reports based at least in part on the one or more answers to generate a set of validated issue reports comprising the set of non-hallucinated issue reports, and wherein the one or more questions identify the set of hallucinated issue reports based on one or more accuracies of the one or more answers to the one or more questions;
 (g) filter the set of validated issue reports to generate a set of prioritized issue reports; and
 (h) provide the set of prioritized issue reports to a user.

29. A computer-based method comprising:
 (a) obtaining code, wherein the code comprises source code;
 (b) parsing the code to generate a structural representation of the code, wherein the structural representation comprises a graph representative of the code, wherein the structural representation represents a part of the code, wherein the part of the code is related to a set of changes, and wherein the graph is representative of the part of the code;
 (c) processing the code and the structural representation to generate a context for the code based at least in part on the graph, wherein the context describes the code;
 (d) processing the context and a set of prompts to generate a set of contextualized prompts, wherein at least two prompts in the set of prompts are specific for different categories of issues, wherein the set of contextualized prompts are selected based on the code using a prompt eliciting a large language model (LLM) to provide relevant categories of issues;
 (e) prompting a first set of language models with the set of contextualized prompts to generate a set of issue reports comprising a set of non-hallucinated issue reports and a set of hallucinated issue reports;
 (f) prompting a second set of language models to generate one or more questions to evaluate the set of issue reports and to generate one or more answers to the one or more questions by reviewing the code, wherein the second set of language models identifies and removes the set of hallucinated issue reports from the set of issue reports based at least in part on the one or more answers to generate a set of validated issue reports comprising the set of non-hallucinated issue reports, and wherein the one or more questions identify the set of hallucinated issue reports based on one or more accuracies of the one or more answers to the one or more questions;
 (g) filtering the set of validated issue reports to generate a set of prioritized issue reports using a recommender system, wherein the recommender system is a machine learning algorithm, and wherein the set of prioritized issue reports identifies a cross-service issue in the code, a critical error in the code, a flawed design pattern in the code, a security issue in the code, or any combination thereof; and
 (h) providing the set of prioritized issue reports to a user.

* * * * *